United States Patent [19]

Grudowski

[11] 4,404,651
[45] Sep. 13, 1983

[54] PROGRAMMABLE CONTROLLER FOR USING CODED I/O DATA TECHNIQUE

[75] Inventor: Raymond A. Grudowski, S. Euclid, Ohio

[73] Assignee: Allen-Bradley Company, Milwaukee, Wis.

[21] Appl. No.: 242,048

[22] Filed: Mar. 9, 1981

[51] Int. Cl.[3] .................. G05B 19/02; G06F 3/04
[52] U.S. Cl. ................................ 364/900; 364/140; 364/141
[58] Field of Search ............... 364/900, 200, 140, 141

[56] References Cited

U.S. PATENT DOCUMENTS

| | | | |
|---|---|---|---|
| 3,643,115 | 2/1972 | Kiffmeyer | 307/296 R |
| 3,745,546 | 7/1973 | Struger et al. | 340/638 |
| 3,992,636 | 11/1976 | Kiffmeyer | 307/231 |
| 3,997,879 | 12/1976 | Markley et al. | 364/900 |
| 4,151,580 | 4/1979 | Struger et al. | 361/415 |
| 4,231,091 | 10/1980 | Motz | 364/900 |
| 4,250,563 | 2/1981 | Struger | 364/900 |
| 4,254,473 | 3/1981 | Galdun et al. | 364/900 |
| 4,282,573 | 10/1981 | Imai et al. | 364/140 |
| 4,293,294 | 10/1981 | Struger et al. | 364/900 |

Primary Examiner—Felix D. Gruber
Assistant Examiner—D. H. Rutherford
Attorney, Agent, or Firm—Quarles & Brady

[57] ABSTRACT

A programmable controller has a scanner module that couples a main processor through two multidrop serial data channels to a relatively large number of remotely located I/O interface racks. The main processor executes a control program to examine input status data coupled from I/O devices on a controlled system through the I/O interface racks and determines output status data which is coupled through the I/O interface racks to control output devices on the controlled system. The scanner circuit encodes a stream of output status data by generating an output mask work and the adapter circuit encodes a stream of input status data by generating an input mask word, the mask words being appended to streams of status data that are coupled to and from each rack in serial data messages. I/O status data that is selected for transmission over the serial data links is limited to data that has changed since the last time its associated I/O rack has been scanned, and refresh data that is periodically coupled to or from each rack, whether such status data has changed or not.

10 Claims, 20 Drawing Figures

CONTROL LOGIC A CIRCUIT

RECEIVE—TRANSMIT
CIRCUIT B

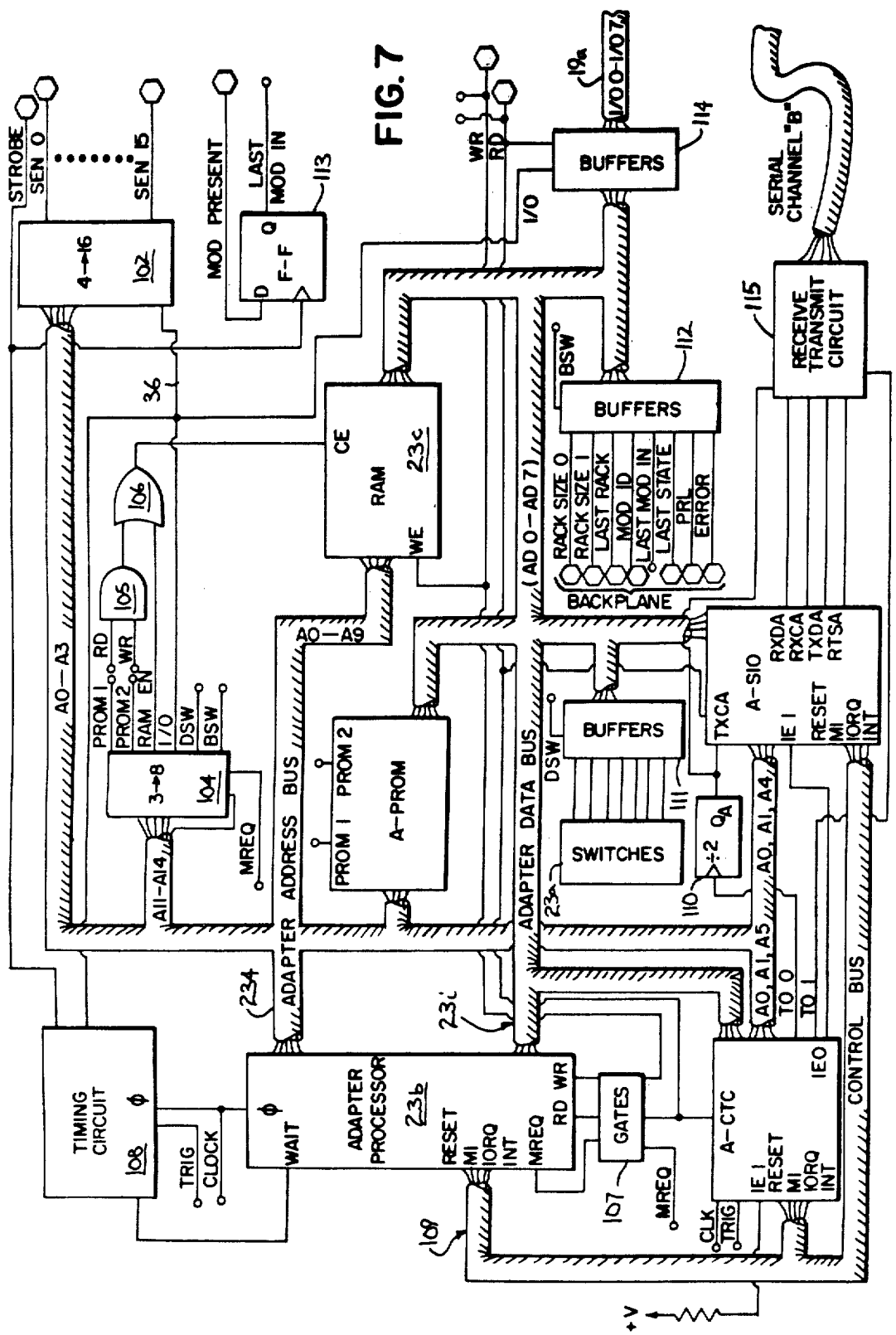

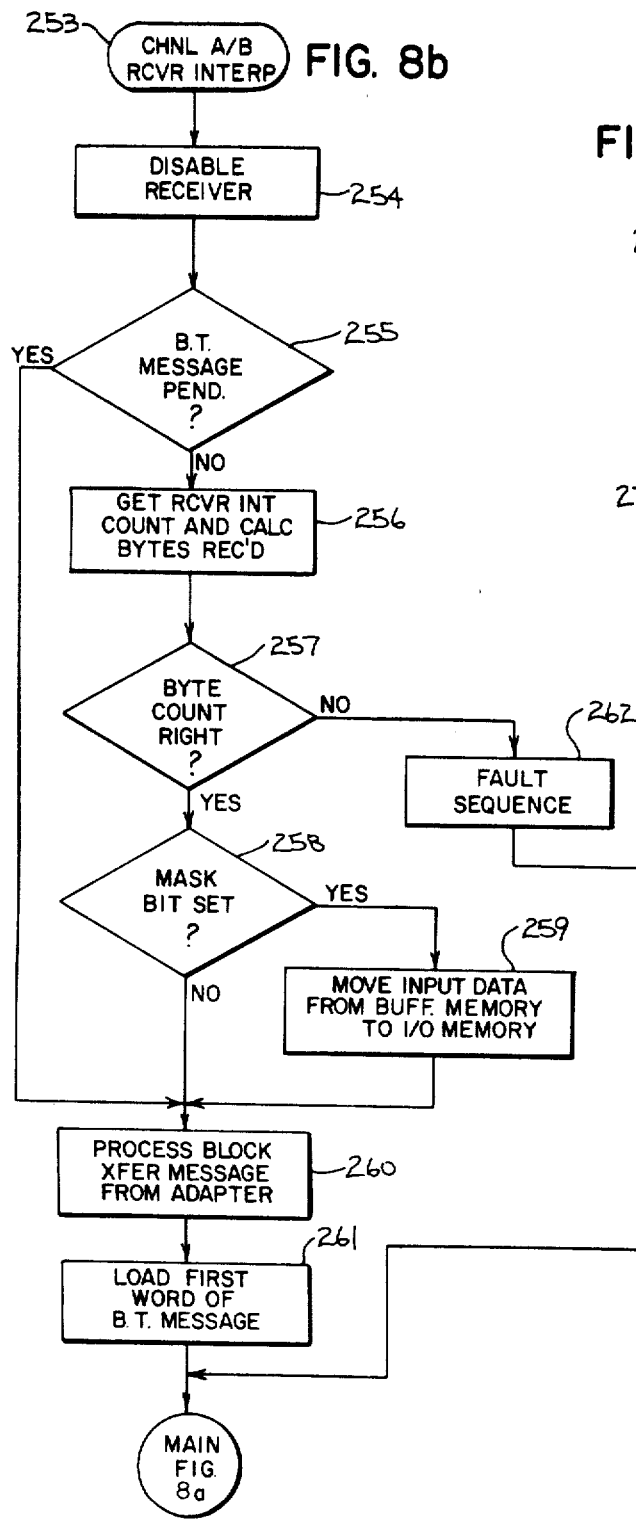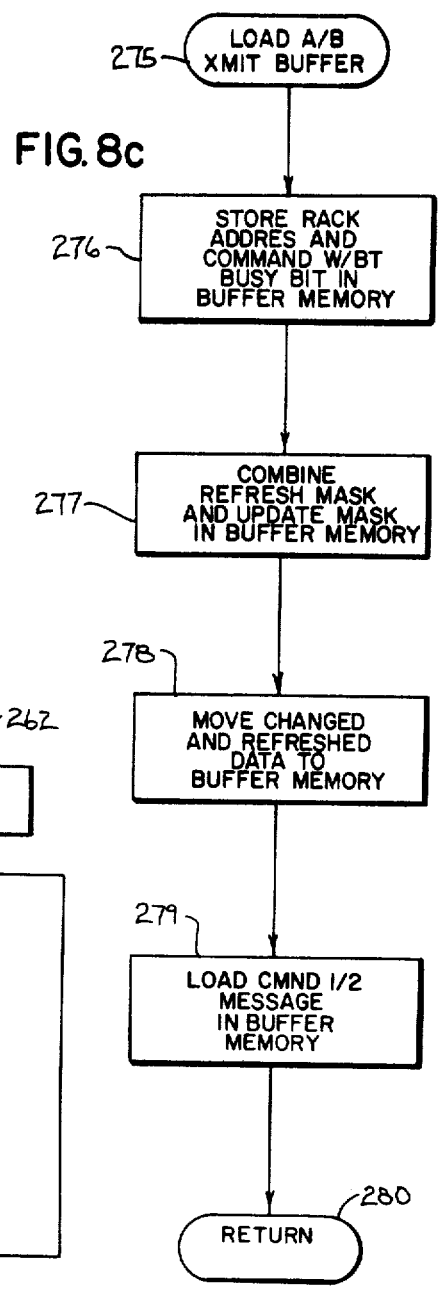

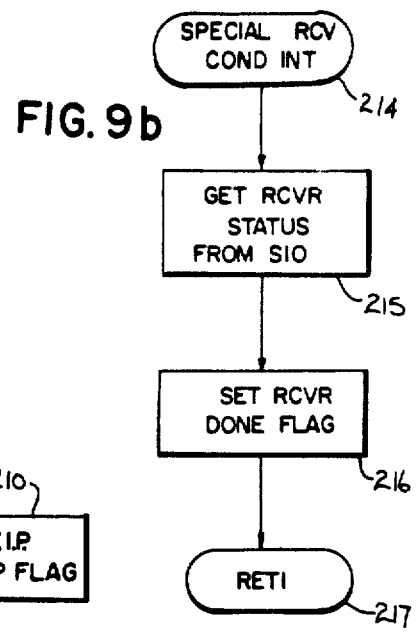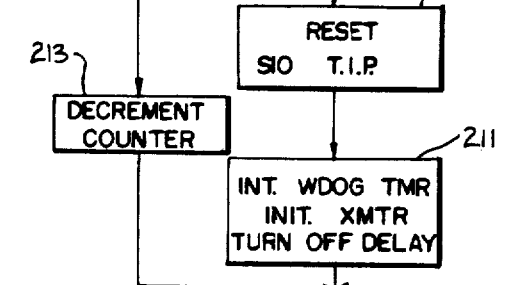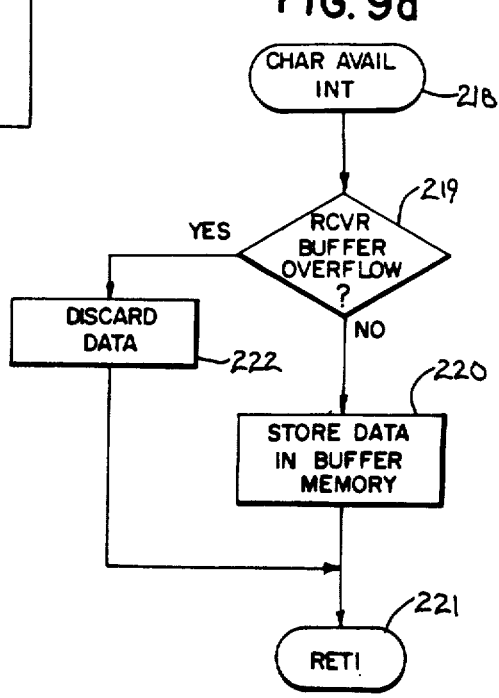

4,404,651

PROGRAMMABLE CONTROLLER FOR USING CODED I/O DATA TECHNIQUE

REFERENCE TO PROGRAM LISTING APPENDICES

Appendices D and E contain firmware listings which are printed on paper and which are hereby incorporated by reference in the specification herein. It is intended that such Appendices will be provided as a microfiche appendix in sufficient time to make the printing of Appendices D and E unnecessary.

BACKGROUND OF THE INVENTION

The invention relates to digital controllers that are used to control industrial machines and processes.

A programmable controller typically has a main processor that is connected through one or more I/O interface modules to I/O devices that control a machine or process. In early controllers the main processors and the I/O modules were housed separately, the I/O modules being placed in an I/O rack that was located near the machine or process being controlled. Several of these I/O racks could be placed at different locations and connected through cables to the main processor, however, the length of the cables between the I/O modules and the main processor was limited, because such cables were used for parallel data transmission.

Another type of programmable controller has provided a processor and I/O racks that could communicate over serial transmission lines, to permit the I/O racks to be located more remotely, at destinations up to 10,000 feet away from the main processor. Such a controller is described in Galdun et al, U.S. Pat. No. 4,254,473, issued Mar. 3, 1981, and entitled "Rack Adapter for Serially Connected I/O Interface Racks." This system employs a scanner circuit of an earlier period with a processor-based adapter circuit that allows serial connection of I/O racks along serial data channels. The scanner and adapter transmit words of conventional I/O status data in a synchronized, bit-oriented fashion.

The ability to interface I/O devices with a programmable controller has been recently enhanced with the invention of a programmable controller having remote I/O interface racks that can accommodate intelligent high-density I/O modules. Such a system is disclosed in a copending patent application of Schultz et al, Ser. No. 242,132, entitled "Programmable Controller for Executing Block Transfer with Remote I/O Interface Racks," filed Mar. 9, 1981, and assigned to the assignee of the present invention. Although larger quantities of I/O status data can be transferred in such a system, there is a need to reduce the time of individual transmissions of conventional I/O status data, so that a number of I/O interface racks can be scanned quickly enough to provide the responsive control that is needed in the industrial environment.

SUMMARY OF THE INVENTION

The invention is incorporated in a digital controller in which input and output status data are coupled between a main processor and I/O modules which, in actual operation of the controller, are coupled to I/O devices on a controlled system. The invention provides a remote I/O controller in which I/O modules are housed in an I/O interface rack that is remotely located from the main processor. The invention is partly embodied in a scanner circuit which couples the main processor to one end of a serial data link and is partly embodied in an adapter circuit that is disposed in the I/O rack with the I/O modules to couple them to a remote end of the serial data link. The serial data link may have multiple drop line connections providing more than one remote connection point for the I/O rack.

To increase the frequency of scanning each I/O rack and therefore the scan rate for the entire controller, the scanner and adapter circuits are selective in transmitting I/O status data over the serial data link. The scanner generates an output mask word, which it transmits with output status data in a serial data message to the I/O rack. The output mask word is generated with a bit pattern in which each bit corresponds to the position of at least one of the I/O modules in the rack. When a bit within the pattern is in one logic state, there is an indication that data is being sent for at least one I/O module in a corresponding position within the I/O rack. When this bit is in an opposite logic state, no data is being sent for that I/O location. The adapter circuit receives the serial data message and couples output status data to the I/O modules as indicated in the output mask word. The adapter circuit also couples input status data from the I/O modules and selects certain of this data for transmission back to the main processor through the scanner circuit. The adapter circuit generates an input mask word that is associated with the input status data that is coupled back to the scanner circuit in a reply serial data message. The input mask word also has a bit pattern which correlates input status data to locations in the I/O rack from which it originated, and to corresponding locations within an image table associated with the main processor.

A more detailed aspect of the invention involves the basis for selecting input and output status data for transmission. First, data that has changed since the last examination of the I/O modules is flagged by storing bits that make up a "data change" mask. This mask has eight bits, one for each pair of I/O modules (an I/O module group). Second, the data in each I/O module group must be periodically refreshed, irrespective of whether it has changed. A "refresh" mask is therefore generated so that each I/O module group is refreshed every eight scans of its I/O rack. The refresh mask word has only one bit set, and this bit rotates among the eight positions on a regular basis. This refresh mask is combined with the update mask in providing a resultant data change mask for output status data and for input status data.

Other objects and advantages of the invention will appear from the following description, in which reference is made to the accompanying drawing which forms a part hereof, and in which there is shown by way of illustration a preferred embodiment of the invention. Such embodiment does not necessarily represent the full scope of the invention, however, and reference is therefore made to the claims herein for interpreting the scope of the invention.

BRIEF DESCRIPTION OF THE DRAWINGS

FIG. 7 is a block diagram of the circuit in the adapter module of FIG. 2;

FIGS. 8a-8c are flow charts of a main program routine and associated subroutines which are executed by the serial processor of FIG. 2;

FIGS. 9a-9d are flow charts of the interrupt service routines executed by the serial processor of FIG. 2.

DETAILED DESCRIPTION OF THE PREFERRED EMBODIMENT

Figure 1:
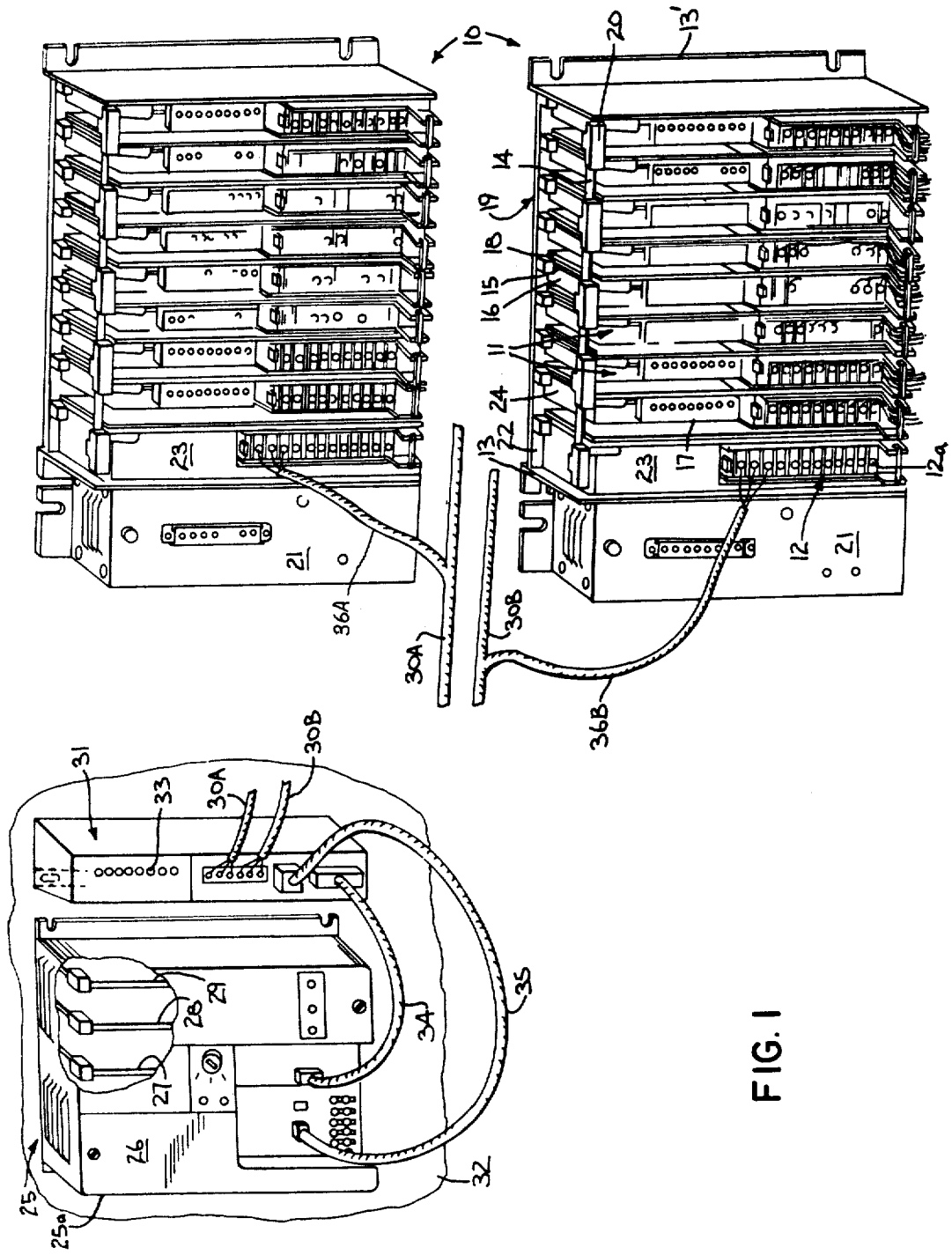
FIG. 1 is a perspective of a main processor unit and two remote I/O interface racks which embody the present invention and which are part of a programmable controller.

In FIG. 1, a programmable controller illustrates the preferred embodiment of the invention. The controller includes a group of I/O interface racks 10, two of which are seen in FIG. 1. These two I/O interface racks 10 each house eight I/O modules 11 which are connected through terminals 12a on the front of swing-arm, electrical connectors 12 to input and output devices (not shown) on a controlled system, which may be one of many industrial machines or processes that can be controlled with programmable controllers. Typical input devices are photocells, limit switches, selector switches and push buttons, while typical output devices include solenoid-operated hydraulic valves, motor starters, pump drives and pattern switches.

Each I/O interface rack 10 has a pair of upright, spaced apart sidewalls 13 and 13' that are connected by rods 14 (not shown) extending laterally therebetween. The rods provide support for guiderails (not shown) that extend from front to back and are paired to support circuit boards 15 included in the I/O modules 11. Besides a circuit board 15 each I/O module 11 has a cover 16 and a group of LED status indicators 17 disposed vertically along the upper front side of the cover 16. The I/O modules 11 slide into upright slots 22 that are separated by substantially parallel, spaced apart, upright barriers 18. The back edge of the circuit board 15 in each I/O module 11 plugs into a back edge connector (not shown) supported by a backplane motherboard 19 that extends across the back of each rack 10 and provides electrical interconnection between the modules 11. The swing-arm connectors 12 pivot around their lower ends to move forward, downward and away from their operating position along the lower front edge of each I/O module 11 so that modules 11 can be removed and replaced in the slots of the I/O interface rack 10. The upper front rod 14 in each I/O interface rack provides support for a group of circuit board latches 20, which hold the I/O modules 11 in place so that the swing-arm connectors 12 can be disconnected when necessary. Further details concerning the frame are disclosed in Struger et al, U.S. Pat. No. 4,151,580, issued Apr. 24, 1979.

The circuit boards 15 in the conventional I/O modules 11 include either a set of eight input circuits or a set of eight output circuits giving each I/O rack a conventional I/O capacity of sixty-four bits. The I/O modules 11 directly monitor and control the I/O devices on the controlled system. Input circuits which are suitable for this purpose are disclosed in Kiffmeyer, U.S. Pat. No. 3,643,115, issued Feb. 15, 1972, and Kiffmeyer, U.S. Pat. No. 3,992,636, issued Nov. 16, 1976, and output circuits which are suitable for this purpose are disclosed in Struger, U.S. Pat. No. 3,745,546, issued July 10, 1973. Power for the I/O modules 11 is provided by an auxiliary power supply 21 mounted on the left side wall of each rack 10.

The I/O interface racks 11 each have a lead slot 22, which is the left-most slot in each rack 10. The lead slot 22a is similar to the other slots 22 in the rack 10 except for the connections available on the backplane motherboard 19, which are adapted so that a special adapter module 23 can be received therein as seen in FIG. 1. The conventional I/O modules 11 in the other slots 22 may be replaced with special high density I/O modules of the type described in Struger et al, U.S. Pat. No. 4,293,294, issued Oct. 6, 1981, entitled "Programmable Controller with High Density I/O Interface," and assigned to the assignee of the present invention. Such high density modules are particularly well-suited for connection to analog I/O devices such as position transducers and position controls. One high density module 24 with the bit transfer capacity of eight conventional modules is positioned in I/O slot "0" of the lower rack 10 in FIG. 1.

A main processor unit 25 in FIG. 1 has a main processor enclosure 25a that houses a main power supply 26 in its left one-third portion and a plurality of upright, closely spaced and substantially parallel circuit modules 27-29 in its right two-thirds portion. These modules 27-29 include a processor interface module 27, a main processor module 28 and a memory module 29. The circuit which they form is disclosed in Struger, U.S. Pat. No. 4,250,563, issued Feb. 10, 1981. There, a local I/O system is described, wherein the main processor unit is connected through relatively short cables to I/O interface racks at a common location in an industrial environment. The present invention is concerned with a programmable controller having remote I/O interface racks, which can each be located up to 10,000 feet from the main processor unit. Communication over such distances is performed by transmission of serial data through communication cables 30A and 30B seen in FIG. 1 which form a two-channel serial data link. At one end, the cables 30A and 30B connect to a scanner module 31 that converts between parallel data used for internal processing within the main processor unit 25 and serial data used for communication with the I/O interface racks 10.

The main processor enclosure 25a and the scanner module 31 have apertured flanges for mounting them on a wall of a larger enclosure 32 of which a fragment is seen in FIG. 1. The scanner module 31 has eight LED-operated status indicators 33 on its upper front side and a terminal strip and two sockets along its lower front side. An I/O interface cable 34 plugs into one socket on the scanner module 31 and a corresponding socket on the main processor 25. Similarly, a power cable 35 connects the main processor 25 to the scanner module 31.

A pair of the transmission cables 30A and 30B that form a serial channel "A" and a serial channel "B", respectively, are connected to the terminal strip on the scanner module 31. Along serial channels A and B, drops are made through shorter cables 36A and 36B, which are connected to the upper three terminals 12a on swing-arm connectors 12 that engage the front edge of circuit boards within the remote I/O adapter modules 23. As will be described in more detail below, these adapter modules 23 cooperate with the scanner module 31 to transfer I/O status data through the serial data channels 30A and 30B. These adapter modules 23 are physically interchangeable with the local adapter modules described in U.S. Pat. No. 4,250,563, cited above.

The number, size and distribution of I/O interface racks 10 is flexible and varied. In this embodiment, up to the seven "rack groups" can be connected through rack adapters 23 and drop lines 36A and 36B to serial channels A and B. A rack group has 128 I/O circuits distributed in I/O modules in one to four primary I/O racks 10 and up to 128 additional I/O circuits distributed in I/O modules in one to four complementary I/O racks 10 at "extended I/O" addresses. The adapter module 23 in each I/O rack 10 includes switches which determine the rack group number, an extended I/O address, and the first module group of the rack.

Figure 2:
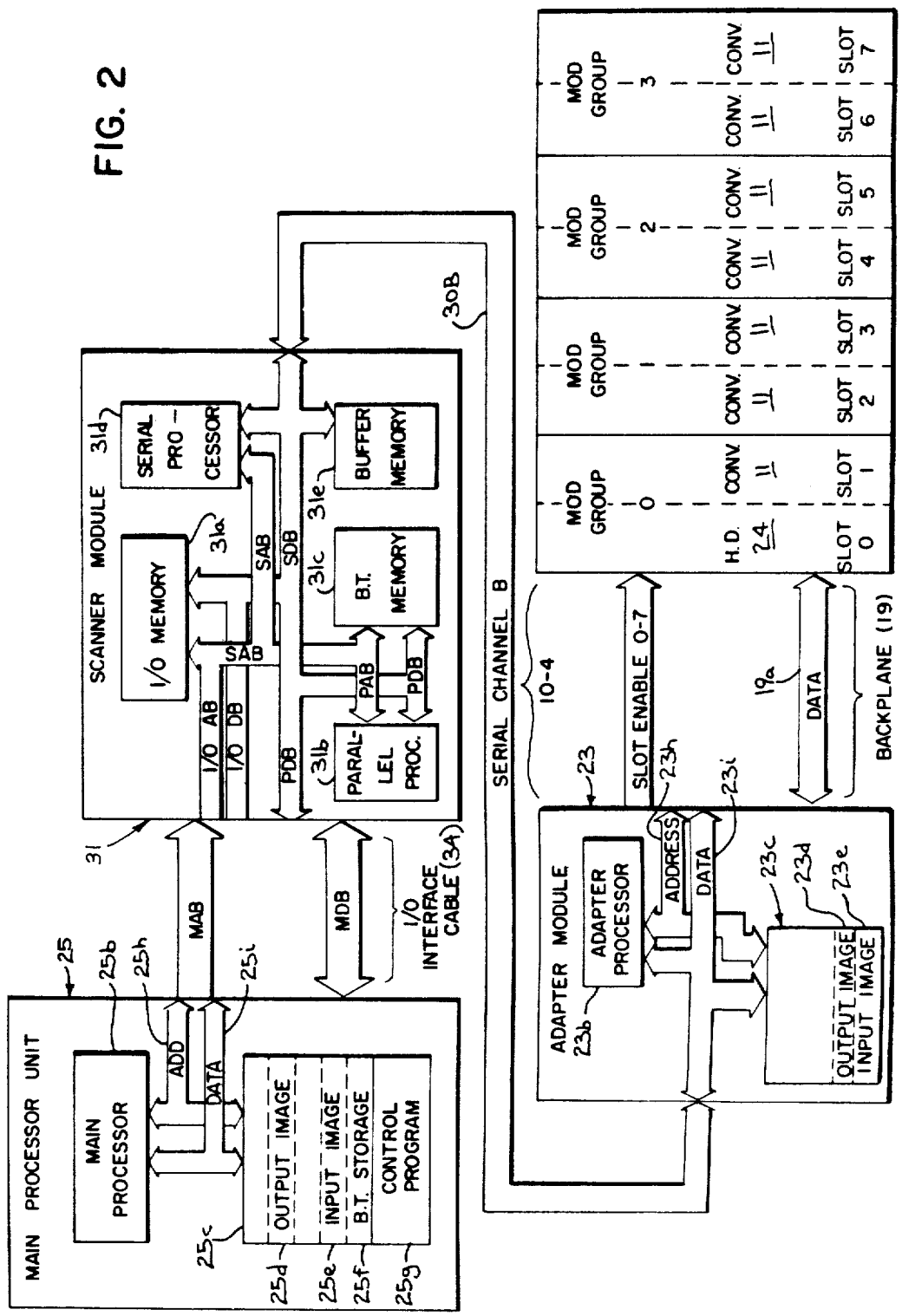
FIG. 2 is a block diagram showing the major circuit components of the main processor unit of FIG. 1 and one of the remote I/O interface racks connected to it through serial channel B.

As seen in FIG. 2, the main processor unit 25 includes a main processor 25b, and a main memory 25c with an output image table 25d, with an input image table 25e and with a block transfer storage area 25f. As explained in U.S. Pat. No. 4,293,294, cited above, block transfer data is coupled to and from the storage area 25f through the image tables 25d and 25e. The main memory 25c also stores a control program 25g, which is executed by the main processor 25b to examine input bits in the input image table 25e and to set output bits in the output image table 25d according to the logic in the instructions making up the control program 25g. The control program 25g is periodically interrupted to execute an I/O scan routine in which I/O status data is coupled between the main I/O image tables 25d and 25e and an I/O image table in a scanner I/O memory 31a. The scanner I/O memory 31a stores conventional I/O data of the type used in conventional I/O modules 11, as well as block transfer requests which are coupled to the I/O racks 10 through this memory 31a.

For both conventional I/O transfers and block transfers, the scanner 31 serves as a buffer between the main processor unit 25 and the serial data link, including channel B seen in FIG. 2. Although FIG. 1 shows that the main processor modules 27-29 and the scanner module 31 are separately housed, it should be apparent to those skilled in the art that these modules 27-29 and 31 could be housed in a single enclosure without departing from the principles of the invention.

Referring again to FIG. 2, the scanner module 31 includes a serial processor 31d which couples serial data between channel B and a buffer memory 31e. The serial processor 31d then supervises data transfer between either the I/O memory 31a and the buffer memory 31e or between the block transfer memory 31c and the buffer memory 31e according to the type of I/O transfer involved. In the preferred embodiment, the I/O memory 31a, the block transfer memory 31c and the buffer memory 31e are all read/write random-access memories. The specific chips constituting these memories are given in Appendix C, which lists the manufacturers' chip descriptions for the components referred to in the following narration. The serial processor 31d and the parallel processor 31b are both Z80A-CPU microprocessor chips manufactured by Zilog, Inc. Besides the description herein, information concerning the architecture, operation and instruction set for these microprocessor chips is available in a Z80-CPU Technical Manual, copyright 1976 by Zilog, Inc.

Normally, the serial processor 31d has access to the I/O memory 31a, with the main processor 25b being allowed to interrupt the serial processor 31b to gain access to the I/O memory 31a. The main processor 25b and main memory 25c are coupled to the scanner circuitry through associated address and data buses 25h and 25i, through main address and data buses (MAB) and (MDB) in the I/O interface cable 34, and finally through I/O address and data buses (I/O AB and I/O DB) on the scanner module 31. The main data bus (MDB) provided by the I/O interface cable 34 also connects to a parallel data bus (PDB) to couple the parallel processor 31b and the block transfer memory 31c to the main processor 25a. The parallel processor 31b is also connected through a paralled address bus (PAB) to the block transfer memory 31c. On the serial processor side, serial address and data buses (SAB and SDB) couple the three scanner memories 31a, 31c and 31e to the serial processor 31d. The manner in which data is coupled from the serial processor 31d to the serial channel B will be explained in more detail below.

At the other end of serial channel B the adapter module 23 for one of the channel B racks is seen. The connection of the internal data path 23i to serial channel B and the adapter processor 23b will be apparent from the more detailed description of the adapter circuitry relative to FIG. 7. The adapter processor 23b is coupled through adapter address and data buses 23h and 23i to an adapter memory 23c. This memory 23c has an output image table 23d, an input image table 23e and a block transfer storage area 23f that are similar to those in the main memory 25b. The adapter processor 23b generates slot address signals on the adapter address bus 23h, and these address signals are decoded to generate signals on the SLOT ENABLE lines 0-7, which connect through the backplane to I/O modules in respective slots 22 of the rack 10. The backplane 19 forms part of a bidirectional data bus 19a for coupling data between the adapter processor 23b and the I/O modules 11. It will be noticed that the I/O modules 24 and 11 in slots "0" and "1" form "module group 0," and that the I/O modules 11 in slots "2" and "3" form "module group 1." Thus, for user addressing purposes in generating a control program 25g, each I/O module 11 provides the high or low word in a particular module group. The exception is the high density module 24 in slot 0 which provides a multiword block of I/O status data instead of the normal word, but it is addressed at a single I/O slot location.

Figure 3:
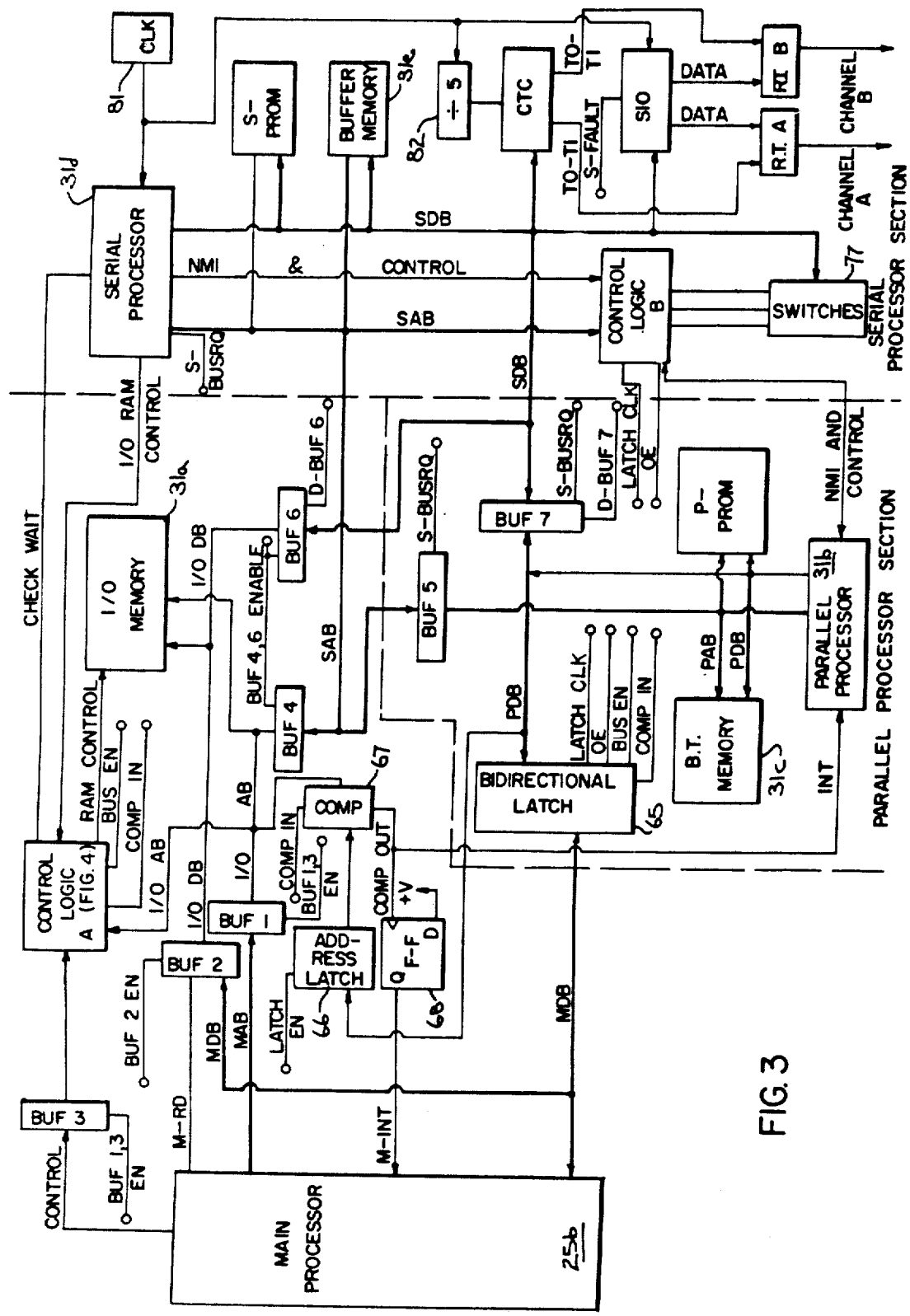
FIG. 3 is a more detailed block diagram of the circuit in the scanner module of FIG. 2.

The supporting hardware in the scanner module 31 had been reserved for presentation in FIG. 3. The scanner processors 31b and 31d cooperate with such supporting hardware to communicate with the main processor and with one another and to alternate control of their interconnecting buses. As seen in FIG. 3, one portion of this hardware is represented by a CONTROL LOGIC A circuit, which receives control signals from the main processor unit 25 through lines of a CONTROL bus and a BUF 3 set a buffers. The CONTROL LOGIC A circuit also receives control signals coming through I/O RAM CONTROL lines from the serial processor 31d. The CONTROL LOGIC A circuit provides output signals on RAM CONTROL lines that are responsive to control signals from either the main processor unit 25 or the serial processor 31d to enable the I/O memory 31a when a respective processor has signalled for access to it.

When the main processor unit 25 has access to the I/O memory 31a, the memory 31a is addressed through the main address bus (MAB), a BUF 1 set of buffers and the I/O address bus (I/O AB). Data is coupled between the main processer unit 25 and the memory 31a through the main data bus (MDB), a BUF 2 set of buffers and the I/O address data bus (I/O DB). Certain lines in the I/O address bus (I/O AB) are used as control lines which connect to the CONTROL LOGIC A circuit.

Figure 4:
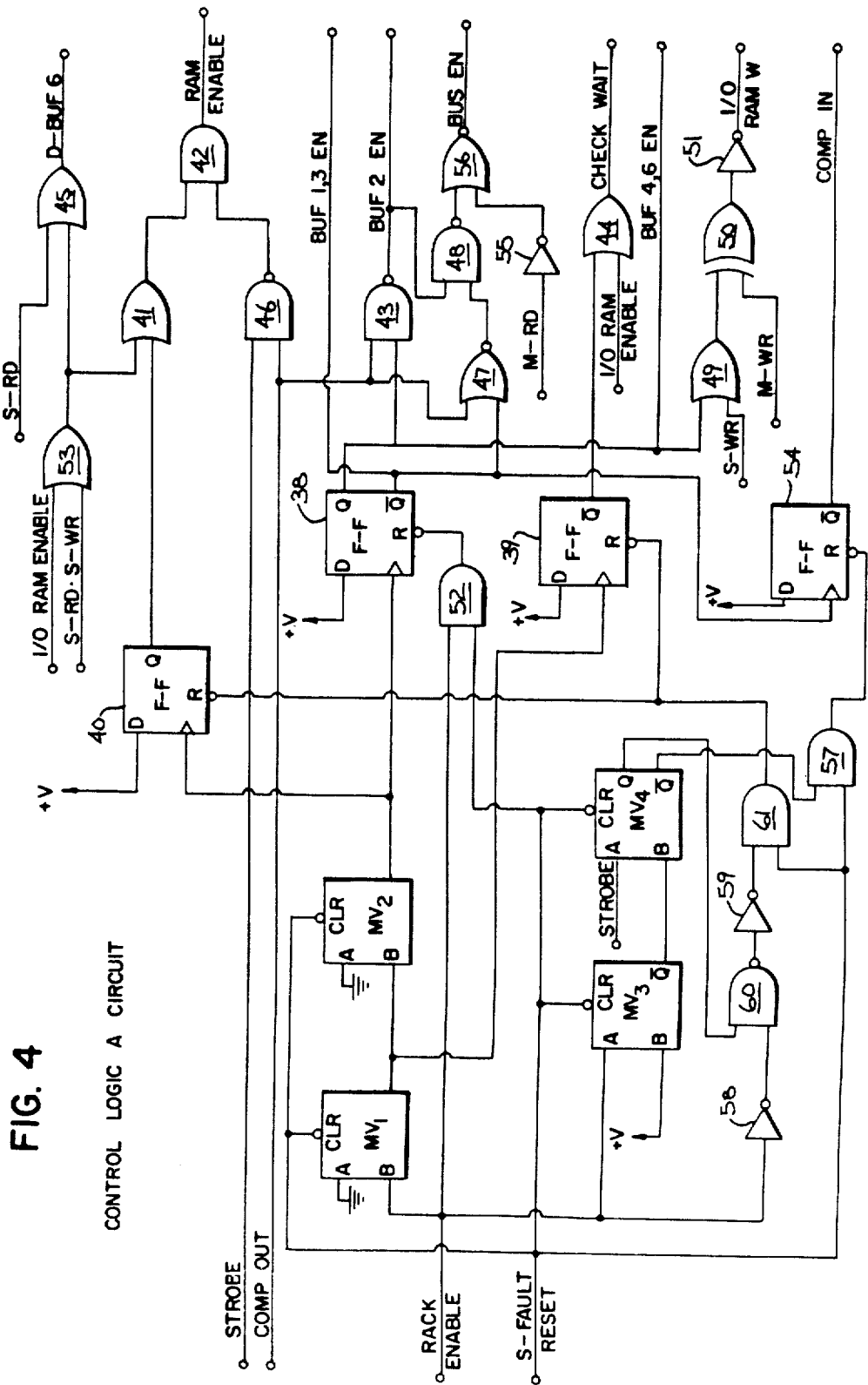
FIG. 4 is an electrical schematic diagram of the control logic A circuit seen in FIG. 3.
Figure 5:
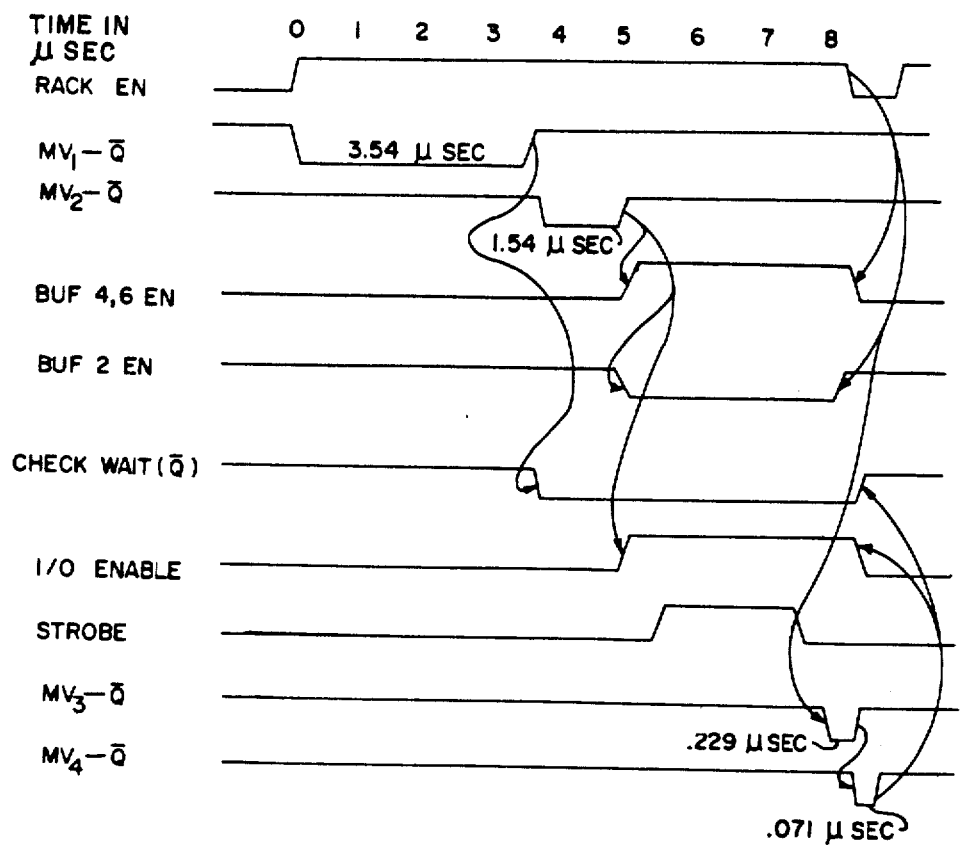
FIG. 5 is a timing diagram illustrating the operation of the circuit of FIG. 4.
Figure 6:
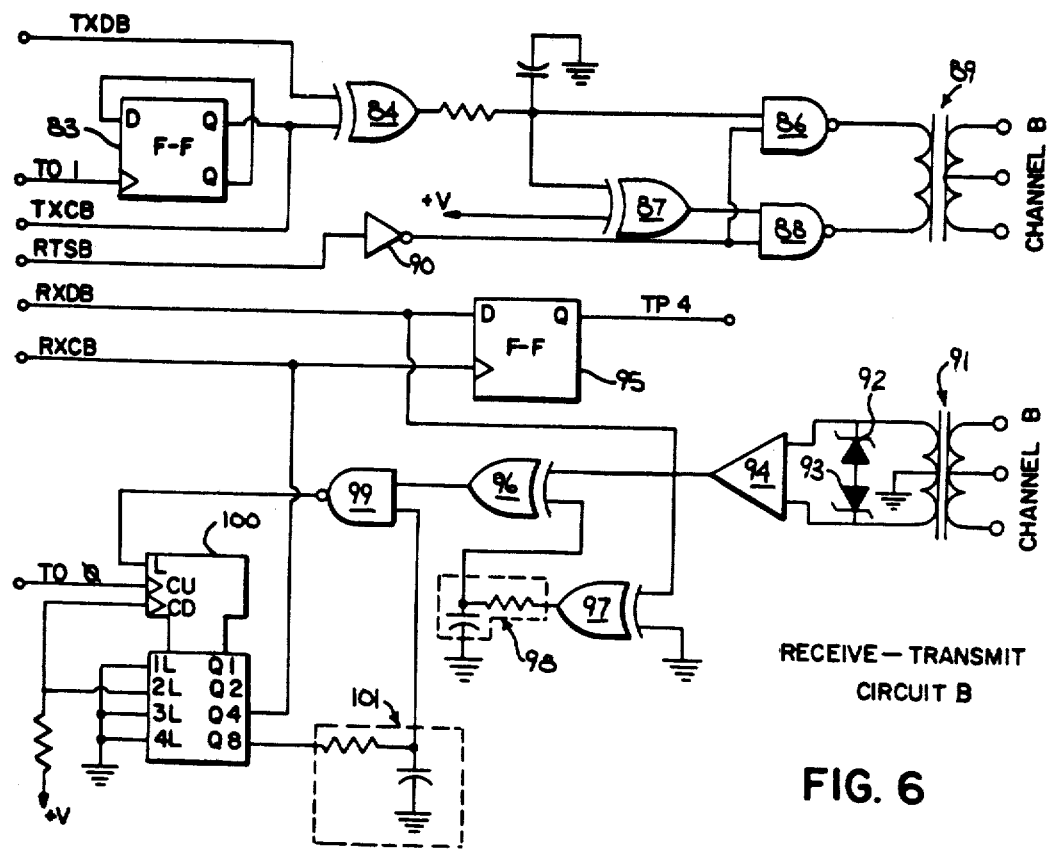
FIG. 6 is an electrical schematic diagram of one of the receive-transmit circuits of FIG. 3.

Control of the conventional I/O memory 31a by the serial processor 31d is interrupted through the CONTROL LOGIC A circuit in a manner best understood by considering FIGS. 4–6 together. In FIG. 5 one of the control lines coming from the main processor unit is the RACK ENABLE line, which is connected to a B input on a first multivibrator $MV_1$, to an A input on a third multivibrator $MV_3$ and through an AND gate 52 to a reset (R) input on a BUF ENABLE flip-flop 38. A low true signal on the RACK ENABLE line (one of the CONTROL lines in FIG. 4) is inverted by the BUF 3 buffers (FIG. 4) to generate a logic high signal at the B input at $MV_1$ in FIG. 5. As seen in the timing diagram, FIG. 6, the Q output of $MV_1$ goes low with the RACK ENABLE signal, and when the multivibrator times out in 3.54 microseconds, a logic high is generated at the B input on a second multivibrator $MV_2$, causing the Q output on $MV_2$ to go low for a period of 1.54 microseconds. The output signal from the $MV_1$ multivibrator also generates a clock pulse to the CHECK WAIT flip-flop 39. Referring again to FIG. 5, the trailing edge of the pulse from the $MV_2$ multivibrator provides clock pulses to an I/O ENABLE flip-flop 40 and to the BUF ENABLE flip-flop 38, respectively. Logic high signals are generated at the Q outputs of these flip-flops 38 and 40 to disable the BUF 4, 6 ENABLE line and the gates 41 and 42 controlling the RAM ENABLE line. This interrupts serial processor control of the buses that provide access to the I/O memory 31a.

When serial processor control is interrupted by the preceding sequence of signals, access to the I/O memory 31a by the main processor 25b is established. Referring again to FIGS. 4, 5 and 6, the Q output on the BUF ENABLE flip-flop 38 is high, thereby enabling the BUF 2 set of buffers through NAND gate 43 and the BUF 2 ENABLE line. The BUF 2 buffers couple data between the main processor unit 25 and the I/O memory 31a. The Q output of the BUF ENABLE flip-flop is now low, and so therefore, is the BUF 1,3 line that carries an enabling signal to the BUF 1 and BUF 3 buffers in FIG. 4. The signal on the BUF 1,3 enable line is also used to clock a comparator enable (COMP EN) flip-flop 54, which has a Q output coupled through the COMP in line to enable the comparator (COMP) 67 and the bidirectional latch 65. The significance of this will be seen below in relation to generating an interrupt signal to the main processor 25b. The BUF 1 buffers couple addresses from the main processor unit 25 to the I/O memory 31a and to the comparator 67. The I/O memory 31a is enabled through the RAM ENABLE line (FIG. 5) which is one of the RAM CONTROL lines in FIG. 4. As seen in FIG. 5, the main processor 25b controls this enabling signal when it sets the I/O ENABLE flip-flop 40, the latter having its Q output coupled through gates 41 and 42 to the RAM ENABLE line. The main processor write (M-WR) line is coupled through an XOR gate 50 and an inverter 51 to control an I/O memory write (I/O RAMW) line connecting to the I/O memory 31a. The M-RD line is also coupled through an inverter 55 and NOR gate 56 to control a main bus enable (BUS EN) line going to the bidirectional latch 65 in FIG. 4. This line controls the state of the MDB and allows the main processor 25b to couple latched data from the bidirectional latch 65. The main processor read (M-RD) line seen in FIG. 4 is employed to control the direction in which the BUF 2 set of buffers are enabled. Whether the main processor 25b couples data through the BUF 2 buffers or the bidirectional latch 65 depends upon the state of the COMP OUT line which is coupled through gates 43, 47, 48 and 56 to both the BUF 2 enable lines and the BUS EN line. Assuming the COMP OUT line is not active, the main processor 25b will enable the BUF 2 set of buffers.

When the main processor 25b has access to the I/O memory 31a, access is denied to the serial processor 31b. As seen in FIG. 5, the Q output of the CHECK WAIT flip-flop 39 is connected through an OR gate 44 to a CHECK WAIT line, which is seen in FIG. 4 connecting the CONTROL LOGIC A circuit to the serial processor 31d. If the serial processor 31d coupled a logic low signal on the I/O RAM ENABLE line while the main processor 25b has access to the I/O memory 31a, a signal is generated to the serial processor 31d on the CHECK WAIT line to keep it in a "wait" state. When such a signal is generated on the CHECK WAIT line, the operation of the serial processor 31d is suspended for approximately 4.5 microseconds. This suspension is ended when, as seen in FIG. 6, the RACK ENABLE signal is removed by the main processor 25b, and pulses are generated first by the $MV_3$ multivibrator and then by the $MV_4$ multivibrator. As seen in FIG. 5, such logic low pulses at the Q outputs of these multivibrators will reset the CHECK WAIT, I/O ENABLE and COMP EN flip-flops 39, 40 and 54, the latter being coupled to the Q output on the $MV_4$ multivibrator through AND gate 57. It should be noted, however, that the reset pulse for the CHECK WAIT and I/O ENABLE flip-flops 39 and 40 actually originates at the Q output of the $MV_4$ multivibrator which is coupled with the RACK ENABLE and SYSTEM RESET lines through inverters 58 and 59 and gates 60 and 61 to the reset (R) inputs on these flip-flops 39 and 40. The BUF ENABLE flip-flop 38 is reset in response to a signal on the SYSTEM RESET line that is coupled through AND gate 52. This signal also clears the multivibrators $MV_3$ and $MV_4$ and controls the reset signal to the COMP EN flip-flop 54 through AND gate 52.

Still referring to FIG. 5, when the BUF ENABLE flip-flop 38 is reset in response to trailing edge of the positive RACK ENABLE pulse, and when the I/O ENABLE flip-flop 40 is reset, the serial processor 31d has access to the I/O memory 31a. The serial processor 31d controls the RAM ENABLE line through an I/O RAM ENABLE line coupled through the OR gate 53, the OR gate 41 and the AND gate 42. The serial processor 31d controls the direction of data flow through the I/O D-BUF 6 line, which is controlled through the I/O RAM ENABLE line and the serial process read (S-RD) line and write line (S-WR), that are coupled through OR gate 53 and a NOR gate 45. The BUF 4 and BUF 6 buffers are enabled, through a BUF 4, 6 ENABLE line which is in a normally low, enabled state unless the BUF ENABLE flip-flop 38 is set during a RACK ENABLE pulse as explained above. Referring to FIG. 5, the signal on the BUF 4, 6 ENABLE line is also coupled through a NOR gate 49 with the signal on a serial processor write (S-WR) line to provide serial processor control of the I/O RAMW line. From this description it should now be apparent how the necessary buffers and control lines are enabled by the main processor 25b and the serial microprocessor 31d to gain access to the I/O memory 31a.

Referring to FIG. 3, the scanner 31 has two processing sections that are interconnected. The serial processor buses (SAB and SDB) are coupled through BUF 5 and BUF 7 sets of buffers, respectively, to a parallel processor address bus (PAB) and a parallel processor data bus (PDB). Through these buses the serial processor 31d has access to the block transfer memory 31c. The PAB and PDB buses also connect the parallel processor 31b to the block transfer memory 31c and to a parallel processor program memory (P-PROM) that stores firmware instructions for the parallel processor 31b.

The parallel processor 31b and the serial processor 31d generate interrupt signals to one another through the CONTROL LOGIC B circuit to take control of the PAB and PDB buses and the block transfer memory 31c. This circuit and its operation are described in the copending application of Grudowski et al that has been cited above and filed on even date herewith. The description in that application is hereby incorporated by reference.

Still referring to FIG. 3, to communicate through the serial data channels A and B, the serial processor 31d reads and executes firmware instructions from a serial processor program memory (S-PROM) to initialize a programmable SIO (serial input/output) circuit. A clock circuit 81 for the serial processor 31d has an output connected to both the serial processor 31d and to the SIO circuit to provide timing signals. The SIO circuit converts between parallel data received through the SDB bus and serial data which is coupled to and from the SIO circuit through receive and transmit (R.T.) circuits A and B. The receive-transmit circuits A and B are coupled to serial channels A and B, respectively. The output of the clock circuit 81 is also coupled through a divide-by-five counter 82 to an input on a CTC (counter/timer circuit). Two timing outputs on the CTC are connected to the receive-transmit circuits A and B, respectively. The CTC is a programmable timing circuit which receives command data through the SDB bus and generates certain timing signals for the receive-transmit circuits A and B from the basic timing signals generated by the clock circuit 81.

In the preferred embodiment the SIO circuit is a Z80A-SIO and information on this circuit is available in a Z80-SIO Technical Manual, copyright 1977 by Zilog, Inc. The CTC circuit is a Z80A-CTC circuit and further information concerning it is available in a Z80A-CTC Technical Manual, copyright 1977 by Zilog, Inc.

The receive-transmit circuit B is seen in more detail in FIG. 6. The receive-transmit circuit A is the same except for an additional flip-flop 83 in the B circuit which is clocked by a signal on the TO1 line. This flip-flop 83 provides a signal at one-half the TO1 frequency to one input of an XOR gate 84 and to a transmit clock (TxCB) input on the SIO circuit. A second input on the XOR gate 84 receives a signal on a line from the transmit data output (TxDB) on the SIO. This XOR gate 84 provides a Manchester-coded transmission signal which is coupled through a resistor 85 to a first NAND gate driver 86. This coded signal is also coupled through an XOR gate 87, which is used as an inverter to an input on a second NAND gate driver 88. A primary winding of a transformer 9 is coupled across the outputs of the two NAND gate drivers 86 and 88. A secondary winding of this transformer 89 is coupled to the long transmission lines in Channel B of the serial data link. A data terminal ready to send (RTSB) line is coupled through an inverter 90 to a second input on the two NAND gate drivers.

The receiver portion of this circuit includes a transformer 91 with a primary winding that couples receiving lines in Channel B to a secondary winding. A pair of Zener diodes 92 and 93 are coupled across a secondary winding to protect a line receiver 94 that has its own input terminals coupled across the secondary winding. The output of the line receiver 94 is connected to the receive data (RxDB) input on the SIO circuit. This line is also coupled to the D input on a test flip-flop 95, which has a line from the receive clock (RxCB) output on the SIO circuit connected to a clock input to provide a test point (TP4) for checking whether data is being received. The output of the line receiver 94 is coupled to one input of an XOR gate 96 that decodes signals from transmission lines and this output is also coupled to one input of a second XOR gate 97. The output of the second XOR gate 97 is coupled through an RC coupling circuit 98 to the second input on the decoding XOR gate 96 to provide pulses for the decoding operation. The output of the first XOR gate 96 is coupled through a NAND gate 99 to a latch (L) input in a binary up/down counter 100. This counter 100 receives a timing signal from the CTC circuit on the T00 timing line, which is connected to its count up (CU) input. The frequency of this signal is one of two user-selectable baud rates which are divided by eight to produce a signal at the Q3 output of this counter, which signal serves as the receive clock frequency at the RxCB input of the SIO circuit. The Q4 output on the counter 100 is coupled through an RC circuit to the second input on the NAND gate 99 so that incoming pulses are sampled during 75% of their duty cycle as part of the decoding of the received transmission signals. This completes the description of the receive-transmit circuits A and B, which have been the last circuits on the scanner module 31 to be described.

The adapter module circuit described generally in FIG. 2 is seen in more detail in FIG. 7. The adapter processor 23b is a Z80A-CPU microprocessor manufactured by Zilog, Inc. It is coupled through lines A0-A3 of the adapter address bus 23h to a four-line-to-sixteen-line decoder 102 to decode slot enable signals that are generated on slot enable lines (SEN0-SEN15). The adapter processor 23b is also connected through lines A0-A10 of the address bus to an adapter processor program memory (A-PROM) which stores the adapter firmware instructions, and to a read/write random-access memory (RAM) 23c which stores the I/O status data described earlier with reference to FIG. 3. The processor 23b is also connected through the adapter address bus 23h to a three-line-to-eight-line decoder 104 which decodes signals on address lines A11-A14 to generate chip select signals on the adapter module 23. Portions of the A-PROM are enabled through the PROM 1 and PROM 2 control lines coming from the three-line-to-eight-line decoder 104 so that program instructions can be read from the A-PROM through lines AD0-AD7 of the adapter data bus 23l. The RAM 23c is enabled at a chip enable (CE) input, to which the read (RD), write (WR) and RAM enable (RAM EN) control lines are coupled through an AND gate 105 and an OR gate 106. The WR line is also connected to a write enable (WE) input on the RAM 23c. The RD, WR and memory request (MREQ) lines are processor control lines which originate at the adapter processor 23b and which are coupled through three OR gate drivers 107. The MREQ line connects to an enable input on the three-line-to-eight-line decoder 104.

A timing circuit 108 provides timing signals to the processor 23b through a CLOCK line. The basic timing signals on the CLOCK line are generated at a frequency of 3.684 megahertz. The timing circuit 108 also generates a 1.8432 megahertz signal on a trigger (TRIG) line and couples signals to the processor 23b through a WAIT line to coordinate processor outputs to the backplane.

The adapter processor 23b is also connected through several lines in a control bus 109 to an adapter CTC (A-CTC) circuit and an adapter SIO (A-SIO) circuit, which employ the same circuit chips as the circuits described previously for the scanner module 31. The A-SIO circuit is coupled to serial channel 115 through its Channel A receive and transmit terminals and a receive-transmit circuit 115 similar to the one in FIG. 8. The A-SIO and A-CTC circuits are programmable circuits, which are programmed by data coupled to them through the adapter data bus 23i. Control signals are provided through the control bus 109 that includes a RESET line, an M1 line, an IORQ line and an interrupt (INT) line. The processor read (RD) line is also connected to the A-SIO. The A-SIO circuit can generate a range of interrupt signals to the processor 23b using the INT line, and using the adapter data bus 23i to convey an interrupt address. Other control signals are coupled to the A-SIO and the A-CTC circuits through lines A0, A1, A4 and A5 of the address bus 23h to control which chip and which register within that chip is being selected.

The CTC circuit receives basic timing signals through the CLOCK line and the trigger (TRIG) line coming from the clock circuit 108 and generates timing signals from outputs T00, T01, and T02. The frequency of signals on the T00 line are divided by two by a counter 110, which has its $Q_4$ output connected to the channel A transmit clock (TxCA) input on the SIO circuit, and the T01 output is connected to the receive-transmit circuit B.

The A-CTC circuit and the A-SIO circuit are connected in an interrupt priority chain through interrupt enable inputs and outputs. The interrupt enable input (IEI) on the CTC circuit is pulled high while the interrupt enable output (IEO) is connected to the interrupt enable input on the SIO circuit. This gives the A-CTC circuit priority over the A-SIO circuit in generating interrupts to the processor 23b. For a more detailed explanation of the working of this interrupt priority chain, reference should be made to the technical manuals which are cited above for the SIO and CTC circuits.

Also seen in FIG. 7 is the DIP switch 23a that is used to select the rack number and starting address of the rack 10 in which the adapter 23 is used. These switches can be read through the adapter data bus 23i when the buffers 111 are enabled through a DSW line coming from the three-line-to-eight-line decoder 104. The adapter processor 23b can also read the status of certain lines, some of which are connected to the backplane. The status of these lines is read through the adapter data bus 23i and a second set of buffers 112 which are enabled through a BSW line coming from the three-line-to-eight-line decoder 104. These lines include a LAST MOD IN coming from the Q output of a flip-flop 113 and a MOD ID line on the backplane that is active when the high density module 24 has been addressed.

The adapter module 23 is connected to the I/O back plane (as symbolized by the hexagonal connectors in FIG. 7) through a standard set of lines which include the STROBE line, the SLOT ENABLE lines (SEN0-SEN 15) a module present (MOD PRESENT) line, an I/O RESET line (not shown), a WR line, an RD line, and lines I/00-I/07 of the I/O data bus 19a. The MOD PRESENT line connects to a D input on the flip-flop 113 that generates the LAST MOD IN signal. The I/O data bus 19a is coupled through a set of buffers 114 to the adapter data bus, these buffers being enabled through the READ line and an I/O control line coming from the three-line-to-eight-line decoder 104. This completes the description of the circuitry on the adapter module 23.

In sending messages over the serial data channels A and 13, the serial processor 31d employs a serial protocol with a basic unit of information referred to as a frame. The basic frame is organized as follows:

FLAG/DESTINATION ADDRESS/COMMAND/STATUS/DATA/CRC/FLAG

The beginning and end of the frame are marked by flag segments. A 16-bit cyclic redundancy code (CRC) segment is generated to protect against communication errors in the other segments. The command segment provides commands identified as Command 1, Command 2, Command 3, etc. In the following description these segments will be examined in more detail, and while most of the segments include a byte or eight bits of data, the more generalized term "word" shall be used. A word of data may be four, eight or sixteen bits long and words of different length could be employed in practicing the invention. For purposes of serial data transmission, however, messages are most easily broken down into byte-sized words, which may be packed together, or subdivided, if necessary for processing in other embodiments.

A Command 2 message is used by the serial processor 31d for conventional I/O data transfer and the frame for Command 2 is organized as follows: FLAG/RACK ADDRESS/BUSY BIT & CMD02(H)/MASK/OUTPUTS/CRC/FLAG In particular, the rack address word is defined in Table 1 as follows:

TABLE 1

| Bit | Description | |
| --- | --- | --- |
| 7 | Reserved for Scanner Address | |
| 6 | Rack Identifier | |
| 5 | Rack Identifier | |
| 4 | Rack Identifier | |
| 3 | Rack Identifier | |
| 2 | Rack Identifier | |
| 1 | ↓ Rack Identifier | 00 = Slot 0 |
| | (Starting Slot) | 01 = Slot 2 |
| | | 10 = Slot 4 |
| | | 11 = Slot 6 |

Up to 32 I/O rack groups can be identified with a five-digit rack identifier, although in the present embodiment the maximum number is seven rack groups with a possibility of complementary racks to effectively provide fourteen rack groups. The command word for the Command 2 message is defined as seen in Table 2 with bit 7 depending on the state of the block transfer busy bit.

TABLE 2

| Bit | 7 | 6 | 5 | 4 | 3 | 2 | 1 | 0 |
|-----|---|---|---|---|---|---|---|---|
| State | B.T. Busy Bit | 0 | 0 | 0 | 0 | 0 | 1 | 0 |

A Command 2 message from the scanner will also include one or more words of output data and a mask word. The mask word includes one bit for each module group of two I/O modules so that if a particular bit is set, data will be sent for that module group.

The output mask in the Command 2 message is actually the logical combination of an "update mask," a "refresh mask" and a rack/size position mask. The update mask contains bits which are set for each word of output status data which has changed in the I/O memory 31a since data at that I/O memory address was last coupled to the buffer memory 31e. From zero to eight bits can be set in the update mask. The refresh mask contains a single rotating bit which is set at each of eight positions over a sequence of eight scans of an I/O rack 10. The rack/size position mask has bits set for occupied module groups, and unless a bit is set for a particular module group, a bit set in the refresh or update mask for the module group will be effectively cancelled when the rack/size position mask is combined with the refresh and update masks.

A Command 1 message is an input/output/reset command message that is the first command sent from the scanner 31 to an I/O rack 10 when starting or restarting communication to that rack 10. The message frame is organized as follows:

FLAG/RACK/ADDRESS/B.T. BUSY BIT & CMD01(H)/MASK/OUTPUTS/CRC/FLAG

The command word for Command is further defined in Table 3 below.

TABLE 3

| Bit | 7 | 6 | 5 | 4 | 3 | 2 | 1 | 0 |
|-----|---|---|---|---|---|---|---|---|
| State | B.T. Busy Bit | 0 | 0 | 0 | 0 | 0 | 0 | 1 |

An important difference between a Command 1 message and a Command 2 message is that while masked output data is sent in a Command 1 message, it is never seen at the I/O devices on the controlled system due to the active state of the I/O RESET line during the time a Command 1 message is sent.

In response to a Command 1 and Command 2 message, the adapters 23 send a Reply 1 and Reply 2 message, respectively to the scanner 31, the message frame for both Reply 1 and Reply 2 is defined generally as follows:

FLAG/SCANNER ADDRESS 80(H)/REPLY WORD/MASK/INPUTS/B.T. SLOT ADDRESS & MSW/CRC/FLAG

The Reply 1 and Reply 2 messages both include input data. And, although a Command 1 message is not effective to couple output data to the I/O devices, a Reply 1 message is effective to couple input data to the scanner 31 and ultimately to the main processor 25b. Therefore, when starting or restarting communication to a rack, communication is established by the receipt of input data. A Command 2 message, which is used after communication has been established, also results in a Reply 2 message which couples input data to the scanner 31.

The Reply 1 and Reply 2 messages included an input data mask associated with its segment of input data. The adapter processor 23b scans the input modules 11 in its associated I/O rack 10 to determine whether the status of their input circuits has changed since input status data was last coupled to an I/O image table in the adapter RAM 23c (See Appendix B). Where changed input data is detected, a bit is set in an update mask. When the adapter assembles the Reply 1 and Reply 2 messages, it combines this update mask with a refresh mask to insure that at least one word of input status data will be sent to the scanner. This refreshed input data is coupled to back through the scanner 31 to the main processor 25b the main memory 25c to produce words of refreshed output data which are then transmitted to the adapter in Command 2 messages over a number of scans of the I/O racks, as explained above.

Both the serial processor 31d and the adapter processor 23b check the block transfer status of each I/O address before coupling input or output status data for that address. Where high density I/O modules 24 are present, and have requested service, such modules 24 will either be serviced or skipped in the scanning sequence until serviced. Accordingly, mask bits are not set for locations where such high density modules 24 are detected. This will become more apparent from the more detailed description of the operation of the processors 23b and 31d that follows. Full details covering the processing of block transfer data, including the coupling of special Command 3 and Command 4 messages, are provided in the concurrently filed application of Schultz et al, entitled "Programmable Controller For Executing Block Transfer With Remote I/O Interface Racks," and assigned to the assignee of the present invention. The disclosure in that application is hereby incorporated by reference.

Referring to FIG. 3, the firmware instructions for the serial processor 31d are stored in its associated S-PROM and are listed in Appendix D. The instructions are grouped in a main loop routine and associated subroutines and a set of interrupt routines associated with the SIO and CTC. The interrupt routines are initiated by signals from the SIO which are received at the INT input of the serial processor 31b. These signals are accompanied by data on the serial data bus (SDB) signifying the type of interrupt.

The main types of SIO-generated interrupts are transmit interrupts, receive interrupts and special condition interrupts. The CTC also generates an interrupt when an internal watchdog timer times out. Channels A and B are separately responsive to channel-designated interrupts with Channel A having a higher priority than Channel B. Within the interrupt subset for a single channel, the receiver, transmit and special condition interrupts have a priority in the order they have been mentioned. When the transmit interrupt is enabled, the serial processor 31d is interrupted by the transmit buffer becoming empty. (This implies that the transmitter must have had a data character written into it so that it can become empty). When enabled, the receiver can interrupt the serial processor 31d either on receiving a character or on detecting a special receive condition, such as a flag segment. The "receiver" and "transmitter" are internal circuits of the SIO which are described in more detail in the Z80-SIO Technical Manual cited above.

For each of the above mentioned SIO and CTC interrupts, the serial processor 31d executes a corresponding interrupt routine of instructions listed in Appendix D. These interrupt routines have been summarized in the form of flow charts 9a-9d. The main program routines executed by the serial processor 31d are summarized in the flow charts in FIG. 8a-8c.

Referring to FIG. 9a, a transmit buffer empty interrupt routine begins in response to the interrupt signal, and this beginning is represented by start block 206. As represented by decision block 207, a block of instructions is executed to see whether the last data has been transmitted. If so, another block of instructions is executed to check the reset transmitter pending (RTP) flag, as represented by decision block 208. Whatever the result, the transmit interrupt pending flag in the SIO is reset as represented by process blocks 209 and 210. Where the RTP flag is set and a XMIT BUFF EMPTY interrupt occurs, the serial processor 31d will read and execute a group of instructions to initialize the watchdog timer, as represented by process block 211, which introduces a time delay before turning off the transmitter after a message transmission. Returning to decision block 207, where further data is present in the buffer memory 31e to be transmitted through the SIO, the data is loaded into the SIO from the buffer memory 31e, as represented by process block 212, and the message byte counter is decremented as represented by process block 213. After proceeding through one of the three alternative paths charted in FIG. 9a, the serial processor 31b returns from the interrupt as represented by return block 295.

When a special condition interrupt (SPEC REC INT) signal is received at the INT input on the serial processor 31b, as represented by start block 214 in FIG. 9b, the serial processor 31b reads a receiver status word, as represented by process block 215. The special condition interrupt normally results at the end of a message and the receiver status word will then have an active end of message flag. The serial processor 31d then sets a receiver done flag, as represented by process block 216, and returns from the interrupt as represented by return block 217.

Referring to FIG. 9d, the reception of a character generally results in a receive character interrupt represented by start block 218 in FIG. 9d. The serial processor 31d executes instructions as represented by decision block 219 to check for overflow of the receiver buffer area in the buffer memory 31e. Assuming overflow has not occurred, the incoming character is stored in the buffer memory 31e as represented by process block 220 and the serial processor returns from the interrupt as represented by return block 221. Where overflow has occurred, the incoming data is discarded as represented by process block 222.

It should be remembered that there are two sets of sequences such as described in relation to FIGS. 9a, 9b and 9d, one set for each channel. Referring to FIG. 9c, there is a CTC watchdog interrupt routine for each of the channels A and B. The start of the routine at reception of an interrupt signal is represented by start block 223. As represented by decision block 224 and process block 225, the serial processor 31d detects any watchdog time outs and saves the receiver status for processing during a fault diagnostics routine of a type commonly used by those skilled in the art. The serial processor 31d also executes instructions to restart the watchdog timer. Where a time out has not occurred, the SIO receiver is enabled and the watchdog timer is restarted as represented by process block 226. The serial processor 31d then returns from the watchdog interrupt as represented by terminal block 227.

Figure 8A:
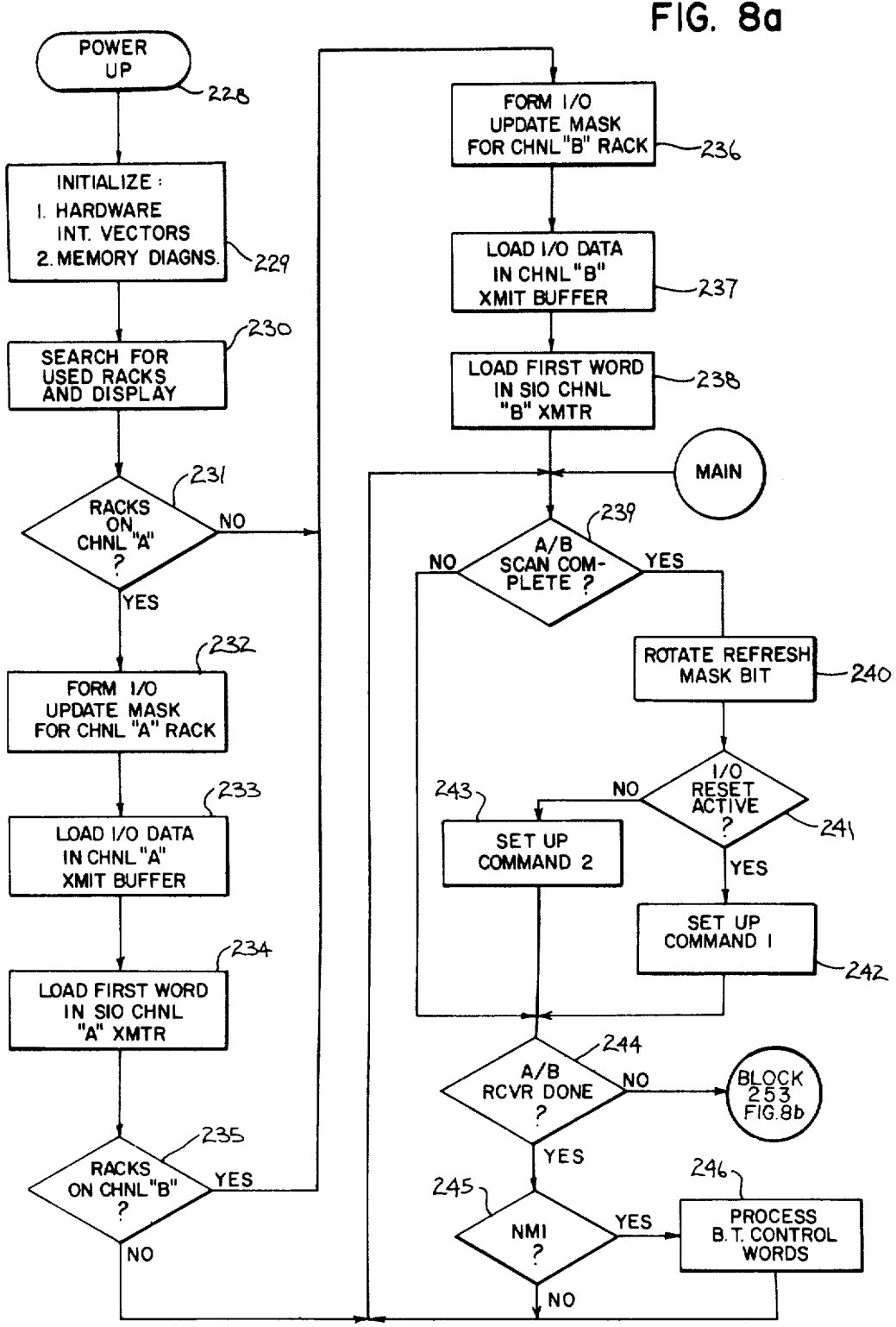

The hardware interrupt service routines just described are continuously interrupting a main program sequence represented in FIGS. 8a-8c. As discussed above, the serial processor 31d communicates through the scanner SIO, the serial data link 30, and the adapter SIO and adapter processor 23b at the other end of the serial data link 30. As explained previously, this communication is carried out through command messages and their corresponding reply messages.

The manner of operation of the serial processor 31d is better understood by reference to a map of the buffer memory 31e which is set forth in Appendix A. As seen there, the first 256 lines of the memory 31e are reserved for a LAST STATE IMAGE table. This table maintains an image of the last reported status of all the I/O modules in the remote system. The first 128 lines of the table accommodate a basic system while the second 128 lines are provided for I/O racks 10 at "extended I/O" addresses.

Following the LAST STAGE IMAGE table is a RACK STATUS table of 64 lines with each line storing a rack status word for a quarter rack of two module groups. The rack status word pertains to block transfers of I/O status data. Following the RACK STATUS table is a RACK SIZE/POSITION table of 64 words, which shows which I/O slot positions are used, and which are unused and how the slots are grouped by I/O racks. Next, a group of miscellaneous counter, pointer and status words are stored, including a group of hardware interrupt vectors. Then follows a rack table, and the transmitter and receiver buffers for channel A and channel B, respectively. The rack tables store three words for each rack. The first word is the rack address; the second word is the corresponding address in the I/O memory 31a and the third word is the I/O update mask, which indicates where I/O data has changed in the I/O memory 31a from the LAST STATE IMAGE table. The transmitter and receiver buffers for each channel are areas in the buffer memory 31e for storing 192 words of data and these areas may each be apportioned in different ways between the receiver and transmit buffers. Following the buffer storage for channel B are more miscellaneous pointer, counter and status words.

Referring now to FIG. 8a, after the serial processor 31d is powered up as represented by stack block 228, instructions in its associated S-PROM are executed to set up the table of hardware interrupt vectors in the first miscellaneous area mentioned above to communicate with the SIO and the CTC, and to perform memory diagnostics on the buffer memory 31e and the S-PROM. Execution of this initialization routine is represented by process block 229. Next, the serial processor 31d executes a block of instructions represented by process block 230 to search for I/O racks being used. For each rack 1-7 being used in a system, one of the LED status indicators 33 on the forward portion of the scanner module 31 seen in FIG. 1 is illuminated. Next, as represented by decision block 231, it is determined whether these racks are connected through channel A to the scanner 31.

The serial processor 31d then begins at I/O scan in which communication is initiated with the first rack on each channel. The serial processor 31d alternately scans a rack in each channel executing the blocks of instructions 231-238. As represented by process block 232, the I/O data which is stored in the I/O memory 31a for the first rack on channel A is compared with the I/O data which is stored in the LAST STATE IMAGE table in the buffer memory 31e for the same rack, to see whether "changed I/O status data" is present in the I/O memory 31a. If so, a bit is set in an update mask work for each module group for which changed data is detected. As represented by process block 233, data is then loaded into a channel A transmit buffer area in the buffer memory 31e.

This sequence is seen in more detail in FIG. 8c, where the call to the subroutine is represented by start block 275. Next, as represented by process block 276, the rack address word and a command word for a message are stored in the channel A transmit buffer area in the buffer memory 31e. If there is a pending block transfer request, the block transfer busy bit is set in the command word and the B.T. issued bit is set in the rack status word as represented by process block 277. The refresh mask and the update mask for the current rack are combined, and based on the bits that are set in the resulting mask word, data for corresponding I/O module groups are moved from the I/O memory 31a to the buffer memory 31e as represented by process block 278. If a block transfer is pending at a particular address, however, the mask bit for that address is reset until the high density I/O module 24 requesting block transfer has been serviced. The command word for either Command 1 or Command 2, and all of the message data necessary to generate a Command 1 or Command 2 message are loaded into the buffer memory 31e, as represented by process block 279. The serial processor 31d then returns to the sequence in FIG. 8a, as represented by return block 280, and loads the first word of the message into the SIO channel A transmitter, as represented by process block 234. A similar sequence of blocks 235-238 is then executed for a rack 10 connected to the scanner 31 through channel B. Executing the sequence of instructions represented by blocks 231-238 effectively establishes communication with the first rack on each of the serial channels A and B.

After establishing communication, the serial processor 31d enters a MAIN program loop to scan each of the other racks connected through serial channels A and B until scanning of all of the racks 10 is completed. "Scanning" in this instance includes the transmission and receipt of messages to and from the respective racks 10, as contrasted with localized scanning which involves sequential addressing and coupling of data through a backplane or parallel data bus. As represented by decision block 239, the serial processor 31d begins this loop by checking several status bits to determine whether the scan of the channel A and B racks has been completed. When a scan is completed, the status bits are reset and the I/O reset line is checked as represented by decision block 240 to see whether it is active. Where the I/O reset line is active, a command word for a Command 1 is set up (stored) in a command word register as represented by process block 241. Where the I/O reset line is not active, a command word for Command 2 is set up (stored) in a command word register, as represented by process block 242. The next time a command message with conventional I/O status data is assembled in the transmit buffer, the contents of the command word register will determine wheter a Command 1 or Command 2 is sent. As mentioned above, when the I/O reset line is active, the outputs are reset and only inputs are coupled through the reply message to the scanner 31. Besides transmitting command messages, the serial processor 31d must also determine what reply messages have been received, and this is represented by decision block 243. After all data has been received from the I/O racks 10, the serial processor 31d checks to see whether it has received an NMI interrupt signal from the parallel processor 31b, as represented by decision block 244. If no such signal has been received, the serial processor 31d loops back to the beginning of the MAIN program loop. Where an NMI interruput has been received, the serial processor executes a block of instructions represented by process block 245 to read and process certain control words related to block transfers before returning to the MAIN program loop.

Referring to FIG. 8b, a receiver interpreter subroutine (CHNL A/B RCVR INTRP) is charged, and there is one of these subroutines corresponding to each of the serial channels A and B. A call to the subroutine is represented by start block 253 and is executed when the decision in block 243 in FIG. 12a is negative. The processor 31d first executes a block of instructions represented by process block 254 to disable the SIO receiver. The serial processor 31d then looks for a message with a block of I/O status data that has been received and temporarily held in the buffer memory 31e. It does this by executing a block of instructions represented by decision block 255, wherein the receipt of a message with a block of I/O status data results in a block transfer receiver pending flag being set. When this condition is detected, the serial processor 31d jumps forward to execute instructions to process message data related to block transfers, as represented by process block 260. It then loads the first word of a command message with the SIO transmitter as represented by process block 261 before returning to the MAIN program loop in FIG. 8a.

When a block transfer message is not pending, the serial processor 31d executes a block of instructions represented by probess block 256 to calculate the number of bytes in the previous incoming message, and to calculate the number of bytes that would be expected according to the information provided in the control words, including the mask word, of the message. These two byte counts are compared by executing a block of instructions represented by decision block 257. If the byte count is not correct, a fault sequence represented by process block 263 is executed before returning to the MAIN program loop in FIG. 8a. Assuming the byte count is correct, instructions represented by decision block 258 are executed to examine the appropriate bit in the mask word and determined whether refreshed or updated I/O status data has been received with the message. If so, instructions represented by process block 259 are executed to move this data from the buffer memory 31e to the I/O memory 31a. Where the mask bit indicates that no refreshed or updated I/O status data is applicable to this particular I/O address, block 259 is skipped. It will be remembered that Reply 1 and Reply 2 messages from the adapter contain both the conventional I/O status data for an I/O rack and additional information for initializing a block transfer so this data is processed next in executing block 260, before initializing the next command message in block 261.

Referring to FIG. 7, the adapter processor 23b cooperates with the A-SIO to communicate through the serial channel B similar to the serial processor 31b and the SIO at the other end. The adapter processor 23b, however, must also communicate through the control lines (terminating with the hexagon symbol in FIG. 7) and the I/O data bus 19a which connect to the I/O backplane. Firmware instructions for the processor 23b are stored in the adapter processor (A-PROM) and are organized in routines in Appendix E that are summarized in FIGS. 10a-10f. In executing these routines, the adapter processor 23b uses the adapter RAM 23c as a scratchpad for storage of pointers, counters and intermediate results as well as for storage I/O and block transfer data. Reference to Appendix B is helpful in understanding the organization of the adapter RAM and the routines to be described.

Figure 10A:
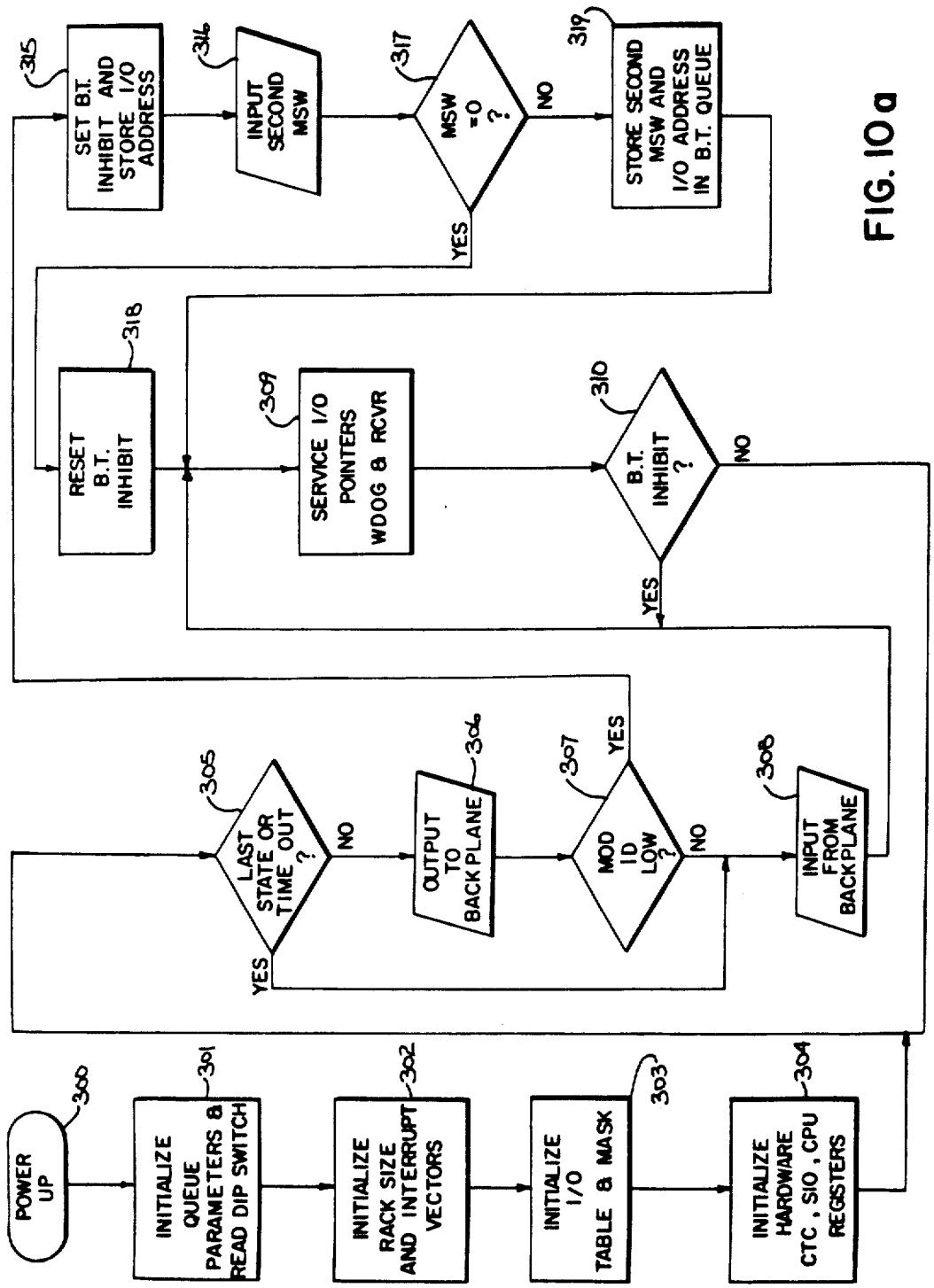
FIGS. 10a-10f are flow charts of the firmware routines executed by the adapter processor of FIG. 2.

The adapter processor 23b executes certain initialization tasks and then enters a loop as seen in FIG. 10a in which the I/O modules 11 are sequentially scanned until the processor 23b is interrupted by the A-CTC or the A-SIO. The initialization tasks are begun after power up, which is represented by start block 300. The adapter processor 23b queues block transfer requests in a block transfer queue at addresses 139A-13BF in the adapter RAM 23c as seen in Appendix B. As shown by process block 301, queue parameters including the size of the queue are determined, and a head and tail address are loaded into selected lines in the queue area of the adapter RAM 23c. The DIP switch inputs 23a are also read and stored in the adapter RAM 23c. The data contained in this input word is defined in Table 4 below.

TABLE 4

| Bit | Description |
|---|---|
| 7 | Backplane Error |
| 6 | Processor Reset Lock-out |
| 5 | Last State |
| 4 | Address Flag |
| 3 | Initialization Flag |
| 2 | Last Rack |
| 1 | Rack Size High |
| 0 | Rack Size Low |

As represented by process block 302, instructions are executed to determine rack size and the mask for coding inputs is sized accordingly. As shown by process block 303, interrupt vector addresses to be used by the processor 23b in responding to SIO and CTC interrupts are loaded into the area beginning at line 1192(H) in the adapter RAM 23c. Next, a block of instructions represented by process block 303 is executed to initialize parameters for the I/O image table at 13CO(H) and the block transfer inhibit table at 1100(H) in the adapter RAM 23c, as seen in Appendix B. As represented by process block 394, the A-CTC, the A-SIO and certain working registers in the adapter processor 23b are initialized.

The processor 23b then enters a loop where it remains until interrupted or until power is recycled. In this loop the adapter 23 continuously scans the I/O modules 11 in its rack 10 to update the image table of input status data in the adapter RAM 23c and to couple fresh output status data to the I/O modules 11. A block of instructions represented by decision block 305 is executed to see whether the I/O module 11 is in a last state or time out status. In recovering from these conditions, inputs are coupled first, so the processor would skip the following blocks 306 and 307. As represented by I/O block 306, when last state or time out status is not indicated, a byte-sized word of data is output to the backplane at the first I/O address in the rack 10. This will be a word of output status data for a conventional I/O module 11 or a first MSW for a high density I/O module 29. A control signal is coupled to the backplane with this word of output data, and if a high density I/O module 24 is present at the I/O address, a signal will be returned on the MOD ID line (FIG. 7). This return signal from the module 24 will be interpreted by the adapter processor 23b as a request for service signal. If the result of the MOD ID check represented by decision block 307 is negative, meaning probably that a conventional I/O module 11 is present, a byte-sized word of data is input from the I/O module 11 to the input image table 23e as shown by I/O block 308. Next, as shown by process block 309, the I/O backplane pointers, various counters, a processor watchdog timer and the A-SIO receiver are serviced. After this service operation, the block transfer inhibit table (Appendix B) is checked for an inhibit word at a line corresponding to the new I/O module group address, as seen in decision block 310. If so, the processor 23b loops back to rotate the I/O pointer and advance a block transfer inhibit pointer, to prevent data from being written to a module group for which a block transfer request is pending. Where no block transfer inhibit word is found, data is coupled to or from the next I/O address by re-executing blocks 305-308.

Where a new block transfer request is detected in decision block 307, the processor 23b branches to execute instructions represented by process block 315 to set all the bits in a block transfer inhibit word and store it in a corresponding line in the block transfer inhibit table. As shown by I/O block 316, the second MSW is input from the high density I/O module 24 and is analyzed as shown by decision block 317 to determine whether zeroes are present. If so, the block transfer has been completed or is not pending, and the block transfer inhibit word is reset to zeroes as represented by process block 318. The I/O address is then rotated by re-executing the block of instructions represented by process block 309. Where a MSW is detected, it is stored with the I/O slot address of the high density module 24 in the block transfer queue as represented by process block 319 before servicing the I/O pointers, processor watchdog timer and A-SIO receiver in block 309. The sequence in FIG. 10a provides a continuous scanning operation for coupling I/O data to and from the I/O modules 11 and for detecting block transfer request signals from high density I/O modules 24.

The adapter scanning sequence is interrupted when the scanner module 31 begins communicating with the adapter 23 and provides a character or word to the A-SIO that generates a character available interrupt to the adapter processor 23b. Actually, two characters are received by the A-SIO before the interrupt is generated for the first character or word. The processor 23b then executes instructions in a character available interrupt routine represented in FIG. 10b. Following the character available interrupt represented by terminal block 320, the word is checked to see whether it is the rack address word, and an appropriate status bit is set, which is represented by decision block 321. The processor 23b then executes instructions as represented by decision block 322 to determine whether the rack address belongs to its host I/O rack 10. If so, the processor 23b returns from this particular character available interrupt as represented by terminal block 330. Where the address of another rack is received, the processor 23b in this rack 10 will initialize the A-SIO to receive data only, as represented by process block 323, but such data will not be coupled to either the adapter RAM 23c or the I/O modules 11. Where the received word is not a rack address word, the processor 23b executes instructions to determine whether the word is a Command 3 word, as represented by decision block 324.

When data is coupled to the backplane during a block transfer, it is coupled "on the fly" as opposed to being stored in the receiver buffer of the adaptor RAM 23c for coupling during the main program loop of FIG. 14a. The data is briefly stored in registers of the A-SIO and the adapter processor 23b, however, because a short delay is desirable for proper timing of the transfer.

The adapter processor program memory (A-PROM) stores two subroutines, one for coupling data from the A-SIO to the backplane, and the other for coupling data from the A-SIO to the receiver buffer in the adapter RAM 23c. Depending upon the result in decision block 324, the adapter processor 23b loads the address of one of these two routines into a register in the A-SIO so that when the next character available interrupt occurs, the processor 23b will be directed to one of these routines. Where a Command 3 is detected in decision block 324, the vector for coupling data from the A-SIO to the backplane is set up as represented by process block 325. Where another command is present, the vector is set up so that data wil be coupled from the A-SIO to the receiver buffer in the adapter RAM 23c, as represented by process block 326.

During each character available interrupt resulting from receipt of a Command 3 message, the processor 23b determines whether the block transfer has been completed as represented by decision block 327 and sets a pointer to the receiver buffer or to the high density module 24 accordingly, as represented by process blocks 328 and 329, before returning from the interrupt as represented by terminal block 330.

Figure 10F:
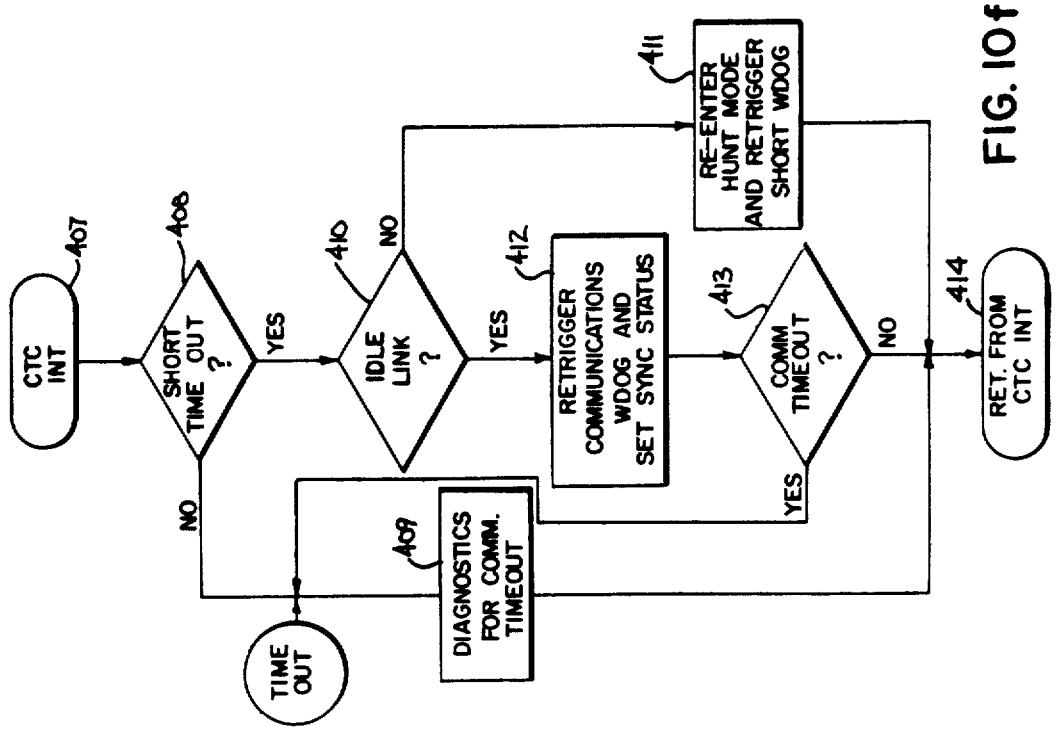
Figure 10B:
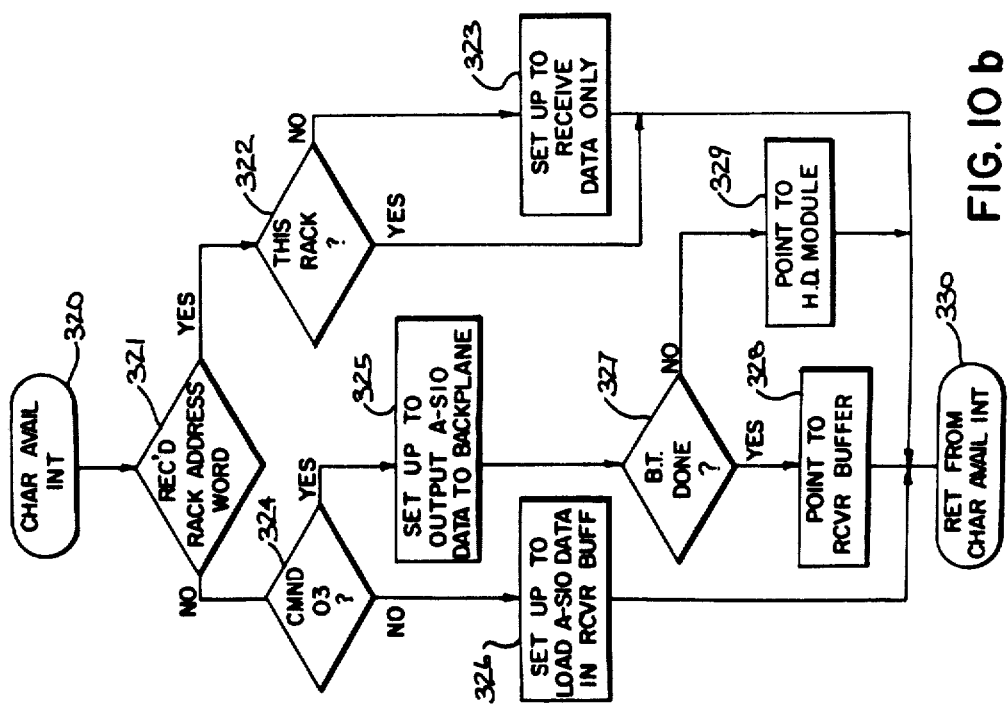
Figure 10C:
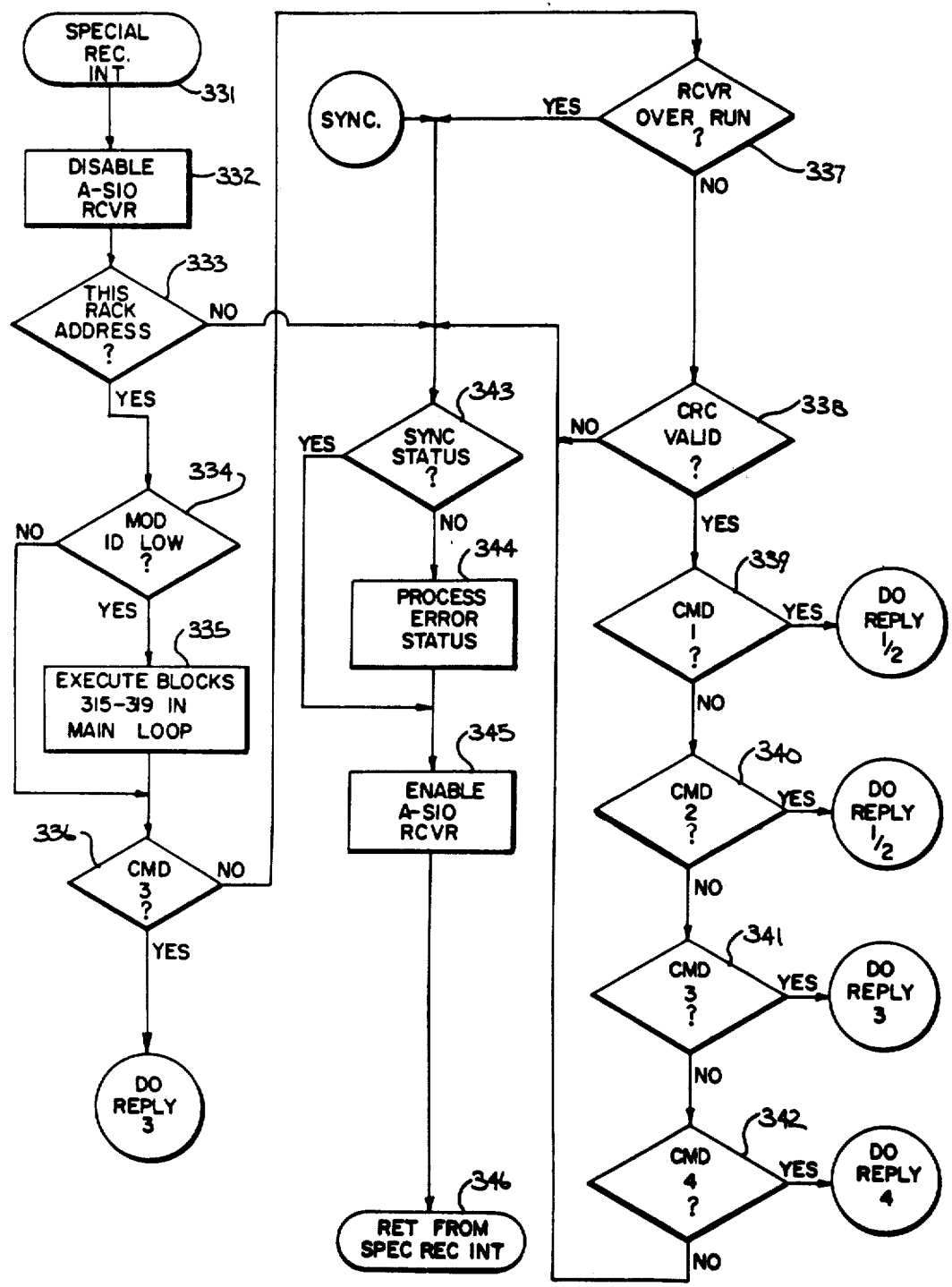

At the end of a message, the A-SIO generates a special receive interrupt signal represented by start block 331 in FIG. 10c. The adapter processor 23b responds by sending a disable signal to the A-SIO receiver as represented by process block 332. The adapter processor 23b then executes instructions represented by decision block 333 to determine whether communication is being carried on with it or another I/O rack 10 along serial channel B by checking the rack address status bit that was determined by executing of block 321 in FIG. 10b. Assuming this adapter 23 is fully communicating with the scanner 31, the processor 23b next determines whether a MOD ID signal had been detected in block 307 of FIG. 10a and this is represented by decision block 334. Timing requirements are such that the processor 23b must return to execute blocks 315-319 for high density I/O modules before continuing the special receive interrupt routine. Before exiting, the processor 23b sets an address to return to this exit point. Upon its return the processor 23b determines whether a Command 3 word has been received as part of a message as represented by decision block 335. If so, the processor jumps to a Reply 3 message sequence; otherwise, it executes an instruction represented by decision block 337 to test for receiver overrun. Assuming there has been no receiver overrun, the two received CRC words are examined by execution of instructions represented by decision block 338. If the CRC words are valid, the processor examines the received command word in decision blocks 339-342, and upon detecting a received command, jumps to a Reply 1 sequence, a Reply 3 sequence or a Reply 4 sequence according to the command detected in decision block 339-342.

Figure 10D:
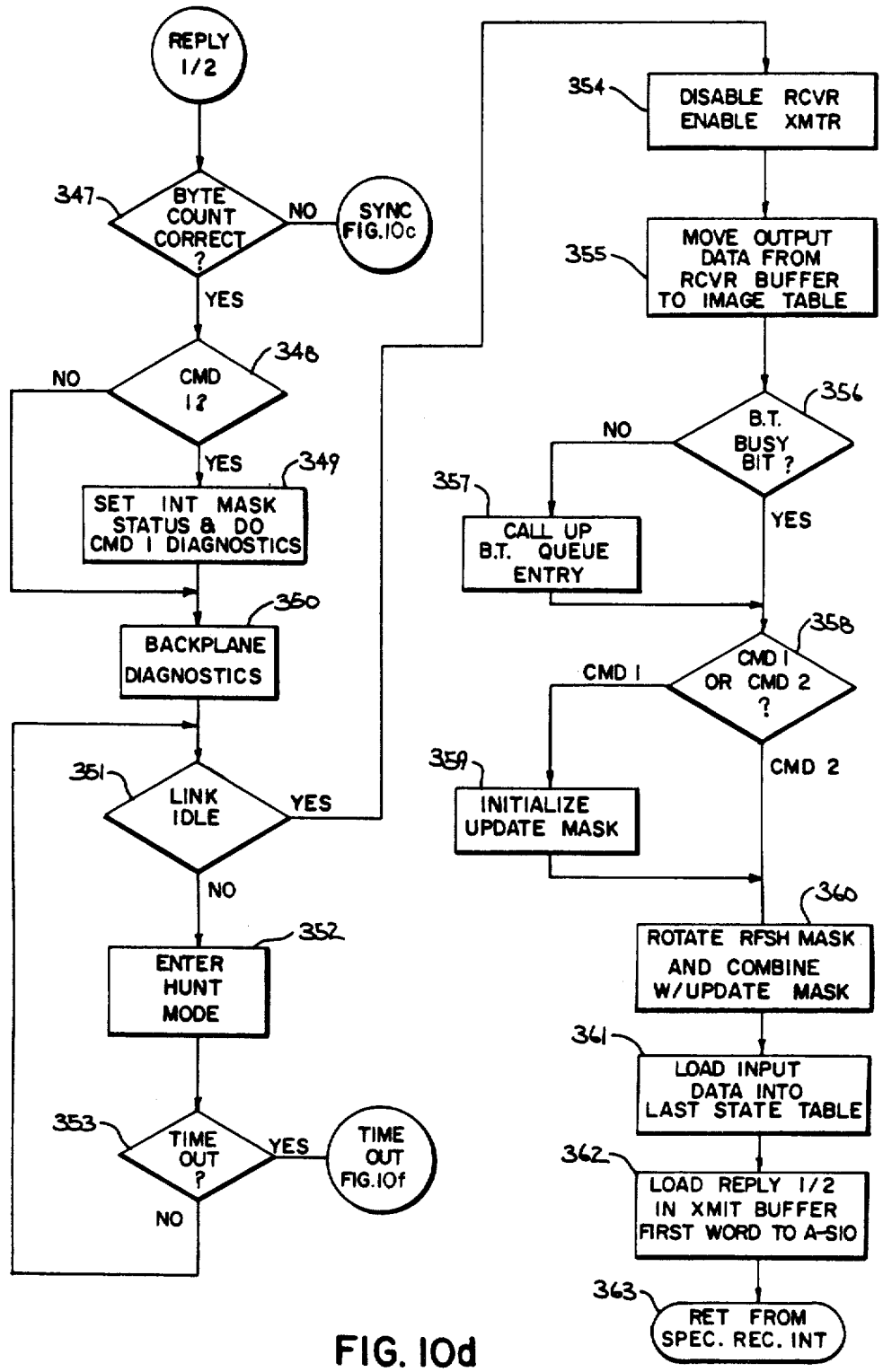

A technical problem to be considered with the hardware of the preferred embodiment is distinguishing bits in a closing flag segment of a message from bits in an opening flag segment of the next message. To obtain synchronization of the receiver to incoming messages, a watchdog timer is provided to assure that the serial data link is idle for a short period before setting a synchronization status bit. This bit is examined by executing an instruction represented by decision block 343 in FIG. 10c to see whether a synchronization has been achieved. If not, various error status flags are examined as represented by process block 344. After checking for synchronization or various possible errors, the A-SIO receiver is re-enabled as represented by process block 345. The processor 23b then returns from the special receive interrupt as represented by terminal block 346.

Where a Command 1 or Command 2 is detected in decision blocks 339 or 340, respectively, the sequence represented in FIG. 10d is executed. The processor 23b begins by confirming that the expected number of bytes in the message have been received as represented by decision block 347. If the byte count cannot be verified, the processor 23b returns to the SYNC sequence in FIG. 10c. Where a Command 1 is detected by executing instructions represented by decision block 348, the processor initializes an input change mask and performs diagnostics, as represented by process block 349. These diagnostics are performed in response to a Command 1 message, because such a message is used in restarting communication with the adapter 23. As represented by process block 350, where the command word is a Command 1 or a Command 2 a backplane diagnostics sequence is then executed. Before assembling a reply message, the processor 23b must assure that the link has been idle for the short time period, thereby also assuring the correct interpretation of flags at the beginning and end of the incoming message frame. If the result of executing instructions represented by decision block 351 is negative, the processor 23b enters the hunt mode by executing instructions to direct the A-SIO to this mode of operation, as represented by process block 352. The processor 23b will stay in this mode until an idle communication link can be confirmed through decision block 351 or until the detection of a time out in executing decision block 353. Such a time out signal would cause the processor 23b to jump out of the hunt mode loop, and proceed to the time out sequence in FIG. 10f.

After making the diagnostic and other checks represented in blocks 347-351, the adapter processor disables the A-SIO receiver and enables the A-SIO transmitter for transmitting a reply message. The processor 23b executes instructions represented by process block 354 to send the appropriate hardware commands to the A-SIO. The adapter processor 23b then moves output status data, which was coupled to the adapter RAM 23c from the incoming message, to the output image table 23d seen in Appendix B, as represented by process block 355. Next, the processor 23b examines the command word for the block transfer "busy" bit as represented by decision block 356. If a block transfer "not busy" bit is received instead, the processor 23b calls up the entry at the head of the block transfer queue, as represented by process block 357. This entry contains the address of the next high density I/O module to be serviced as well as the second MSW which has been previously coupled to the adapter 23 from the requesting module. After this has been done, the processor again checks a status flag resulting from execution of block 344 to see whether the reply will be responding to a Command 1 message or a Command 2 message, and this check is represented by decision block 358. For generating a reply to a Command 1 message, the adapter processor 23b will initialize an update mask as represented by process block 359. This step is not necessary in responding to the Command 2 message as the response will have been made to a Command 1 message in an earlier cycle of the program. For either message, the adapter processor 23b adjusts a rotating bit in a refresh mask word and combines that word with the update or change mask word, as represented by process block 360. The update or change mask is formed by comparing inputs in the adapter image table 23e with status data in a last stage image table beginning at line 10F0(H) of the adapter RAM 23c as seen in Appendix B. As represented by process block 361, the data in the input image table 23e is then transferred to the adapter LAST STATE IMAGE table to provide last state information for the next Reply 2 sequence. Finally, the adapter processor 23b loads the appropriate reply word, the resultant mask word and the input data into the transmitter buffer of the adapter RAM 23c, and then loads the first word of the reply message into the A-SIO transmitter, as represented by process block 362. The processor 23b then returns from the special receive interrupt sequence, of which this last described sequence is a part, as represented by terminal block 363. The message data will be transmitted from cycling through a transmit buffer empty interrupt sequence which will be described in relation to FIG. 10e. Each time a word is transmitted, an interrupt signal will be generated to the processor 23b and another word will be loaded into the A-SIO transmitter for transmission to the scanner 31.

Figure 10E:
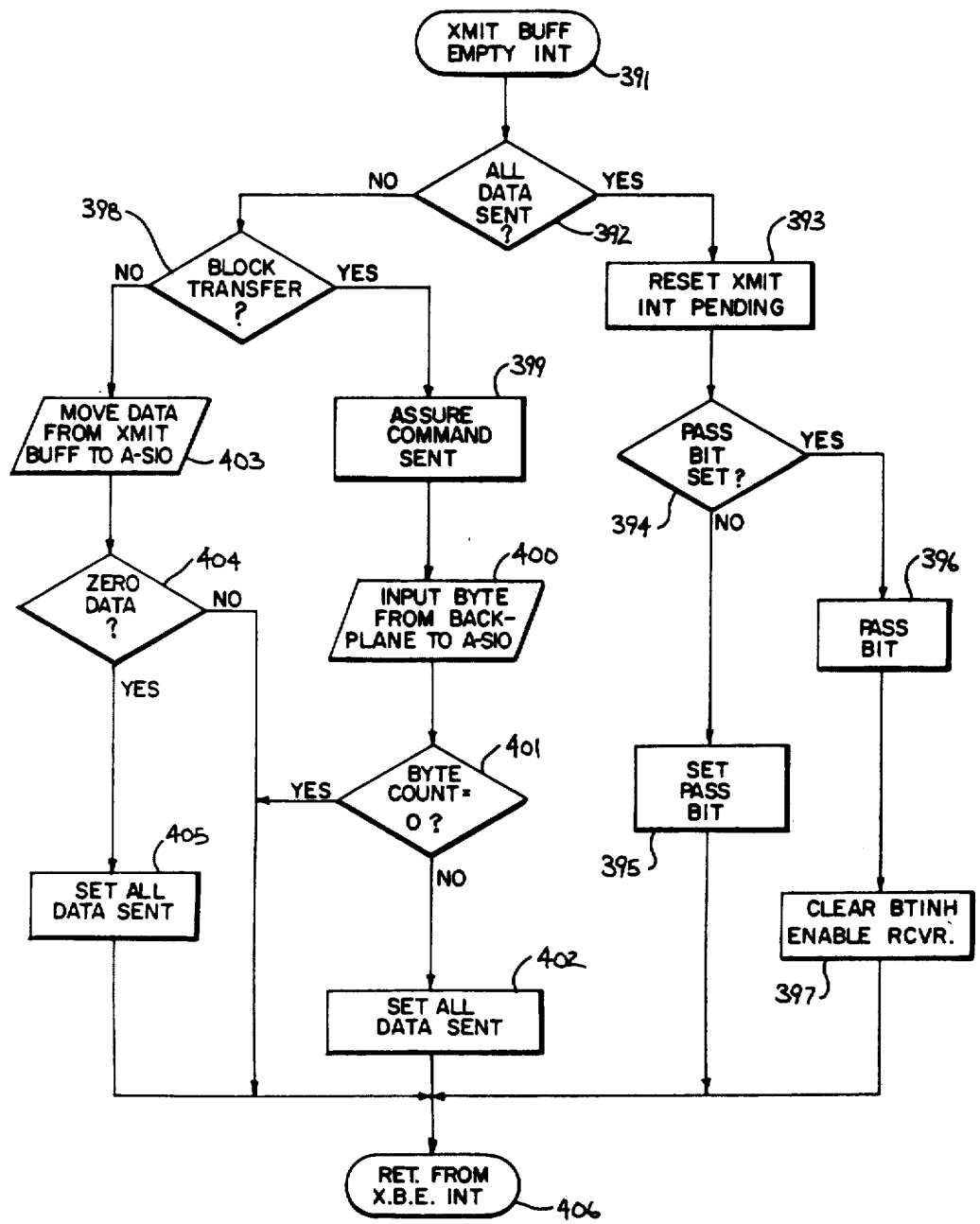

Referring to FIG. 10e, the beginning of the transmit buffer empty interrupt sequence is represented by start block 391. As represented by decision block 392, the processor 23b examines a flag to see whether all data in a reply message has been sent. If so, it issues a reset transmitter interrupt pending command which prevents further transmitter interrupts until after the next word has been loaded into the transmit buffer or until the CRC has been completely sent, and this is represented by process block 393. A pass bit is then examined as seen in decision block 394. This bit is set on the first pass as represented by process block 395 and is reset on the second pass as represented by process block 396. On the second pass after a block transfer message has been sent, the block transfer inhibit table is cleared, and the A-SIO receiver is re-enabled as represented by process block 397.

Referring again to decision block 392 in FIG. 10e, where all data has not been sent, the processor 23b examines a block transfer status flag as represented by decision block 398. Where a block transfer is indicated, the processor 23b assures that the command word has been sent, as represented by process block 399. Next, as represented by I/O block 400, the processor 23b inputs a word of I/O status from the backplane to the transmit buffer of the A-SIO. The processor 23b then examines the byte (word) count as represented by decision block 401 and when the byte count reaches zero, the "all data sent" flag is set as represented by process block 402. Where a block transfer status is not indicated (i.e. conventional I/O data is being sent) as a result of executing decision block 398, the processor 23b points to the transmit buffer of the adapter RAM 23c and couples data from there to the transmitter of the A-SIO, as represented by I/O block 403. The processor 23b checks the data coupled through execution of block 403 and when a word with all zeroes has been detected, as a result of executing decision block 404, the "all data sent" flag is set as represented by process block 405 and the processor returns from the transmit buffer empty interrupt sequence as represented by terminal block 406.

Referring to FIG. 10f, communications over the serial data link 30B are monitored by the adapter processor 23b by execution of a CTC interrupt (CTC INT) sequence in response to an interrupt signal from the A-CTC. The beginning of this sequence is represented by start block 407. Thereafter, the processor 23b executes instructions represented by decision block 408 to detect a short time out. If the interrupt is not caused by a short time out, then it is a result of a communications time out and diagnostics are performed as represented by process block 409. Where the interrupt is generated by the short time out, the processor 23b executes instructions to determine whether the link 30B is idle as represented by decision block 410. If the link 30B is not idle, the processor 23b re-enters the hunt mode and retriggers the short watchdog timer, as represented by process block 411. As represented by process block 412 where the link 30B is found to be idle, the communications watchdog timer is retriggered and the synchronization status bit is set to be read by the processor during the other interrupt routines mentioned above. Thereafter, the processor 23b executes an instruction to check for a communications watchdog timeout, as represented by decision block 413. When this occurs, the processor 23b performs diagnostics as represented by process block 409, otherwise, it returns from the CTC interrupt sequence, as represented by terminal block 414.

What has been described is a digital controller with remote I/O interface racks in which the input and output status data coupled during I/O scanning operations is coded through associated mask words. This allows less than a full rack of I/O status data to be coupled over the serial data link, while providing a means for identifying I/O module and image table locations with which such data is associated. Mask words are generated by the scanner circuit and the adapter circuit, which have been described in detail herein, however, the definition of the invention, which may be embodied in various circuits, is not to be so limited, except as expressed in the following claims.

Appendix A
MAP OF BUFFER MEMORY
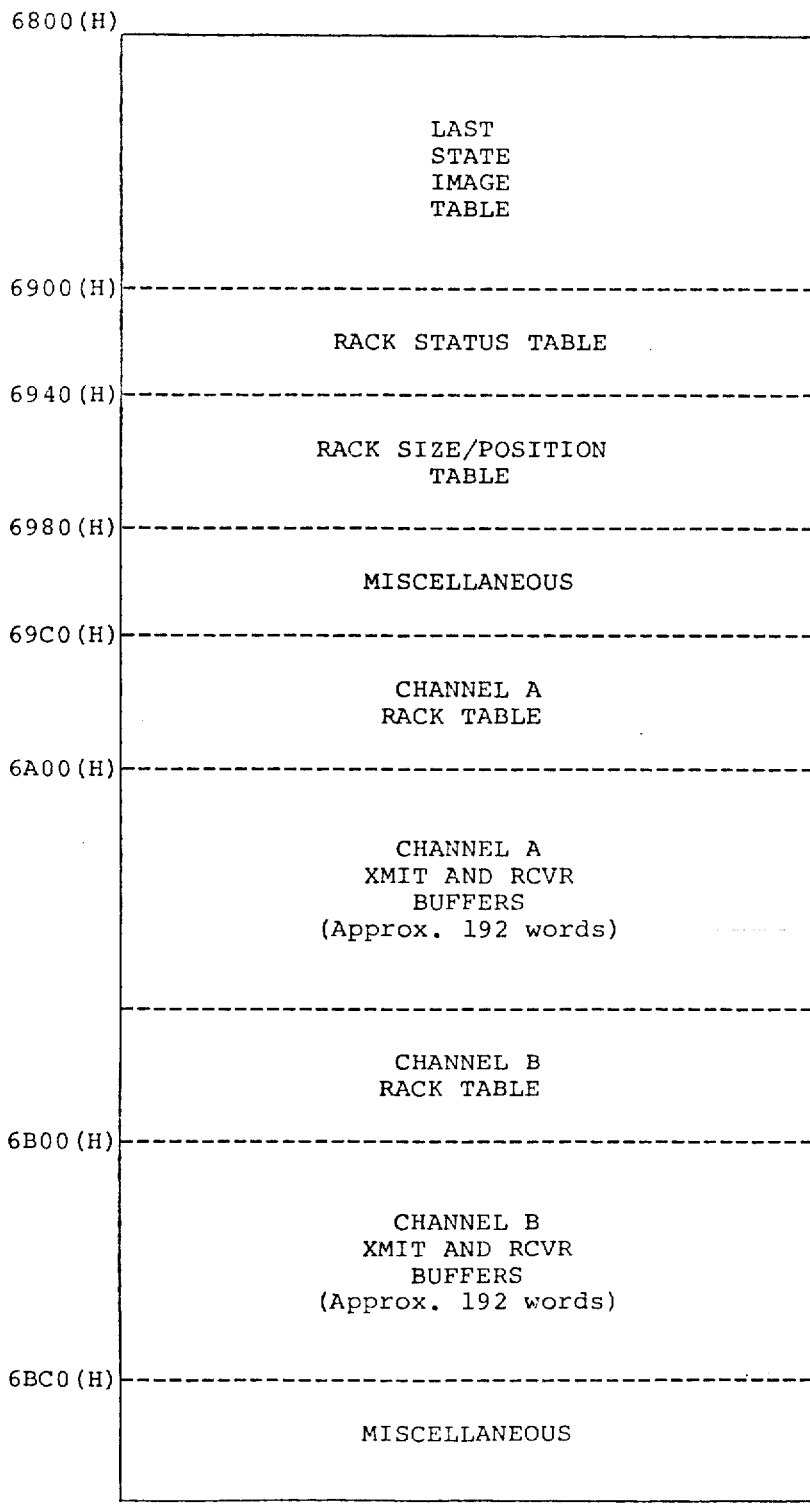

Appendix B
MAP OF ADAPTER RAM
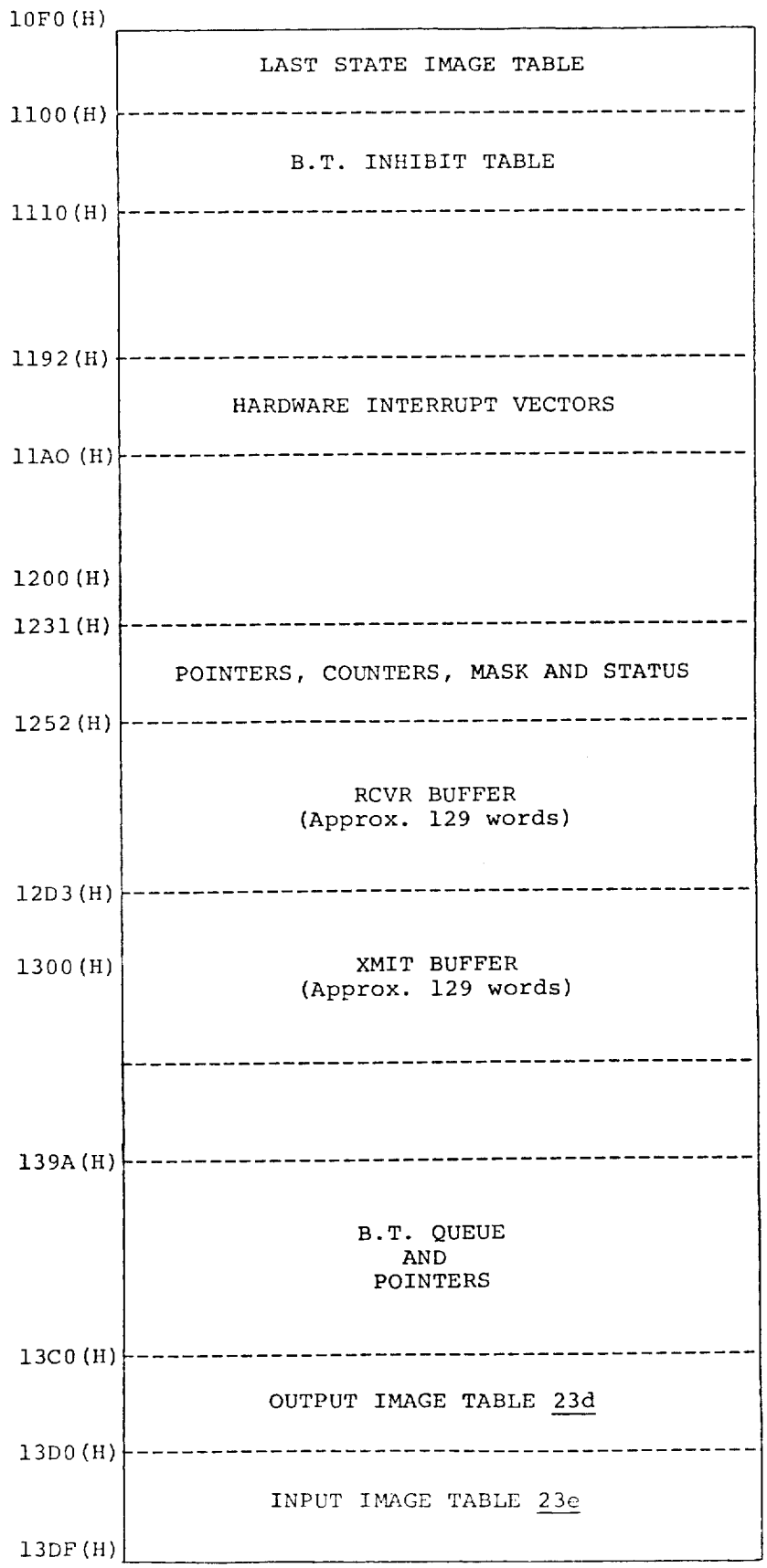

Appendix C

COMPONENT APPENDIX

| Component | Ref. Nr. | Manufacturer's Chip Description |
|---|---|---|
| serial processor | 31d | Z80A-CPU manufactured by Zilog, Inc. |
| parallel processor | 31b | Z80A-CPU manufactured by Zilog, Inc. |
| I/O memory | 31a | Two 6561 256-line x 4-bit random access memories manufactured by Harris Corp. |
| buffer memory | 31e | Two P2114A-4 1k x 4-bit random access memories manufactured by Intel Corp. |
| block transfer memory | 31c | Two 6561 256-line x 4-bit random access memories manufactured by Harris Corp. |
| serial processor program memory | S-PROM | Three 82S181 1k x 8-bit programmable read only memories manufactured by Signetics |
| parallel processor program memory | P-PROM | SN745472 512-line x 8-bit programmable read only memory manufactured by Texas Instruments, Inc. |
| buffers | BUF1, BUF3 | Two SN74LS240 octal buffers/line drivers/line receivers with inverted three state outputs manufactured by Texas Instruments, Inc. |
| buffers | BUF4, BUF5, 111, 112 | Four SN74LS244 octal buffers/line drivers/line receivers with non-inverted three state outputs manufactured by Texas Instruments, Inc. |

| Component | Ref. Nr. | Manufacturer's Chip Description |
|---|---|---|
| buffers | BUF2, BUF6, BUF7, 114 | Four 8304 octal bidirectional buffers/line drivers manufactured by National Semiconductor, Inc. |
| bidirectional latch | 65 | Two 2907 quad bus transceivers manufactured by Advanced Micro Devices, Inc. |
| address latch | 66 | SN74LS374 octal D-type flip-flops manufactured by Texas Instruments, Inc. |
| comparator | 67 | SN25LS2521 8-bit comparator manufactured by Texas Instruments, Inc. |
| flip-flops | 38, 39, 40, 68, 83, 95, 113 | Four SN74LS74 dual D-type positive edged triggered flip-flops manufactured by Texas Instruments, Inc. |
| divide by 5 counter divide by 2 counter | 82 110 | Two SN74LS290 decade counters manufactured by Texas Instruments, Inc. |
| scanner counter/ timer circuit | CTC | Z80-CTC counter/ timer circuit manufactured by Zilog, Inc. |
| scanner serial input/output circuit | SIO | Z80-SIO serial input/output circuit manufactured by Zilog, Inc. |
| multivibrators | $MV_1$, $MV_2$, $MV_3$, $MV_4$ | Two SN74LS221 dual monostable multivibrators manufactured by Texas Instruments, Inc. |
| NAND gates | 43, 44, 48, 99, 105 | Two SN74LS00 quad two-input NAND gates manufactured by Texas Instruments, Inc. |

| Component | Ref. Nr. | Manufacturer's Chip Description |
|---|---|---|
| OR gates | 41, 44, 45, 49, 79, 106, 107 | Three SN74LS32 quad two-input OR gates manufactured by Texas Instruments, Inc. |
| NOR gates | 47, 69, 73, 80 | Two quad two-input NOR gates manufactured by Texas Instruments, Inc. |
| EX OR gates | 50, 84, 87, 96, 97 | Two SN74LS86 quad two-input exclusive OR gates manufactured by Texas Instruments, Inc. |
| inverters | 51, 90 | SN7404 hex inverters manufactured by Texas Instruments, Inc. |
| three-line to eight-line decoders | 70, 75, 76, 104 | Three SN74LS138 three-to-eight-line decoders/ multiplexers manufactured by Texas Instruments, Inc. |
| NAND gates | 86, 88 | SN75452 dual two-input NAND gate drivers manufactured by Texas Instruments, Inc. |
| line receiver | 94 | AM26LS32 line receiver manufactured by Advanced Micro Devices, Inc. |
| four bit up/down counter | 100 | SN74LS193 up/ down dual clock counter manufactured by Texas Instruments, Inc. |
| adapter processor | 23b | Z80A-CPU manufactured by Zilog, Inc. |
| adapter counter/ timer circuit | A-CTC | Z80-CTC counter/ timer circuit manufactured by Zilog, Inc. |
| adapter serial input/output circuit | A-SIO | Z80-SIO serial input/output circuit manufactured by Zilog, Inc. |

| Component | Ref. Nr. | Manufacturer's Chip Description |
|---|---|---|
| four-to-sixteen line decoder | 102 | SN74154 four-line to sixteen-line decoder/demultiplexer manufactured by Texas Instruments, Inc. |
| adapter program memory | A-PROM | 82S181 1k x 8-bit programmable read only memory manufactured by Signetics |
| adapter RAM | 23c | Two P2114A-4 1k x 4-bit random access memories manufactured by Intel Corp. |

Appendix D

```
REF LINE  ADDR & DATA   REL

1                   ;     1772-SD   -   PLC-2 REMOTE SCANNER
    2                   ;
    3                   ;
    4                   ;
    5                   ;     ***    SERIAL PROCESSOR FIRMWARE   -    REVISION 1    ***
    6                   ;
    7                   ;
    8                   ;
    9                   ;
   10                   ;
   11                   ;
   12                   ;
   13                   ;DECODER EQUATES:
   14                   ;
   15                   ;
   16  0000             PROM1    EQU    0000H
   17  0800             PROM2    EQU    0800H
   18  1000             PROM3    EQU    1000H
   19  2000             IORAM    EQU    2000H     ;I/O RAM ADDRESS
   20  3800             LED1     EQU    3800H     ;LEDS 0-3 LATCH
   21  3000             LED2     EQU    3000H     ;LEDS 4-7 LATCH
   22  4000             MODSEL   EQU    4000H     ;MODE SELECT INPUT PORT
   23  4800             RKUSED   EQU    4800H     ;RACKS USED INPUT PORT
   24  5000             AUSED    EQU    5000H     ;RACKS USED ON CH A INPUT PORT
   25  5800             PNMI     EQU    5800H     ;NMI TO PARALLEL PROCESSOR
   26  6000             FLTRST   EQU    6000H     ;FAULT RESET
   27  6800             BUFRAM   EQU    6800H     ;BUFFER RAM ADDRESS
   28  7800             BTRAM    EQU    7800H     ;BLOCK TRANSFER RAM ADDRESS
   29                   ;
   30                   ;
   31                   ;CTC EQUATES:
   32                   ;
   33                   ;
   34  0090             CTC0     EQU    90H       ;CTC CHANNEL 0
   35  0091             CTC1     EQU    91H       ;CTC CHANNEL 1
   36  0092             CTC2     EQU    92H       ;CTC CHANNEL 2
```

```
SFR LINE  ADDR & DATA   SEL
  37  3093              CTC3     EQU    93H    ;CTC CHANNEL 3
  38                    ;
  39                    ;
  40                    ;SIO EQUATES:
  41                    ;
  42                    ;
  43  0040              SIOAD    EQU    40H    ;SIO DATA REGISTER A
  44  0041              SIOBD    EQU    41H    ;SIO DATA REGISTER B
  45  0042              SIOAC    EQU    42H    ;SIO COMMAND REGISTER A
  46  0043              SIOBC    EQU    43H    ;SIO COMMAND REGISTER B
  47                    ;
  48                    ;
  49                    ;GENERAL PURPOSE EQUATES:
  50                    ;
  51                    ;
  52  6990              CHARKS   EQU    6990H  ;RACKS USED ON CH A
  53  6991              CHBRKS   EQU    6991H  ;RACKS USED ON CH B
  54  6900              ATABLE   EQU    6900H  ;CH A RACK TABLE
  55  6A00              BTABLE   EQU    6A00H  ;CH B RACK TABLE
  56  6992              APOINT   EQU    6992H  ;ATABLE POINTER
  57  6993              BPOINT   EQU    6993H  ;BTABLE POINTER
  58  6994              AXCNT    EQU    6994H  ;BYTE COUNT,CH A MESSAGE
  59  6995              ASXCNT   EQU    6995H  ;BYTE COUNT,CH A MESSAGE - BACKUP
  60  6996              BXCNT    EQU    6996H  ;BYTE COUNT,CH B MESSAGE
  61  6997              BSXCNT   EQU    6997H  ;BYTE COUNT,CH B MESSAGE - BACKUP
  62  6998              ARSTAT   EQU    6998H  ;CH A CURRENT RACK STATUS
  63  6999              BRSTAT   EQU    6999H  ;CH B CURRENT RACK STATUS
  64  699A              LOWER    EQU    699AH  ;LED 0 - 3 DISPLAY BYTE
  65  699B              HIGHER   EQU    699BH  ;LED 4 - 7 DISPLAY BYTE
  66  699C              AMAX     EQU    699CH  ;CH A RECEIVER COUNT
  67  699D              BMAX     EQU    699DH  ;CH B RECEIVER COUNT
  68  699E              AXPNT    EQU    699EH  ;PRESENT CH A - IX RACK TABLE POINTER
  69  699F              AYPNT    EQU    699FH  ;PRESENT CH A - IY RACK STATUS TABLE POI
  70  6A00              AXBUFF   EQU    6A00H  ;CH A XMIT BUFFER
  71  6B00              BXBUFF   EQU    6B00H  ;CH B XMIT BUFFER
  72  6A80              ARBUFF   EQU    6A80H  ;CH A RECEIVE BUFFER
  73  6B80              BRBUFF   EQU    6B80H  ;CH B RECEIVE BUFFER
  74  6992              ADTEMP   EQU    6992H  ;LAST RACK TALKED TO BY SCANNER
  75  6993              WRSB     EQU    6993H  ;CH B - SIO WRS STATUS
  76  6994              CHCHK    EQU    6994H  ;CHANNEL STATUS BYTE
  77  6995              RKCHK    EQU    6995H  ;RACK STATUS BYTE
  78  6996              BXPNT    EQU    6996H  ;PRESENT CH B - IX RACK TABLE POINTER
  79  6998              BYPNT    EQU    6998H  ;PRESENT CH B - IY RACK STATUS TABLE POI
  80  699A              CMND     EQU    699AH  ;GLOBAL COMMAND BYTE
  81  699B              ACNT     EQU    699BH  ;INITIALIZE RECEIVER COUNT VALUE - CH A
  82  699C              TEMP     EQU    699CH  ;TEMP STORE FOR RECEIVED COMMAND BYTE
  83  699D              RFSH     EQU    699DH  ;GLOBAL REFRESH BYTE
  84  699E              XCNT     EQU    699EH  ;GLOBAL XMIT COUNT BYTE
  85  699F              LAST     EQU    699FH  ;RACK ADDRESS, LAST STATE RAM
  86  69A1              ADDR     EQU    69A1H  ;GLOBAL ADDRESS BYTE
  87  69A2              AADDR    EQU    69A2H  ;PRESENT RACK ADDRESS BYTE - CH A
  88  69A3              BADDR    EQU    69A3H  ;PRESENT RACK ADDRESS BYTE - CH B
  89  69A4              AEND     EQU    69A4H  ;ENDING RACK ADDRESS - FROM ADAPTER
  90  69A5              STORE    EQU    69A5H  ;TEMPORARY STORAGE - CURRENT IY POINTER
  91  69A7              PRMCNT   EQU    69A7H  ;PROM CHIP TO BE CHECKED
  92  69A8              MAX      EQU    69A8H  ;GLOBAL MAX RECEIVER COUNT
  93  69A9              CTCWHY   EQU    69A9H  ;CTC STATUS BYTE
  94  6BC0              WRSA     EQU    6BC0H  ;CH A - SIO WRS STATUS
  95  6BC1              BTPNT    EQU    6BC1H  ;IY POINTER TO PRESENT BT RACK
  96  6BC3              BTTEMP   EQU    6BC3H  ;BT RACK ADDRESS
  97  6BC5              BCNT     EQU    6BC5H  ;INITIALIZE RECEIVER COUNT VALUE - CH B
  98  6BC6              ARADDR   EQU    6BC6H  ;RECEIVE BUFFER STARTING ADDRESS - CH A
  99  6BC8              BRADDR   EQU    6BC8H  ;RECEIVE BUFFER STARTING ADDRESS - CH B
 100  6BCA              ARECV    EQU    6BCAH  ;CH A RECEIVER STATUS BYTE
```

```
EPR LINE  ADDR B DATA   REL
101  6BC5                        PRECV   EQU     6BC5H    ;CH B RECEIVER STATUS BYTE
102  6B04                        BTSTOP  EQU     6B04H    ;INHIBIT TRANSFERS TO PENDING BT OUTPUT
103  03FF                        P1CHK   EQU     03FFH    ;PROM 1 CHECKSUM LOCATION
104  0BFF                        P2CHK   EQU     0BFFH    ;PROM 2 CHECKSUM LOCATION
105  13FF                        P3CHK   EQU     13FFH    ;PROM 3 CHECKSUM LOCATION
106  79C9                        TASKRQ  EQU     79C9H    ;BT TASK REQUEST BYTE
107  79CA                        RESULT  EQU     79CAH    ;BT TASK RESULT BYTE
108  79CB                        BTSLOT  EQU     79CBH    ;BT SLOT ADDRESS
109  79CD                        BTMSB   EQU     79CDH    ;BT MODULE STATUS BYTE
110  20FA                        FBTRK0  EQU     20FAH    ;RACK 0,INPUT SLOT 5 - FBT LOCATION
111  209A                        FBTRK2  EQU     209AH    ;RACK 2,INPUT SLOT 5 - FBT LOCATION
112                              ;
113                              ;
114                              ;INTERRUPT VECTOR EQUATES:
115                              ;
116                              ;
117  69AC                        CTC2V   EQU     69ACH    ;CH A WATCHDOG
118  69AE                        CTC3V   EQU     69AEH    ;CH B WATCHDOG
119  69B8                        SIOT4   EQU     69B8H    ;CH A XMITTER
120  69BC                        SIORA   EQU     69BCH    ;CH A RECEIVER
121  69BE                        SIOSRA  EQU     69BEH    ;CH A SPECIAL RECEIVE
122  69B0                        SIOTB   EQU     69B0H    ;CH B XMITTER
123  69B4                        SIORB   EQU     69B4H    ;CH B RECEIVER
124  69B6                        SIOSRB  EQU     69B6H    ;CH B SPECIAL RECEIVE
125                              ;
126                              ;
127                              ;
128                              ;SYSTEM INITIALIZATION: INITIALIZE ALL HARDWARE AND PERFORM
129                              ;                       DIAGNOSTIC CHECK ON ALL PROM AND RAM MEMORIES.
130                              ;
131                              ;
132                              ;
133  0000 A 31FF6B                       LD      SP,6BFFH ;INITIALIZE STACK POINTER
134  0003 A ED5E                         IM      2        ;SELECT INTERRUPT MODE 2
135  0005 A 3E00                         LD      A,00H
136  0007 A 320060                       LD      (FLTRST),A ;PULSE FAULT RESET
137  000A A 0100FD                       LD      BC,0FD00H
138  000D A 1E04                         LD      E,04H
139  000F A 210068                       LD      HL,BUFRAM
140  0012 A CD6002                       CALL    RAMCHK   ;CLEAR AND CHECK BUFFER RAM
141  0015 A 01FFFF                       LD      BC,0FFFFH
142  0019 A 1E01                         LD      E,01H
143  001A A 210029                       LD      HL,IORAM
144  001D A CD6002                       CALL    RAMCHK   ;CLEAR AND CHECK I/O RAM
145  0020 A 79                           LD      A,C
146  0021 A 32D069                       LD      (BTSTOP),A ;INITIALIZE BT INHIBIT MASK
147  0024 A 3E03                         LD      A,03H
148  0026 A 32A769                       LD      (PRMCNT),A ;INITIALIZE PROM CHECK CONTROL BYTE
149  0029 A 3EA9               CTCINI    LD      A,0A9H
150  002B A D390                         OUT     (CTC0),A ;LOAD CTC INTERRUPT VECTOR REGISTER
151  002D A 3E57                         LD      A,57H    ;INITIALIZE CTC CH 0,CH 1
152  002F A D390                         OUT     (CTC0),A
153  0031 A D391                         OUT     (CTC1),A
154  0033 A 3E57                         LD      A,057H
155  0035 A D392                         OUT     (CTC2),A ;INITIALIZE CTC2
156  0037 A D393                         OUT     (CTC3),A ;INITIALIZE CTC3
157  0039 A 3A0040                       LD      A,(MODSEL)
158  003C A CB47                         BIT     0,A      ;TEST FOR HI/LO BAUD RATE
159  003E A 2805                         JR      Z,LOW-$
160  0040 A 3E02                         LD      A,02H
161  0042 A D390                         OUT     (CTC0),A ;CH 0 - DIVIDE BY 2 - 300K HZ
162  0044 A 3E08                         LD      A,08H
```

```
SRC LINE  ADDR B DATA   REL
163  0046 A D381                   OUT     (CTC1),A    ;CH 1 - DIVIDE BY 2  -  230K HZ
164  0048 A 3E42        SIOINI  LD  C,SIOAC     ;INITIALIZE SIO CH A
165  004A A 213309              LD  HL,SIOD
166  004D A 0607                 LD  B,07H
167  004F A EDB3                 OTIR
168  0051 A 3E43                 LD  C,SIOBC     ;INITIALIZE SIO CH B
169  0053 A 213309              LD  HL,SIOD
170  0056 A 0609                 LD  B,09H
171  0058 A EDB3                 OTIR
172  005A A 21129A              LD  HL,WDCHA    ;SET UP INTERRUPT VECTOR JUMP TABLE
173  005D A 22A069              LD  (CTC2V),HL
174  0060 A 21470A              LD  HL,WDCHB
175  0063 A 1814                 JR  ITABLE-$
176                              ORG 0066H       ;NMI INTERRUPT
177  0066 A E5                   PUSH HL
178  0067 A 219469              LD  HL,CHCHK
179  006A A CBFE                 SET 7,(HL)      ;SET NMI RECEIVED FLAG
180  006C A E1                   POP HL
181  006D A ED45                 RETN
182  006F A 3E04        LOW     LD  A,04H
183  0071 A D380                 OUT (CTC0),A    ;CH 0 - DIVIDE BY 4  -  460K HZ
184  0073 A 3E10                 LD  A,10H
185  0075 A D381                 OUT (CTC1),A    ;CH 1 - DIVIDE BY 16 -  115K HZ
186  0077 A 18CF                 JR  SIOINI-$
187  0079 A 22AE69     ITABLE  LD  (CTC3V),HL
188  007C A 217C0A              LD  HL,XA
189  007F A 22B869              LD  (SIOTA),HL
190  0082 A 21D30A              LD  HL,RA
191  0085 A 22BC69              LD  (SIORA),HL
192  0088 A 21F90A              LD  HL,SRA
193  008B A 22BE69              LD  (SIOSRA),HL
194  008E A 21A90A              LD  HL,XB
195  0091 A 22B069              LD  (SIOTB),HL
196  0094 A 21E60A              LD  HL,RB
197  0097 A 22B469              LD  (SIORB),HL
198  009A A 211409              LD  HL,SRB
199  009D A 22B669              LD  (SIOSRB),HL
200                              ;
201                              ;
202                              ;
203                              ;RACKS USED SEARCH: FIND WHICH RACKS ARE DECLARED USED ON EACH
204                              ;   CHANNEL IN THE REMOTE SYSTEM. RESULTS ARE
205                              ;   STORED IN THE BUFFER RAM - ATABLE FOR CH A
206                              ;   RACKS AND BTABLE FOR CH B RACKS.
207                              ;
208                              ;
209                              ;
210  00A0 A 3A0049              LD  A,(RKUSED)   ;INPUT RACKS USED BYTE
211  00A3 A 2F                   CPL
212  00A4 A E67F                 AND 7FH         ;MASK OUT RACK 0
213  00A6 A 47                   LD  B,A         ;STORE RACK USED BYTE
214  00A7 A 3A0050              LD  A,(AUSED)    ;INPUT RACKS USED ON CH A
215  00AA A 2F                   CPL
216  00AB A A0                   AND B           ;CHECK FOR RACKS USED ON CH A
217  00AC A 200C                 JR  NZ,ARACK-$
218  00AE A 219469              LD  HL,CHCHK
219  00B1 A CBC6                 SET 0,(HL)      ;SET CH A SCAN COMPLETE BIT
220  00B3 A 219569              LD  HL,RKCHK
221  00B6 A CBC6                 SET 0,(HL)      ;SET NO RACKS ON CH A BIT
222  00B8 A 1810                 JR  BSRCH-$
223  00BA A 320069     ARACK   LD  (CHARKS),A    ;STORE CH A RACKS
224  00BD A D9                   EXX
225  00BE A 57                   LD  D,A         ;STORE RACKS USED ON CH A BYTE
226  00BF A 21006A              LD  HL,ATABLE
```

```
SRC LINE  ADDR S DATA    LBL 227  00C2 A CD8302         CALL   RKSRCH    ;SET UP CH A RACK TABLE
228  00C5 A CD9502         CALL   ENXA      ;ENABLE CH A XMITTER - SEND FLAGS
229  00C8 A 7A             LD     A,D       ;RECALL CH B RACKS USED BYTE
230  00C9 A D9             EXX
231  00CA A 2F      BSRCH  CPL
232  00CB A A0             AND    B         ;AND WITH RACKS USED BYTE
233  00CC A 200C           JR     NZ,BRACK-$
234  00CE A 219469         LD     HL,CHCHK
235  00D1 A CBCE           SET    1,(HL)    ;SET CH B SCAN COMPLETE BIT
236  00D3 A 219569         LD     HL,RKCHK
237  00D6 A CBCE           SET    1,(HL)    ;SET NO RACKS ON CH B BIT
238  00D8 A 1809           JR     DRU-$
239  00DA A 328169  BRACK  LD     (CHBRKS),A
240  00DD A 57             LD     D,A
241  00DE A 21006A         LD     HL,BTABLE
242  00E1 A CD8302         CALL   RKSRCH    ;SET UP CH B RACK TABLE
243  00E4 A CDAF02         CALL   ENXB      ;ENABLE CH B XMITTER - SEND FLAGS
244                        ;
245                        ;
246                        ;
247                        ;
248                        ;DISPLAY RACKS USED: GREEN LEDS ON FOR ALL RACKS DECLARED USED
249                        ;   IN THE REMOTE SYSTEM. IF NO RACKS ARE DECLARED USED,
250                        ;   INDICATE CONDITION WITH ALL LEDS RED.
251                        ;
252                        ;
253                        ;
254  00E7 A 3A0048  DRU    LD     A,(RKUSED) ;INPUT RACKS USED BYTE
255  00EA A CB07           RLC    A          ;7 6 5 4 3 2 1 0 -
                                             ;RACK POSITION
256  00EC A F601           OR     01H        ;INHIBIT THE DISPLAY OF RACK 0
257  00EE A 47             LD     B,A
258  00EF A 3EFF           LD     A,0FFH
259  00F1 A B8             CP     B
260  00F2 A CA4E02         JP     Z,DIAGER   ;NO REMOTE RACKS DECLARED USED
261  00F5 A 0E04           LD     C,04H
262  00F7 A CD7102         CALL   RCKDIS
263  00FA A 320039         LD     (LED1),A
264  00FD A 329A69         LD     (LOWER),A  ;LED 0-3 CODED DISPLAY BYTE
265  0100 A 0E04           LD     C,04H
266  0102 A CD7102         CALL   RCKDIS
267  0105 A 320038         LD     (LED2),A
268  0108 A 329B69         LD     (HIGHER),A ;LED 4-7 CODED DISPLAY BYTE
269                        ;
270                        ;
271                        ;
272                        ;I/O SCAN: INITIATE COMMUNICATION WITH THE FIRST RACK ON
273                        ;   EACH CHANNEL.
274                        ;
275                        ;
276                        ;
277  010B A FB      IOSCAN EI
278  010C A 3E69           LD     A,69H
279  010E A ED47           LD     I,A        ;LOAD INTERRUPT VECTOR - HI BYTE
280  0110 A 3E01           LD     A,01H
281  0112 A 329869         LD     (RFSH),A
282  0115 A 329A69         LD     (CMND),A   ;INITIALIZE CONTROL BYTES
283  0118 A 21996A         LD     HL,ARBUFF
284  011B A 22066B         LD     (APADDR),HL
285  011E A 21986B         LD     HL,BRBUFF
286  0121 A 22086B         LD     (BPADDR),HL ;INITIALIZE RECEIVE BUFFER REGIONS
287  0124 A 3A9569         LD     A,(RKCHK)
288  0127 A CB47           BIT    0,A        ;TEST FOR RACKS USED ON CH A
289  0129 A 201F           JR     NZ,CHB-$
```

```
SRC LINE  ADDR E DATA     REL                                       
290   0129 A DD210069              LD      IX,ATABLE
291   012F A CDBF02                CALL    XRDY
292   0132 A FDCB00DE               SET     3,(IY+00H)    ;INITIALIZE BT TURN BIT
293   0136 A FD22016B               LD      (BTPNT),IY    ;INITIALIZE BT RACK BYTE
294   013A A 21006A                LD      HL,AXBUFF
295   013D A CDF402                CALL    XMIT
296   0140 A CD8B03                CALL    APUT
297   0143 A 3A9569                LD      A,(RKCHK)
298   0146 A CB4F                  BIT     1,A           ;TEST FOR RACKS USED ON CH B
299   0148 A 2021                  JR      NZ,MAIN-$
300   014A A DD21006A       CHB    LD      IX,BTABLE
301   014E A CDBF02                CALL    XRDY
302   0151 A 3A9569                LD      A,(RKCHK)
303   0154 A CB47                  BIT     0,A           ;TEST FOR NO RACKS USED ON CH A
304   0156 A 2808                  JR      Z,BTOK-$
305   0158 A FDCB00DE               SET     3,(IY+00H)    ;INITIALIZE BT TURN BIT
306   015C A FD22016B               LD      (BTPNT),IY    ;INITIALIZE BT RACK BYTE
307   0160 A 21006B        BTOK    LD      HL,BXBUFF
308   0163 A CDF402                CALL    XMIT
309   0166 A CDBF03                CALL    BPUT
310   0169 A 18C0                  JR      MAIN-$
311                         ;
312                         ;
313                         ;
314                         ;
315                         ;
316                         ;MAIN CHECK LOOP: AFTER TRANSMITTER LOADING IS COMPLETE, EXECUTE
317                         ;   THIS CHECK LOOP. PROGRAM FLOW IS THEN DIRECTED
318                         ;   BY THE STATUS OF THE CHECKED CONDITIONS.
319                         ;
320                         ;
321                         ;
322                         ;
323                         ;
324   016B A 3A9469         MAIN    LD      A,(CHCHK)     ;INPUT CHANNELS STATUS CHECK BYTE
325   016E A 47                    LD      B,A
326   016F A E603                  AND     03H
327   0171 A FE03                  CP      03H           ;TEST FOR CH A,B SCAN COMPLETE
                                                           ;BITS SET
328   0173 A CCF303                CALL    Z,DONE
329   0176 A CB50                  BIT     2,B           ;TEST FOR CH A MESSAGE COMPLETE
330   0178 A C26904                JP      NZ,ARCVR
331   017B A CB58                  BIT     3,B           ;TEST FOR CH B MESSAGE COMPLETE
332   017D A C26406                JP      NZ,BRCVR
333   0180 A CB78                  BIT     7,B           ;TEST FOR NMI RECEIVED
334   0182 A 2005                  JR      NZ,NMI-$
335   0184 A CDE101                CALL    XFORM
336   0187 A 18E2                  JR      MAIN-$
337                         ;
338                         ;
339                         ;
340                         ;
341                         ;
342   0189 A 219469         NMI     LD      HL,CHCHK
343   018C A CBBE                  RES     7,(HL)        ;RESET NMI RECEIVED BIT
344   018E A 3E05                  LD      A,05H
345   0190 A F3                    DI
346   0191 A D342                  OUT     (SIOAC),A
347   0193 A 3AC06B                LD      A,(WR5A)
348   0196 A CBCF                  SET     1,A           ;SET BUSRQ BIT
349   0198 A D342                  OUT     (SIOAC),A     ;ISSUE BUSRQ
350   019A A FB                    EI
351   019B A 32C06B                LD      (WR5A),A      ;STORE NEW SIOA STATUS
```

```
SRC LINE  ADDR B DATA    REL
352  01?E A 3A0040           LD    A,(MODSEL)
353  01A1 A CB7F             BIT   7,A          ;TEST FOR BUSAK RECVED
354  01A3 A C24E02            JP    NZ,DIAGER
355  01A6 A 3AC879            LD    A,(TASKRQ)
356  01A9 A CB47             BIT   0,A          ;TEST FOR BT REQUESTED
357  01AB A 2810             JR    Z,DIAG-$
358  01AD A 2AC16B            LD    HL,(BTPNT)
359  01B0 A CB7E             BIT   7,(HL)       ;TEST FOR BT READ
360  01B2 A 2813             JR    Z,WRMOD-$
361  01B4 A CBAE             RES   5,(HL)       ;RESET BT PENDING BIT
362  01B6 A CBBE             RES   7,(HL)       ;RESET BT READ PENDING BIT (NMI)
363  01B8 A CDD101            CALL  CLRBT
364  01BB A 18AE             JR    MAIN-$
365  01BD A 3AC979   DIAG     LD    A,(RESULT)
366  01C0 A CB47             BIT   0,A          ;TEST FOR DIAGNOSTIC SUCCESS
367  01C2 A C24E02            JP    Z,DIAGER
368  01C5 A 18A4             JR    MAIN-$
369  01C7 A 3AA969   WRMOD    LD    A,(CTCWHY)
370  01CA A CBF7             SET   6,A          ;SET BT WRITE XMIT WAITING BIT
371  01CC A 32A969            LD    (CTCWHY),A
372  01CF A 189A             JR    MAIN-$
373                           ;
374                           ;
375                           ;
376                           ;
377                           ;
378  01D1 A F3      CLRBT    DI
379  01D2 A 166B             LD    D,6BH
380  01D4 A 3AC879            LD    A,(BTSLOT)
381  01D7 A 5F              LD    E,A
382  01D8 A 3EFF             LD    A,0FFH
383  01DA A 32D06B            LD    (BTSTOP),A   ;CLEAR OUT BT INHIBIT MASK
384  01DD A 2F              CPL
385  01DE A 12              LD    (DE),A       ;ZERO BT MODULE OUTPUT BYTE
386  01DF A FB              EI
387  01E0 A C9              RET
388                           ;
389                           ;
390                           ;
391                           ;
392                           ;
393  01E1 A 219469   XFORM    LD    HL,CHCHK
394  01E4 A CB66             BIT   4,(HL)       ;TEST FOR CH A XFORM OFF BIT SET
395  01E6 A C4F201            CALL  NZ,AXOFF
396  01E9 A 219469            LD    HL,CHCHK
397  01EC A CB6E             BIT   5,(HL)       ;TEST FOR CH B XFORM OFF BIT SET
398  01EE A C42002            CALL  NZ,BXOFF
399  01F1 A C9              RET
400                           ;
401                           ;
402                           ;
403                           ;
404                           ;
405  01F2 A F3      AXOFF    DI
406  01F3 A CBA6             RES   4,(HL)       ;RESET CH A XFORM OFF BIT
407  01F5 A 3E05             LD    A,05H
408  01F7 A D342             OUT   (SIOAC),A    ;WR5A
409  01F9 A 3AC06B            LD    A,(WR5A)
410  01FC A E602             AND   02H
411  01FE A 32C06B            LD    (WR5A),A
412  0201 A D342             OUT   (SIOAC),A    ;DISABLE XMITTER AND LINK XFORMER
413  0203 A 3E03             LD    A,03H
414  0205 A D342             OUT   (SIOAC),A    ;WR3A
```

```
ERR LINE  ADDR & DATA    REL 415  0207 A 3E0C                LD    A,0CH
416  0209 A D342                OUT   (SIOAC),A      ;ENABLE RECEIVER
417  020B A 21A969              LD    HL,CTCWHY
418  020E A CBC6                SET   0,(HL)         ;SET WATCHDOG ENABLE BIT
419  0210 A D9                  EXX
420  0211 A ED4B656B            LD    BC,(ARADDR)    ;INPUT RECEIVE BUFFER STARTING ADDRESS
421  0215 A 79                  LD    A,C
422  0216 A 329869              LD    (ACNT),A       ;STORE INITIAL RECEIVE COUNT
423  0219 A D9                  EXX
424  021A A 3E22                LD    A,22H
425  021C A D382                OUT   (CTC2),A       ;INITIATE CH A WATCHDOG - 2.35 MILLISECS
426  021E A FB                  EI
427  021F A C9                  RET
428                      ;
429                      ;
430                      ;
431                      ;
432                      ;
433  0220 A F3    BXOFF   DI
434  0221 A CBAE                RES   5,(HL)         ;RESET CH B XFORM OFF BIT
435  0223 A 3E05                LD    A,05H
436  0225 A D343                OUT   (SIOBC),A      ;WR5B
437  0227 A 3A9369              LD    A,(WR5B)
438  022A A E602                AND   02H
439  022C A 329369              LD    (WR5B),A
440  022F A D343                OUT   (SIOBC),A      ;DISABLE XMITTER AND LINK XFORMER
441  0231 A 3E03                LD    A,03H
442  0233 A D343                OUT   (SIOBC),A      ;WR3B
443  0235 A 3E0C                LD    A,0CH
444  0237 A D343                OUT   (SIOBC),A      ;ENABLE RECEIVER
445  0239 A 21A969              LD    HL,CTCWHY
446  023C A CBE6                SET   4,(HL)         ;SET WATCHDOG ENABLE BIT
447  023E A D9                  EXX
448  023F A ED5B636B            LD    DE,(BRADDR)    ;INPUT RECEIVE BUFFER STARTING ADDRESS
449  0243 A 7B                  LD    A,E
450  0244 A 32056B              LD    (BCNT),A       ;STORE INITIAL RECEIVE COUNT
451  0247 A D9                  EXX
452  0248 A 3E22                LD    A,22H
453  024A A D383                OUT   (CTC3),A       ;INITIATE CH B WATCHDOG - 2.35 MILLISECS
454  024C A FB                  EI
455  024D A C9                  RET
456                      ;
457                      ;
458                      ;
459                      ;
460                      ;
461  024E A F3    DIAGER  DI
462  024F A 3E55                LD    A,55H          ;DIAGNOSTIC ERROR - ALL LEDS RED
463  0251 A 320038              LD    (LED1),A
464  0254 A 320030              LD    (LED2),A
465  0257 A 3E05                LD    A,05H
466  0259 A D343                OUT   (SIOBC),A      ;WR5B
467  025B A 3E02                LD    A,02H
468  025D A D343                OUT   (SIOBC),A      ;SET I/O FAULT BIT - RTSB
469  025F A 76                  HALT
470                      ;
471                      ;
472                      ;
473                      ;
474                      ;
475  0260 A 71    RAMCHK  LD    (HL),C         ;WRITE / VERIFY TEST CODE
476  0261 A 7E                  LD    A,(HL)
477  0262 A B9                  CP    C
```

```
EFR LINE  ADDR & DATA    REL
     478  0263 A 2805            JR      Z,KEEPON-$
     479  0265 A 71              LD      (HL),C          ;TRY TEST CODE AGAIN
     480  0266 A 7E              LD      A,(HL)
     481  0267 A B9              CP      C
     482  0268 A 20E4            JR      NZ,DIAGER-$
     483  026A A 23      KEEPON  INC     HL
     484  026B A 10F3            DJNZ    RAMCHK-$
     485  026D A 1D              DEC     E
     486  026E A 20F0            JR      NZ,RAMCHK-$
     487  0270 A C9              RET
     488                 ;
     489                 ;
     490                 ;
     491                 ;
     492  0271 A 3E00    RCKDIS  LD      A,00H
     493  0273 A CB40    NEXTRK  BIT     0,B             ;TEST FOR RACK USED
     494  0275 A 2002            JR      NZ,NOTUSD-$
     495  0277 A CBCF            SET     1,A             ;RACK USED, SET CORRESPONDING BIT
     496  0279 A CB0F    NOTUSD  RRC     A
     497  027B A CB0F            RRC     A               ;SHIFT CODED LED CONTROL BYTE
     498  027D A CB08            RRC     B               ;SHIFT RACK USED BYTE
     499  027F A 0D              DEC     C               ;DECREMENT RACK COUNTER
     500  0280 A 20F1            JR      NZ,NEXTRK-$
     501  0282 A C9              RET
     502                 ;
     503                 ;
     504                 ;
     505                 ;
     506                 ;
     507  0283 A 010001  RKSRCH  LD      BC,0100H        ;RACK # MASK, RACK ADDRESS
     508  0286 A 59              LD      E,C
     509  0287 A 7A      SRCH    LD      A,D             ;INPUT RACKS USED ON CHANNEL
     510  0288 A A0              AND     B
     511  0289 A 2805            JR      Z,RKNXT-$
     512  028B A 71      RACK    LD      (HL),C          ;STORE RACK ADDRESS
     513  028C A 2C              INC     L
     514  028D A 73              LD      (HL),E          ;STORE STARTING RAM ADDRESS
     515  028E A 2C              INC     L
     516  028F A 2C              INC     L               ;SAVE PLACE FOR RACK'S RAM UPDATE MASK
     517  0290 A 7B      RKNXT   LD      A,E
     518  0291 A C610            ADD     A,10H           ;COMPUTE NEXT RACKS STARTING
                                                         ;RAM ADDRESS
     519  0293 A 5F              LD      E,A
     520  0294 A 79              LD      A,C
     521  0295 A C604            ADD     A,04H           ;COMPUTE NEXT RACK ADDRESS
     522  0297 A 4F              LD      C,A
     523  0298 A CB00            RLC     B               ;SHIFT RACK # MASK
     524  029A A 30EB            JR      NC,SRCH-$
     525  029C A 36FF            LD      (HL),0FFH       ;STORE FF - RACK TABLE END - EOD
     526  029E A C9              RET
     527                 ;
     528                 ;
     529                 ;
     530                 ;
     531                 ;
     532  029F A 3E05    ENXA    LD      A,05H
     533  02A1 A D342            OUT     (SIOAC),A       ;WR5
     534  02A3 A 06E9            LD      B,0E9H
     535  02A5 A 3A0069          LD      A,(WR5A)
     536  02A8 A B0              OR      B
     537  02A9 A D342            OUT     (SIOAC),A       ;ENABLE XMITTER A
     538  02AB A 320069          LD      (WR5A),A        ;STORE NEW SIOA STATUS
     539  02AE A C9              RET
     540                 ;
```

```
ERR LINE  ADDR 2 DATA    LBL 541
542                        ;
543                        ;
544                        ;
545   02AF A 3E05   ENXP   LD    A,05H
546   02B1 A D343          OUT   (8I09C),A    ;WR5
547   02B3 A 065B          LD    B,05BH
548   02B5 A 3A936P        LD    A,(WR5B)
549   02B8 A B0            OR    B
550   02B9 A D343          OUT   (8I09C),A    ;ENABLE XMITTER B
551   02BB A 32936P        LD    (WR5B),A     ;STORE NEW 8108 STATUS
552   02BE A C9            RET
553                        ;
554                        ;
555                        ;
556                        ;
557                        ;
558   02BF A DD7E00  XRDY  LD    A,(IX+00H)   ;00XX XX++
559   02C2 A 32A169        LD    (ADDR),A
560   02C5 A 6F            LD    L,A          ;CALCULATE CORRESPONDING RACK STATUS
561   02C6 A 2669          LD    H,69H        ;TABLE STARTING ADDRESS (IY) FOR THE
562   02C8 A E5            PUSH  HL           ;CURRENT RACK (IX)
563   02C9 A FDE1          POP   IY
564   02CB A 0600          LD    B,00H
565   02CD A 1620          LD    D,20H
566   02CF A DD5E01        LD    E,(IX+01H)   ;INPUT RACK'S STARTING I/O RAM ADDRESS
567   02D2 A 2669          LD    H,69H
568   02D4 A 6B            LD    L,E          ;RACKS LAST STATE RAM ADDRESS
569   02D5 A 1A     NXTBYT LD    A,(DE)       ;CURRENT RAM VALUE
570   02D6 A 2F            CPL                ;PLC-2 DATA INVERTED BY HARDWARE
571   02D7 A 4E            LD    C,(HL)       ;LAST STATE RAM VALUE
572   02D8 A B9            CP    C            ;COMPARE CURRENT AND LAST STATE RAM
                                              ; VALU:
573   02D9 A 2803          JR    Z,NOCHNG-$
574   02DB A 77            LD    (HL),A       ;UPDATE LAST STATE RAM IF DATA HAS
                                              ; CHANG:
575   02DC A CBC0          SET   0,B          ;SET BIT IN UPDATE MASK
576   02DE A 1C     NOCHNG INC   E
577   02DF A 7B            LD    A,E
578   02E0 A E601          AND   01H
579   02E2 A 2002          JR    NZ,NOSHFT-$
580   02E4 A CB08          RRC   B            ;SHIFT ON EVEN RAM ADDRESS VALUES
581   02E6 A 7D     NOSHFT LD    A,L
582   02E7 A E60F          AND   0FH
583   02E9 A FE0F          CP    0FH
584   02EB A 2803          JR    Z,XDONE-$
585   02ED A 2C            INC   L
586   02EE A 18E5          JR    NXTBYT-$
587   02F0 A DD7002 XDONE  LD    (IX+02H),B   ;STORE RAM UPDATE MASK BYTE
588   02F3 A C9            RET
589                        ;
590                        ;
591                        ;
592                        ;
593                        ;
594   02F4 A 3AA169 XMIT   LD    A,(ADDR)     ;00XX XX++
595   02F7 A 77            LD    (HL),A       ;STORE RACK ADDRESS TO XMIT BUFFER
596   02F8 A 2C            INC   L
597   02F9 A FD4E00        LD    C,(IY+00H)   ;INPUT RACK STATUS BYTE
598   02FC A 16FF          LD    D,0FFH
599   02FE A CB69          BIT   5,C          ;TEST FOR PT PENDING
600   0300 A 2804          JR    Z,NOMTCH-$
601   0302 A 3AD06B        LD    A,(BTSTOP)   ;INPUT PT INHIBIT MASK
602   0305 A 57            LD    D,A
```

```
ERR LINE  ADDR S DATA       REL
 603  0306 A 3A9A69  NOMTCH  LD    A,(CMND)       ;INPUT GLOBAL COMMAND
 604  0309 A 47              LD    B,A
 605  030A A CB59            BIT   3,C            ;TEST FOR ST TIME
 606  030C A 280A            JR    Z,NOST-$
 607  030E A CB69            BIT   5,C            ;TEST FOR ST PENDING
 608  0310 A 2006            JR    NZ,NOST-$
 609  0312 A FDCB00F6        SET   6,(IY+00H)     ;SET ST ISSUED BIT
 610  0316 A 1802            JR    POLCHK-$
 611  0318 A CBF8    NOST    SET   7,B            ;SET ST BUSY BIT
 612  031A A CB41    POLCHK  BIT   0,C            ;TEST FOR RACK UP
 613  031C A 2842            JR    Z,POLL-$
 614  031E A 3A9569          LD    A,(RKCHK)
 615  0321 A CB7F            BIT   7,A            ;TEST FOR FAULT RUN MODE
 616  0323 A 203B            JR    NZ,POLL-$
 617  0325 A 78              LD    A,B
 618  0326 A 77              LD    (HL),A         ;STORE COMMAND BYTE TO XMIT BUFFER
 619  0327 A 2C              INC   L
 620  0328 A 3A9D69          LD    A,(RFSH)       ;INPUT DATA REFRESH BYTE
 621  032B A DD4602          LD    B,(IX+02H)     ;INPUT RAM UPDATE MASK BYTE
 622  032E A B0              OR    B
 623  032F A CB61            BIT   4,C            ;TEST FOR ALL DATA SENT
 624  0331 A 2006            JR    NZ,POSIT-$
 625  0333 A 3EFF            LD    A,0FFH         ;LOAD SEND ALL DATA MASK
 626  0335 A FDCB00E6        SET   4,(IY+00H)     ;SET ALL DATA SENT BIT
 627  0339 A FD4640  POSIT   LD    B,(IY+40H)     ;INPUT RACK SIZE / POSITION MASK
 628  033C A A0              AND   B              ;TEST FOR NO REFRESH OR CHANGES IN
                                                    THIS
 629  033D A A2              AND   D              ;MASK OUT ST PENDING SLOT
 630  033E A 77              LD    (HL),A         ;STORE MASK BYTE TO XMIT BUFFER
 631  033F A 2C              INC   L
 632  0340 A 47              LD    B,A
 633  0341 A 1668            LD    D,68H
 634  0343 A DD5E01          LD    E,(IX+01H)     ;RACK'S LAST STATE RAM ADDRESS
 635  0346 A 0E03            LD    C,03           ;STARTING BYTE COUNT - RACK ADDR,CMND,
                                                    MA
 636  0348 A 180D            JR    DATACK-$
 637  034A A 7B      CHKCNT  LD    A,E
 638  034B A E60F            AND   0FH            ;TEST FOR DATA EXCHANGE COMPLETE
 639  034D A FE0F            CP    0FH
 640  034F A 2005            JR    NZ,CONCHK-$
 641  0351 A 79              LD    A,C
 642  0352 A 329E69          LD    (XCNT),A       ;STORE XMIT BYTE COUNT
 643  0355 A C9              RET
 644  0356 A 1C      CONCHK  INC   E
 645  0357 A CB40    DATACK  BIT   0,B            ;IF SET,SEND THIS DATA WORD
 646  0359 A 2025            JR    NZ,LDDATA-$
 647  035B A 1C              INC   E
 648  035C A CB08    NXTBIT  RRC   B              ;SHIFT MASK
 649  035E A 18EA            JR    CHKCNT-$
 650  0360 A 3E03    POLL    LD    A,03H
 651  0362 A 329E69          LD    (XCNT),A       ;STORE BYTE COUNT OF MESSAGE
 652  0365 A 0600            LD    B,00H
 653  0367 A 3A9569          LD    A,(RKCHK)
 654  036A A CB7F            BIT   7,A            ;TEST FOR FAULT RUN MODE BIT SET
 655  036C A 2802            JR    Z,NODEP-$
 656  036E A CBF8            SET   6,B            ;SET RACK DECIDES ITS LAST STATE BIT
 657  0370 A FDCB0056 NODEP  BIT   2,(IY+00H)     ;TEST FOR FAULTED RACK
 658  0374 A 2802            JR    Z,CMNDLD-$
 659  0376 A CBE8            SET   5,B            ;SET COMMAND FAULTED RACK BIT
 660  0378 A 3E81    CMNDLD  LD    A,81H          ;SEND CMND 1-ST BUSY BIT SET
 661  037A A B0              OR    B
 662  037B A 77              LD    (HL),A         ;STORE CMND BYTE TO XMIT BUFFER
```

```
EPR LINE  ADDR S DATA     REL
663  037C A 2C                    INC    L
664  037D A 3600                  LD     (HL),00H    ;STORE MASK BYTE TO XMIT BUFFER
665  037F A C9                    RET
666  0380 A 1A       LDDATA  LD   A,(DE)      ;INPUT LOW LAST STATE RAM BYTE
667  0381 A 77               LD   (HL),A      ;STORE TO XMIT BUFFER
668  0382 A 1C               INC  E
669  0383 A 2C               INC  L
670  0384 A 1A               LD   A,(DE)      ;INPUT HI LAST STATE RAM BYTE
671  0385 A 77               LD   (HL),A      ;STORE TO XMIT BUFFER
672  0386 A 2C               INC  L
673  0387 A 0C               INC  C
674  0388 A 0C               INC  C
675  0389 A 18D1              JR   NXTBIT-$
676                    ;
677                    ;
678                    ;
679                    ;
680                    ;
681  038B A 3A9E69  APUT    LD   A,(XCNT)
682  038E A 329469          LD   (AXCNT),A
683  0391 A 329569          LD   (ASXCNT),A   ;STORE VALUE OF XMIT MESSAGE BYTE COUNT
684  0394 A DDE5            PUSH IX
685  0396 A E1              POP  HL
686  0397 A 229E69          LD   (AXPNT),HL   ;STORE ATABLE POINTER
687  039A A FDE5            PUSH IY
688  039C A E1              POP  HL
689  039D A 229069          LD   (AYPNT),HL   ;STORE CH A RACK STATUS POINTER
690  03A0 A 3AA169          LD   A,(ADDR)
691  03A3 A 32A269          LD   (AADDR),A    ;STORE CH A CURRENT RACK ADDRESS
692  03A6 A 3E80    ASTART  LD   A,80H
693  03A8 A D342            OUT  (SIOAC),A    ;RESET XMIT CRC GENERATOR
694  03AA A F3              DI
695  03AB A D9              EXX
696  03AC A 01006A          LD   BC,AXBUFF
697  03AF A 0A              LD   A,(BC)       ;INPUT FIRST BYTE TO BE XMITTED
698  03B0 A 0C              INC  C
699  03B1 A D340            OUT  (SIOAD),A    ;OUTPUT TO SIO
700  03B3 A 3EC0            LD   A,0C0H
701  03B5 A D342            OUT  (SIOAC),A    ;RESET XMIT UNDERRUN/EOM BIT
702  03B7 A D9              EXX
703  03B8 A 3EB8            LD   A,0B8H
704  03BA A 328C69          LD   (AMAX),A     ;LOAD MAXIMUM RECEIVER VALUE
705  03BD A FB              EI
706  03BE A C9              RET
707                    ;
708                    ;
709                    ;
710                    ;
711                    ;
712  03BF A 3A9E69  BPUT    LD   A,(XCNT)
713  03C2 A 329669          LD   (BXCNT),A
714  03C5 A 329769          LD   (BSXCNT),A   ;STORE VALUE OF XMIT MESSAGE BYTE COUNT
715  03C8 A DDE5            PUSH IX
716  03CA A E1              POP  HL
717  03CB A 229869          LD   (BXPNT),HL   ;STORE BTABLE POINTER
718  03CE A FDE5            PUSH IY
719  03D0 A E1              POP  HL
720  03D1 A 229969          LD   (BYPNT),HL   ;STORE CH B RACK STATUS POINTER
721  03D4 A 3AA169          LD   A,(ADDR)
722  03D7 A 32A369          LD   (BADDR),A    ;STORE CH B CURRENT RACK ADDRESS
723  03DA A 3E80    BSTART  LD   A,80H
724  03DC A D343            OUT  (SIOBC),A
725  03DE A F3              DI
726  03DF A D9              EXX
```

```
ERR LINE  ADDR S DATA     REL
727  03E0 A 11006B                 LD    DE,BXBUFF
728  03E3 A 1A                     LD    A,(DE)        ;INPUT FIRST BYTE TO BE XMITTED
729  03E4 A 1C                     INC   E
730  03E5 A D341                   OUT   (SIOBD),A     ;OUTPUT TO SIO
731  03E7 A 3EC0                   LD    A,0C0H
732  03E9 A D343                   OUT   (SIOBC),A     ;RESET XMIT UNDERRUN/EOM BIT
733  03EB A D9                     EXX
734  03EC A 3EB9                   LD    A,0B9H
735  03EE A 32ED69                 LD    (BMAX),A      ;LOAD MAXIMUM RECEIVER VALUE
736  03F1 A FB                     EI
737  03F2 A C9                     RET
738                                ;
739                                ;
740                                ;
741                                ;
742                                ;
743  03F3 A 219469        DONE     LD    HL,CHCHK
744  03F6 A 3A9569                 LD    A,(RKCHK)
745  03F9 A CB47                   BIT   0,A           ;TEST FOR RACKS ON CH A
746  03FB A 2002                   JR    NZ,BCHECK-$
747  03FD A CB86                   RES   0,(HL)        ;RESET CH A SCAN COMPLETE BIT
748  03FF A CB4F        BCHECK     BIT   1,A           ;TEST FOR RACKS ON CH B
749  0401 A 2002                   JR    NZ,CHDONE-$
750  0403 A CB8E                   RES   1,(HL)        ;RESET CH B SCAN COMPLETE BIT
751  0405 A 00          CHDONE     NOP
752  0406 A 219D69                 LD    HL,RFSH
753  0409 A CB06                   RLC   (HL)          ;SHIFT CHANNEL REFRESH MASK
754  040B A 219569                 LD    HL,RKCHK
755  040E A 3A0040                  LD    A,(MODSEL)
756  0411 A CB77                   BIT   6,A           ;TEST FOR I/O RESET ACTIVE (LOW)
757  0413 A 2048                   JR    NZ,FLTST-$
758  0415 A CB57                   BIT   2,A           ;TEST FOR PLC-2/20,2/30 FAULT MODE
759  0417 A 200E                   JR    NZ,MOD2-$
760  0419 A CB6F                   BIT   5,A           ;TEST FOR KEYSWITCH IN RUN MODE
761  041B A 280A                   JR    Z,MOD2-$
762  041D A CBF6                   SET   6,(HL)        ;SET KEYSWITCH BIT
763  041F A CBBE                   RES   7,(HL)        ;RESET FAULT RUN BIT
764  0421 A 3E01                   LD    A,01H
765  0423 A 32A869                 LD    (CMND),A      ;SET XMITTER FOR CMND 1
766  0426 A C9                     RET
767  0427 A CBFE        MOD2       SET   7,(HL)        ;SET FAULT RUN BIT
768  0429 A 3E01                   LD    A,01H
769  042B A 32A869                 LD    (CMND),A      ;SET XMITTERS FOR CMND 1
770  042E A 3A0040      RUNFLT     LD    A,(MODSEL)
771  0431 A 57                     LD    D,A
772  0432 A CB77                   BIT   6,A           ;TEST FOR I/O RESET ACTIVE (LOW)
773  0434 A 2809                   JR    Z,FLTACK-$
774  0436 A CB76                   BIT   6,(HL)        ;TEST FOR KEYSWITCH BIT SET
775  0438 A C8                     RET   Z             ;FAULT NOT RECOGNIZED BY PLC-2 YET
776  0439 A CBB6                   RES   6,(HL)        ;RESET KEYSWITCH CHANGE BIT
777  043B A CBBE                   RES   7,(HL)        ;RESET FAULT RUN BIT
778  043D A 1822                   JR    NORES-$
779  043F A 3E05        FLTACK     LD    A,05H
780  0441 A F3                     DI
781  0442 A D343                   OUT   (SIOBC),A     ;WR5
782  0444 A 3A9369                 LD    A,(WR5B)
783  0447 A CB8F                   RES   1,A           ;RESET I/O FAULT BIT - RTS B
784  0449 A D343                   OUT   (SIOBC),A
785  044B A FB                     EI
786  044C A 329369                 LD    (WR5B),A
787  044F A 320060                 LD    (FLTRST),A    ;PULSE FAULT RESET LINE
788  0452 A CBF6                   SET   6,(HL)        ;SET KEYSWITCH BIT
```

```
ERR LINE  ADDR B DATA     REL 789  0454 A CB52              BIT    2,D         ;LO - PLC-2/20,2/30 FAULT MODE -
                                                        RACKS 8
      790  0456 A C0                RET    NZ          ;HI - PLC-2 FAULT MODE - USER
                                                        DECIDES RA
      791  0457 A CB6A              BIT    5,D         ;TEST FOR KEYSWITCH IN RUN MODE
      792  0459 A C8                RET    Z
      793  045A A CBBE              RES    7,(HL)      ;KEYSWITCH IN PGRM/TEST MODE -
      794  045C A C9                RET                ;RESET FAULT RUN MODE BIT
      795  045D A CB7E     FLTST    BIT    7,(HL)      ;TEST FOR FAULT RUN BIT SET
      796  045F A 20CD              JR     NZ,RUNFLT-$
      797  0461 A CBB6     NORES    RES    6,(HL)      ;RESET KEYSWITCH CHANGE BIT
      798  0463 A 3E02              LD     A,02H
      799  0465 A 329A69             LD     (CMND),A    ;SET XMITTERS FOR CMND 2
      800  0468 A C9                RET
      801                           ;
      802                           ;
      803                           ;
      804                           ;
      805                           ;
      806  0469 A F3       ARCVR    DI
      807  046A A 3E33              LD     A,33H
      808  046C A D342              OUT    (SIOAC),A   ;WR3
      809  046E A 3E00              LD     A,00H
      810  0470 A D342              OUT    (SIOAC),A   ;DISABLE RECEIVER
      811  0472 A DB40              IN     A,(SIOAD)
      812  0474 A FB                EI
      813  0475 A DB40              IN     A,(SIOAD)
      814  0477 A CD9F02             CALL   ENXA
      815  047A A 21A969             LD     HL,CTCWHY
      816  047D A CB86              RES    0,(HL)      ;RESET CTC WATCHDOG BIT
      817  047F A 219469             LD     HL,CHCHK
      818  0482 A CB96              RES    2,(HL)      ;RESET ARCVR BIT
      819  0484 A CD6F05             CALL   AGET
      820  0487 A 3A8869             LD     A,(ARSTAT)  ;INPUT RECEIVER STATUS BYTE
      821  048A A 57                LD     D,A
      822  048B A CBB7              RES    6,A         ;RESET RTP FLAG
      823  048D A 328869             LD     (ARSTAT),A
      824  0490 A 3ACA6B             LD     A,(ARECV)   ;INPUT SIO STATUS
      825  0493 A CB7F              BIT    7,A         ;TEST FOR VALID END OF MESSAGE
      826  0495 A 286A              JR     Z,ARETRY-$
      827  0497 A CB77              BIT    6,A         ;TEST FOR CRC ERROR
      828  0499 A 2066              JR     NZ,ARETRY-$
      829  049B A 2AC66B             LD     HL,(ARADDR) ;RECEIVE BUFFER AREA
      830  049E A 7A                LD     A,D
      831  049F A E60C              AND    0CH         ;TEST FOR BT RECEIVE PENDING
      832  04A1 A 2052              JR     NZ,RDBTA-$
      833  04A3 A F3                DI
      834  04A4 A D9                EXX
      835  04A5 A 79                LD     A,C         ;INPUT MAX USED RECEIVER BUFFER BYTE
      836  04A6 A FB                EI
      837  04A7 A D9                EXX
      838  04A8 A 95                SUB    L           ;CALCULATE RECEIVED DATA INT COUNT
      839  04A9 A 3D                DEC    A
      840  04AA A CD7807             CALL   INTERP
      841  04AD A FEFF              CP     0FFH        ;TEST FOR FAULT CONDITION
      842  04AF A 2850              JR     Z,ARETRY-$
      843  04B1 A CB68              BIT    5,B         ;TEST FOR BT REQUEST
      844  04B3 A 281A              JR     Z,ADONE-$
      845  04B5 A 218969             LD     HL,ARSTAT
      846  04B8 A FDCB00EE           SET    5,(IY+00H)  ;SET RACK'S BT PENDING FLAG
      847  04BC A 3AA169             LD     A,(ADDR)
      848  04BF A 32C36B             LD     (BTTEMP),A  ;STORE BT RACK ADDRESS
      849  04C2 A CB79              BIT    7,C         ;TEST FOR BT READ MODULE
```

```
SRC LINE  ADDR & DATA    REL             
850  04C4 A C25005                 JP    NZ,ABTRD
851  04C7 A 21A969                 LD    HL,CTCWHY
852  04CA A CBEE                   SET   5,(HL)          ;ST WRITE ON CH A
853  04CC A CD2209                 CALL  BTNMI
854  04CF A 219869        ADONE    LD    HL,ARSTAT
855  04D2 A CD6109                 CALL  NEXT
856  04D5 A 219469        ANEXT    LD    HL,CHCHK
857  04D8 A CB76                   BIT   6,(HL)          ;TEST FOR INTERMEDIATE SCAN COMPLETE
858  04DA A 2804                   JR    Z,AXM-$
859  04DC A CBB6                   RES   6,(HL)
860  04DE A CBC6                   SET   0,(HL)          ;SET CHANNEL A SCAN COMPLETE BIT
861  04E0 A 21006A        AXM      LD    HL,AXBUFF
862  04E3 A 3A8869                 LD    A,(ARSTAT)
863  04E6 A CDF402                 CALL  XMIT
864  04E9 A 21896A                 LD    HL,ARBUFF
865  04EC A 220669                 LD    (ARADDR),HL
866  04EF A CD8903        AGO      CALL  APUT
867  04F2 A C36B01                 JP    MAIN
868  04F5 A CDF507        RDBTA    CALL  BTREC
869  04F8 A FEFF                   CP    0FFH            ;TEST FOR BT FAULT
870  04FA A 2805                   JR    Z,ARETRY-$
871  04FC A CD4805                 CALL  ABTCLR
872  04FF A 18CE                   JR    ADONE-$
873                                ;
874                                ;
875                                ;
876                                ;
877                                ;
878  0501 A 3A8869        ARETRY   LD    A,(ARSTAT)
879  0504 A CB5F                   BIT   3,A             ;TEST FOR BT WRITE RECEIVE PENDING
880  0506 A 2808                   JR    Z,PREVA-$
881  0508 A FD22A569                LD    (STORE),IY
882  050C A FD2AC16B                LD    IY,(BTPNT)
883  0510 A FDCB004E      PREVA    BIT   1,(IY+00H)      ;TEST FOR PREVIOUS FAULT
884  0514 A 2019                   JR    NZ,AMAJOR-$
885  0516 A FDCB00CE               SET   1,(IY+00H)      ;SET PREVIOUS FAULT BIT
886  051A A CB5F                   BIT   3,A             ;TEST FOR BT WRITE RECEIVE PENDING
887  051C A 2804                   JR    Z,ALOAD-$
888  051E A FD2AA569                LD    IY,(STORE)      ;RESTORE CURRENT IY VALUE
889  0522 A 3A8569        ALOAD    LD    A,(ASXCNT)
890  0525 A 329469                 LD    (AXCNT),A       ;RESTORE XMIT DATA BYTE COUNT
891  0528 A CDA603                 CALL  ASTART
892  052B A C36B01                 JP    MAIN
893  052E A CD8205        AMAJOR   CALL  MAJOR
894  0531 A 3A8869                 LD    A,(ARSTAT)
895  0534 A CB5F                   BIT   3,A             ;TEST FOR BT WRITE RECEIVE PENDING
896  0536 A 2809                   JR    Z,ARPEND-$
897  0538 A FD2AA569               LD    IY,(STORE)      ;RESTORE CURRENT IY VALUE
898  053C A CD4805                 CALL  ABTCLR
899  053F A 1894                   JR    ANEXT-$
900  0541 A CB57          ARPEND   BIT   2,A             ;TEST FOR BT READ RECEIVE PENDING
901  0543 A C44805                 CALL  NZ,ABTCLR
902  0546 A 182D                   JR    ANEXT-$
903                                ;
904                                ;
905                                ;
906                                ;
907                                ;
908  0548 A 218869        ABTCLR   LD    HL,ARSTAT
909  054B A CB96                   RES   2,(HL)          ;RESET BT READ RECEIVE PENDING
910  054D A CB9E                   RES   3,(HL)          ;RESET BT WRITE RECEIVE PENDING
911  054F A C9                     RET
912                                ;
913                                ;
```

```
ERR LINE  ADDR S DATA      REL
     914                    ;
     915                    ;
     916                    ;
     917  0550 A CBD6       ABTRD    SET    2,(HL)         ;SET BT READ RECEIVE PENDING
     918  0552 A FDCB00FE            SET    7,(IY+00H)     ;SET NMI BT READ PENDING FLAG
     919  0556 A 21006A              LD     HL,AXBUFF
     920  0559 A 3AA169              LD     A,(ADDR)       ;INPUT RACK ADDRESS
     921  055C A 77                  LD     (HL),A         ;LOAD RACK ADDRESS TO XMIT BUFFER
     922  055D A 2C                  INC    L
     923  055E A 3E04                LD     A,04H
     924  0560 A 77                  LD     (HL),A         ;LOAD COMMAND BYTE TO XMIT BUFFER
     925  0561 A 3E02                LD     A,02H
     926  0563 A 32A669              LD     (XCNT),A       ;STORE BYTE COUNT OF MESSAGE
     927  0566 A 21046A              LD     HL,6A04H
     928  0569 A 22C66B              LD     (ARADDR),HL
     929  056C A C3EF04              JP     AGO
     930                    ;
     931                    ;
     932                    ;
     933                    ;
     934                    ;
     935  056F A 2AAE69     AGET     LD     HL,(AXPNT)     ;GET RACK TABLE POINTER
     936  0572 A E5                  PUSH   HL
     937  0573 A DDE1                POP    IX
     938  0575 A 2AB069              LD     HL,(AYPNT)     ;GET RACK STATUS TABLE POINTER
     939  0578 A E5                  PUSH   HL
     940  0579 A FDE1                POP    IY
     941  057B A 3AA269              LD     A,(AADDR)
     942  057E A 32A169              LD     (ADDR),A       ;GET CURRENT RACK ADDRESS
     943  0581 A C9                  RET
     944                    ;
     945                    ;
     946                    ;
     947                    ;
     948                    ;
     949  0582 A FD7E00     MAJOR    LD     A,(IY+00H)     ;INPUT RACK STATUS BYTE
     950  0585 A F604                OR     04H            ;SET FAULT BIT
     951  0587 A E6EE                AND    0EEH           ;RESET RACK UP,ALL DATA SENT BIT
     952  0589 A FD7700              LD     (IY+00H),A     ;STORE NEW RACK STATUS BIT
     953  058C A CD1306              CALL   LEDPOS
     954  058F A D603                SUB    03H            ;TEST FOR HI - LO LED BYTE
     955  0591 A FAA205              JP     M,LOLED
     956  0594 A 3AB869              LD     A,(HIGHER)     ;GET PAST HI LED BYTE
     957  0597 A CD3806              CALL   LEDRED
     958  059A A 32B869              LD     (HIGHER),A     ;STORE NEW HI LED BYTE
     959  059D A 320030              LD     (LED2),A
     960  05A0 A 180C                JR     SIZGET-$
     961  05A2 A 3AB669     LOLED    LD     A,(LOWER)      ;GET PAST LO LED BYTE
     962  05A5 A CD3806              CALL   LEDRED
     963  05A8 A 32B669              LD     (LOWER),A      ;STORE NEW LO LED BYTE
     964  05AB A 320039              LD     (LED1),A
     965  05AE A FD7E40     SIZGET   LD     A,(IY+40H)     ;INPUT RACK SIZE/POSITION BYTE
     966  05B1 A 010400              LD     BC,0004H       ;RACK SIZE CHECK
     967  05B4 A FE00                CP     00H
     968  05B6 A 2852                JR     Z,ALLFLT-$
     969  05B8 A CD4106              CALL   FLTMSK
     970  05BB A CD5106     FINDWD   CALL   WRDY
     971  05BE A 3A0040              LD     A,(MODSEL)
     972  05C1 A 4F                  LD     C,A
     973  05C2 A CB5F                BIT    3,A            ;TEST FOR FBI IN 125,126
     974  05C4 A 2848                JR     Z,RACK0-$
     975  05C6 A 219A20              LD     HL,FSTRK2
     976  05C9 A 7D         FWRITE   LD     A,L
     977  05CA A 82                  ADD    A,D
```

```
ERR LINE  ADDR & DATA        REL 978   05CB A 6F                       LD      L,A            ;COMPUTE CORRECT FAULT TABLE ADDRESS
979   05CC A 7E                       LD      A,(HL)         ;GET PREVIOUS FST
980   05CD A 2F                       CPL
981   05CE A B0                       OR      B
982   05CF A 2F                       CPL
983   05D0 A 77                       LD      (HL),A         ;STORE FST
984   05D1 A 219669                   LD      HL,RKCHK
985   05D4 A CB49                     BIT     1,C            ;TEST FOR IND/DEP MODE
986   05D6 A 282B                     JR      Z,INDEP-$
987   05D8 A CB71                     BIT     6,C            ;TEST FOR I/O RESET ACTIVE
988   05DA A 2812                     JR      Z,MODE-$
989   05DC A 3E05                     LD      A,05H
990   05DE A F3                       DI
991   05DF A D343                     OUT     (SIOBC),A      ;WR5 - CH B
992   05E1 A 3A9369                   LD      A,(WR5B)
993   05E4 A CBCF                     SET     1,A            ;SET I/O FAULT BIT - RTSB
994   05E6 A D343                     OUT     (SIOBC),A
995   05E8 A FB                       EI
996   05E9 A 329369                   LD      (WR5B),A
997   05EC A CBB6                     RES     6,(HL)         ;RESET KEYSWITCH CHANGE BIT
998   05EE A CB51          MODE       BIT     2,C            ;TEST FOR FAULTED RACK MODE SELECTED
999   05F0 A 200C                     JR      NZ,PLC2-$
1000  05F2 A CB69                     BIT     5,C            ;TEST FOR KEYSWITCH IN RUN MODE
1001  05F4 A 2808                     JR      Z,PLC2-$
1002  05F6 A 3E01          C1TIME     LD      A,01H
1003  05F8 A 329A69                   LD      (CMND),A       ;SET XMISSIONS FOR CMND 1
1004  05FB A C3EA09                   JP      GUESS
1005  05FE A CBFE          PLC2       SET     7,(HL)         ;SET FAULT RUN BIT - PLC-2 MODE
1006  0600 A C3F605                   JP      C1TIME
1007  0603 A CB71          INDEP      BIT     6,C            ;TEST FOR I/O RESET ACTIVE
1008  0605 A 28E7                     JR      Z,MODE-$
1009  0607 A C3EA09                   JP      GUESS
1010  060A A 060F          ALLFLT     LD      B,0FH
1011  060C A 18AD                     JR      FINDWD-$
1012  060E A 21FA20        RACK0      LD      HL,FSTRK0      ;FST IN 105-106
1013  0611 A 1826                     JR      FWRITE-$
1014                       ;
1015                       ;
1016                       ;
1017                       ;
1018                       ;
1019  0613 A DD7E00        LEDPOS     LD      A,(IX+00H)     ;INPUT RACK ADDRESS
1020  0616 A CB0F                     RRC     A
1021  0618 A CB0F                     RRC     A
1022  061A A E607                     AND     07H            ;MASK OUT RACK ADDRESS BYTES
1023  061C A 329269                   LD      (ADTEMP),A     ;D = RACK #, E = RED LED MASK
1024  061F A 110400                   LD      DE,0004H
1025  0622 A 5A            RKMTCH     CP      D
1026  0623 A 2807                     JR      Z,TABINC-$
1027  0625 A 14                       INC     D              ;RACK NUMBER COUNT
1028  0626 A CB03                     RLC     E              ;SHIFT RED LED MASK
1029  0628 A CB03                     RLC     E
1030  062A A 18F6                     JR      RKMTCH-$
1031  062C A 0600          TABINC     LD      B,00H
1032  062E A 15            DECD       DEC     D
1033  062F A 15                       DEC     D
1034  0630 A FA3606                   JP      M,FINTAB
1035  0633 A 04                       INC     B
1036  0634 A 18F9                     JR      DECD-$
1037  0636 A 50            FINTAB     LD      D,B
1038  0637 A C9                       RET
1039                       ;
1040                       ;
1041                       ;
```

```
ERR LINE  ADDR & DATA     REL 1042
1043                              ;
1044   063B A 47           LEDRED  LD    B,A              ;PAST CODED LED BYTE
1045   063C A 4B                   LD    C,E
1046   063A A 7B                   LD    A,E              ;LED MASK
1047   063B A CB07                 RLC   A
1048   063D A 2F                   CPL
1049   063E A A0                   AND   B                ;RESET FAULTED RACKS GREEN LED BIT
1050   063F A B3                   OR    E                ;SET FAULTED RACKS RED LED BIT
1051   0640 A C9                   RET
1052                              ;
1053                              ;
1054                              ;
1055                              ;
1056                              ;
1057   0641 A CB47         FLTMSK  BIT   0,A
1058   0643 A 2802                 JR    Z,NOPE-$
1059   0645 A CBE0                 SET   4,B              ;SET FAULT TABLE MASK BIT
1060   0647 A CB0F         NOPE    RRC   A
1061   0649 A CB0F                 RRC   A                ;CALCULATE WHICH FAULT BITS TO SET
1062   064B A CB08                 RRC   B
1063   064D A 0D                   DEC   C                ;DECREMENT COUNTER
1064   064E A C8                   RET   Z
1065   064F A 18F0                 JR    FLTMSK-$
1066                              ;
1067                              ;
1068                              ;
1069                              ;
1070                              ;
1071   0651 A 1EF0         WRDY    LD    E,0F0H
1072   0653 A 3A9269               LD    A,(ADTEMP)
1073   0656 A E601                 AND   01H              ;TEST FOR HI/LO NIBBLE
1074   0658 A C0                   RET   NZ
1075   0659 A CB00                 RLC   B                ;ODD RACK USE LO NIBBLE
1076   065B A CB00                 RLC   B
1077   065D A CB00                 RLC   B
1078   065F A CB00                 RLC   B
1079   0661 A 1E0F                 LD    E,0FH
1080   0663 A C9                   RET
1081                              ;
1082                              ;
1083                              ;
1084                              ;
1085                              ;
1086   0664 A F3           BRCVR   DI
1087   0665 A 3E33                 LD    A,33H
1088   0667 A D343                 OUT   (SIOBC),A        ;WR3
1089   0669 A 3E00                 LD    A,00H
1090   066B A D343                 OUT   (SIOBC),A        ;DISABLE RECEIVER
1091   066D A DB41                 IN    A,(SIOBD)
1092   066F A FB                   EI
1093   0670 A DB41                 IN    A,(SIOBD)
1094   0672 A CDAF02               CALL  EMXB
1095   0675 A 21A969               LD    HL,CTCWHY
1096   0678 A CBA6                 RES   4,(HL)           ;RESET CTC WATCHDOG BIT
1097   067A A 219469               LD    HL,CHCHK
1098   067D A CB9E                 RES   3,(HL)           ;RESET BRCVR BIT
1099   067F A CD6507               CALL  BGET
1100   0682 A 3A8969               LD    A,(BRSTAT)       ;INPUT RECEIVER STATUS
1101   0685 A 57                   LD    D,A
1102   0686 A CBB7                 RES   6,A              ;RESET RTP FLAG
1103   0688 A 328969               LD    (BRSTAT),A
1104   068B A 3AC86B               LD    A,(BRECV)        ;INPUT SIG STATUS
1105   068E A CB7F                 BIT   7,A              ;TEST FOR VALID END OF MESSAGE
```

```
ERR LINE  ADDR & DATA       REL
    1106  0690 A 2865              JR     Z,BRETRY-$
    1107  0692 A CB77              BIT    6,A              ;TEST FOR CRC ERROR
    1108  0694 A 2061              JR     NZ,BRETRY-$
    1109  0696 A 2AC96B            LD     HL,(BRADDR)      ;RECEIVE BUFFER AREA
    1110  0699 A 7A                LD     A,D
    1111  069A A E60C              AND    0CH              ;TEST FOR BT RECEIVE PENDING
    1112  069C A 204D              JR     NZ,RDBTP-$
    1113  069E A F3                DI
    1114  069F A D9                EXX
    1115  06A0 A 7B                LD     A,E              ;INPUT MAX USED RECEIVER BUFFER
                                                           BYTE
    1116  06A1 A FB                EI
    1117  06A2 A D9                EXX
    1118  06A3 A 95                SUB    L                ;CALCULATE RECEIVED DATA INT COUNT
    1119  06A4 A 3D                DEC    A
    1120  06A5 A CD7907            CALL   INTERP
    1121  06A8 A FEFF              CP     0FFH             ;TEST FOR FAULT CONDITION
    1122  06AA A 284B              JR     Z,BRETRY-$
    1123  06AC A CB69              BIT    5,B              ;TEST FOR BT REQUEST
    1124  06AE A 2815              JR     Z,BDONE-$
    1125  06B0 A 218969            LD     HL,BRSTAT
    1126  06B3 A FDCB00EE          SET    5,(IY+00H)       ;SET RACK'S BT PENDING BIT
    1127  06B7 A 3AA169            LD     A,(ADDR)
    1128  06BA A 32C36B            LD     (BTTEMP),A       ;STORE BT RACK ADDRESS
    1129  06BD A CB79              BIT    7,C              ;TEST FOR BT READ MODULE
    1130  06BF A C24607            JP     NZ,BBTRD
    1131  06C2 A CD2208            CALL   BTNMI
    1132  06C5 A 218969    BDONE   LD     HL,BRSTAT
    1133  06C8 A CD6109            CALL   NEXT
    1134  06CB A 219469    BNEXT   LD     HL,CHCHK
    1135  06CE A CB76              BIT    6,(HL)           ;TEST FOR INTERMEDIATE SCAN COMPLETE
                                                           BIT
    1136  06D0 A 2804              JR     Z,BXM-$
    1137  06D2 A CBB6              RES    6,(HL)
    1138  06D4 A CBCE              SET    1,(HL)           ;SET CHANNEL B SCAN COMPLETE BIT
    1139  06D6 A 21006B    BXM     LD     HL,BXBUFF
    1140  06D9 A 3A8969            LD     A,(BRSTAT)
    1141  06DC A CDF402            CALL   XMIT
    1142  06DF A 218969            LD     HL,BRBUFF
    1143  06E2 A 22C86B            LD     (BRADDR),HL
    1144  06E5 A CDBF03    BGO     CALL   BPUT
    1145  06E8 A C33801            JP     MAIN
    1146  06EB A CDF507    RDBTP   CALL   BTREC
    1147  06EE A FEFF              CP     0FFH             ;TEST FOR BT FAULT
    1148  06F0 A 2805              JR     Z,BRETRY-$
    1149  06F2 A CD3E07            CALL   BTCLR
    1150  06F5 A 18CE              JR     BDONE-$
    1151                           ;
    1152                           ;
    1153                           ;
    1154                           ;
    1155                           ;
    1156  06F7 A 3A8969    BRETRY  LD     A,(BRSTAT)
    1157  06FA A CB5F              BIT    3,A              ;TEST FOR BT WRITE RECEIVE PENDING
    1158  06FC A 2808              JR     Z,PREVB-$
    1159  06FE A FD22A569          LD     (STORE),IY
    1160  0702 A FD2AC16B          LD     IY,(BTPNT)
    1161  0706 A FDCB004E  PREVB   BIT    1,(IY+00H)       ;TEST FOR PREVIOUS FAULT
    1162  070A A 2018              JR     NZ,BMAJOR-$
    1163  070C A FDCB00CE          SET    1,(IY+00H)       ;SET PREVIOUS FAULT BIT
    1164  0710 A CB5F              BIT    3,A              ;TEST FOR BT WRITE RECEIVE PENDING
    1165  0712 A 2904              JR     Z,BLOAD-$
```

```
ERR LINE  ADDR S DATA      REL
     1166 0714 A FD2AA569          LD      IY,(STORE)
     1167 0718 A 3A8769     BLOAD  LD      A,(PSXCNT)
     1168 071B A 329669            LD      (BXCNT),A       ;RESTORE XMIT DATA BYTE COUNT
     1169 071E A CDDA03            CALL    BSTART
     1170 0721 A C36B01            JP      MAIN
     1171 0724 A CD8205     BMAJOR CALL    MAJOR
     1172 0727 A 3A9869            LD      A,(BRSTAT)
     1173 072A A CB5F              BIT     3,A             ;TEST FOR BT WRITE RECEIVE PENDING
     1174 072C A 2809              JR      Z,BRPEND-$
     1175 072E A FD2AA569          LD      IY,(STORE)      ;RESTORE CURRENT IY VALUE
     1176 0732 A CD3E07            CALL    BBTCLR
     1177 0735 A 1894              JR      BNEXT-$
     1178 0737 A CB57      BRPEND  BIT     2,A             ;TEST FOR BT READ RECEIVE PENDING
     1179 0739 A C43E07            CALL    NZ,BBTCLR
     1180 073C A 188D              JR      BNEXT-$
     1181                          ;
     1182                          ;
     1183                          ;
     1184                          ;
     1185                          ;
     1186 073E A 219869     BBTCLR LD      HL,ARSTAT
     1187 0741 A CB96              RES     2,(HL)          ;RESET BT RECEIVE PENDING BIT
     1188 0743 A CB9E              RES     3,(HL)          ;RESET BT WRITE RECEIVE PENDING BIT
     1189 0745 A C9                RET
     1190                          ;
     1191                          ;
     1192                          ;
     1193                          ;
     1194                          ;
     1195 0746 A CBD6       BBTRD  SET     2,(HL)          ;SET BT READ PENDING FLAG
     1196 0748 A FDCB00FE          SET     7,(IY+00H)      ;SET NMI BT READ PENDING FLAG
     1197 074C A 21006B            LD      HL,BXBUFF
     1198 074F A 3AA169            LD      A,(ADDR)        ;INPUT RACK ADDRESS
     1199 0752 A 77                LD      (HL),A          ;LOAD RACK ADDRESS TO XMIT BUFFER
     1200 0753 A 2C                INC     L
     1201 0754 A 3E04              LD      A,04H
     1202 0756 A 77                LD      (HL),A          ;LOAD COMMAND BYTE TO XMIT BUFFER
     1203 0757 A 3E02              LD      A,02H
     1204 0759 A 329E69            LD      (XCNT),A        ;STORE BYTE COUNT OF MESSAGE
     1205 075C A 21046B            LD      HL,6B04H
     1206 075F A 22C86B            LD      (BRADDR),HL
     1207 0762 A C3E506            JP      BGO
     1208                          ;
     1209                          ;
     1210                          ;
     1211                          ;
     1212                          ;
     1213 0765 A 2A9669     BGET   LD      HL,(BXPNT)      ;GET RACK TABLE POINTER
     1214 0768 A E5                PUSH    HL
     1215 0769 A DDE1              POP     IX
     1216 076B A 2A9869            LD      HL,(BYPNT)      ;GET RACK STATUS POINTER
     1217 076E A E5                PUSH    HL
     1218 076F A FDE1              POP     IY
     1219 0771 A 3AA369            LD      A,(BADDR)
     1220 0774 A 32A169            LD      (ADDR),A        ;GET CURRENT RACK ADDRESS
     1221 0777 A C9                RET
     1222                          ;
     1223                          ;
     1224                          ;
     1225                          ;
     1226                          ;
     1227 0778 A 47         INTERP LD      B,A             ;STORE RECVR INT DATA COUNT
     1228 0779 A D603              SUB     03H
```

```
ERR LINE  ADDR & DATA      REL
    1229  0778 A FAF207             JP     M,FAULT              ;TEST FOR MINIMUM VALID XMISSION
                                                                 LENGTH
    1230  077E A 7E                 LD     A,(HL)               ;INPUT FIRST BYTE FROM RECVR BUFFER
    1231  077F A 2C                 INC    L
    1232  0780 A FE90                CP    90H                  ;TEST FOR VALID SCANNER ADDRESS
    1233  0782 A 206E                JR    NZ,FAULT-$
    1234  0784 A 5E                 LD     E,(HL)               ;INPUT COMMAND BYTE
    1235  0785 A 2C                 INC    L
    1236  0786 A 4E                 LD     C,(HL)               ;INPUT MASK BYTE
    1237  0787 A 2C                 INC    L
    1238  0788 A 3E00                LD    A,00H
    1239  078A A 1608                LD    D,08H
    1240  078C A CD5508             CALL   HEXCNT
    1241  078F A C603               ADD    A,03H                ;ADD IN ADDR,CMMD,AND MASK BYT
    1242  0791 A CB6B               BIT    5,E                  ;TEST FOR BT REQUESTED
    1243  0793 A 2802               JR     Z,STAFOL-$
    1244  0795 A C602               ADD    A,02H                ;ADD IN BT ADDRESS AND MSB
    1245  0797 A CB5B        STAFOL BIT    3,E                  ;TEST FOR COMMAND TO FOLLOW
    1246  0799 A 2801               JR     Z,CNTCHK-$
    1247  079B A 3C                 INC    A
    1248  079C A B9         CNTCHK  CP     C                    ;COMPARE CALCULATED BYTE COUNT WITH
    1249  079D A 2053               JR     NZ,FAULT-$           ;RECVR INT DATA COUNT
    1250  079F A 7B                 LD     A,E                  ;INPUT COMMAND BYTE
    1251  07A0 A 329C69             LD     (TEMP),A             ;STORE COMMAND BYTE
    1252  07A3 A 3E90               LD     A,90H
    1253  07A5 A DD8601             ADD    A,(IX+01H)           ;COMPUTE RACK I/O RAM INPUT TABLE
                                                                 ADDRESS
    1254  07A8 A 5F                 LD     E,A
    1255  07A9 A 1620               LD     D,20H
    1256  07AB A 0608               LD     B,08H                ;INITIALIZE CYCLE COUNTER
    1257  07AD A CB41        EXDATA BIT    0,C                  ;TEST FOR MASK BIT SET
    1258  07AF A 2811               JR     Z,NODATA-$
    1259  07B1 A 7E                 LD     A,(HL)
    1260  07B2 A 2F                 CPL
    1261  07B3 A 12                 LD     (DE),A               ;EXCHANGE LO BYTE
    1262  07B4 A 2C                 INC    L
    1263  07B5 A 1C                 INC    E
    1264  07B6 A 7E                 LD     A,(HL)
    1265  07B7 A 2F                 CPL
    1266  07B8 A 12                 LD     (DE),A               ;EXCHANGE HI BYTE
    1267  07B9 A 2C                 INC    L
    1268  07BA A 1C                 INC    E
    1269  07BB A 05                 DEC    B
    1270  07BC A 280D               JR     Z,EXDONE-$
    1271  07BE A CB09               RRC    C
    1272  07C0 A 18EB               JR     EXDATA-$
    1273  07C2 A 05         NODATA  DEC    B
    1274  07C3 A 2806               JR     Z,EXDONE-$
    1275  07C5 A CB09               RRC    C
    1276  07C7 A 1C                 INC    E
    1277  07C8 A 1C                 INC    E
    1278  07C9 A 18E2               JR     EXDATA-$
    1279  07CB A 3A9C69     EXDONE  LD     A,(TEMP)             ;INPUT COMMAND BYTE
    1280  07CE A 47                 LD     B,A
    1281  07CF A CB68               BIT    5,B                  ;TEST FOR BT REQUEST
    1282  07D1 A 2810               JR     Z,BTNO-$
    1283  07D3 A 7E                 LD     A,(HL)               ;INPUT BT SLOT ADDRESS
    1284  07D4 A 2C                 INC    L
    1285  07D5 A 329D79             LD     (BTSLOT),A           ;STORE TO BT RAM
    1286  07D8 A E60F               AND    0FH                  ;MASK OUT BT SLOT ADDRESS
    1287  07DA A 0E01               LD     C,01H
    1288  07DC A 3D         DECA    DEC    A
    1289  07DD A 3D                 DEC    A
```

```
ERR LINE  ADDR & DATA        PEL
     1290 07DE A F4E507              JP      M,BTRDY
     1291 07E1 A CB01               RLC     C
     1292 07E3 A 18F7               JR      DECA-$
     1293 07E5 A 79         BTRDY   LD      A,C
     1294 07E6 A 2F                 CPL
     1295 07E7 A 32D04B             LD      (BTSTOP),A   ;ALL 1'S EXCEPT FOR 0 AT BT SLOT
     1296 07EA A 7E                 LD      A,(HL)       ;INPUT MSW
     1297 07EB A 32CB79             LD      (BTMSB),A    ;STORE TO BT RAM
     1298 07EE A 4F                 LD      C,A
     1299 07EF A 3E00      BTNO     LD      A,00H        ;SET NO FAULT FLAG
     1300 07F1 A C9                 RET
     1301 07F2 A 3EFF      FAULT    LD      A,0FFH       ;SET FAULT FLAG
     1302 07F4 A C9                 RET
     1303                           ;
     1304                           ;
     1305                           ;
     1306                           ;
     1307                           ;
     1308 07F5 A CB5A      BTREC    BIT     3,D          ;TEST FOR BT WRITE RECEIVE PENDING
     1309 07F7 A 2808               JR      Z,COMTST-$
     1310 07F9 A FD22A569            LD      (STORE),IY
     1311 07FD A FD2A16B             LD      IY,(BTPNT)
     1312 0801 A CB42      COMTST   BIT     0,D          ;TEST FOR COMMUNICATION ERROR
     1313 0803 A 2038               JR      NZ,BTRFLT-$
     1314 0805 A 7E                 LD      A,(HL)       ;INPUT FIRST DATA BYTE
     1315 0806 A FE80               CP      80H          ;TEST FOR VALID SCANNER ADDRESS
     1316 0808 A 2033               JR      NZ,BTRFLT-$
     1317 080A A 2C                 INC     L
     1318 080B A 7E                 LD      A,(HL)
     1319 080C A FE03               CP      03H
     1320 080E A 2830               JR      Z,WRDONE-$
     1321 0810 A FE04               CP      04H
     1322 0812 A 2029               JR      NZ,BTRFLT-$
     1323 0814 A CD4908             CALL    BTSIZE
     1324 0817 A 2C        BTEXCH   INC     L
     1325 0818 A 7E                 LD      A,(HL)
     1326 0819 A 12                 LD      (DE),A       ;EXCHANGE BT DATA
     1327 081A A 1D                 DEC     E
     1328 081B A F21708             JP      P,BTEXCH
     1329 081E A FDCB009E           RES     1,(IY+00H)   ;RESET PREVIOUS FAULT BIT
     1330 0822 A 3E01      BTNMI    LD      A,01H
     1331 0824 A 32C879             LD      (TASKRQ),A   ;LOAD TASK REQUEST BYTE
     1332 0827 A 3E05               LD      A,05H
     1333 0829 A F3                 DI
     1334 082A A D342               OUT     (SIOAC),A
     1335 082C A 3AC64B             LD      A,(WR5A)
     1336 082F A CB8F               RES     1,A          ;RESET SUSRQ BIT
     1337 0831 A D342               OUT     (SIOAC),A
     1338 0833 A FB                 EI
     1339 0834 A 32C64B             LD      (WR5A),A
     1340 0837 A 32005B             LD      (PNMI),A     ;ISSUE NMI TO PARALLEL PROCESSOR
     1341 083A A 3E00               LD      A,00H
     1342 083C A C9                 RET
     1343 083D A 3EFF      BTRFLT   LD      A,0FFH
     1344 083F A C9                 RET
     1345 0840 A FDCB009E  WRDONE   RES     1,(IY+00H)   ;RESET PREVIOUS FAULT BIT
     1346 0844 A FD2AA569            LD      IY,(STORE)  ;RESTORE CURRENT IY VALUE
     1347 0848 A C9                 RET
     1348                           ;
     1349                           ;
     1350                           ;
     1351                           ;
     1352                           ;
     1353 0849 A 3ACB79    BTSIZE   LD      A,(BTMSB)    ;INPUT BT MODULE STATUS BYTE
```

```
ERR LINE  ADDR & DATA   REL 1354  084C A 47                  LD      B,A
1355  084D A 3E3F                LD      A,3FH      ;MASK OUT R/W BITS
1356  084F A A0                  AND     B
1357  0850 A 87                  ADD     A,A        ;CONVERT FROM WORDS TO BYTES;1
                                                     EXTRA - C:
1358  0851 A 1679                LD      D,79H      ;BT RAM - HI BYTE ADDRESS
1359  0853 A 5F                  LD      E,A        ;BT RAM - LO BYTE ADDRESS
1360  0854 A C9                  RET
1361                     ;
1362                     ;
1363                     ;
1364                     ;
1365                     ;
1366  0855 A CB41        MSKCNT  BIT     0,C        ;TEST FOR MASK BIT SET
1367  0857 A 2802                JR      Z,BIT-$
1368  0859 A 3C                  INC     A
1369  085A A 3C                  INC     A          ;INCREMENT BYTE COUNTER
1370  085B A CB09        BIT     RRC     C          ;SHIFT MASK BYTE
1371  085D A 15                  DEC     D
1372  085E A C8                  RET     Z
1373  085F A 18F4                JR      MSKCNT-$
1374                     ;
1375                     ;
1376                     ;
1377                     ;
1378                     ;
1379  0861 A 3AA969      NEXT    LD      A,(CTCWHY)
1380  0864 A CB77                BIT     6,A        ;TEST FOR BT WRITE XMIT WAITING
1381  0866 A 2843                JR      Z,BTCNTR-$
1382  0868 A CBB7                RES     6,A        ;RESET BT WRITE XMIT WAITING BIT
1383  086A A 218869              LD      HL,ARSTAT
1384  086D A CB6F                BIT     5,A        ;TEST FOR CH A
1385  086F A 2003                JR      NZ,EXSTCK-$
1386  0871 A 21DA03              LD      HL,BSTART
1387  0874 A E3         EXSTCK   EX      (SP),HL    ;RETURN ADDRESS = CH XMIT ROUTINE
1388  0875 A 0E84                LD      C,84H      ;LO BYTE COUNT STORE - CH A
1389  0877 A 11006A              LD      DE,AXBUFF
1390  087A A 218869              LD      HL,ARSTAT
1391  087D A CB6F                BIT     5,A        ;TEST FOR CH A
1392  087F A 2008                JR      NZ,WRXMIT-$
1393  0881 A 0E86                LD      C,86H      ;LO BYTE COUNT STORE - CH B
1394  0883 A 11006B              LD      DE,BXBUFF
1395  0886 A 218969              LD      HL,BRSTAT
1396  0889 A CBAF       WRXMIT   RES     5,A        ;RESET CH A BIT
1397  088B A 32A969              LD      (CTCWHY),A
1398  088E A CBDE                SET     3,(HL)     ;SET BT WRITE RECEIVE PENDING BIT
1399  0890 A EB                  EX      DE,HL
1400  0891 A CD4909              CALL    BTSIZE
1401  0894 A 0669                LD      B,69H
1402  0896 A 7B                  LD      A,E
1403  0897 A C603                ADD     A,03H      ;CALCULATE XMIT BYTE COUNT -
1404  0899 A 02                  LD      (BC),A     ;ADD IN ADDR,CMND,AND CHKSUM BYTE
1405  089A A 0C                  INC     C
1406  089B A 02                  LD      (BC),A
1407  089C A 3AC369              LD      A,(BTTEMP)
1408  089F A 77                  LD      (HL),A     ;LOAD PACK ADDRESS
1409  08A0 A 3E03                LD      A,03H
1410  08A2 A 77                  LD      (HL),A     ;LOAD COMMAND BYTE
1411  08A3 A 2C         XLOAD    INC     L
1412  08A4 A 1A                  LD      A,(DE)     ;GET BYTE FROM BT RAM
1413  08A5 A 77                  LD      (HL),A     ;STORE TO XMIT BUFFER
1414  08A6 A 1B                  DEC     E
1415  08A7 A F2A308              JP      P,XLOAD
```

```
ERR LINE  ADDR & DATA      REL
     1416  08AA A C9                       RET
     1417  08AB A 2AC15B    BTCNTR   LD    HL,(BTPNT)
     1418  08AE A 7E                 LD    A,(HL)
     1419  08AF A CB77                BIT  6,A           ;TEST FOR BT ISSUED
     1420  08B1 A 2827                JR   Z,NXTRCK-$
     1421  08B3 A CB6F                BIT  5,A           ;TEST FOR BT PENDING
     1422  08B5 A 2023                JR   NZ,NXTRCK-$
     1423  08B7 A E617                AND  17H           ;CLEAR OUT ALL BT CONTROL BITS
     1424  08B9 A 77                  LD   (HL),A
     1425  08BA A 0600                LD   B,00H
     1426  08BC A 2C       NXTBT      INC  L
     1427  08BD A CB46                BIT  0,(HL)        ;TEST FOR RACK UP
     1428  08BF A 200F                JR   NZ,SETBT-$
     1429  08C1 A 7D                  LD   A,L
     1430  08C2 A FE3F                CP   3FH           ;TEST FOR MAX VALUE OF IY RACK TABLE
     1431  08C4 A 2002                JR   NZ,CNTLOP-$
     1432  08C6 A 2EFF                LD   L,0FFH
     1433  08C8 A 3E3F     CNTLOP     LD   A,3FH
     1434  08CA A B8                  CP   B             ;TEST FOR MAX ALLOWED BT INC CYCLE
     1435  08CB A 2808                JR   Z,SAMEBT-$
     1436  08CD A 04                  INC  B
     1437  08CE A 18EC                JR   NXTBT-$
     1438  08D0 A CBDE     SETBT      SET  3,(HL)        ;SET BT TURN BIT
     1439  08D2 A 22C15B              LD   (BTPNT),HL    ;STORE BT RACK ALLOWED POINTER
     1440  08D5 A 2AC15B   SAMEBT     LD   HL,(BTPNT)
     1441  08D8 A CBDE                SET  3,(HL)        ;SET BT TURN BIT
     1442  08DA A 3AC069   NXTRCK     LD   A,(TEMP)      ;INPUT RECEIVED COMMAND BYTE
     1443  08DD A E603                AND  03H           ;MASK OUT HIGHEST USED QUARTER RACK
                                                          BITS
     1444  08DF A 5F                  LD   E,A           ;I/O ENDING SLOT ADDRESS
     1445  08E0 A 32A469              LD   (ADEND),A
     1446  08E3 A FDCB0046            BIT  0,(IY+00H)    ;TEST FOR RACK UP
     1447  08E7 A C29B09              JP   NZ,SIZRDY
     1448  08EA A FDCB00C6            SET  0,(IY+00H)    ;SET RACK UP BIT
     1449  08EE A 3AA169              LD   A,(ADDR)      ;00XX XX44
     1450  08F1 A E603                AND  03H           ;MASKOUT STARTING RACK BITS
     1451  08F3 A 1600                LD   D,00H
     1452  08F5 A FE00     MTCHIO     CP   00H
     1453  08F7 A 2806                JR   Z,SIZE-$
     1454  08F9 A 3D       RKSPOT     DEC  A
     1455  08FA A 14                  INC  D
     1456  08FB A FE00                CP   00H
     1457  08FD A 20FA                JR   NZ,RKSPOT-$
     1458  08FF A 7B       SIZE       LD   A,E           ;INPUT HIGHEST SLOT NUMBER USED
     1459  0900 A 92                  SUB  D
     1460  0901 A 0E03                LD   C,03H
     1461  0903 A FE00     SIZE1      CP   00H
     1462  0905 A 280B                JR   Z,SZSHFT-$
     1463  0907 A 3D                  DEC  A
     1464  0908 A CB01                RLC  C
     1465  090A A CBC1                SET  0,C
     1466  090C A CB01                RLC  C
     1467  090E A CBC1                SET  0,C           ;SET BIT FOR EACH CORRESPONDING
     1468  0910 A 18F1                JR   SIZE1-$       ;RACK SLOT PAIR USED
     1469  0912 A 7A       SZSHFT     LD   A,D
     1470  0913 A FE00     SLOOP2     CP   00H
     1471  0915 A 2807                JR   Z,SIZSTR-$
     1472  0917 A 3D                  DEC  A
     1473  0918 A CB01                RLC  C
     1474  091A A CB01                RLC  C             ;SHIFT TO ACCOUNT FOR RACK OFFSET
     1475  091C A 18F5                JR   SLOOP2-$
     1476  091E A FD7140   SIZSTR     LD   (IY+40H),C    ;STORE RACK SIZE - POSITION BYTE
```

| SRC LINE | ADDR & DATA | REL | | | | |
|---|---|---|---|---|---|---|
| 1477 | 0921 A FDCB009E | FLTTST | RES | 1,(IY+00H) | | ;RESET FIRST PASS FAULT BIT |
| 1478 | 0925 A FDCB0056 | | BIT | 2,(IY+00H) | | ;TEST FOR FAULTED RACK |
| 1479 | 0929 A CA9B09 | | JP | Z,SIZRDY | | |
| 1480 | 092C A FDCB0096 | | RES | 2,(IY+00H) | | ;RESET RACK FAULT BIT |
| 1481 | 0930 A CD1306 | | CALL | LEDPOS | | |
| 1482 | 0933 A 79 | | LD | A,C | | ;RACK SIZE - POSITION MASK |
| 1483 | 0934 A 010400 | | LD | BC,0004H | | |
| 1484 | 0937 A CD4106 | | CALL | FLTMSK | | |
| 1485 | 093A A 3A9C69 | | LD | A,(TEMP) | | |
| 1486 | 093D A CB57 | | BIT | 2,A | | ;TEST FOR LAST RACK |
| 1487 | 093F A 2816 | | JR | Z,RCKBIT-$ | | |
| 1488 | 0941 A 3E00 | | LD | A,00H | | |
| 1489 | 0943 A CB58 | FSTBIT | BIT | 3,B | | ;TEST IF LAST QUARTER RACK RESET |
| 1490 | 0945 A 2007 | | JR | NZ,LRDONE-$ | | |
| 1491 | 0947 A CBD8 | | SET | 3,B | | ;SET RESET QUARTER RACK FAULT BIT |
| 1492 | 0949 A CB00 | | RLC | B | | |
| 1493 | 094B A 3C | | INC | A | | ;COUNT SHIFTS |
| 1494 | 094C A 18F5 | | JR | FSTBIT-$ | | |
| 1495 | 094E A FE00 | LRDONE | CP | 00H | | ;TEST SHIFT COUNT VALUE |
| 1496 | 0950 A 2805 | | JR | Z,RCKBIT-$ | | |
| 1497 | 0952 A CB08 | LR1 | RRC | B | | ;RESTORE POSITION OF FST RESULT BYTE |
| 1498 | 0954 A 3D | | DEC | A | | |
| 1499 | 0955 A 20FB | | JR | NZ,LR1-$ | | |
| 1500 | 0957 A CD5106 | RCKBIT | CALL | WRDY | | |
| 1501 | 095A A 78 | | LD | A,B | | ;BITS SET = RACK SIZE POSITION |
| 1502 | 095B A 2F | | CPL | | | |
| 1503 | 095C A 47 | | LD | B,A | | |
| 1504 | 095D A 3A0040 | | LD | A,(MODSEL) | | |
| 1505 | 0960 A 4F | | LD | C,A | | |
| 1506 | 0961 A CB5F | | BIT | 3,A | | ;TEST FOR FST LOCATION |
| 1507 | 0963 A CA030A | | JP | Z,RK0 | | |
| 1508 | 0966 A 219A20 | | LD | HL,FSTRK2 | | |
| 1509 | 0969 A 7D | FRESET | LD | A,L | | |
| 1510 | 096A A 82 | | ADD | A,D | | |
| 1511 | 096B A 6F | | LD | L,A | | ;CORRECT FAULT TABLE ADDRESS |
| 1512 | 096C A 7E | | LD | A,(HL) | | ;GET PREVIOUS FST |
| 1513 | 096D A 2F | | CPL | | | |
| 1514 | 096E A A0 | | AND | B | | |
| 1515 | 096F A 2F | | CPL | | | |
| 1516 | 0970 A 47 | | LD | B,A | | |
| 1517 | 0971 A 77 | | LD | (HL),A | | ;STORE FST |
| 1518 | 0972 A 7B | HISTST | LD | A,E | | |
| 1519 | 0973 A 2F | | CPL | | | |
| 1520 | 0974 A 5F | | LD | E,A | | |
| 1521 | 0975 A A3 | | AND | E | | |
| 1522 | 0976 A BB | | CP | E | | ;TEST FOR ENTIRE RACK FAULT FREE |
| 1523 | 0977 A 2022 | | JR | NZ,SIZRDY-$ | | |
| 1524 | 0979 A CD1306 | | CALL | LEDPOS | | |
| 1525 | 097C A D603 | | SUB | 03H | | ;TEST FOR HI - LO LED BYTE |
| 1526 | 097E A FA8F09 | | JP | M,LOWLED | | |
| 1527 | 0981 A 3A8B69 | | LD | A,(HIGHER) | | |
| 1528 | 0984 A CD090A | | CALL | LEDGRN | | |
| 1529 | 0987 A 328B69 | | LD | (HIGHER),A | | |
| 1530 | 098A A 320030 | | LD | (LED2),A | | |
| 1531 | 098D A 180C | | JR | SIZRDY-$ | | |
| 1532 | 098F A 3A8A69 | LOWLED | LD | A,(LOWER) | | |
| 1533 | 0992 A CD090A | | CALL | LEDGRN | | |
| 1534 | 0995 A 328A69 | | LD | (LOWER),A | | |
| 1535 | 0998 A 320039 | | LD | (LED1),A | | |
| 1536 | 099B A 3A9C69 | SIZRDY | LD | A,(TEMP) | | |
| 1537 | 099E A CB57 | | BIT | 2,A | | ;TEST FOR LAST RACK |
| 1538 | 09A0 A 202B | | JR | NZ,NEWRK-$ | | |
| 1539 | 09A2 A 47 | | LD | B,A | | |

```
ERR LINE  ADDR & DATA     REL
     1540 09A3 A 3AA169                LD      A,(ADDR)      ;00*X XX++
     1541 09A6 A CB6F                  BIT     5,A           ;TEST FOR EXT I/O BIT SET - *
     1542 09A8 A 2008                  JR      NZ,EXTRES-$
     1543 09AA A CB78                  BIT     7,B           ;TEST FOR EXT I/O REQUESTED
     1544 09AC A 2804                  JR      Z,EXTRES-$
     1545 09AE A CBEF   DOEXT          SET     5,A           ;SET EXT I/O BIT
     1546 09B0 A 1811                  JR      LOADAD-$
     1547 09B2 A CBAF   EXTRES         RES     5,A           ;RESET EXT I/O BIT
     1548 09B4 A 47                    LD      B,A
     1549 09B5 A 3AA469                LD      A,(ADEND)     ;INPUT LAST 1/4 RACK USED
     1550 09B8 A 3C     INCRCK         INC     A             ;ADVANCE TO NEXT 1/4 SLOT
     1551 09B9 A 5F                    LD      E,A
     1552 09BA A D604                  SUB     04H
     1553 09BC A F2CD09                JP      P,NEWRK
     1554 09BF A 78                    LD      A,B           ;00*X XX++
     1555 09C0 A E6FC   RCKNXT         AND     0FCH          ;00*X XX00
     1556 09C2 A B3                    OR      E             ;OR IN NEXT POSSIBLE QUARTER RACK
                                                              ADDRES
     1557 09C3 A 32A169  LOADAD        LD      (ADDR),A      ;00*X XX++
     1558 09C6 A 1669                  LD      D,69H         ;*=EXT IO, X=RACK ADDR, +=QUARTER
                                                              SLOT
     1559 09C8 A 5F                    LD      E,A           ;CALCULATE IY TABLE POINTER -TO GET
     1560 09C9 A D5                    PUSH    DE            ;THIS RACKS CORRESPONDING I/O SIZE
     1561 09CA A FDE1                  POP     IY            ;- POSITION BYTE
     1562 09CC A C9                    RET
     1563 09CD A DD23   NEWRK          INC     IX            ;CALCULATE NEXT RACK NUMBER
     1564 09CF A DD23                  INC     IX
     1565 09D1 A DD23                  INC     IX
     1566 09D3 A DD7E00                LD      A,(IX+00H)
     1567 09D6 A FEFF                  CP      0FFH
     1568 09D8 A 200D                  JR      NZ,MORE-$
     1569 09DA A 219469                LD      HL,CHCHK
     1570 09DD A CBF6                  SET     6,(HL)        ;SCAN COMPLETE ON THIS CHANNEL
     1571 09DF A DDE5                  PUSH    IX
     1572 09E1 A C1                    POP     BC
     1573 09E2 A 0EC0                  LD      C,0C0H        ;RE-INITIALIZE RACK TABLE
     1574 09E4 A C5                    PUSH    BC
     1575 09E5 A DDE1                  POP     IX
     1576 09E7 A C33F02  MORE          JP      XRDY
     1577                              ;
     1578                              ;
     1579                              ;
     1580                              ;
     1581                              ;
     1582 09EA A 3AA169  GUESS         LD      A,(ADDR)      ;00*X XX++
     1583 09ED A CB6F                  BIT     5,A           ;TEST FOR EXT I/O BIT SET - *
     1584 09EF A 2807                  JR      Z,EXTCHK-$
     1585 09F1 A CBAF   NOEXT          RES     5,A           ;RESET EXT I/O BIT
     1586 09F3 A 47                    LD      B,A
     1587 09F4 A E603                  AND     03H           ;MASK OUT 1/4 RACK SLOT ADDRESS
     1588 09F6 A 18C0                  JR      INCRCK-$
     1589 09F8 A 4F     EXTCHK         LD      C,A
     1590 09F9 A 3A0040                LD      A,(MODSEL)
     1591 09FC A CB6F                  BIT     5,A
     1592 09FE A 79                    LD      A,C           ;TEST FOR EXT I/O OPTION SELECTED
     1593 09FF A 28AD                  JR      Z,DOEXT-$
     1594 0A01 A 18EE                  JR      NOEXT-$
     1595                              ;
     1596                              ;
     1597                              ;
     1598                              ;
     1599                              ;
     1600 0A03 A 21FA20  RK0           LD      HL,FSTRK0
     1601 0A06 A C36909                JP      FRESET
```

```
ERR LINE  ADDR S DATA    REL
    1602                      ;
    1603                      ;
    1604                      ;
    1605                      ;
    1606                      ;
    1607  0A09 A 47      LEDGRN  LD      B,A             ;PAST CODED LED BYTE
    1608  0A0A A 4B              LD      C,E
    1609  0A0B A 7B              LD      A,E             ;LED MASK
    1610  0A0C A 2F              CPL
    1611  0A0D A A0              AND     B               ;RESET FAULTED RACKS RED LED BIT
    1612  0A0E A CB03            RLC     E
    1613  0A10 A B3              OR      E               ;SET VALID RACK COMMUNICATION
                                                         ; GREEN LED
    1614  0A11 A C9              RET
    1615                      ;
    1616                      ;
    1617                      ;
    1618                      ;
    1619                      ;CTC CHANNEL 2 INTERRUPT - CHANNEL A WATCHDOG TIMER
    1620
    1621                      ;
    1622                      ;
    1623                      ;
    1624                      ;
    1625                      ;
    1626  0A12 A 08      WDCHA   EX      AF,AF'
    1627  0A13 A D9              EXX
    1628  0A14 A 21A969          LD      HL,CTCWHY
    1629  0A17 A CB46            BIT     0,(HL)          ;TEST FOR XFORMER DISABLE TIME
    1630  0A19 A 219469          LD      HL,CHCHK
    1631  0A1C A 2819            JR      Z,AOFF-$
    1632  0A1E A CB56            BIT     2,(HL)          ;TEST FOR RECEIVE COMPLETE
    1633  0A20 A 2071            JR      NZ,EXINT-$
    1634  0A22 A 3A9B69          LD      A,(ACNT)        ;INPUT LAST VALUE OF RECEIVE
                                                         ; COUNTER
    1635  0A25 A B9              CP      C               ;COMPARE WITH PRESENT RECEIVE
                                                         ; COUNT VALUE
    1636  0A26 A 2816            JR      Z,ADIED-$
    1637  0A28 A 79              LD      A,C             ;SET PRESENT COUNT VALUE
    1638  0A29 A 329B69          LD      (ACNT),A
    1639  0A2C A 3EB7            LD      A,0B7H
    1640  0A2E A D382            OUT     (CTC2),A        ;RESET CTC2, X256 PRESCALER MODE
    1641  0A30 A 3E22            LD      A,22H
    1642  0A32 A D382            OUT     (CTC2),A        ;RESTART CH A WATCHDOG - 2.35
                                                         ; MILLISEC
    1643  0A34 A 185D            JR      EXINT-$
    1644  0A36 A CBE6    AOFF    SET     4,(HL)          ;SET CH A XFORM TURNOFF BIT
    1645  0A38 A 3EB7    CHARES  LD      A,0B7H
    1646  0A3A A D382            OUT     (CTC2),A        ;RESET CTC2, X256 PRESCALER MODE
    1647  0A3C A 1855            JR      EXINT-$
    1648  0A3E A 3E00    ADIED   LD      A,00H
    1649  0A40 A 32CA6B          LD      (ARECV),A       ;CH A DEAD - STORE BAD RECEIVE
                                                         ; STATUS
    1650  0A43 A CBD6            SET     2,(HL)          ;SET CH A RECEIVE COMPLETE FLAG
    1651  0A45 A 18F1            JR      CHARES-$
    1652                      ;CTC CHANNEL 3 INTERRUPT - CHANNEL B WATCHDOG TIMER
    1653                      ;
    1654                      ;
    1655                      ;
    1656                      ;
    1657                      ;
    1658  0A47 A 08      WDCHB   EX      AF,AF'
    1659  0A48 A D9              EXX
    1660  0A49 A 21A969          LD      HL,CTCWHY
```

```
ERR LINE  ADDR 8 DATA    REL
1661  0A4C A CB66              BIT    4,(HL)      ;TEST FOR XFORMER DISABLE TIME
1662  0A4E A 219469            LD     HL,CHCHK
1663  0A51 A 2818              JR     Z,BOFF-$
1664  0A53 A CB5E              BIT    3,(HL)      ;TEST FOR RECEIVE COMPLETE
1665  0A55 A 203C              JR     NZ,EXINT-$
1666  0A57 A 3AC56B            LD     A,(BCNT)    ;INPUT LAST VALUE OF RECEIVE
                                                   COUNTER
1667  0A5A A BB                CP     E           ;COMPARE WITH PRESENT RECEIVE
                                                   COUNT VALUE
1668  0A5B A 2816              JR     Z,BDIED-$
1669  0A5D A 7B                LD     A,E         ;GET PRESENT COUNT VALUE
1670  0A5E A 32C56B            LD     (BCNT),A
1671  0A61 A 3E87              LD     A,087H
1672  0A63 A D383              OUT    (CTC3),A    ;RESET CTC3, X256 PRESCALER MODE
1673  0A65 A 3E22              LD     A,22H
1674  0A67 A D383              OUT    (CTC3),A    ;RESTART CH B WATCHDOG - 2.35
                                                   MILLISEC
1675  0A69 A 1828              JR     EXINT-$
1676  0A6B A CBEE        BOFF  SET    5,(HL)      ;SET CH B XFORM TURNOFF BIT
1677  0A6D A 3E87        CHBRES LD    A,087H
1678  0A6F A D383              OUT    (CTC3),A    ;RESET CTC3, X256 PRESCALER MODE
1679  0A71 A 1820              JR     EXINT-$
1680  0A73 A 3E00        BDIED LD     A,00H
1681  0A75 A 32C36B            LD     (BRECV),A   ;CH B DEAD - STORE BAD RECEIVER
                                                   STATUS
1682  0A78 A CBDE              SET    3,(HL)      ;SET CH B RECEIVE COMPLETE FLAG
1683  0A7A A 18F1              JR     CHBRES-$
1684                    ;CHANNEL A - TRANSMIT BUFFER EMPTY INTERRUPT ROUTINE
1685                    ;
1686                    ;
1687                    ;
1688                    ;
1689                    ;
1690  0A7C A 08         XA     EX     AF,AF'      ;SAVE ALL REGISTERS
1691  0A7D A D9                EXX
1692  0A7E A 3A8469            LD     A,(AXCNT)   ;INPUT XBUFF BYTE COUNT
1693  0A81 A 3D                DEC    A
1694  0A82 A 2014              JR     NZ,LDXA-$   ;DATA REMAINING - GO TO XMIT DATA
1695  0A84 A 218869            LD     HL,ARSTAT
1696  0A87 A CB76              BIT    6,(HL)      ;RTP FLAG SET?
1697  0A89 A 2816              JR     Z,RTPA-$
1698  0A8B A 3E28              LD     A,28H
1699  0A8D A D342              OUT    (SIOAC),A   ;RESET XMITTER INT PENDING
1700  0A8F A 3E02              LD     A,02H
1701  0A91 A D382              OUT    (CTC2),A    ;INITIATE CTC XFORM TURNOFF TIMER
                                                   - 139
1702  0A93 A 08         EXINT  EX     AF,AF'
1703  0A94 A D9                EXX                ;RESTORE ALL REGISTERS
1704  0A95 A FB                EI
1705  0A96 A ED4D              RETI
1706  0A98 A 328469     LDXA   LD     (AXCNT),A   ;STORE XBUFF BYTE COUNT
1707  0A9B A 0A                LD     A,(BC)      ;INPUT BYTE FROM XMIT A BUFFER
1708  0A9C A D340              OUT    (SIOAD),A   ;XMIT DATA
1709  0A9E A 0C                INC    C
1710  0A9F A 18F2              JR     EXINT-$
1711  0AA1 A CBF6       RTPA   SET    6,(HL)      ;SET RTP FLAG
1712  0AA3 A 3E28              LD     A,28H
1713  0AA5 A D342              OUT    (SIOAC),A   ;RESET XMITTER INT PENDING
1714  0AA7 A 18EA              JR     EXINT-$
1715                    ;CHANNEL B - TRANSMIT BUFFER EMPTY INTERRUPT ROUTINE
1716                    ;
1717                    ;
1718                    ;
1719                    ;
```

```
ERR LINE  ADDR S DATA     REL
     1720                     ;
     1721  0AA9 A 08      XB      EX      AF,AF'          ;SAVE ALL REGISTERS
     1722  0AAA A D9              EXX
     1723  0AAB A 3A8669          LD      A,(BXCNT)       ;INPUT XBUFF BYTE COUNT
     1724  0AAE A 3D              DEC     A
     1725  0AAF A 2011            JR      NZ,LDXB-$       ;DATA REMAINING - GO TO XMIT DATA
     1726  0AB1 A 218969          LD      HL,PRSTAT
     1727  0AB4 A CB76            BIT     6,(HL)          ;RTP FLAG SET?
     1728  0AB6 A 2813            JR      Z,RTPS-$
     1729  0AB8 A 3E28            LD      A,28H
     1730  0ABA A D343            OUT     (SIOBC),A       ;RESET XMITTER INT PENDING
     1731  0ABC A 3E02            LD      A,02H
     1732  0ABE A D333            OUT     (CTC3),A        ;INITIATE CTC XFORM TURNOFF TIMER
                                                          ; - 13F
     1733  0AC0 A 18D1            JR      EXINT-$
     1734  0AC2 A 328669  LDXB    LD      (BXCNT),A       ;STORE XBUFF BYTE COUNT
     1735  0AC5 A 1A              LD      A,(DE)          ;INPUT BYTE FROM XMIT B BUFFER
     1736  0AC6 A D341            OUT     (SIOBD),A       ;XMIT DATA
     1737  0AC8 A 1C              INC     E
     1738  0AC9 A 18C9            JR      EXINT-$
     1739  0ACB A CBF6    RTPS    SET     6,(HL)          ;SET RTP FLAG
     1740  0ACD A 3E28            LD      A,28H
     1741  0ACF A D343            OUT     (SIOBC),A       ;RESET XMITTER INT PENDING
     1742  0AD1 A 18C0            JR      EXINT-$
     1743                     ;CHANNEL A - RECEIVE CHARACTER AVAILABLE INTERRUPT ROUTINE
     1744                     ;
     1745                     ;
     1746                     ;
     1747  0AD3 A 08      RA      EX      AF,AF'          ;SAVE ALL REGISTERS
     1748  0AD4 A D9              EXX
     1749  0AD5 A 3A8C69          LD      A,(AMAX)
     1750  0AD8 A B9              CP      C               ;TEST FOR RECEIVER BUFFER OVERFLOW
     1751  0AD9 A CAE20A          JP      Z,AOVER
     1752  0ADC A DB40            IN      A,(SIOAD)
     1753  0ADE A 02              LD      (BC),A          ;STORE INPUT DATA
     1754  0ADF A 0C              INC     C
     1755  0AE0 A 18B1            JR      EXINT-$
     1756  0AE2 A DB40    AOVER   IN      A,(SIOAD)       ;READ, DISCARD BYTE - SATISFY INT
     1757  0AE4 A 18AD            JR      EXINT-$
     1758                     ;
     1759                     ;
     1760                     ;
     1761                     ;
     1762                     ;
     1763                     ;CHANNEL B - RECEIVE CHARACTER AVAILABLE INTERRUPT ROUTINE
     1764                     ;
     1765                     ;
     1766                     ;
     1767  0AE6 A 08      RB      EX      AF,AF'          ;SAVE ALL REGISTERS
     1768  0AE7 A D9              EXX
     1769  0AE9 A 3A8D69          LD      A,(BMAX)
     1770  0AEB A BB              CP      E               ;TEST FOR RECEIVER BUFFER OVERFLOW
     1771  0AEC A CAF50A          JP      Z,BOVER
     1772  0AEF A DB41            IN      A,(SIOBD)
     1773  0AF1 A 12              LD      (DE),A          ;STORE INPUT DATA
     1774  0AF2 A 1C              INC     E
     1775  0AF3 A 189E            JR      EXINT-$
     1776  0AF5 A DB41    BOVER   IN      A,(SIOBD)       ;READ, DISCARD BYTE - SATISFY INT
     1777  0AF7 A 189A            JR      EXINT-$
     1778                     ;CHANNEL A - SPECIAL RECEIVE CONDITION INTERRUPT ROUTINE
     1779                     ;
     1780                     ;
     1781  0AF9 A 08      SRA     EX      AF,AF'          ;SAVE ALL REGISTERS
     1782  0AFA A D9              EXX
```

```
ERR LINE  ADDR S DATA    REL
     1783 0AFB A DB40             IN     A,(SIOAD)   ;INPUT SECOND CRC BYTE - DISCARD IT
     1784 0AFD A 3E01              LD     A,01H
     1785 0AFF A D3E2              OUT    (SIOAC),A   ;RR1
     1786 0B01 A DB42              IN     A,(SIOAC)   ;INPUT RR1
     1787 0B03 A 32CA6B            LD     (ARECV),A   ;STORE CH A RECEIVER STATUS
     1788 0B06 A 3EB7              LD     A,0B7H
     1789 0B08 A D3E2              OUT    (CTC2),A    ;RESET CH A WATCHDOG - X256
                                                       PRESCALER
     1790 0B0A A 79
     1791 0B0B A 32C06B            LD     A,C
     1792 0B0E A 219469            LD     (AMAX),A    ;TRICK RECEIVER TO BE FULL
     1793 0B11 A CBDE              LD     HL,CHCHK
     1794 0B13 A C3930A            SET    3,(HL)      ;SET RECEIVE COMPLETE FLAG
     1795                           JP     EXINT
     1796                  ;
     1797                  ;
     1798                  ;CHANNEL B - SPECIAL RECEIVE CONDITION INTERRUPT ROUTINE
     1799                  ;
     1800 0B16 A 08        ;
     1801 0B17 A D9        SRB    EX     AF,AF'      ;SAVE ALL REGISTERS
     1802 0B18 A DB41              EXX
     1803 0B1A A 3E01              IN     A,(SIOBD)   ;INPUT SECOND CRC BYTE - DISCARD IT
     1804 0B1C A D343              LD     A,01H
     1805 0B1E A DB43              OUT    (SIOBC),A   ;RR1
     1806 0B20 A 32CB6B            IN     A,(SIOBC)   ;INPUT RR1
     1807 0B23 A 3EB7              LD     (BRECV),A   ;STORE CH B RECEIVER STATUS
     1808 0B25 A D3B3              LD     A,0B7H
     1809 0B27 A 7B                OUT    (CTC3),A    ;RESET CTC CH B WATCHDOG - X256
                                                       PRESCALE
     1810 0B28 A 328D69            LD     A,E
     1811 0B2B A 219469            LD     (BMAX),A    ;TRICK RECEIVER TO BE FULL
     1812 0B2E A CBDE              LD     HL,CHCHK
     1813 0B30 A C3930A            SET    3,(HL)      ;SET RECEIVE COMPLETE FLAG
     1814                           JP     EXINT
     1815                  ;
     1816                  ;
     1817                  ;
     1818                  ;
     1819 0B33 A 18        SIOD   DEFB   18H
     1820 0B34 A 04               DEFB   04H
     1821 0B35 A 20               DEFB   20H
     1822 0B36 A 01               DEFB   01H
     1823 0B37 A 1E               DEFB   1EH
     1824 0B38 A 07               DEFB   07H
     1825 0B39 A 7E               DEFB   7EH
     1826 0B3A A 02               DEFB   7EH
     1827 0B3B A 80               DEFB   02H
     1828 0B3C                     DEFB   080H
                                   END

ASSEMBLER ERRORS =   0
```

Appendix E

```
ERR LINE  ADDR S DATA    REL
     1
     2                    ;SIO EQUATES
     3   00E1             SIOAC   EQU    0E1H    ;COMMAND REGISTER A
     4   00E0             SIOAD   EQU    0E0H    ;DATA REGISTER A
     5   00E3             SIOBC   EQU    0E3H    ;COMMAND REGISTER B
     6   00E2             SIOBD   EQU    0E2H    ;DATA REGISTER B
     7   0090             SIOV    EQU    90H     ;INT. VECTOR FOR SIO
     8                    ;CTC EQUATES
     9   00D0             CTC0    EQU    0D0H    ;BAUD RATE CHANNEL
```

```
ERR LINE  ADDR S DATA    REL
    10    00D1              CTC1    EQU     0D1H    ;8*BAUD RATE
    11    00D2              CTC2    EQU     0D2H    ;PROCESSOR WATCHDOG
    12    00D3              CTC3    EQU     0D3H    ;COMMUNICATIONS WATCHDOG
    13    0055              CCW0    EQU     55H     ;COMMAND WORD FOR CHANNELS 0 AND 1
    14    00B5              CCW2    EQU     0B5H    ;COMMAND WORD FOR CHANNELS 2 AND 3
    15    0095              CCW2S   EQU     95H
    16    0090              CTCV    EQU     90H     ;INTERRUPT VECTOR FOR CTC
    17    0028              LOB     EQU     28H     ;LO BAUD RATE SELECT
    18    0008              HIBZ    EQU     08H     ;HI BAUD RATE PRESET CHANNEL 0
    19    0002              HIB0    EQU     02H     ;HI BAUD RATE PRESET CHANNEL 1
    20    0010              LOBZ    EQU     10H     ;LO BAUD RATE PRESET CHANNEL 0
    21    0004              LOB0    EQU     04H     ;LO    BAUD RATE PRESET CHANNEL 1
    22    00FF              PRPR    EQU     0FFH    ;PROC. WATCHDOG PRESET CHANNEL 2
    23    00FF              COPS    EQU     0FFH    ;COMM. WATCHDOG PRESET CHANNEL 3 (SHORT
    24    0097              CTCR    EQU     97H     ;RESET CHANNEL
    25    00FF              COPL    EQU     0FFH    ;COMM. WATCHDOG PRESET CHANNEL 3 (LONG)
    26                      ;RAM EQUATES
    27    13D0              INPT    EQU     13D0H
    28    13C0              OUTT    EQU     13C0H   ;BASE ADDRESS OUTPUT TABLE
    29                      ;RAM EQUATES(BT QUEUE)
    30    13A0              BTQ     EQU     13A0H   ;BASE ADDRESS BTQUEUQ
    31    139E              TBTQ    EQU     139EH   ;TAIL ADDRESS BTQUEUE
    32    139C              HBTQ    EQU     139CH   ;HEAD ADDRESS BTQUEUE
    33    139B              NBTQ    EQU     139BH   ;NO.  CHAR.BTQUEUE
    34    139A              MBTQ    EQU     139AH   ;LO. ORDER BTMAX
    35                      ;RAM EQUATES (EBTQUEUE)
    36    135A              EBTQ    EQU     135AH   ;BASE    ADDR.EBTQUE
    37    1358              TEBT    EQU     1358H   ;TAIL ADDR.EBTQUEUQ
    38    1356              HEBT    EQU     1356H   ;HEAD    ADDR.EBTQUEUE
    39
    40    1355              NEBT    EQU     1355H   ;NO. CHAR. EBTQUEUE
    41    1354              MEBT    EQU     1354H   ;LO ORDER EBTMAX
    42
    43                      ;RAM EQUATES(XMIT/RCVR BUFFER)
    44    12E8              XBUF    EQU     12E8H   ;XMIT BUFFER BASS ADDR.
    45    1252              RBUF    EQU     1252H   ;RCVR BUFFER BASE ADDR.
    46    1251              FLAG    EQU     1251H   ;FLAG LOCATION
    47    1250              DSWC    EQU     1250H   ;DIP SWITCH SETTINGS
    48    124E              MASK    EQU     124EH   ;MASK ADDRESS
    49    124D              MSKP    EQU     124DH   ;MASK POSSIBLE
    50    124C              MSKC    EQU     124CH   ;MASK CHANGE
    51    124B              MSKK    EQU     124BH   ;MASK COUNT
    52    1242              OUTBL   EQU     1242H   ;OUTPUT TABLE START ADDRESS
    53    1240              INTBL   EQU     1240H   ;INPUT TABLE START ADDRESS
    54    123F              RACK    EQU     123FH   ;NO. OF SLOTS IN RACK
    55    1800              BACK    EQU     1800H   ;BACKPLANE ADDRESS LOCATION
    56    1239              ADDR    EQU     1239H   ;RACK ADDRESS
    57    0011              BTIH    EQU     11H     ;MSBYTE OF BT INHIBIT TABLE
    58    0008              MID     EQU     08H     ;MIDDLE SLOT OF BACKPLANE
    59    1100              BTIN    EQU     1100H   ;BTIN TABLE ADDRESS
    60    10F0              OLD     EQU     10F0H   ;BEGIN ADDR OF OLD INPUT DATA TABLE
    61    122F              IMSK    EQU     122FH   ;ADDR. OF INITIAL MASK
    62                      ;MEMORY MAP EQUATES
    63    2800              DSW     EQU     2800H
    64    1800              IO      EQU     1800H
    65    3000              BDSW    EQU     3000H
    66                      ;MISC. EQUATES
    67    0000              STKB    EQU     00H     ;MAX. ADDRESS OF RAM+1
    68    1800              BAKP    EQU     1800H   ;BACKPLANE ADDRESS
    69    1236              BTWS    EQU     1236H   ;ADDR. OF BT STATUS WORD FOR SERVICE
    70    0011              VECT    EQU     11H     ;HI ORDER VECTOR
    71    1400              STCK    EQU     1400H   ;STACK ADDRESS BASE
    72    0000              CLR     EQU     00H     ;GENERAL CLEAR
    73    00C0              BTMAX   EQU     0C0H    ;MAX. LO BYTE OF BTQUEUE
    74    009A              EMAX    EQU     9AH     ;MAX. LO BYTE OF EBQUEUE
```

```
ERR LINE  ADDR & DATA   REL
     75   1238                   BCNT    EQU    1238H    ;ADDR. OF BYTE COUNT
     76   1235                   BTSW    EQU    1235H    ;ADDR OF STATUS WORD
     77   1237                   EBTB    EQU    1237H    ;NO. OF BT BYTES TO BE XFERRED
     78   1110                   BTDT    EQU    1110H    ;BT DATA STORE
     79   1236                   BTAS    EQU    1236H    ;ADDR. OB BT ADDR FOR SERVICE
     80   1234                   CCNT    EQU    1234H    ;COMMUNICATIONS COUNTER
     81   0000                   CCTR    EQU    0000H    ;COMMUNICATIONA WATCHDOG COUNTER
     82   1233                   CMDR    EQU    1233H    ;COMMAND REPLY
     83   1231                   BTRS    EQU    1231H    ;PNT. TO BACKPLANE ADDR. OF BT MODULE
     84   1000                   TRAM    EQU    1000H    ;BOTTOM OF RAM
     85   124F                   FLG3    EQU    124FH    ;3RD FLAG ADDR.
     86   1252                   COMD    EQU    1252H
     87   10EF                   CH3     EQU    10EFH             ;LOCATION TO STORE CTC PRESET
     88   10ED                   CH3S    EQU    10EDH             ;
     89   10EB                   FLAGD   EQU    10EBH
     90   10EA                   CHT     EQU    10EAH
     91   10E5                   WATCH   EQU    10E5H
     92   10E4                   WATCT   EQU    10E4H
     93   10DF                   LONGT   EQU    10DFH
     94   10E2                   INTER   EQU    10E2H
     95   13FE                   RTR     EQU    13FEH
     96   10DD                   HLSTO   EQU    10DDH
     97   10DC                   CRCS    EQU    10DCH
     98   10DB                   REND    EQU    10DBH
     99   1244                   BTDUM   EQU    1244H
    100   10D8                   DELD    EQU    10D8H
    101   1245                   XFERC   EQU    1245H
    102   1246                   XFERB   EQU    1246H
    103   1247                   CHEKS   EQU    1247H
    104   10DC                   XMITF   EQU    10DCH
    105   10D7                   FLAGC   EQU    10D7H
    106   119A                   EXTSA   EQU    119AH
    107                          ;
    108                          ;INT.VECTOR EQUATES
    109                          ;
    110   1192                   SIOEB   EQU    1192H    ;INT. VECTOR LOCATION FOR EXT/STATUS CH;
    111   1194                   CTC2V   EQU    1194H    ;INT. VECTOR LOCATION FOR PROC WATCHDOG
    112   1196                   CTC3V   EQU    1196H    ;INT. VECTOR LOCATION FOR COMM WATCHDOG
    113   1198                   SIOTA   EQU    1198H    ;INT. VECTOR LOCATION FOR XMIT BUFFER E;
    114   119C                   SIORA   EQU    119CH    ;INT. VECTOR LOCATION FOR CHAR AVAIL IN
    115   119E                   SIOSA   EQU    119EH    ;INT. VECTOR LOCATION FOR SPC. RCVR CON;
    116                          ;
    117                          ;COMMAND EQUATES
    118                          ;
    119   0000                   CMND0   EQU    00H      ;COMMAND 00H EQUATE
    120   0001                   CMND1   EQU    01H      ;COMMAND 01H EQUATE
    121   0002                   CMND2   EQU    02H      ;COMMANC 02H EQUATE
    122   0003                   CMND3   EQU    03H      ;COMMAND 03H EQUATE
    123   0004                   CMND4   EQU    04H      ;COMMAND 04H EQUATE
    124   0005                   CMND5   EQU    05H      ;COMMAND 05H EQUATE
    125   0006                   NAK     EQU    06H      ;COMMAND NAK EQUATE
    126   0006                   CMND6   EQU    06H      ;COMMAND 06H EQUATE
    127                          ;
    128                          ;FLIP FLOP EQUATES
    129                          ;
    130   3800                   NMRES   EQU    3800H    ;ADDR OF NMRESET F/F
    131
    132   2000                   COMM    EQU    2000H    ;COMM/PROC F/F ADDR
    133   0001                   DBZS    EQU    01H      ;DATA BUS ZERO SET
    134   0002                   DBTS    EQU    02H      ;DATA BUS TWO SET
    135   0004                   DBHS    EQU    04H      ;DATA BUS THREE
    136   0000                   FRES    EQU    00H      ;F/F RESET
    137
    138
    139
```

| ERR | LINE | ADDR S DATA | REL | | | | |
|---|---|---|---|---|---|---|---|
| | 140 | | | ; | | | |
| | 141 | | | ;PROM CHECK | | | |
| | 142 | | | ; | | | |
| | 143 | | | ; | | | |
| | 144 | | | ;RAM CHECK | | | |
| | 145 | | | ; | | | |
| | 146 | 0000 A 210010 | | | LD | HL,TRAM | ;POINT TO THE LOWEST RAM ADDRES |
| | 147 | 0003 A 7D | | TLI: | LD | A,L | ;DATA REGISTER |
| | 148 | 0004 A 77 | | | LD | (HL),A | ;OUTPUT DATA REGISTER TO RAM |
| | 149 | 0005 A 7E | | | LD | A,(HL) | ;READ BACK DATA |
| | 150 | 0006 A BD | | | CP | L | ;TEST IF VALID DATA |
| | 151 | 0007 A 2008 | | | JR | NZ,ERR-$ | ;IF FALSE GOTO ERR |
| | 152 | 0009 A 23 | | | INC | HL | ;ELSE INCREMENT RAM POINTER |
| | 153 | 000A A 3E14 | | | LD | A,14H | ;TEST FOR END OF RAM |
| | 154 | 000C A BC | | | CP | H | |
| | 155 | 000D A 20F4 | | | JR | NZ,TLI-$ | ;IF FALSE GOTO TLI |
| | 156 | 000F A 1807 | | | JR | TOP-$ | ;ELSE GOTO TOP |
| | 157 | 0011 A 210020 | | ERR: | LD | HL,COMM | ;TURN COMM. LED OFF AND PROC. L |
| | 158 | 0014 A 3601 | | | LD | (HL),01H | |
| | 159 | 0016 A 18F9 | | | JR | ERR-$ | |
| | 160 | | | ; | | | |
| | 161 | | | ;MISCELLANEOUS INITIALIZATION | | | |
| | 162 | | | ; | | | |
| | 163 | 0018 A 310014 | | TOP: | LD | SP,1400H | ;STACK POINTER GOES TO TOP OF R/ |
| | 164 | 001B A FD215112 | | | LD | IY,FLAG | ;IY PNTS TO FLAG STORE IN RAM |
| | 165 | 001F A ED5E | | | IM | 2 | ;DEFINE INTERRUPT MODE 2 |
| | 166 | | | ; | | | |
| | 167 | | | ;INSPECT BACKPLANE | | | |
| | 168 | | | ; | | | |
| | 169 | 0021 A 210020 | | | LD | HL,COMM | ;COMM LED ON, PROC. LED OFF |
| | 170 | 0024 A 3602 | | | LD | (HL),02H | |
| | 171 | 0026 A 210018 | | | LD | HL,BACK | ;PNT. TO BACKPLANE |
| | 172 | 0029 A 06FF | | | LD | B,0FFH | ;DATA OUTPUT REGISTER |
| | 173 | 002B A 70 | | TEST: | LD | (HL),B | ;OUTPUT TO BACKPLANE |
| | 174 | 002C A 3A0030 | | | LD | A,(BDSW) | ;TEST FOR ERROR |
| | 175 | 002F A CB7F | | | BIT | 7,A | |
| | 176 | 0031 A 2018 | | | JR | NZ,BERR-$ | ;IF TRUE GOTO BERR |
| | 177 | 0033 A 23 | | | INC | HL | ;INCREMENT BACKPLANE PNTER |
| | 178 | 0034 A 7D | | | LD | A,L | ;TEST IF ALL STOTS TESTED |
| | 179 | 0035 A FE10 | | | CP | 10H | |
| | 180 | 0037 A 20F2 | | | JR | NZ,TEST-$ | ;IF FALSE GOTO TEST |
| | 181 | 0039 A 05 | | | DEC | B | ;ELSE DECREMENT DATA REGISTER |
| | 182 | 003A A 78 | | | LD | A,B | ;TEST IF ALL DATA TRYED |
| | 183 | 003B A FEBF | | | CP | 0BFH | |
| | 184 | 003D A 2805 | | | JR | Z,BGOOD-$ | ;IF FALSE GOTO TEST |
| | 185 | 003F A 210018 | | | LD | HL,BACK | ;PNT TO BEGINNING OF BACK |
| | 186 | 0042 A 18E7 | | | JR | TEST-$ | |
| | 187 | 0044 A 210020 | | BGOOD: | LD | HL,COMM | ;TURN PROC AND COMM LED OFF |
| | 188 | 0047 A 3603 | | | LD | (HL),03H | |
| | 189 | 0049 A 1807 | | | JR | CRAM-$ | |
| | 190 | 004B A 210020 | | BERR: | LD | HL,COMM | ;TURN PROC AND COMM LED OFF |
| | 191 | 004E A 3603 | | | LD | (HL),03H | |
| | 192 | 0050 A 18F9 | | | JR | BERR-$ | |
| | 193 | | | ; | | | |
| | 194 | | | ;CLEAR RAM CONTENTS | | | |
| | 195 | | | ; | | | |
| | 196 | 0052 A 210010 | | CRAM: | LD | HL,TRAM | ;POINT TO THE LOWEST RAM ADDRES |
| | 197 | 0055 A 3600 | | CRAN: | LD | (HL),00H | ;CLEAR RAM LOCATION |
| | 198 | 0057 A 23 | | | INC | HL | ;INCREMENT RAM POINTER |
| | 199 | 0058 A 7C | | | LD | A,H | ;TEST IF DONE |
| | 200 | 0059 A FE14 | | | CP | 14H | |
| | 201 | 005B A 20F8 | | | JR | NZ,CRAN-$ | ;IF FALSE GOTO CRAN |
| | 202 | | | ; | | | |
| | 203 | | | ;BTQUEUE PARAMETERS | | | |
| | 204 | | | ; | | | |

| ERR LINE | ADDR S DATA | REL | | | |
|---|---|---|---|---|---|
| 205 | 005D A 21A013 | | LD | HL,BTQ | ;PNT.TO LOC.OF TAIL |
| 206 | 0060 A 229E13 | | LD | (TBTQ),HL | ;LOAD TAIL |
| 207 | 0063 A 229C13 | | LD | (HBTQ),HL | ;LOAD HEAD |
| 208 | 0066 A 3EC0 | | LD | A,BTMAX | ;MAX. ADDR. OF QUEUE |
| 209 | 0068 A 329A13 | | LD | (MBTQ),A | ;LOAD MAX.ADDR. |
| 210 | | | ; | | |
| 211 | | | ;STORE BACKPLANE DIP SWITCHES | | |
| 212 | | | ; | | |
| 213 | 006B A 215012 | | LD | HL,DSWC | ;STORAGE FOR SWITCHES |
| 214 | 006E A 3A0030 | | LD | A,(BDSW) | ;INPUT BACKPLANE DIP SWITCH SET |
| 215 | 0071 A E627 | | AND | 27H | ;MASK OUT EXTRA BITS |
| 216 | 0073 A 77 | | LD | (HL),A | ;STORE SWITCH SETTINGS |
| 217 | | | ; | | |
| 218 | | | ;ADAPTER ADDRESS SETTUP | | |
| 219 | | | ; | | |
| 220 | 0074 A 3A0028 | | LD | A,(DSW) | ;INPUT ADDRESS |
| 221 | 0077 A 0608 | | LD | B,08H | ;REVERSE THE ORDER OF THE SWITCH |
| 222 | 0079 A 17 | | EXC: RLA | | |
| 223 | 007A A CB19 | | RR | C | |
| 224 | 007C A 05 | | DEC | B | |
| 225 | 007D A 20FA | | JR | NZ,EXC-$ | |
| 226 | 007F A 79 | | LD | A,C | |
| 227 | 0080 A 323912 | | LD | (ADDR),A | ;STORE ADDRESS |
| 228 | 0083 A E61C | | AND | 1CH | ;MASK OUT ALL BUT RACK NUMBER |
| 229 | 0085 A 0602 | | LD | B,02H | ;ROTATE THE RACK NUMBER TO THE |
| 230 | 0087 A 07 | | PSAD: RLCA | | |
| 231 | 0088 A 05 | | DEC | B | |
| 232 | 0089 A 20FC | | JR | NZ,PSAD-$ | |
| 233 | 008B A FD77DF | | LD | (IY-21H),A | ;STORE RACK NO. FOR BT. USE |
| 234 | | | ; | | |
| 235 | | | ;STORE ADAPTER STATUS SWITCHES | | |
| 236 | | | ; | | |
| 237 | 008E A 3E10 | | LD | A,10H | ;RESET EXT/STATUS BITS |
| 238 | 0090 A D3E1 | | OUT | (SIOAC),A | |
| 239 | 0092 A D3E3 | | OUT | (SIOBC),A | |
| 240 | 0094 A DBE1 | | IN | A,(SIOAC) | ;INPUT CHAN.A STATUS |
| 241 | 0096 A E628 | | AND | 28H | ;MASK OUT ALL BUT SWITCH STATES |
| 242 | 0098 A 324F12 | | LD | (FLG3),A | ;STORE SWITCH STATES |
| 243 | 009B A DBE3 | | IN | A,(SIOBC) | ;INPUT CHAN. B STATUS |
| 244 | 009D A E620 | | AND | 20H | ;MASK OUT ALL BUT SWITCH STATES |
| 245 | 009F A 325112 | | LD | (FLAG),A | ;STORE SWITCH STATES |
| 246 | | | ; | | |
| 247 | | | ; RACK SIZE INITIALIZATION | | |
| 248 | | | ; | | |
| 249 | 00A2 A 3A5012 | | LD | A,(DSWC) | ;LOAD DIP SWITCH SETTINGS |
| 250 | 00A5 A E603 | | AND | 03H | ;OBTAIN RACK SIZE |
| 251 | 00A7 A FE00 | | CP | 00H | ;TEST FOR 4 SLOTS |
| 252 | 00A9 A 2004 | | JR | NZ,ETST-$ | ;IF FALSE TEST FOR 8 SLOTS |
| 253 | 00AB A 1604 | | LD | D,04H | ;LOAD NO. OF SLOTS |
| 254 | 00AD A 1812 | | JR | POST-$ | ;GOTO POST |
| 255 | 00AF A FE01 | | ETST: CP | 01H | ;TEST FOR 8 SLOTS |
| 256 | 00B1 A 2004 | | JR | NZ,TTST-$ | ;IF FALSE TEST FOR 12 SLOTS |
| 257 | 00B3 A 1608 | | LD | D,08H | ;LOAD NO. OF SLOTS |
| 258 | 00B5 A 180A | | JR | POST-$ | ;GOTO POST |
| 259 | 00B7 A FE02 | | TTST: CP | 02H | ;TEST FOR 12 SLOTS |
| 260 | 00B9 A 2004 | | JR | NZ,STST-$ | ;IF FALSE DEFAULT TO 16 SLOTS |
| 261 | 00BB A 160C | | LD | D,0CH | ;LOAD NO. OF SLOTS |
| 262 | 00BD A 1802 | | JR | POST-$ | ;GOTO POST |
| 263 | 00BF A 1610 | | STST: LD | D,10H | |
| 264 | 00C1 A 213F12 | | POST: LD | HL,RACK | ;STORE THE RACK SIZE |
| 265 | 00C4 A 72 | | LD | (HL),D | |
| 266 | | | ; | | |
| 267 | | | ;INT. VECTOR LOAD | | |
| 268 | | | ; | | |
| 269 | 00C5 A 215C04 | | LD | HL,EXTA | ;LOAD WITH LOC. OF EXT/STATUS |

```
ERR LINE  ADDR S DATA      REL
    270   00C8 A 229A11            LD      (EXTSA),HL       ;STORE LOC AT EXTSA
    271   00CB A 215B04            LD      HL,PRWD          ;LOAD WITH LOC. OF PROC. WATCHDOG
    272   00CE A 229411            LD      (CTC2V),HL       ;STORE LOC AT CTC2V
    273   00D1 A 218903            LD      HL,CMWD          ;LOAD WITH LOC. OF COMM WATCHDOG
    274   00D4 A 229611            LD      (CTC3V),HL       ;STORE LOC AT CTC3V
    275   00D7 A 219104            LD      HL,RECI          ;LOAD WITH LOC.OF CHAR. AVAIL. F
    276   00DA A 229C11            LD      (SIORA),HL       ;STORE LOC AT SIORA
    277   00DD A 21D605            LD      HL,SPCA          ;LOAD WITH LOC. OF SPEC REC. COM
    278   00E0 A 229E11            LD      (SIOSA),HL       ;STORE LOC AT SIOSA
    279                      ;
    280                      ;I/O TABLE POINTER SETTUP
    281                      ;
    282   00E3 A 21C013            LD      HL,OUTT          ;LOAD HL WITH THE BEGIN ADDR OF
    283
    284   00E6 A 3A3912            LD      A,(ADDR)         ;LOAD AC WITH THE RACK ADDRESS
    285   00E9 A E603              AND     03H              ;MASK OUT ALL BUT 1/4 RACK ADDRE
    286   00EB A 0E02              LD      C,02H            ;POSITION 1/4 RACK ADDRESS PROPE
    287   00ED A 07       SET3:    RLCA
    288   00EE A 0D                DEC     C
    289   00EF A 20FC              JR      NZ,SET3-$
    290   00F1 A 47                LD      B,A              ;SAVE AC
    291   00F2 A 85                ADD     A,L              ;GET DISPLACEMENT TO BASE
    292   00F3 A 6F                LD      L,A              ;LOAD L WITH DISPLACEMENT
    293   00F4 A 224212            LD      (OUTBL),HL       ;STORE STARTING ADDR OF OUTPUT
    294   00F7 A 21D013            LD      HL,INPT          ;LOAD HL WITH STARTING ADDR OF
    295   00FA A 78                LD      A,B              ;LOAD AC WITH THE 1/4 RACK ADDRE
    296   00FB A 85                ADD     A,L              ;GET DISPLACEMENT TO BASE
    297   00FC A 6F                LD      L,A              ;LOAD L WITH DISPLACEMENT
    298   00FD A 224012            LD      (INTBL),HL       ;STORE STARTING ADDR OF INPUT I
    299                      ;
    300                      ;MASK INITIALIZATION
    301                      ;
    302   0100 A 214C12            LD      HL,MSKC          ;POINT TO MASK CHANGE LOCATION
    303   0103 A 3E01              LD      A,01H            ;LOAD THE MASK ROTATE BYTE
    304   0105 A 77                LD      (HL),A
    305   0106 A 0E08              LD      C,08H            ;ITERATION COUNTER
    306   0108 A 210018            LD      HL,BACK          ;PNT TO BACKPLANE
    307   010B A 46       MAKI:    LD      B,(HL)           ;INPUT DATA
    308   010C A 3A0030            LD      A,(BDSW)
    309   010F A CB67              BIT     4,A
    310   0111 A 2004              JR      NZ,BITT-$        ;IF FALSE GOTO BITT
    311   0113 A FDCBDEC6          SET     0,(IY-22H)       ;ELSE SET BIT IN MASK
    312   0117 A CB45     BITT:    BIT     0,L              ;TEST FOR EVEN SLOT
    313   0119 A 280A              JR      Z,INRG-$         ;IF TRUE GOTO INRG
    314   011B A FDCBDE0E          RRC     (IY-22H)         ;ELSE ROTATE MASK
    315   011F A 2C                INC     L                ;INCREMENT BACK PNTER
    316   0120 A 0D                DEC     C                ;DECREMENT ITERATION COUNTER
    317   0121 A 2805              JR      Z,MIIN-$         ;IF DONE GOTO MIIN
    318   0123 A 18E6              JR      MAKI-$
    319   0125 A 2C       INRG:    INC     L                ;INCREMENT BACK PNTER
    320   0126 A 18E3              JR      MAKI-$
    321   0128 A 3A3912   MIIN:    LD      A,(ADDR)         ;TEST FOR 1/4 RACK
    322   012B A E603              AND     03H
    323   012D A 2809              JR      Z,MIIT-$         ;IF 1ST 1/4 GOTO MIIT
    324   012F A CB07              RLC     A
    325   0131 A FDCBDE06 RAGN:    RLC     (IY-22H)         ;ELSE POSITION MASK PROPERLY
    326   0135 A 3D                DEC     A
    327   0136 A 20F9              JR      NZ,RAGN-$
    328                      ;
    329                      ;MISCELLANEOUS RAM INITIALIZATION
    330                      ;
    331   0138 A 3E18     MIIT:    LD      A,18H            ;HIGH ORDER BYTE OF BACK ADDR
    332   013A A 323212            LD      (BTRS+01H),A     ;STORE FOR BT MODULE REQ. SERVI
    333   013D A FDCB00DE          SET     3,(IY-00H)       ;INDICATE TIMEOUT
    334   0141 A 21FFFF            LD      HL,0FFFFH
    335   0144 A 22E210            LD      (INTER),HL
```

| ERR | LINE | ADDR | S | DATA | REL | | | | |
|---|---|---|---|---|---|---|---|---|---|
| | 336 | 0147 | A | 3E02 | | | LD | A,02H | |
| | 337 | 0149 | A | 324512 | | | LD | (XFERC),A | |
| | 338 | | | | | ; | | | |
| | 339 | | | | | ;COMMAND REPLY INITIALIZATION | | | | |
| | 340 | | | | | ; | | | |
| | 341 | 014C | A | 3A3912 | | | LD | A,(ADDR) | ;LOAD AC WITH RACK ADDR |
| | 342 | 014F | A | E603 | | | AND | 03H | ;OBTAIN 1/4 RACK ADDR |
| | 343 | 0151 | A | 47 | | | LD | B,A | ;STORE AC CONTENTS |
| | 344 | 0152 | A | 3A5012 | | | LD | A,(DSWC) | ;LOAD DIP SWITCH SETTINGS |
| | 345 | 0155 | A | E603 | | | AND | 03H | ;OBTAIN THE RACK SIZE |
| | 346 | 0157 | A | 80 | | | ADD | A,B | ;OBTAIN THE HIGHEST QUARTER RAC |
| | 347 | 0158 | A | FDCBFF56 | | | BIT | 2,(IY-01H) | ;INSPECT IF LAST STATE IS INDIC |
| | 348 | | | | | | | | |
| | 349 | 015C | A | 2802 | | | JR | Z,TEIO-$ | ;IF FALSE GOTO TEIO |
| | 350 | 015E | A | CBD7 | | | SET | 2,A | ;ELSE SET THE LAST STATE BIT IN |
| | 351 | 0160 | A | FDCBFE6E | | TEIO: | BIT | 5,(IY-02H) | ;INSPECT IF EXTENDED IO IS INDI |
| | 352 | 0164 | A | 2802 | | | JR | Z,KAMP-$ | ;IF FALSE GOTO KAMP |
| | 353 | 0166 | A | CBFF | | | SET | 7,A | ;ELSE SET THE EIO BIT |
| | 354 | 0168 | A | FD77E2 | | KAMP: | LD | (IY-1EH),A | ;LOAD THE COMMAND IN RAM |
| | 355 | | | | | ; | | | |
| | 356 | | | | | ;CTC CHANNELS 0,1,AND 2 INITIALIZATION AND SETTUP FOR CHANNEL 3 | | | | |
| | 357 | | | | | ; | | | |
| | 358 | 016B | A | 3E90 | | | LD | A,CTCV | ;INITIAL. INTERRUPT VECTOR |
| | 359 | 016D | A | D3D0 | | | OUT | (CTC0),A | |
| | 360 | 016F | A | 3E55 | | | LD | A,CCW0 | ;LOAD CHANNEL 0 AND 1 COMMAND W |
| | 361 | 0171 | A | D3D0 | | | OUT | (CTC0),A | |
| | 362 | 0173 | A | D3D1 | | | OUT | (CTC1),A | |
| | 363 | 0175 | A | 3EA7 | | | LD | A,0A7H | ;LOAD CHANNEL 2 WITH COMMAND WC |
| | 364 | 0177 | A | D3D2 | | | OUT | (CTC2),A | |
| | 365 | 0179 | A | FDCB006E | | | BIT | 5,(IY-00H) | ;TEST BAUD RATE SWITCH |
| | 366 | 017D | A | 202C | | | JR | NZ,MIDB-$ | |
| | 367 | 017F | A | 3E08 | | | LD | A,08H | ;LOAD 115.2KBAUD TIME CONSTANTS |
| | 368 | 0181 | A | D3D0 | | | OUT | (CTC0),A | |
| | 369 | 0183 | A | 3E02 | | | LD | A,02H | |
| | 370 | 0185 | A | D3D1 | | | OUT | (CTC1),A | |
| | 371 | 0187 | A | 3E1C | | | LD | A,1CH | ;SHORT WATCHDOG TIME CONSTANT |
| | 372 | 0189 | A | 32ED10 | | | LD | (CH3S),A | |
| | 373 | 018C | A | 3E1D | | | LD | A,1DH | ;TIMEOUT FOR FLAGS OFF LINK |
| | 374 | 018E | A | 32EB10 | | | LD | (FLAGD),A | |
| | 375 | 0191 | A | 3E22 | | | LD | A,22H | ;XMIT FLAG TIMEOUT |
| | 376 | 0193 | A | 32EA10 | | | LD | (CHT),A | |
| | 377 | 0196 | A | 3E06 | | | LD | A,06H | ;COMMUNICATIONS WATCHDOG COUNT |
| | 378 | 0198 | A | 32E510 | | | LD | (WATCH),A | |
| | 379 | 019B | A | 3E0A | | | LD | A,0AH | |
| | 380 | 019D | A | 32D710 | | | LD | (FLAGC),A | |
| | 381 | 01A0 | A | 3E01 | | | LD | A,01H | |
| | 382 | 01A2 | A | 32DB10 | | | LD | (REND),A | |
| | 383 | 01A5 | A | DD36F20E | | | LD | (IX-0EH),0EH | ;ENDING FLAG TIMEOUT |
| | 384 | 01A9 | A | 182A | | | JR | TTS-$ | ;GOTO TTS |
| | 385 | 01AB | A | 3E10 | | MIDB: | LD | A,10H | ;LOAD 57.5KBAUD TIME CONSTANTS |
| | 386 | 01AD | A | D3D0 | | | OUT | (CTC0),A | |
| | 387 | 01AF | A | 3E04 | | | LD | A,04H | |
| | 388 | 01B1 | A | D3D1 | | | OUT | (CTC1),A | |
| | 389 | 01B3 | A | 3E3B | | | LD | A,3BH | ;SHORT TIMER TIME CONSTANT |
| | 390 | 01B5 | A | 32ED10 | | | LD | (CH3S),A | |
| | 391 | 01B8 | A | 3E3D | | | LD | A,3DH | ;TIMEOUT FOR FLAGS OFF LINK |
| | 392 | 01BA | A | 32EB10 | | | LD | (FLAGD),A | |
| | 393 | 01BD | A | 3E4D | | | LD | A,4DH | ;XMIT FLAG TIMEOUT |
| | 394 | 01BF | A | 32EA10 | | | LD | (CHT),A | |
| | 395 | 01C2 | A | 3E06 | | | LD | A,06H | ;COMMUNICATION WATCHDOG COUNT |
| | 396 | 01C4 | A | 32E510 | | | LD | (WATCH),A | |
| | 397 | 01C7 | A | 3E2A | | | LD | A,2AH | |
| | 398 | 01C9 | A | 32D710 | | | LD | (FLAGC),A | |
| | 399 | 01CC | A | 3E2B | | | LD | A,2BH | |
| | 400 | 01CE | A | 32DB10 | | | LD | (REND),A | |

| ERR LINE | ADDR S DATA | REL | | | |
|---|---|---|---|---|---|
| 401 | 01D1 A DD36F207 | | LD | (IX-0EH),07H | ;ENDING FLAG TIMEOUT |
| 402 | 01D5 A 3EFF | TTS: | LD | A,0FFH | ;LOAD PROC. WATCHDOG TIME CONST |
| 403 | 01D7 A D3D2 | | OUT | (CTC2),A | |
| 404 | 01D9 A 3EFF | | LD | A,0FFH | ;LOAD CHANNEL 3 TIME CONSTANT |
| 405 | 01DB A 32EF10 | | LD | (CH3),A | |
| 406 | | ; | | | |
| 407 | | ;SIO INITIALIZATION CHANNEL A AND CHANNEL B | | | |
| 408 | | ; | | | |
| 409 | 01DE A 0EE1 | | LD | C,SIOAC | ;PNTER TO SIO CHANNEL A-COMMAND |
| 410 | 01E0 A 21BD0B | | LD | HL,SCDA | ;PNTER TO MEMORY LOCATION FOR I |
| 411 | 01E3 A 060B | | LD | B,0BH | ;CNTER FOR NUMBER OF DATA BYTES |
| 412 | 01E5 A EDB3 | | OTIR | | ;OUTPUT COMMANDS |
| 413 | 01E7 A 0EE3 | | LD | C,SIOBC | ;PNTER TO SIO CHANNEL B-COMMAND |
| 414 | 01E9 A 060B | | LD | B,0BH | ;CNTER FOR NUMBER OF DATA BYTES |
| 415 | 01EB A EDB3 | | OTIR | | ;OUTPUT COMMANDS |
| 416 | 01ED A 3E06 | | LD | A,06H | ;PNT. TO WR6A |
| 417 | 01EF A D3E1 | | OUT | (SIOAC),A | |
| 418 | 01F1 A 3A3912 | | LD | A,(ADDR) | ;WR6A COMMAND |
| 419 | 01F4 A D3E1 | | OUT | (SIOAC),A | |
| 420 | | ; | | | |
| 421 | | ;CPU REGISTER INITIALIZATION | | | |
| 422 | | ; | | | |
| 423 | 01F6 A ED4B4212 | | LD | BC,(OUTBL) | ;BC PNTS. TO INPUT TABLE |
| 424 | 01FA A 210018 | | LD | HL,IO | ;HL PNTS. TO BACKPLANE |
| 425 | 01FD A ED5B4012 | | LD | DE,(INTBL) | ;DE PNTS. TO OUTPUT TABLE |
| 426 | 0201 A DD21EF10 | | LD | IX,10EFH | ;IX PNTS TO RAM |
| 427 | 0205 A 3E11 | | LD | A,VECT | ;LOAD AC WITH HI ORDER VECTOR E |
| 428 | 0207 A ED47 | | LD | I,A | ;LOAD VECTOR REGISTER |
| 429 | 0209 A D9 | | EXX | | ;EXCHANGE REGISTER BANKS |
| 430 | 020A A 06FF | | LD | B,0FFH | ;BYTE CNTER |
| 431 | 020C A 0EE0 | | LD | C,SIOAD | ;PNT TO SIO |
| 432 | 020E A 215212 | | LD | HL,RBUF | ;PNT TO RECEIVER BUFFER |
| 433 | 0211 A D9 | | EXX | | |
| 434 | | ;************************************************ | | | |
| 435 | | ;*MAIN PROGAM-OUTPUTTING AND INPUTTING TO BACKPLANE | | | |
| 436 | | ;************************************************ | | | |
| 437 | | ; | | | |
| 438 | | ;TEST FOR LAST STATE OR TIMEOUT | | | |
| 439 | | ; | | | |
| 440 | 0212 A F3 | BEGN: | DI | | ;DISABLE INTERRUPTS |
| 441 | 0213 A FDCB0076 | | BIT | 6,(IY-00H) | ;TEST INT. EN-DIS BIT |
| 442 | 0217 A 2801 | | JR | Z,RCVT-$ | ;IF FALSE GOTO RCVT |
| 443 | 0219 A FB | | EI | | ;ELSE ENABLE INTERRUPTS |
| 444 | 021A A FDCB004E | RCVT: | BIT | 1,(IY-00H) | ;TEST FOR LAST STATE |
| 445 | 021E A 2021 | | JR | NZ,INB-$ | ;IF TRUE GOTO INB |
| 446 | 0220 A FDCB005E | | BIT | 3,(IY-00H) | ;TEST FOR TIMEOUT |
| 447 | 0224 A 201B | | JR | NZ,INB-$ | |
| 448 | | ; | | | |
| 449 | | ;OUTPUT TO BACKPLANE TEST FOR ERROR & BLCK XFER | | | |
| 450 | | ; | | | |
| 451 | 0226 A 0A | | LD | A,(BC) | ;LOAD AC WITH DATA IN OUT TBL |
| 452 | 0227 A 2F | | CPL | | ;COMPLEMENT AS BACK IS LO TRUE |
| 453 | 0228 A F3 | | DI | | ;DISABLE INT WHILE TEST FOR BT |
| 454 | 0229 A 77 | | LD | (HL),A | ;OUTPUT TO BACKPLANE |
| 455 | 022A A 3A0030 | | LD | A,(BDSW) | ;LOAD AC WITH BACK STATUS |
| 456 | 022D A CB7F | | BIT | 7,A | ;TEST FOR ERROR |
| 457 | 022F A C4D702 | | CALL | NZ,DOWN | ;GOTO DOWN IF ERROR |
| 458 | 0232 A CB5F | MODT: | BIT | 3,A | ;TEST MOD ID |
| 459 | 0234 A 200B | | JR | NZ,INB-$ | ;GOTO INB IF NOT ZERO |
| 460 | 0236 A DDCBF7DE | | SET | 3,(IX-09H) | ;INDICATE BT XCHANGE PENDING |
| 461 | 023A A FB | | EI | | ;ENABLE INT AS FLAG IS SET |
| 462 | 023B A CD8902 | | CALL | BTRQ | ;BT XCHANGE |
| 463 | 023E A C34502 | | JP | FIXP | |
| 464 | | ; | | | |
| 465 | | ;INPUT FROM BACKPLANE | | | |

| ERR LINE | ADDR S DATA | REL | | | | |
|---|---|---|---|---|---|---|
| 466 | | | ; | | | |
| 467 | 0241 A FB | | INB: | EI | | ;ENABLE INTERRUPTS |
| 468 | 0242 A 7E | | | LD | A,(HL) | ;INPUT FROM BACKPLANE |
| 469 | 0243 A 2F | | | CPL | | ;COMPLEMENT AS BACK IS LO TRUE |
| 470 | 0244 A 12 | | | LD | (DE),A | ;STORE DATA IN INPUT TABLE |
| 471 | | | ; | | | |
| 472 | | | ;FIX POINTERS AND SERVICE PROC. WATCHDOG | | | |
| 473 | | | ; | | | |
| 474 | 0245 A 03 | | FIXP: | INC | BC | ;INC PNT TO OUTTBL |
| 475 | 0246 A 23 | | | INC | HL | ;INC PNT TO BACK |
| 476 | 0247 A 13 | | | INC | DE | ;INC PNT TO INTBL |
| 477 | 0248 A 3E10 | | | LD | A,10H | ;INSPECT FOR PUSHBUTTON RESET |
| 478 | 024A A D3E3 | | | OUT | (SIOBC),A | |
| 479 | 024C A DBE3 | | | IN | A,(SIOBC) | |
| 480 | 024E A CB5F | | | BIT | 3,A | |
| 481 | 0250 A C46603 | | | CALL | NZ,RESET | ;IF TRUE CALL RESET |
| 482 | 0253 A 3EA7 | | | LD | A,0A7H | ;RESET PROC. WATCHDOG |
| 483 | 0255 A D3D2 | | | OUT | (CTC2),A | |
| 484 | 0257 A 3EFF | | | LD | A,PRPR | |
| 485 | 0259 A D3D2 | | | OUT | (CTC2),A | |
| 486 | 025B A 7D | | | LD | A,L | ;LOAD AC WITH LO ORDER BACK ADI |
| 487 | 025C A FDBEEE | | | CP | (IY-12H) | ;COMPARE TO NO. OF SLOTS |
| 488 | 025F A 201D | | | JR | NZ,BTIT-$ | ;IF FALSE GOTO BTIT |
| 489 | | | ; | | | |
| 490 | | | ;FIX POINTER TO BEGINNING & INITIALIZE RCVR | | | |
| 491 | | | ; | | | |
| 492 | 0261 A ED5B4012 | | | LD | DE,(INTBL) | ;LOAD DE WITH INTBL ADDR |
| 493 | 0265 A 210018 | | | LD | HL,BACK | ;LOAD HL WITH BACK ADDR |
| 494 | 0268 A ED4B4212 | | | LD | BC,(OUTBL) | ;LOAD BC WITH OUTBL ADDR |
| 495 | 026C A FDCB0046 | | | BIT | 0,(IY-00H) | ;IF INITIAL RUN SET BIT |
| 496 | 0270 A 200C | | | JR | NZ,BTIT-$ | ;NOT INIT. GOTO BTINH TEST |
| 497 | 0272 A FDCB00C6 | | | SET | 0,(IY+00H) | ;SET INIT. BIT |
| 498 | 0276 A 3E03 | | | LD | A,03H | ;ENABLE SIO RCVR-PNT TO WR3A |
| 499 | 0278 A D3E1 | | | OUT | (SIOAC),A | |
| 500 | 027A A 3ED9 | | | LD | A,0D9H | ;WR3A CMND |
| 501 | 027C A D3E1 | | | OUT | (SIOAC),A | |
| 502 | | | ; | | | |
| 503 | | | ;TEST FOR BLCK XFER INHIBIT | | | |
| 504 | | | ; | | | |
| 505 | 027E A 2611 | | BTIT: | LD | H,BTIH | ;SET PNT TO BTINH TBL |
| 506 | 0280 A 3E00 | | | LD | A,00H | ;LOAD AC WITH 00H |
| 507 | 0282 A BE | | | CP | (HL) | ;TEST BTINH FOR ADDR. SLT |
| 508 | 0283 A 2618 | | | LD | H,18H | ;BTINH REST GOTO BEGIN |
| 509 | 0285 A 288B | | | JR | Z,BEGN-$ | |
| 510 | 0287 A 18BC | | | JR | FIXP-$ | ;IF BTINH SET GOTO FIXP |
| 511 | | | ; | | | |
| 512 | | | ;INPUT BLCK XFER STATUS WORD & TEST FOR REQUESTED XFER | | | |
| 513 | | | ; | | | |
| 514 | 0289 A 2611 | | BTRQ: | LD | H,BTIH | ;PNT TO BTINH TABLE |
| 515 | 028B A 36FF | | | LD | (HL),0FFH | ;SET BTINH FOR SLOT |
| 516 | 028D A 2618 | | | LD | H,18H | ;POINT TO BACKPLANE |
| 517 | 028F A FD7EDF | | | LD | A,(IY-21H) | ;LOAD INITIAL VALUE FOR SLOT AI |
| 518 | 0292 A B5 | | | OR | L | ;OR TO GET SLOT ADDR FOR SCANNE |
| 519 | 0293 A FD77F8 | | | LD | (IY-08H),A | ;WILL PASS TO QUEUE VIA RAM |
| 520 | 0296 A 3E09 | | | LD | A,09H | ;DELAY LOOP |
| 521 | 0298 A 3D | | LOPR: | DEC | A | |
| 522 | 0299 A 20FD | | | JR | NZ,LOPR-$ | |
| 523 | 029B A 7E | | | LD | A,(HL) | ;INPUT STATUS WORD |
| 524 | 029C A FB | | | EI | | |
| 525 | 029D A DDCBF79E | | | RES | 3,(IX-09H) | ;RESET BT PENDING BIT |
| 526 | 02A1 A 2F | | | CPL | | ;BACKPLANE IS LOW TRUE |
| 527 | 02A2 A FE00 | | | CP | 00H | ;TEST FOR BLK XFER REQEUSTED |
| 528 | 02A4 A 2007 | | | JR | NZ,THAT-$ | ;IF TRUE GOTO THAT |

| ERR | LINE | ADDR S DATA | REL | | | |
|---|---|---|---|---|---|---|
| | 529 | 02A6 A 2611 | | LD | H,BTIH | ;POINT TO BTINH TBL |
| | 530 | 02A8 A 3600 | | LD | (HL),00H | ;REST BTINH |
| | 531 | 02AA A 2618 | | LD | H,18H | |
| | 532 | 02AC A C9 | | RET | | |
| | 533 | 02AD A FD77F7 | THAT: | LD | (IY-09H),A | ;WILL PASS TO QUEUE VIA RAM |
| | 534 | | ; | | | |
| | 535 | | ;QUEUE UP STATUS AND SLOT ADDRESS OF BLCK XFER MODULE | | | |
| | 536 | | ; | | | |
| | 537 | 02B0 A 22DD10 | | LD | (HLSTO),HL | |
| | 538 | 02B3 A 2A9E13 | | LD | HL,(TBTQ) | ;LOAD TAIL OF QUEUE |
| | 539 | 02B6 A FD7EF8 | | LD | A,(IY-08H) | ;STORE SLOT ADDR ON QUEUE |
| | 540 | 02B9 A 77 | | LD | (HL),A | |
| | 541 | 02BA A 23 | | INC | HL | |
| | 542 | 02BB A FD7EF7 | | LD | A,(IY-09H) | ;STORE STATUS WORD ON QUEUE |
| | 543 | 02BE A 77 | | LD | (HL),A | |
| | 544 | 02BF A 23 | | INC | HL | |
| | 545 | 02C0 A 3A9A13 | | LD | A,(MBTQ) | ;TEST IF END OF QUEUE |
| | 546 | 02C3 A BD | | CP | L | |
| | 547 | 02C4 A 2003 | | JR | NZ,CNUM-$ | ;IF FALSE GOTO CNUM |
| | 548 | 02C6 A 21A013 | | LD | HL,BTQ | ;ELSE PNT. TO BEGIN OF QUEUE |
| | 549 | 02C9 A 3A9B13 | CNUM: | LD | A,(NBTQ) | ;INCREMENT QUEUE COUNT |
| | 550 | 02CC A 3C | | INC | A | |
| | 551 | 02CD A 329B13 | | LD | (NBTQ),A | |
| | 552 | 02D0 A 229E13 | | LD | (TBTQ),HL | ;LOAD NEW TAIL |
| | 553 | 02D3 A 2ADD10 | | LD | HL,(HLSTO) | |
| | 554 | 02D6 A C9 | | RET | | |
| | 555 | 02D7 A F5 | DOWN: | PUSH | AF | |
| | 556 | 02D8 A C5 | | PUSH | BC | |
| | 557 | 02D9 A E5 | | PUSH | HL | |
| | 558 | 02DA A DDCBF77E | | BIT | 7,(IX-09H) | ;TEST FOR XMISSION |
| | 559 | 02DE A CA0203 | | JP | Z,SBTB | ;NO XMISSION GOTO SBTB |
| | 560 | 02E1 A 3E05 | | LD | A,05H | ;ELSE DISABLE XMITTER |
| | 561 | 02E3 A D3E1 | | OUT | (SIOAC),A | |
| | 562 | 02E5 A 3E00 | | LD | A,00H | |
| | 563 | 02E7 A D3E1 | | OUT | (SIOAC),A | |
| | 564 | 02E9 A 3E03 | | LD | A,03H | ;ENABLE RCVR |
| | 565 | 02EB A D3E1 | | OUT | (SIOAC),A | |
| | 566 | 02ED A 3ED9 | | LD | A,0D9H | |
| | 567 | 02EF A D3E1 | | OUT | (SIOAC),A | |
| | 568 | 02F1 A D9 | | EXX | | |
| | 569 | 02F2 A 215212 | | LD | HL,RBUF | |
| | 570 | 02F5 A 06FF | | LD | B,0FFH | |
| | 571 | 02F7 A 0EE0 | | LD | C,SIOAD | |
| | 572 | 02F9 A D9 | | EXX | | |
| | 573 | 02FA A DDCBF7BE | | RES | 7,(IX-09H) | ;INDICATE RCVR ENABLED |
| | 574 | 02FE A FDCB00B6 | | RES | 6,(IY-00H) | ;INDICATE DI |
| | 575 | 0302 A FDCB00FE | SBTB: | SET | 7,(IY-00H) | ;SET BACKPLANE TEST BIT |
| | 576 | 0306 A FB | | EI | | |
| | 577 | 0307 A 06FF | | LD | B,0FFH | ;DELAY LOOP |
| | 578 | 0309 A 3EA7 | RPWT: | LD | A,0A7H | |
| | 579 | 030B A D3D2 | | OUT | (CTC2),A | |
| | 580 | 030D A 3EFF | | LD | A,PRPR | |
| | 581 | 030F A D3D2 | | OUT | (CTC2),A | |
| | 582 | 0311 A 05 | | DEC | B | |
| | 583 | 0312 A C20903 | | JP | NZ,RPWT | |
| | 584 | 0315 A E1 | | POP | HL | |
| | 585 | 0316 A C1 | | POP | BC | |
| | 586 | 0317 A 0A | | LD | A,(BC) | ;LOAD AC WITH DATA IN OUT TBL |
| | 587 | 0318 A 2F | | CPL | | ;COMPLEMENT AS BACK IS LO TRUE |
| | 588 | 0319 A 77 | | LD | (HL),A | ;OUTPUT TO BACKPLANE |
| | 589 | 031A A 3A0030 | | LD | A,(BDSW) | ;LOAD AC WITH BACK STATUS |
| | 590 | 031D A CB7F | | BIT | 7,A | ;TEST FOR BACKPLANE ERROR |
| | 591 | 031F A C23403 | | JP | NZ,BADB | ;IF TRUE GOTO BAD BACKPLANE |
| | 592 | 0322 A FDCB00BE | | RES | 7,(IY-00H) | ;ELSE RESET BACK TEST BIT |

| ERR LINE | ADDR S DATA | REL | | | |
|---|---|---|---|---|---|
| 593 | 0326 A FDCB005E | | BIT | 3,(IY-00H) | ;TEST FOR TIMEOUT |
| 594 | 032A A CA3203 | | JP | Z,PACU | ;IF FALSE GOTO PACU |
| 595 | 032D A 210020 | | LD | HL,COMM | ;ELSE TURN COMM LED OFF |
| 596 | 0330 A 3600 | | LD | (HL),00H | |
| 597 | 0332 A F1 | PACU: | POP | AF | |
| 598 | 0333 A C9 | | RET | | |
| 599 | 0334 A FDCBFFFE | BADB: | SET | 7,(IY-01H) | ;INDICATE BACKPLANE FAULT |
| 600 | 0338 A F1 | | POP | AF | |
| 601 | 0339 A DDCBFDFE | | SET | 7,(IX-03H) | ;SET BACKPLANE COUNT BIT |
| 602 | 033D A 3E02 | | LD | A,02H | ;LOAD BACKPLANE COUNT |
| 603 | 033F A DD77F8 | | LD | (IX-08H),A | |
| 604 | 0342 A FDCB005E | | BIT | 3,(IY-00H) | ;TEST FOR TIMEOUT |
| 605 | 0346 A CA4E03 | | JP | Z,RPWO | ;IF FALSE GOTO RPWO |
| 606 | 0349 A 210020 | | LD | HL,COMM | ;ELSE TURN COMM LED OFF |
| 607 | 034C A 3600 | | LD | (HL),00H | |
| 608 | 034E A F3 | RPWO: | DI | | ;DISABLE INTERRUPTS |
| 609 | 034F A 3EA7 | | LD | A,0A7H | |
| 610 | 0351 A D3D2 | | OUT | (CTC2),A | |
| 611 | 0353 A 3EFF | | LD | A,PRPR | |
| 612 | 0355 A D3D2 | | OUT | (CTC2),A | |
| 613 | 0357 A 3E10 | | LD | A,10H | ;RESET EXT/STATUS CMND |
| 614 | 0359 A D3E3 | | OUT | (SIOBC),A | |
| 615 | 035B A DBE3 | | IN | A,(SIOBC) | ;INPUT STATUS BYTE |
| 616 | 035D A FB | | EI | | ;ENABLE INTERRUPTS |
| 617 | 035E A CB5F | | BIT | 3,A | ;TEST FOR RESET |
| 618 | 0360 A C46603 | | CALL | NZ,RESET | ;IF TRUE CALL RESET |
| 619 | 0363 A C34E03 | | JP | RPWO | ;LOOP |
| 620 | 0366 A F3 | RESET: | DI | | ;DISABLE INTERRUPTS |
| 621 | 0367 A FDCBFF7E | | BIT | 7,(IY-01H) | ;TEST FOR BACKPLANE FAULT |
| 622 | 036B A CA7503 | | JP | Z,PRET | ;IF FALSE GOTO PRET |
| 623 | 036E A DDCBF7CE | | SET | 1,(IX-09H) | ;ELSE INDICATE PUSHBUTTON RESTA |
| 624 | 0372 A C37B03 | | JP | PDOWN | |
| 625 | 0375 A FDCB005E | PRET: | BIT | 3,(IY-00H) | ;TEST FOR TIMEOUT |
| 626 | 0379 A FB | | EI | | ;ENABLE INTERRUPTS |
| 627 | 037A A C8 | | RET | Z | ;RETURN IF FALSE |
| 628 | 037B A DDCBFD9E | PDOWN: | RES | 3,(IX-03H) | ;INDICATE PDOWN FOR RCVR ROUTIN |
| 629 | 037F A DD36FA00 | | LD | (IX-06H),00H | |
| 630 | 0383 A FDCBFFB6 | | RES | 6,(IY-01H) | ;RESET PRL |
| 631 | 0387 A FB | | EI | | |
| 632 | 0388 A C9 | | RET | | |
| 633 | | | ;************************************************ | | |
| 634 | | | ;*INTERRUPT ROUTINE FOR CTC CHANNEL 3 INT. * | | |
| 635 | | | ;************************************************ | | |
| 636 | 0389 A 08 | CMWD: | EX | AF,AF' | ;SAVE AC AND FLAGS |
| 637 | 038A A D9 | | EXX | | ;SAVE REGISTERS |
| 638 | | | ; | | |
| 639 | | | ;TEST FOR PURPOSE OF INTERRUPT | | |
| 640 | | | ; | | |
| 641 | 038B A DDCBFD4E | | BIT | 1,(IX-03H) | ;TEST FOR SHORT TIMER TIMEOUT |
| 642 | 038F A 2075 | | JR | NZ,RWAT-$ | ;IF TRUE GOTO RWAT |
| 643 | | | ; | | |
| 644 | | | ;TIMEOUT INDICATED | | |
| 645 | | | ; | | |
| 646 | 0391 A DD35F5 | | DEC | (IX-0BH) | ;TEST FOR ERROR |
| 647 | 0394 A C2AF04 | | JP | NZ,IBCT | ;IF FALSE GOTO IBCT |
| 648 | 0397 A FDCBFF7E | CTOT: | BIT | 7,(IY-01H) | ;TEST FOR BACKPLANE TEST |
| 649 | 039B A 2006 | | JR | NZ,COFF-$ | ;IF TRUE GOTO COFF |
| 650 | 039D A FDCB007E | | BIT | 7,(IY-00H) | ;ELSE TEST FOR BACKPLANE TEST |
| 651 | 03A1 A 2005 | | JR | NZ,TRSR-$ | ;IF TRUE GOTO TRSR |
| 652 | 03A3 A 3E03 | COFF: | LD | A,03H | ;COMM LED OFF,PROC LED OFF |
| 653 | 03A5 A 320020 | | LD | (COMM),A | |
| 654 | 03A8 A FDCBFF6E | TRSR: | BIT | 5,(IY-01H) | ;TEST FOR RESET |
| 655 | 03AC A 2808 | | JR | Z,NRSS-$ | ;IF FALSE GOTO NRSS |
| 656 | 03AE A 210038 | | LD | HL,NMRES | ;ELSE RESET BACKPLANE |
| 657 | 03B1 A 3600 | | LD | (HL),00H | |

```
ERR LINE  ADDR S DATA       REL
    658   03B3 A C3BA03            JP    NMSS                ;SET LAST STATE FLAG
    659   03B6 A FDCB00CE   NRSS:  SET   1,(IY-00H)          ;INDICATE ERROR
    660   03BA A FDCBFF9E   NMSS:  RES   3,(IY-01H)          ;ADDRESS SYNC BIT
    661   03BE A FDCBFFA6          RES   4,(IY-01H)          ;INDICATE A TIMEOUT
    662   03C2 A FDCB00DE          SET   3,(IY-00H)          ;DISABLE CTC
    663   03C6 A 3E03              LD    A,03H
    664   03C8 A D3D3              OUT   (CTC3),A
    665   03CA A DDCBFDDE          SET   3,(IX-03H)
    666   03CE A DDCBF7A6          RES   4,(IX-09H)
    667   03D2 A 3A0030            LD    A,(BDSW)            ;INPUT BACKPLANE DIP SWITCHES
    668   03D5 A CB77              BIT   6,A                 ;TEST FOR PRL
    669   03D7 A 2804              JR    Z,RECE-$            ;IF FALSE GOTO RESE
    670   03D9 A FDCBFFF6          SET   6,(IY-01H)          ;ELSE INDICATE PRL
    671   03DD A 219104     RECE:  LD    HL,RECI             ;INTERRUPT VECTOR AT RECI
    672   03E0 A 229C11            LD    (SIORA),HL
    673   03E3 A 3E03              LD    A,03H               ;REENABLE RCVR
    674   03E5 A D3E1              OUT   (SIOAC),A
    675   03E7 A 3ED9              LD    A,0D9H
    676   03E9 A D3E1              OUT   (SIOAC),A
    677   03EB A 3E05              LD    A,05H               ;ENABLE XMITTER
    678   03ED A D3E1              OUT   (SIOAC),A
    679   03EF A 3E00              LD    A,00H
    680   03F1 A D3E1              OUT   (SIOAC),A
    681   03F3 A DDCBF7BE          RES   7,(IX-09H)          ;INDICATE RCVR ENABLED
    682   03F7 A FDCB00B6          RES   6,(IY-00H)          ;INDICATE INT. DIS IN MAIN
    683   03FB A DBE0              IN    A,(SIOAD)
    684   03FD A DBE0              IN    A,(SIOAD)
    685   03FF A DBE0              IN    A,(SIOAD)
    686   0401 A DBE0              IN    A,(SIOAD)
    687   0403 A C37406            JP    RESE
    688                            ;
    689                            ;TEST FOR IDLE LINK
    690                            ;
    691   0406 A DBE1       RWAT:  IN    A,(SIOAC)           ;READ REGISTER 0
    692   0408 A CB67              BIT   4,A                 ;TEST FOR FLAG
    693   040A A 201F              JR    NZ,IDLE-$           ;IF FALSE GOTO IDLE
    694   040C A 05                DEC   B
    695   040D A 281C              JR    Z,IDLE-$
    696   040F A 3E13       CTOV:  LD    A,13H               ;ELSE RE-ENTER HUNT MODE
    697   0411 A D3E1              OUT   (SIOAC),A
    698   0413 A 3ED9              LD    A,0D9H
    699   0415 A D3E1              OUT   (SIOAC),A           ;RESET EXT/STATUS BITS
    700   0417 A 3E10              LD    A,10H
    701   0419 A D3E1              OUT   (SIOAC),A
    702   041B A D3E1              OUT   (SIOAC),A
    703   041D A D3E1              OUT   (SIOAC),A
    704   041F A 3E97              LD    A,97H
    705   0421 A D3D3              OUT   (CTC3),A
    706   0423 A 3AED10            LD    A,(CH3S)
    707   0426 A D3D3              OUT   (CTC3),A
    708   0428 A C3AF04            JP    IRCT
    709                            ;
    710                            ;LINK IS IDLE
    711                            ;
    712   042B A CD4F04     IDLE:  CALL  WATR                ;RETRIGGER COMM. WATCHDOG
    713   042E A DBE0              IN    A,(SIOAD)           ;FLUSH BUFFER
    714   0430 A DBE0              IN    A,(SIOAD)
    715   0432 A DBE0              IN    A,(SIOAD)
    716   0434 A DBE0              IN    A,(SIOAD)
    717   0436 A 3E01              LD    A,01H               ;REENABLE RCVR INT.
    718   0438 A D3E1              OUT   (SIOAC),A
    719   043A A 3E1A              LD    A,1AH
    720   043C A D3E1              OUT   (SIOAC),A
    721   043E A 3AE510            LD    A,(WATCH)
    722   0441 A 32E410            LD    (WATCT),A
```

```
ERR LINE  ADDR S DATA       REL
    723  0444 A DDCBFD8E                 RES   1,(IX-03H)    ;INDICATE COMM. WATCHDOG INITI
    724  0448 A FDCB00B6                 RES   6,(IY-00H)
    725  044C A C37806                   JP    REST
    726                      ;SUBROUTINE TO RETRIGGER COMM. WATCHDOG
    727                      ;
    728                      ;
    729                      ;
    730  044F A F5           WATR: PUSH  AF               ;SAVE AC AND FLAGS
    731  0450 A 3EA7               LD    A,0A7H          ;RETRIGGER COMMUNICATIONS WATCH
    732  0452 A D3D3               OUT   (CTC3),A
    733  0454 A 3AEF10              LD    A,(CH3)
    734  0457 A D3D3               OUT   (CTC3),A
    735  0459 A F1                 POP   AF              ;RESTORE AC AND FLAGS
    736  045A A C9                 RET
    737                      ;************************************************
    738                      ;INTERRUPT ROUTINGE FOR CTC CHANNEL 2           *
    739                      ;************************************************
    740  045B A 76           PRWD: HALT
    741                      ;************************************************
    742                      ;*EXT/STATUS INT. ROUTINE                       *
    743                      ;************************************************
    744  045C A 08           EXTA: EX    AF,AF'          ;SAVE AC AND FLAGS
    745  045D A D9                 EXX                   ;SAVE REGISTERS
    746  045E A DBE1               IN    A,(SIOAC)       ;INPUT SIO STATUS REGISTERS
    747  0460 A CB7F               BIT   7,A             ;TEST FOR ABORT DETECT
    748  0462 A CA8404             JP    Z,RESI          ;IF FALSE GOTO RESI
    749  0465 A FDCBFFA6           RES   4,(IY-01H)      ;RESET ADDR FOUND BIT
    750  0469 A 3E01               LD    A,01H           ;RESET EXT/STATUS INT. ENABLE
    751  046B A D3E1               OUT   (SIOAC),A
    752  046D A 3E1A               LD    A,1AH
    753  046F A D3E1               OUT   (SIOAC),A
    754  0471 A 3E33               LD    A,33H           ;REENTER HUNT MODE
    755  0473 A D3E1               OUT   (SIOAC),A
    756  0475 A 3ED9               LD    A,0D9H
    757  0477 A D3E1               OUT   (SIOAC),A
    758  0479 A DBE0               IN    A,(SIOAD)       ;FLUSH BUFFER
    759  047B A DBE0               IN    A,(SIOAD)
    760  047D A DBE0               IN    A,(SIOAD)
    761  047F A DBE0               IN    A,(SIOAD)
    762  0481 A C37806             JP    REST
    763  0484 A 3E10         RESI: LD    A,10H           ;RESET EXT/STATUS INT
    764  0486 A D3E1               OUT   (SIOAC),A
    765  0488 A D3E1               OUT   (SIOAC),A
    766  048A A D3E1               OUT   (SIOAC),A
    767  048C A D9                 EXX                   ;RESTORE REGISTERS
    768  048D A 08                 EX    AF,AF'          ;RESTORE AC AND FLAGS
    769  048E A FB                 EI
    770  048F A ED4D               RETI
    771                      ;************************************************
    772                      ;*CHARACTER AVAILABLE INTERRUPT ROUTINE FOR SIO A *
    773                      ;************************************************
    774  0491 A 08           RECI: EX    AF,AF'  ;SAVE AC AND FLAGS
    775  0492 A D9                 EXX           ;SAVE REGISTERS
    776                      ;
    777                      ;TEST FOR ADDRESS BYTE
    778                      ;
    779  0493 A FDCBFF66           BIT   4,(IY-01H)      ;TEST IF THIS IS THE ADDRESS BY
    780  0497 A 201B               JR    NZ,TBXF-$       ;IF NO GOTO TBXF
    781  0499 A DBE0               IN    A,(SIOAD)       ;INPUT THE ADDRESS BYTE
    782  049B A DD77F9             LD    (IX-07H),A      ;STORE ADDRESS
    783  049E A FDBEEB             CP    (IY-18H)        ;COMPARE TO THE RACK ADDRESS
    784  04A1 A 2006               JR    NZ,CHVC-$       ;IF FALSE GOTO IBCT
    785  04A3 A FDCBFFE6           SET   4,(IY-01H)      ;INDICATE THAT THE PROPER ADDRE
    786  04A7 A 1806               JR    IBCT-$
    787  04A9 A 214E05       CHVC: LD    HL,RECJ         ;SET UP TO RECEIVE DATA BUT NOT
```

| ERR LINE | ADDR S DATA | REL | | | |
|---|---|---|---|---|---|
| 788 | 04AC A 229C11 | | | LD | (SIORA),HL |
| 789 | 04AF A D9 | IBCT: | | EXX | |
| 790 | 04B0 A 08 | | | EX | AF,AF' |
| 791 | 04B1 A FB | | | EI | |
| 792 | 04B2 A ED4D | | | RETI | |
| 793 | | ; | | | |
| 794 | | ;TEST FOR COMMAND 03 | | | |
| 795 | | ; | | | |
| 796 | 04B4 A DBE0 | TBXF: | | IN | A,(SIOAD) ;INPUT COMMAND FROM SIO |
| 797 | 04B6 A 77 | | | LD | (HL),A ;STORE ON RBUF |
| 798 | 04B7 A FE03 | | | CP | 03H ;TEST FOR COMMAND 03 |
| 799 | 04B9 A 2029 | | | JR | NZ,NORM-$ ;IF FALSE GOTO NORM |
| 800 | 04BB A DDCBFD46 | | | BIT | 0,(IX-03H) ;TEST FOR BT DONE |
| 801 | 04BF A C2E404 | | | JP | NZ,NORM ;IF TRUE GOTO NORM |
| 802 | 04C2 A FDCB00CE | | | SET | 1,(IY-00H) ;ELSE DONT WRITE TO BACK TILL ) |
| 803 | 04C6 A 21F904 | | | LD | HL,RECB ;SET UP FOR BXFER |
| 804 | 04C9 A 229C11 | | | LD | (SIORA),HL |
| 805 | 04CC A 215312 | | | LD | HL,RBUF+01H ;PNT. TO RECEIVE BUFFER |
| 806 | 04CF A ED5B3112 | | | LD | DE,(BTRS) |
| 807 | 04D3 A 015312 | | | LD | BC,RBUF+01H ;BC PNTS TO DATA TO MODULE |
| 808 | 04D6 A DDCBEB46 | | | BIT | 0,(IX-15H) ;TEST FOR BT WRITE ERROR |
| 809 | 04DA A CAAF04 | | | JP | Z,IBCT ;IF FALSE GOTO IBCT |
| 810 | 04DD A 3A3512 | | | LD | A,(BTSW) ;ELSE OUTPUT COMMAND WORD TO MC |
| 811 | 04E0 A 12 | | | LD | (DE),A |
| 812 | 04E1 A C3AF04 | | | JP | IBCT |
| 813 | | ; | | | |
| 814 | | ;NORMAL DATA XFER | | | |
| 815 | | ; | | | |
| 816 | 04E4 A 21F004 | NORM: | | LD | HL,RECN ;SET UP FOR NORMAL XFER |
| 817 | 04E7 A 229C11 | | | LD | (SIORA),HL |
| 818 | 04EA A 215312 | | | LD | HL,RBUF+01H ;PNT. TO RECEIVE BUFFER |
| 819 | 04ED A 05 | | | DEC | B ;DECREMENT CHARACTER COUNT |
| 820 | 04EE A 18BF | | | JR | IBCT-$ |
| 821 | | ;NORMAL XFER ROUTINE | | | |
| 822 | | ; | | | |
| 823 | | ; | | | |
| 824 | | ; | | | |
| 825 | 04F0 A D9 | RECN: | | EXX | ;SAVE REGISTERS |
| 826 | 04F1 A 08 | | | EX | AF,AF' ;SAVE AC AND FLAGS |
| 827 | 04F2 A EDA2 | | | INI | ;INPUT AND SAVE |
| 828 | 04F4 A D9 | | | EXX | ;RESTORE REGISTERS |
| 829 | 04F5 A 08 | | | EX | AF,AF' ;RESTORE AC AND FLAGS |
| 830 | 04F6 A FB | | | EI | |
| 831 | 04F7 A ED4D | | | RETI | |
| 832 | | ;BLOCK XFER ROUTINE TO STORE 2 VALUES AND REINITIALIZE | | | |
| 833 | | ; | | | |
| 834 | | ; | | | |
| 835 | | ; | | | |
| 836 | 04F9 A 08 | RECB | | EX | AF,AF' |
| 837 | 04FA A D9 | | | EXX | ;STORE REGISTERS |
| 838 | 04FB A DBE0 | | | IN | A,(SIOAD) ;INPUT DATA |
| 839 | 04FD A 77 | | | LD | (HL),A ;STORE ON BUFFER |
| 840 | 04FE A 23 | | | INC | HL ;INCREMENT BUFFER PNTER |
| 841 | 04FF A DDCBEB46 | | | BIT | 0,(IX-15H) ;TEST FOR BT WRITE ERROR |
| 842 | 0503 A CA1705 | | | JP | Z,DCNT ;IF FALSE GOTO DCNT |
| 843 | 0506 A 3E0B | | | LD | A,0BH ;ELSE DELAY FOR STATUS READ |
| 844 | 0508 A 3D | DISW | | DEC | A |
| 845 | 0509 A C20805 | | | JP | NZ,DISW |
| 846 | 050C A 1A | | | LD | A,(DE) ;INPUT STATUS WORD |
| 847 | 050D A FDBEE4 | | | CP | (IY-1CH) ;COMPARE TO PREVIOUS STAT. BYTE |
| 848 | 0510 A C22805 | | | JP | NZ,NREIN ;IF FALSE GOTO NREIN |
| 849 | 0513 A DDCBEB86 | | | RES | 0,(IX-15H) ;ELSE RESET ERROR BIT |
| 850 | 0517 A FD35F4 | DCNT | | DEC | (IY-0CH) ;DECREMENT BACKPLANE COUNTER |
| 851 | 051A A C22305 | | | JP | NZ,EXIT |
| 852 | 051D A 213805 | | | LD | HL,RECB1 ;NEXT INT. CALL IS TO RECB1 |

| ERR LINE | ADDR S DATA | REL | | | |
|---|---|---|---|---|---|
| 853 | 0520 A 229C11 | | LD | (SIORA),HL | |
| 854 | 0523 A D9 | EXIT | EXX | | ;RESTORE REGISTER CONTENTS |
| 855 | 0524 A 08 | | EX | AF,AF' | ;RESTORE AC AND FLAGS |
| 856 | 0525 A FB | | EI | | |
| 857 | 0526 A ED4D | | RETI | | |
| 858 | 0528 A 21F004 | NREIN | LD | HL,RECN | ;NEXT INT. CALL IS TO RECN |
| 859 | 052B A 229C11 | | LD | (SIORA),HL | |
| 860 | 052E A 06FE | | LD | B,0FEH | ;LOAD BYTE COUNTER |
| 861 | 0530 A 0EE1 | | LD | C,SIOAC | ;PNT TO SIOAC |
| 862 | 0532 A 215312 | | LD | HL,RBUF+01H | ;PNT TO BUFFER |
| 863 | 0535 A C32305 | | JP | EXIT | |
| 864 | | ;BLOCK XFER ROUTINE TO WRITE TO THE BACKPLANE | | | |
| 865 | | ; | | | |
| 866 | | ; | | | |
| 867 | | ; | | | |
| 868 | 0538 A 08 | RECB1 | EX | AF,AF' | ;STORE AC AND FLAGS |
| 869 | 0539 A D9 | | EXX | | ;STORE REGISTERS |
| 870 | 053A A DBE0 | | IN | A,(SIOAD) | ;INPUT DATA |
| 871 | 053C A 77 | | LD | (HL),A | ;STORE DATA ON BUFFER |
| 872 | 053D A 23 | | INC | HL | ;INCREMENT BUFFER PNTER |
| 873 | 053E A 0A | | LD | A,(BC) | ;FETCH DATA TO BACKPLANE |
| 874 | 053F A 03 | | INC | BC | ;INCREMENT PNTER |
| 875 | 0540 A 2F | | CPL | | ;COMPLEMENT AS BACK IS LO TRUE |
| 876 | 0541 A 12 | | LD | (DE),A | ;OUTPUT DATA TO MODULE |
| 877 | 0542 A 2F | | CPL | | ;COMPLEMENT DATA |
| 878 | 0543 A FD86F6 | | ADD | A,(IY-0AH) | ;CALCULATE CHECKSUM |
| 879 | 0546 A FD77F6 | | LD | (IY-0AH),A | |
| 880 | 0549 A D9 | | EXX | | ;RESTORE REGISTER |
| 881 | 054A A 08 | | EX | AF,AF' | ;RESTORE AC AND FLAGS |
| 882 | 054B A FB | | EI | | |
| 883 | 054C A ED4D | | RETI | | |
| 884 | | ;ROUTINE TO RECEIVE DATA BUT NOT STORE | | | |
| 885 | | ; | | | |
| 886 | | ; | | | |
| 887 | | ; | | | |
| 888 | 054E A 08 | RECJ: | EX | AF,AF' | ;SAVE AC AND FLAGS |
| 889 | 054F A DBE0 | | IN | A,(SIOAD) | ;INPUT DATA BYTE |
| 890 | 0551 A 08 | | EX | AF,AF' | ;RESTORE AC AND FLAGS |
| 891 | 0552 A FB | | EI | | |
| 892 | 0553 A ED4D | | RETI | | |
| 893 | | | | | |
| 894 | | | | | |
| 895 | | ;************************************************************ | | | |
| 896 | | ;*XMIT BUFFER EMPTY INTERRUPT ROUTINE FOR THE SIO CHANNEL A. * | | | |
| 897 | | ;************************************************************ | | | |
| 898 | | ;NORMAL DATA XMIT ROUTINE | | | |
| 899 | | ; | | | |
| 900 | | ; | | | |
| 901 | | ; | | | |
| 902 | 0555 A 08 | NXMT: | EX | AF,AF' | ;SAVE AC AND FLAG |
| 903 | 0556 A D9 | | EXX | | ;SAVE REGISTERS |
| 904 | 0557 A EDA3 | | OUTI | | ;OUTPUT DATA TO SIO |
| 905 | 0559 A C26205 | | JP | NZ,FIN | ;GOTO FIN IF ALL DATA NOT SENT |
| 906 | 055C A 219505 | | LD | HL,FXMT | ;NEXT INT. CALLS FXMT |
| 907 | 055F A 229811 | | LD | (SIOTA),HL | |
| 908 | 0562 A 08 | FIN: | EX | AF,AF' | ;RESTORE FLAGS CONTENTS |
| 909 | 0563 A D9 | | EXX | | ;RESTORE REGISTER CONTENTS |
| 910 | 0564 A FB | | EI | | ;ENABLE INTERRUPTS |
| 911 | 0565 A ED4D | | RETI | | ;RETURN |
| 912 | | ;BLOCK XFER XMIT ROUTINE | | | |
| 913 | | ; | | | |
| 914 | | ; | | | |
| 915 | | ; | | | |
| 916 | 0567 A 08 | BXMT: | EX | AF,AF' | ;SAVE AC AND FLAGS |
| 917 | 0568 A D9 | | EXX | | ;SAVE REGISTERS |

| ERR LINE | ADDR S DATA REL | | | | |
|---|---|---|---|---|---|
| 918 | 0569 A CB41 | | BIT | 0,C | ;TEST FOR CMND SENT |
| 919 | 056B A C27E05 | | JP | NZ,CSNT | ;IF TRUE GOTO CSNT |
| 920 | 056E A 3E04 | | LD | A,04H | ;ELSE STORE AND OUTPUT CMND |
| 921 | 0570 A 77 | | LD | (HL),A | |
| 922 | 0571 A D3E0 | | OUT | (SIOAD),A | |
| 923 | 0573 A CBC1 | | SET | 0,C | ;INDICATE CMND SENT |
| 924 | 0575 A ED5B3112 | | LD | DE,(BTRS) | ;PNT. TO MODULE FOR SERVICE |
| 925 | 0579 A 08 | FIN1: | EX | AF,AF' | ;RESTORE REGISTER CONTENTS |
| 926 | 057A A D9 | | EXX | | ;RESTORE REGISTER CONTENTS |
| 927 | 057B A FB | | EI | | ;ENABLE INTERRUPTS |
| 928 | 057C A ED4D | | RETI | | ;RETURN |
| 929 | 057E A 23 | CSNT: | INC | HL | ;INC. XBUF PNTER |
| 930 | 057F A 1A | | LD | A,(DE) | ;INPUT FROM MODULE |
| 931 | 0580 A 2F | | CPL | | ;COMPLEMENT AS BACK IS LO TRUE |
| 932 | 0581 A 77 | | LD | (HL),A | ;STORE ON BUFFER\ |
| 933 | 0582 A D3E0 | | OUT | (SIOAD),A | ;OUTPUT TO SIO |
| 934 | 0584 A 05 | | DEC | B | ;DECREMENT BYTE COUNT |
| 935 | 0585 A C27905 | | JP | NZ,FIN1 | ;ALL NOT SENT GOTO FIN1 |
| 936 | 0588 A DDCBF7B6 | | RES | 6,(IX-09H) | ;ELSE RESET BT PENDING BIT |
| 937 | 058C A 219505 | | LD | HL,FXMT | ;NEXT INT. CALLS FXMT |
| 938 | 058F A 229811 | | LD | (SIOTA),HL | |
| 939 | 0592 A C37905 | | JP | FIN1 | ;RETURN |
| 940 | | ;XMIT END OF FRAME ROUTINE | | | |
| 941 | | ; | | | |
| 942 | | ; | | | |
| 943 | | ; | | | |
| 944 | 0595 A 08 | FXMT: | EX | AF,AF' | ;SAVE AC AND FLAGS |
| 945 | 0596 A D9 | | EXX | | ;SAVE REGISTERS |
| 946 | 0597 A 3E28 | | LD | A,28H | ;SATISFY XMIT INTERRUPT |
| 947 | 0599 A D3E1 | | OUT | (SIOAC),A | |
| 948 | 059B A CB48 | | BIT | 1,B | ;TEST IF 1ST PASS |
| 949 | 059D A C2A705 | | JP | NZ,PAST | ;IF FALSE GOTO PAST |
| 950 | 05A0 A CBC8 | | SET | 1,B | ;ELSE SET PASS BIT |
| 951 | 05A2 A D9 | FIN2: | EXX | | ;RESTORE REGISTER CONTENTS |
| 952 | 05A3 A 08 | | EX | AF,AF' | ;RESTORE AC AND FLAGS |
| 953 | 05A4 A FB | | EI | | ;ENABLE INTERRUPTS |
| 954 | 05A5 A ED4D | | RETI | | ;RETURN |
| 955 | 05A7 A CDCA05 | PAST | CALL | BTCHK | ;TEST IF BT XCHANGE PENDING |
| 956 | 05AA A 08 | | EX | AF,AF' | ;EXCHANGE AC AND FLAGS |
| 957 | 05AB A D9 | | EXX | | ;EXCHANGE REGISTERS |
| 958 | 05AC A 3AEA10 | | LD | A,(CHT) | ;DELAY FOR END FLAGS |
| 959 | 05AF A 3D | LPY: | DEC | A | |
| 960 | 05B0 A C2AF05 | | JP | NZ,LPY | |
| 961 | 05B3 A 21D30B | | LD | HL,SIOR | ;DISABLE XMIT,ENABLE RCVR |
| 962 | 05B6 A 0EE1 | | LD | C,SIOAC | |
| 963 | 05B8 A 0604 | | LD | B,04H | |
| 964 | 05BA A EDB3 | | OTIR | | |
| 965 | 05BC A DDCBF7BE | | RES | 7,(IX-09H) | ;INDICATE RCVR ENABLED |
| 966 | 05C0 A 215212 | | LD | HL,RBUF | ;SET FOR RCVR ROUTINE |
| 967 | 05C3 A 0EE0 | | LD | C,SIOAD | |
| 968 | 05C5 A 06FF | | LD | B,0FFH | |
| 969 | 05C7 A C3A205 | | JP | FIN2 | ;RETURN |
| 970 | | ;ROUTINE TO TEST FOR BT XCHANGE PENDING | | | |
| 971 | | ; | | | |
| 972 | | ; | | | |
| 973 | | ; | | | |
| 974 | 05CA A 08 | BTCHK | EX | AF,AF' | |
| 975 | 05CB A D9 | | EXX | | |
| 976 | 05CC A DDCBF75E | | BIT | 3,(IX-09H) | |
| 977 | 05D0 A C8 | | RET | Z | |
| 978 | 05D1 A D1 | | POP | DE | |
| 979 | 05D2 A E1 | | POP | HL | |
| 980 | 05D3 A D5 | | PUSH | DE | |
| 981 | 05D4 A E5 | | PUSH | HL | |
| 982 | 05D5 A C9 | | RET | | |

| ERR LINE | ADDR S DATA | REL | | | | |
|---|---|---|---|---|---|---|
| 983 | | | ;********************************************************** |
| 984 | | | ;*SPECIAL RECEIVE INTERRUPT FOR SIO CHANNEL A.           * |
| 985 | | | ;********************************************************** |
| 986 | | | ; |
| 987 | | | ;TEST IF A RCVR OVERRUN CAUSED INTERRUPT |
| 988 | | | ; |
| 989 | 05D6 A 08 | | SPCA: | EX | AF,AF' | ;SAVE AC AND FLAG CONTENTS |
| 990 | 05D7 A D9 | | | EXX | | ;SAVE REGISTERS |
| 991 | 05D8 A 3E01 | | | LD | A,01H | ;INPUT STATUS AND STORE |
| 992 | 05DA A D3E1 | | | OUT | (SIOAC),A | |
| 993 | 05DC A DBE1 | | | IN | A,(SIOAC) | |
| 994 | 05DE A 32DC10 | | | LD | (CRCS),A | |
| 995 | 05E1 A 3E01 | | | LD | A,01H | ;DISABLE EXT/STATUS INT. |
| 996 | 05E3 A D3E1 | | | OUT | (SIOAC),A | |
| 997 | 05E5 A 3E1B | | | LD | A,1BH | |
| 998 | 05E7 A D3E1 | | | OUT | (SIOAC),A | |
| 999 | 05E9 A 3E13 | | | LD | A,13H | ;DIS. RCVR TO PREVENT FURTHER D |
| 1000 | 05EB A D3E1 | | | OUT | (SIOAC),A | |
| 1001 | 05ED A 3ED9 | | | LD | A,0D9H | |
| 1002 | 05EF A D3E1 | | | OUT | (SIOAC),A | |
| 1003 | 05F1 A 3E10 | | | LD | A,10H | ;RESET EXT/STATUS BITS |
| 1004 | 05F3 A D3E1 | | | OUT | (SIOAC),A | |
| 1005 | 05F5 A D3E1 | | | OUT | (SIOAC),A | |
| 1006 | 05F7 A D3E1 | | | OUT | (SIOAC),A | |
| 1007 | 05F9 A DBE0 | | | IN | A,(SIOAD) | ;INPUT THE 2ND CRC BYTE |
| 1008 | 05FB A DBE0 | | | IN | A,(SIOAD) | ;FLUSH BUFFER |
| 1009 | 05FD A DBE0 | | | IN | A,(SIOAD) | |
| 1010 | 05FF A DBE0 | | | IN | A,(SIOAD) | |
| 1011 | 0601 A 219104 | | | LD | HL,REC1 | ;SET UP FOR NEW MESSAGE |
| 1012 | 0604 A 229C11 | | | LD | (SIORA),HL | |
| 1013 | 0607 A 3A5212 | | | LD | A,(RBUF) | |
| 1014 | 060A A E67F | | | AND | 07FH | |
| 1015 | 060C A FE03 | | | CP | 03 | |
| 1016 | 060E A CA250A | | | JP | Z,CMD3 | |
| 1017 | 0611 A DDCBF766 | | TCNL: | BIT | 4,(IX-09H) | ;TEST IF CONTROL IS MADE |
| 1018 | 0615 A 2819 | | | JR | Z,ERVR-$ | ;IF FALSE GOTO ERVR |
| 1019 | 0617 A 2AE210 | | | LD | HL,(INTER) | |
| 1020 | 061A A 23 | | | INC | HL | |
| 1021 | 061B A 22E210 | | | LD | (INTER),HL | |
| 1022 | 061E A 2ADF10 | | | LD | HL,(LONGT) | |
| 1023 | 0621 A 2B | | | DEC | HL | |
| 1024 | 0622 A 22DF10 | | | LD | (LONGT),HL | |
| 1025 | 0625 A 7D | | | LD | A,L | |
| 1026 | 0626 A FE00 | | | CP | 00H | |
| 1027 | 0628 A 2006 | | | JR | NZ,ERVR-$ | |
| 1028 | 062A A 7C | | | LD | A,H | |
| 1029 | 062B A FE00 | | | CP | 00H | |
| 1030 | 062D A CA9703 | | | JP | Z,CTOT | |
| 1031 | 0630 A 3ADC10 | | ERVR: | LD | A,(CRCS) | ;INPUT FROM READ REGISTER 1 (SIO |
| 1032 | 0633 A E6E7 | | | AND | 0E7H | ;INSPECT RESIDUE,CRC, AND OVERRU |
| 1033 | 0635 A FE87 | | | CP | 87H | |
| 1034 | 0637 A 2033 | | | JR | NZ,YFLT-$ | ;IF FALSE GOTO YFLT |
| 1035 | 0639 A FDCBFFDE | | | SET | 3,(IY-01H) | ;ELSE INDICATE SYNC ACHEIVED |
| 1036 | 063D A DD7EF9 | | | LD | A,(IX-07H) | ;TEST IF SCANNER ISSUED THIS FRA |
| 1037 | 0640 A FE80 | | | CP | 80H | |
| 1038 | 0642 A 2018 | | | JR | NZ,ADDRT-$ | ;IF FALSE GOTO RESE |
| 1039 | 0644 A 3E01 | | | LD | A,01H | ;DISABLE EXT STATUS INT |
| 1040 | 0646 A D3E1 | | | OUT | (SIOAC),A | |
| 1041 | 0648 A 3E1A | | | LD | A,1AH | |
| 1042 | 064A A D3E1 | | | OUT | (SIOAC),A | |
| 1043 | 064C A 3E2C | | | LD | A,2CH | |
| 1044 | 064E A 3D | | FLGH | DEC | A | |
| 1045 | 064F A C24E06 | | | JP | NZ,FLGH | |
| 1046 | 0652 A 3E03 | | | LD | A,03H | |
| 1047 | 0654 A D3E1 | | | OUT | (SIOAC),A | |

| ERR LINE | ADDR S DATA REL | | | | |
|---|---|---|---|---|---|
| 1048 | 0656 A 3ED9 | | LD | A,0D9H | |
| 1049 | 0658 A D3E1 | | OUT | (SIOAC),A | |
| 1050 | 065A A 1818 | | JR | RESE-$ | |
| 1051 | 065C A FDCBFF66 | ADDRT | BIT | 4,(IY-01H) | ;ELSE TEST IF ADDR IS TO THIS R, |
| 1052 | 0660 A 2047 | | JR | NZ,FCMD-$ | ;IF TRUE GOTO FCMD |
| 1053 | 0662 A 3E01 | | LD | A,01H | ;DISABLE EXT/STATUS INT |
| 1054 | 0664 A D3E1 | | OUT | (SIOAC),A | |
| 1055 | 0666 A 3E1A | | LD | A,1AH | |
| 1056 | 0668 A D3E1 | | OUT | (SIOAC),A | |
| 1057 | 066A A 1818 | | JR | RESR-$ | |
| 1058 | 066C A FDCBFF9E | YFLT | RES | 3,(IY-01H) | ;INDICATE NO SYNC |
| 1059 | 0670 A FDCBFFA6 | | RES | 4,(IY-01H) | ;RESET ADDR INDICATOR BIT |
| 1060 | 0674 A 3E30 | RESE: | LD | A,30H | |
| 1061 | 0676 A D3E1 | | OUT | (SIOAC),A | |
| 1062 | 0678 A 215212 | REST: | LD | HL,RBUF | ;INITIALIZE PARAMETERS FOR RCVR |
| 1063 | 067B A 06FF | | LD | B,0FFH | |
| 1064 | 067D A 0EE0 | | LD | C,SIOAD | |
| 1065 | 067F A D9 | | EXX | | ;RESTORE REGISTERS |
| 1066 | 0680 A 08 | | EX | AF,AF' | ;RESTORE AC AND FLAG CONTENTS |
| 1067 | 0681 A FB | | EI | | ;ENABLE INTERRUPTS |
| 1068 | 0682 A ED4D | | RETI | | ;RETURN FROM INTERRUPT |
| 1069 | 0684 A DDCBFDCE | RESR: | SET | 1,(IX-03H) | ;INDICATE TIMER |
| 1070 | 0688 A 3E97 | | LD | A,97H | ;RESET CTC AS TIMER |
| 1071 | 068A A D3D3 | | OUT | (CTC3),A | |
| 1072 | 068C A 3AD710 | | LD | A,(FLAGC) | |
| 1073 | 068F A D3D3 | | OUT | (CTC3),A | |
| 1074 | 0691 A 3E01 | | LD | A,01H | ;DISABLE RCVR INT |
| 1075 | 0693 A D3E1 | | OUT | (SIOAC),A | |
| 1076 | 0695 A 3E00 | | LD | A,00H | |
| 1077 | 0697 A D3E1 | | OUT | (SIOAC),A | |
| 1078 | 0699 A 3E30 | | LD | A,30H | ;RESET EOM BIT |
| 1079 | 069B A D3E1 | | OUT | (SIOAC),A | |
| 1080 | 069D A DD46F2 | | LD | B,(IX-0EH) | ;COUNTER FOR XMITTER STUCK |
| 1081 | 06A0 A FDCB00F6 | | SET | 6,(IY-00H) | |
| 1082 | 06A4 A D9 | | EXX | | |
| 1083 | 06A5 A 08 | | EX | AF,AF' | |
| 1084 | 06A6 A FB | | EI | | |
| 1085 | 06A7 A ED4D | | RETI | | |
| 1086 | | ; | | | |
| 1087 | | ;FIND CMND TO GO TO | | | |
| 1088 | | ; | | | |
| 1089 | 06A9 A FDCBFFA6 | FCMD: | RES | 4,(IY-01H) | |
| 1090 | 06AD A 3A5212 | | LD | A,(COMD) | ;LOAD AC WITH THE COMMAND RCVED |
| 1091 | 06B0 A E60F | | AND | 0FH | ;MASK OUT CONTROL BITS IN COMMAI |
| 1092 | 06B2 A FE01 | | CP | CMND1 | ;COMPARE TO COMMAND 1 |
| 1093 | 06B4 A 280C | | JR | Z,CMD12-$ | ;IF TRUE GOTO CMD1 |
| 1094 | 06B6 A FE02 | | CP | CMND2 | ;COMPARE TO COMMAND 2 |
| 1095 | 06B8 A 2808 | | JR | Z,CMD12-$ | ;IF TRUE GOTO CMD2 |
| 1096 | 06BA A FE04 | | CP | CMND4 | ;COMPARE TO COMMAND 4 |
| 1097 | 06BC A CA600B | | JP | Z,CMD4 | ;IF TRUE GOTO CMD4 |
| 1098 | 06BF A C36C06 | | JP | YFLT | ;ELSE DECLARE A FAULT |
| 1099 | | ;************************************************ | | | |
| 1100 | | ;*COMMAND 1,2 ROUTINE * | | | |
| 1101 | | ;************************************************ | | | |
| 1102 | | | | | |
| 1103 | | ; | | | |
| 1104 | | ;TEST THAT THE PROPER NO. OF BYTES WERE RECEIVED | | | |
| 1105 | | ; | | | |
| 1106 | 06C2 A 3EFF | CMD12: | LD | A,0FFH | ;FIND THE NO. OF BYTES THAT WER |
| 1107 | 06C4 A 90 | | SUB | B | |
| 1108 | 06C5 A FD77EB | | LD | (IY-15H),A | ;STORE THE NO. OF BYTES RCVED A |
| 1109 | 06C8 A 3E00 | | LD | A,CLR | ;NO. OF WORD CNTER |
| 1110 | 06CA A FD4602 | | LD | B,(IY+02H) | ;LOAD B WITH THE MASK RCVED |
| 1111 | 06CD A 0E08 | | LD | C,08H | ;ITERATION CNTER |
| 1112 | 06CF A CB78 | INPB: | BIT | 7,B | ;FIND THE NO. OF 1'S IN THE MAS |

```
ERR LINE  ADDR S DATA     REL
     1113 06D1 A 2801                JR     Z,RMSK-$
     1114 06D3 A 3C                  INC    A
     1115 06D4 A CB00       RMSK:    RLC    B
     1116 06D6 A 0D                  DEC    C
     1117 06D7 A 20F6                JR     NZ,INFR-$
     1118 06D9 A CB07                RLC    A              ;FIND NO. OF OUTPUT DATA BYTES
     1119 06DB A C603                ADD    A,03H          ;ADD 4 FOR ADDR,CMND,MASK, AND
     1120 06DD A FDBEEB              CP     (IY-15H)       ;COMPARE NO. EXPECTED WITH THAT
     1121 06E0 A C26C06              JP     NZ,YFLT        ;IF ERROR GOTO RESE
     1122 06E3 A 3E30                LD     A,30H          ;RESET THE EOM BIT
     1123 06E5 A D3E1                OUT    (SIOAC),A
     1124                      ;
     1125                      ;DISABLE EXT/STATUS INT
     1126                      ;
     1127 06E7 A 3E01                LD     A,01H
     1128 06E9 A D3E1                OUT    (SIOAC),A
     1129 06EB A 3E1A                LD     A,1AH
     1130 06ED A D3E1                OUT    (SIOAC),A
     1131                      ;
     1132                      ;TURN COMM LED ON
     1133                      ;
     1134 06EF A 210020              LD     HL,COMM
     1135 06F2 A 3602                LD     (HL),02H
     1136                      ;
     1137                      ;REINITIALIZE COMMUNICATION COUNT
     1138                      ;
     1139 06F4 A DDCBF326            SLA    (IX-0DH)
     1140 06F8 A DDCBF416            RL     (IX-0CH)
     1141 06FC A DDCBF326            SLA    (IX-0DH)
     1142 0700 A DDCBF416            RL     (IX-0CH)
     1143 0704 A 2AE210              LD     HL,(INTER)
     1144 0707 A 22DF10              LD     (LONGT),HL
     1145 070A A 210000              LD     HL,00H
     1146 070D A 22E210              LD     (INTER),HL
     1147 0710 A DDCBF7E6            SET    4,(IX-09H)
     1148                      ;
     1149                      ;INSPECT FOR COMMAND 1 OR 2 AND TAKE ACTION
     1150                      ;
     1151 0714 A FD7E01              LD     A,(IY+01H)
     1152 0717 A E60F                AND    0FH
     1153 0719 A FE01                CP     01H
     1154 071B A C2A507              JP     NZ,CMD2        ;IF FALSE GOTO CMD2
     1155 071E A DDCBFDE6            SET    4,(IX-03H)     ;SET IMASK BIT
     1156 0722 A FDCB0166            BIT    4,(IY+01H)     ;TEST FOR SCANNER ISSUED ERROR
     1157 0726 A 2822                JR     Z,SLSF-$       ;IF FALSE GOTO SLSF
     1158 0728 A FDCBFF6E            BIT    5,(IY-01H)     ;TEST FOR BACKPLANE RESET
     1159 072C A 2807                JR     Z,NRST-$       ;IF FALSE GOTO NRST
     1160 072E A 210038              LD     HL,NMRES       ;ELSE RESET THE BACKPLANE
     1161 0731 A 3600                LD     (HL),00H
     1162 0733 A 1804                JR     PDT-$
     1163 0735 A FDCB00CE   NRST:    SET    1,(IY-00H)     ;LAST STATE
     1164 0739 A DDCBFDAE   PDT:     RES    5,(IX-03H)
     1165 073D A FDCBFF76            BIT    6,(IY-01H)     ;TEST FOR PRL
     1166 0741 A C28406              JP     NZ,RESR        ;IF TRUE GOTO RESR
     1167 0744 A FDCB009E            RES    3,(IY-00H)     ;ELSE RESET TIMEOUT
     1168 0748 A 1877                JR     STOT-$
     1169 074A A FDCB0176   SLSF:    BIT    6,(IY+01H)     ;STATE DECISION TEST
     1170 074E A 2825                JR     Z,NSTD-$       ;IF FALSE GOTO NSTD
     1171 0750 A FDCB005E            BIT    3,(IY-00H)     ;TEST FOR TIMEOUT
     1172 0754 A CA5E07              JP     Z,TRST         ;IF FALSE GOTO TRST
     1173 0757 A FDCBFF76            BIT    6,(IY-01H)     ;TEST FOR PRL
     1174 075B A C28406              JP     NZ,RESR
     1175 075E A FDCBFF6E   TRST     BIT    5,(IY-01H)     ;TEST FOR RESET
     1176 0762 A 2807                JR     Z,NRSZ-$       ;FALSE GOTO NRSZ
     1177 0764 A 210038              LD     HL,NMRES       ;ELSE RESET THE BACKPLANE
```

| ERR | LINE | ADDR S DATA | REL | | | | |
|---|---|---|---|---|---|---|---|
| | 1178 | 0767 A 3600 | | | LD | (HL),00H | |
| | 1179 | 0769 A 1804 | | | JR | NRSY-$ | |
| | 1180 | 076B A FDCB00CE | NRSZ: | | SET | 1,(IY-00H) | ;LAST STATE |
| | 1181 | 076F A FDCB009E | NRSY: | | RES | 3,(IY-00H) | |
| | 1182 | 0773 A 184C | | | JR | STOT-$ | |
| | 1183 | 0775 A FDCB005E | NSTD: | | BIT | 3,(IY-00H) | ;TEST FOR TIMEOUT |
| | 1184 | 0779 A 281F | | | JR | Z,NTIM-$ | ;IF FALSE GOTO NTIM |
| | 1185 | 077B A FDCBFF76 | | | BIT | 6,(IY-01H) | ;TEST FOR PRL |
| | 1186 | 077F A 2803 | | | JR | Z,TFS-$ | ;IF FALSE GOTO TFS |
| | 1187 | 0781 A C38406 | | | JP | RESR | |
| | 1188 | 0784 A DDCBFD6E | TFS: | | BIT | 5,(IX-03H) | ;TEST FOR FIRST |
| | 1189 | 0788 A 2006 | | | JR | NZ,DTIM-$ | ;IF FALSE GOT DTIM |
| | 1190 | 078A A DDCBFDEE | | | SET | 5,(IX-03H) | |
| | 1191 | 078E A 1831 | | | JR | STOT-$ | |
| | 1192 | 0790 A FDCB009E | DTIM: | | RES | 3,(IY-00H) | ;DELETE TIMEOUT |
| | 1193 | 0794 A DDCBFDAE | | | RES | 5,(IX-03H) | |
| | 1194 | 0798 A 1827 | | | JR | STOT-$ | |
| | 1195 | 079A A 210038 | NTIM: | | LD | HL,NMRES | ;RESET THE BACKPLANE |
| | 1196 | 079D A 3600 | | | LD | (HL),00H | |
| | 1197 | 079F A FDCB008E | | | RES | 1,(IY-00H) | ;NO LAST STATE |
| | 1198 | 07A3 A 181C | | | JR | STOT-$ | |
| | 1199 | 07A5 A FDCB005E | CMD2: | | BIT | 3,(IY-00H) | ;TEST FOR TIMEOUT |
| | 1200 | 07A9 A C28406 | | | JP | NZ,RESR | |
| | 1201 | 07AC A 210038 | | | LD | HL,NMRES | ;REMMOVE BACKPLANE RESET |
| | 1202 | 07AF A 3604 | | | LD | (HL),04H | |
| | 1203 | 07B1 A FDCB008E | | | RES | 1,(IY-00H) | ;RESET LAST STATE BIT |
| | 1204 | 07B5 A DDCBFDA6 | | | RES | 4,(IX-03H) | ;RESET IMASK BIT |
| | 1205 | 07B9 A DDCBFDAE | | | RES | 5,(IX-03H) | |
| | 1206 | 07BD A FDCB009E | | | RES | 3,(IY-00H) | |
| | 1207 | | | ; | | | |
| | 1208 | | | ;INSPECT FOR POWER UP | | | |
| | 1209 | | | ; | | | |
| | 1210 | 07C1 A DDCBFD5E | STOT: | | BIT | 3,(IX-03H) | |
| | 1211 | 07C5 A 201D | | | JR | NZ,PUP-$ | |
| | 1212 | 07C7 A DD34FA | | | INC | (IX-06H) | |
| | 1213 | 07CA A DD7EFA | | | LD | A,(IX-06H) | |
| | 1214 | 07CD A FE02 | | | CP | 02H | |
| | 1215 | 07CF A 2013 | | | JR | NZ,PUP-$ | |
| | 1216 | 07D1 A DDCBFDDE | | | SET | 3,(IX-03H) | |
| | 1217 | 07D5 A 3A0030 | | | LD | A,(BDSW) | |
| | 1218 | 07D8 A CB77 | | | BIT | 6,A | |
| | 1219 | 07DA A 2808 | | | JR | Z,PUP-$ | |
| | 1220 | 07DC A FDCBFFF6 | | | SET | 6,(IY-01H) | |
| | 1221 | 07E0 A DDCBF78E | | | RES | 1,(IX-09H) | |
| | 1222 | | | ; | | | |
| | 1223 | | | ;INSPECT FOR BACKPLANE FAULT | | | |
| | 1224 | | | ; | | | |
| | 1225 | 07E4 A FDCBFF7E | PUP: | | BIT | 7,(IY-01H) | ;TEST FOR BACKPLANE ERROR |
| | 1226 | 07E8 A 282E | | | JR | Z,TFIL-$ | ;IF FALSE GOTO TFIL |
| | 1227 | 07EA A DDCBF74E | | | BIT | 1,(IX-09H) | ;TEST FOR PUSHBUTTON RESTART |
| | 1228 | 07EE A CAF307 | | | JP | Z,PRLT3 | ;IF FALSE GOTO PRLT3 |
| | 1229 | 07F1 A 1807 | | | JR | BTA-$ | |
| | 1230 | 07F3 A FDCBFF76 | PRLT3: | | BIT | 6,(IY-01H) | ;ELSE TEST FOR PRL |
| | 1231 | 07F7 A C28406 | | | JP | NZ,RESR | ;IF TRUE GOTO RESR |
| | 1232 | 07FA A D9 | BTA: | | EXX | | ;ELSE EXCHANGE REGISTER BANKS |
| | 1233 | 07FB A 0A | | | LD | A,(BC) | ;LOAD DATA FROM OUTPUT TBL |
| | 1234 | 07FC A 2F | | | CPL | | ;COMPLEMENT AS BACK IS LO TRUE |
| | 1235 | 07FD A 77 | | | LD | (HL),A | ;OUTPUT TO BACKPLANE |
| | 1236 | 07FE A 3A0030 | | | LD | A,(BDSW) | ;INPUT BACKPLANE STATUS WORD |
| | 1237 | 0801 A CB7F | | | BIT | 7,A | ;TEST FOR ERROR |
| | 1238 | 0803 A 2804 | | | JR | Z,DOP-$ | ;IF FALSE GOTO DOP |
| | 1239 | 0805 A D9 | | | EXX | | ;EXCHANGE REGISTER BANKS |
| | 1240 | 0806 A C38406 | | | JP | RESR | |
| | 1241 | 0809 A FDCBFFBE | DOP: | | RES | 7,(IY-01H) | ;RESET BACKPLANE ERROR BIT |
| | 1242 | 080D A 314102 | | | LD | SP,INR | ;SET RETURN ADDRESS TO MAIN ROU |

```
ERR LINE  ADDR S DATA       REL
    1243  0810 A ED73FE13        LD      (RTR),SP
    1244  0814 A 31FE13          LD      SP,RTR
    1245  0817 A D9              EXX                     ;EXCHANGE REGISTER BANKS
    1246  0818 A DDCBFD7E  TFIL: BIT     7,(IX-03H)      ;TEST FOR BACKPLANE COUNT COMPL
    1247  081C A 2814            JR      Z,TTTT-$        ;IF FALSE GOTO TTTT
    1248  081E A DD7EF8          LD      A,(IX-08H)      ;ELSE LOAD AC WITH COUNT
    1249  0821 A FE00            CP      00H             ;TEST IF COMPLETE
    1250  0823 A 2805            JR      Z,TFLI-$        ;IF TRUE GOTO TFLI
    1251  0825 A DD35F8          DEC     (IX-08H)        ;ELSE DECREMENT COUNT
    1252  0828 A 1808            JR      TTTT-$
    1253  082A A FDCB00BE  TFLI: RES     7,(IY-00H)      ;RESET BACKPLANE TEST BIT
    1254  082E A DDCBFDBE        RES     7,(IX-03H)
    1255                         ;
    1256                         ;RELOAD WATCHDOG CONSTANTS
    1257                         ;
    1258  0832 A CD4F04    TTTT: CALL    WATR            ;RETRIGGER WATCHDOG
    1259  0835 A 3AE510          LD      A,(WATCH)       ;LOAD COMMUNICATIONS CONSTANTS
    1260  0838 A 32E410          LD      (WATCT),A
    1261                         ;
    1262                         ;TEST FOR IDLE LINK
    1263                         ;
    1264  083B A CDCE09          CALL    LINK
    1265                         ;
    1266                         ;ENABLE XMITTER
    1267                         ;
    1268  083E A CDBD09          CALL    XMTTER
    1269                         ;
    1270                         ;TEST IF A BT WRITE OCCURED PREVIOUS TO THIS COMMAND
    1271                         ;
    1272  0841 A DDCBFD46        BIT     0,(IX-03H)      ;TEST FOR BT WRITE DONE
    1273  0845 A C24F08          JP      NZ,CLEAR        ;IF TRUE GOTO CLEAR
    1274  0848 A DDCBEB46        BIT     0,(IX-15H)      ;TEST FOR BT WRITE ERROR
    1275  084C A CA6208          JP      Z,TBTR          ;IF FALSE GOTO TBTR
    1276  084F A 2A3112    CLEAR LD      HL,(BTRS)       ;ELSE CLEAR BT INHIBIT TABLE
    1277  0852 A 2611            LD      H,11H
    1278  0854 A 3600            LD      (HL),00H
    1279  0856 A DDCBFD86        RES     0,(IX-03H)      ;RESET BITS ASSOCIATED WITH XFE
    1280  085A A DDCBEB86        RES     0,(IX-15H)
    1281  085E A DDCBF7B6        RES     6,(IX-09H)      ;RESET BT PENDING
    1282                         ;
    1283                         ;INSPECT IF BT READ OCCURED ON THE PREVIOUS COMMAND TO THIS
    1284                         ;
    1285  0862 A FDCBFE56  TBTR: BIT     2,(IY-02H)
    1286  0866 A CA7408          JP      Z,STORE
    1287  0869 A 2A3112          LD      HL,(BTRS)
    1288  086C A 2611            LD      H,11H
    1289  086E A 3600            LD      (HL),00H
    1290  0870 A FDCBFE96        RES     2,(IY-02H)
    1291                         ;
    1292                         ;STORE THE OUTPUT DATA RCVED IN THE OUTPUT TABLE
    1293                         ;
    1294  0874 A 11C013    STORE LD      DE,OUTT         ;PNT. TO THE LSBYTE IN THE OUTF
    1295  0877 A 215412          LD      HL,RBUF+02H     ;PNT. TO THE LSBYTE IN
    1296  087A A FD4602          LD      B,(IY+02H)      ;LOAD B WITH MASK
    1297  087D A 0E08            LD      C,08H
    1298  087F A CB40      TDTA: BIT     0,B             ;TEST FOR DATA
    1299  0881 A 280F            JR      Z,ITER-$        ;NO DATA-GOTO ITER
    1300  0883 A 7E              LD      A,(HL)          ;LOAD AC WITH DATA
    1301  0884 A 12              LD      (DE),A          ;STORE ON INPUT TBL
    1302  0885 A 23              INC     HL              ;INC RBUF PNTER
    1303  0886 A 13              INC     DE              ;DEC OUTPUT TBL PNTER
    1304  0887 A 7E              LD      A,(HL)          ;LOAD AC WITH DATA
    1305  0888 A 12              LD      (DE),A          ;STORE ON INPUT TBL
    1306  0889 A 23              INC     HL              ;INC RBUF PNTER
    1307  088A A 13              INC     DE              ;DEC OUTPUT TBL PNTER
```

```
ERR LINE  ADDR S DATA       REL
 1308  088B A CB08              RRC    B
 1309  088D A 0D               DEC    C
 1310  088E A 20EF             JR     NZ,TDTA-$
 1311  0890 A 1807             JR     CASM-$
 1312  0892 A CB08     ITER:   RRC    B              ;INSPECT NEXT WORD OF DATA
 1313  0894 A 13               INC    DE
 1314  0895 A 13               INC    DE
 1315  0896 A 0D               DEC    C              ;TEST FOR NO. OF INTERATIONS
 1316  0897 A 20E6             JR     NZ,TDTA-$      ;
 1317                  ;
 1318                  ;ASSEMBLE CMND FOR REPLY
 1319                  ;
 1320  0899 A FDCB007E CASM:   BIT    7,(IY-00H)     ;TEST FOR BACKPLANE TEST
 1321  089D A C23309           JP     NZ,XFLGD       ;IF TRUE GOTO NBT
 1322  08A0 A FDCB017E         BIT    7,(IY+01H)     ;TEST FOR BLOCK XFER BUSY
 1323  08A4 A 2014             JR     NZ,NBTT-$      ;BLK XFER PENDING GOTO NBT
 1324  08A6 A DDCBF776         BIT    6,(IX-09H)     ;TEST IF BT PENDING
 1325  08AA A 2806             JR     Z,NBTP-$       ;IF FALSE GOTO NBTP
 1326  08AC A FDCBE2EE         SET    5,(IY-1EH)     ;ELSE REQUEST BT
 1327  08B0 A 1808             JR     NBTT-$
 1328  08B2 A 3A9B13   NBTP:   LD     A,(NBTQ)       ;LOAD WITH NO. OF BQUEUE ENTRIE
 1329  08B5 A FE00             CP     00H            ;TEST FOR NO. OF ENTRIES
 1330  08B7 A C48709           CALL   NZ,BTGET       ;IF NAVE ENTRIES CALL 1ST IN
 1331                  ;
 1332                  ;POSITION MASK PROPERLY
 1333                  ;
 1334  08BA A DDCBFD66 NBTT:   BIT    4,(IX-03H)
 1335  08BE A 2805             JR     Z,NFR-$
 1336  08C0 A 3A2F12           LD     A,(IMSK)
 1337  08C3 A 182D             JR     OPML-$
 1338  08C5 A 21D013   NFR:    LD     HL,INPT        ;PNT. TO INPUT TABLE
 1339  08C8 A 011000           LD     BC,0010H
 1340  08CB A 11F010           LD     DE,OLD
 1341  08CE A 1A       COMP:   LD     A,(DE)
 1342  08CF A EDA1             CPI
 1343  08D1 A 2804             JR     Z,POTT-$
 1344  08D3 A FDCBFDC6         SET    0,(IY-03H)
 1345  08D7 A CB43     POTT:   BIT    0,E
 1346  08D9 A 13               INC    DE
 1347  08DA A 28F2             JR     Z,COMP-$
 1348  08DC A FDCBFD0E         RRC    (IY-03H)
 1349  08E0 A 3E00             LD     A,00H
 1350  08E2 A B9               CP     C
 1351  08E3 A 20E9             JR     NZ,COMP-$
 1352                  ;OBTAIN PROTER MASK
 1353                  ;
 1354  08E5 A 3A4E12   OPMK:   LD     A,(MASK)       ;LOAD AC WITH MASK
 1355  08E8 A FDB6FB           OR     (IY-05H)       ;INCLUDE REFRESH BIT
 1356  08EB A FDCBFB0E         RRC    (IY-05H)       ;ROTATE REFRESH RIGHT
 1357  08EF A FDA6DE           AND    (IY-22H)       ;AND IN MASK POSSIBLE
 1358  08F2 A FD77FD   OPML:   LD     (IY-03H),A     ;STORE MASK
 1359                  ;
 1360                  ;STORE DATA IN OLD BUFFER
 1361                  ;
 1362  08F5 A 11F010           LD     DE,OLD
 1363  08F8 A 21D013           LD     HL,INPT
 1364  08FB A 011000           LD     BC,0010H
 1365  08FE A EDB0             LDIR
 1366                  ;
 1367                  ;LOAD DATA IN XMIT BUFFER ACCORDING TO MASK
 1368                  ;
 1369  0900 A 0E08     LDTA:   LD     C,08H          ;
 1370  0902 A 21D013           LD     HL,INPT        ;PNT. TO INPUT TABLE
 1371  0905 A 11EA12           LD     DE,XBUF+02H    ;PNT. TO XMIT BUFFER
 1372  0908 A FDCBFD46 TFDT:   BIT    0,(IY-03H)     ;TEST LSB OF MASK
```

| ERR | LINE | ADDR S DATA | REL | | | |
|---|---|---|---|---|---|---|
| | 1373 | 090C A 280A | | JR | Z,ROTC-$ | ;NO CHABGED DATA GOTO ROTC |
| | 1374 | 090E A 7E | | LD | A,(HL)- | ;LOAD AC WITH INPUT DATA |
| | 1375 | 090F A 12 | | LD | (DE),A | ;LOAD DATA IN XMIT BUFFER |
| | 1376 | 0910 A 23 | | INC | HL | ;INC. INPUT TBL PNTER |
| | 1377 | 0911 A 13 | | INC | DE | ;INC. XMIT BUFFER PNTER |
| | 1378 | 0912 A 7E | | LD | A,(HL) | ;LOAD AC WITH INPUT DATA |
| | 1379 | 0913 A 12 | | LD | (DE),A | ;LOAD DATA IN XMIT BUFFER |
| | 1380 | 0914 A 23 | | INC | HL | |
| | 1381 | 0915 A 13 | | INC | DE | |
| | 1382 | 0916 A 1802 | | JR | ROTD-$ | ; |
| | 1383 | 0918 A 23 | ROTC: | INC | HL | |
| | 1384 | 0919 A 23 | | INC | HL | |
| | 1385 | 091A A FDCBFD0E | ROTD: | RRC | (IY-03H) | ;ROTATE MASK RIGHT |
| | 1386 | 091E A 0D | | DEC | C | ;DEC MASK COUNT |
| | 1387 | 091F A 20E7 | | JR | NZ,TFDT-$ | ;JP OF ALL SLOTS NOT CONSIDERED |
| | 1388 | 0921 A FDCBE26E | | BIT | 5,(IY-1EH) | ;INSPECT FOR BLOCK LOAD |
| | 1389 | 0925 A 2812 | | JR | Z,LCMD-$ | ;NO BT GOTO LAMD |
| | 1390 | 0927 A 3A3612 | | LD | A,(BTAS) | ;LAAD AC WITH BTAS |
| | 1391 | 092A A 12 | | LD | (DE),A | ;LOAD XMIT BUFFEER WITH ADDRESS |
| | 1392 | 092B A 13 | | INC | DE | ;INCREMENT PNTER |
| | 1393 | 092C A 3A3512 | | LD | A,(BTSW) | ;LOAD AC WITH STATUS WORD |
| | 1394 | 092F A 12 | | LD | (DE),A | ;LOAD XMIT BUFFER WITH S.WORD |
| | 1395 | 0930 A C33909 | | JP | LCMD | |
| | 1396 | | | ; | | |
| | 1397 | | | ;ENABLE XMITTER | | |
| | 1398 | | | ; | | |
| | 1399 | 0933 A 3E53 | XFLGD | LD | A,53H | |
| | 1400 | 0935 A 3D | XFLAG | DEC | A | |
| | 1401 | 0936 A C23509 | | JP | NZ,XFLAG | |
| | 1402 | | | ; | | |
| | 1403 | | | ;LAD CMND AND MASK IN XMIT BUFFER | | |
| | 1404 | | | ; | | |
| | 1405 | 0939 A 11E812 | LCMD: | LD | DE,XBUF | ;PNT TO XMIT BUFFER |
| | 1406 | 093C A 3A3312 | | LD | A,(CMDR) | |
| | 1407 | 093F A 12 | | LD | (DE),A | ;LOAD XMITN BUFFER WITH MASK |
| | 1408 | 0940 A 13 | | INC | DE | ;INC XMIT BUFFER PNTER |
| | 1409 | 0941 A 3A4E12 | | LD | A,(MASK) | ;LOAD AC WITH MASK |
| | 1410 | 0944 A 12 | | LD | (DE),A | ;LOAD XMIT BUFFER WITH MASK |
| | 1411 | | | ; | | |
| | 1412 | | | ;INITIALIZE PARAMETERS | | |
| | 1413 | | | ; | | |
| | 1414 | 0945 A 3E00 | | LD | A,CLR | ;NO OF WORD CNTER |
| | 1415 | 0947 A FD46FD | | LD | B,(IY-03H) | ;LOAD B WITH MASK |
| | 1416 | 094A A 0E08 | | LD | C,08H | ;ITERATION CNTER |
| | 1417 | 094C A CB78 | INPC: | BIT | 7,B | ;TEST FOR 1 IN MASK |
| | 1418 | 094E A 2801 | | JR | Z,SMSK-$ | ;NO 1 GOTO SMSK |
| | 1419 | 0950 A 3C | | INC | A | |
| | 1420 | 0951 A CB00 | SMSK: | RLC | B | ;DEC ITERATIION CNTER |
| | 1421 | 0953 A 0D | | DEC | C | ;DEC ITERATION CNTER |
| | 1422 | 0954 A 20F6 | | JR | NZ,INPC-$ | ;GOTO INPC IF NOT DONE |
| | 1423 | 0956 A CB07 | | RLC | A | |
| | 1424 | 0958 A FDCBE26E | | BIT | 5,(IY-1EH) | ;TEST OFR BLCK XFER |
| | 1425 | 095C A 2802 | | JR | Z,FBCT-$ | ;NO BLCK XFER GOTO FBCT |
| | 1426 | 095E A C602 | | ADD | A,02H | ;ADD 2 FOR BT PARAMETERS |
| | 1427 | 0960 A C602 | FBCT: | ADD | A,02H | ;ADD 5 FOR BASIC CMND |
| | 1428 | 0962 A 47 | | LD | B,A | |
| | 1429 | 0963 A 0EE0 | | LD | C,SIOAD | |
| | 1430 | 0965 A FDCBE2AE | | RES | 5,(IY-1EH) | |
| | 1431 | 0969 A FD36FD00 | | LD | (IY-03H),00H | ;CLEAR MASK LOCATION |
| | 1432 | | | ; | | |
| | 1433 | | | ;SET UP INT. LOCATION FOR NORMAL XFER | | |
| | 1434 | | | ; | | |
| | 1435 | 096D A 215505 | RCRD: | LD | HL,NXMT | |
| | 1436 | 0970 A 229811 | | LD | (SIOTA),HL | |
| | 1437 | | | ; | | |

```
ERR LINE  ADDR S DATA      REL
    1438                        ;RESET XMIT CRC GENERATOR
    1439                        ;
    1440  0973 A 3E80           RCRC:   LD      A,80H           ;RESET CRC GEN. COMMAND
    1441  0975 A D3E1                   OUT     (SIOAC),A
    1442                        ;
    1443                        ;LOAD 1ST BYTE TO SIO & RESET UNDER/EOM BIT
    1444                        ;
    1445  0977 A 21E812                 LD      HL,XBUF
    1446  097A A 3E80                   LD      A,80H
    1447  097C A D3E0                   OUT     (SIOAD),A
    1448  097E A 3EC0                   LD      A,0C0H
    1449  0980 A D3E1                   OUT     (SIOAC),A
    1450                        ;
    1451                        ;RETURN TO MAIN PROGRAM
    1452                        ;
    1453  0982 A D9                     EXX
    1454  0983 A 08                     EX      AF,AF'
    1455  0984 A FB                     EI
    1456  0985 A ED4D                   RETI
    1457
    1458                        ;BTGET ROUTINE
    1459                        ;
    1460                        ;
    1461                        ;
    1462  0987 A E5             BTGET:  PUSH    HL              ;SAAVE HL STATUS
    1463  0988 A FDCBE2EE               SET     5,(IY-1EH)
    1464  098C A DDCBF7F6               SET     6,(IX-09H)
    1465  0990 A 2A9C13                 LD      HL,(HBTQ)       ;HL PNTS TO HEAD BTQ
    1466  0993 A 7E                     LD      A,(HL)          ;LOAD AC WIH DATA AT HEAD
    1467  0994 A 323612                 LD      (BTAS),A        ;LOAD INCS WITH SLT ADDR
    1468  0997 A E60F                   AND     0FH             ;FIND SLOT NO.
    1469  0999 A 323112                 LD      (BTRS),A        ;STORE LOW BYTE
    1470  099C A 23                     INC     HL              ;INC HEAD PNT.
    1471  099D A 7E                     LD      A,(HL)          ;LOAD AC WITH STAT. WORD
    1472  099E A 323512                 LD      (BTSW),A        ;STORE STAT. WORD AT BTSW
    1473  09A1 A 23                     INC     HL              ;INC HEAD
    1474  09A2 A 3A9A13                 LD      A,(MBTQ)        ;LOAD AC WITH MAX LOW BYTE
    1475  09A5 A BD                     CP      L               ;COMPARE WITH LOW BYTE OF PNT
    1476  09A6 A 2003                   JR      NZ,CNMM-$       ;IF NOT ZERO GOTO CNMM
    1477  09A8 A 21A013                 LD      HL,BTQ          ;IF ZERO PNT AT Q BEGINNING
    1478  09AB A 3A9B13         CNMM:   LD      A,(NBTQ)        ;LOAD AC WITH NO. OF CHAR
    1479  09AE A 3D                     DEC     A               ;DEC NO OF CAHR
    1480  09AF A 329B13                 LD      (NBTQ),A        ;RESTORE NO. OF CHAR
    1481  09B2 A 229C13                 LD      (HBTQ),HL       ;RESTORE HEAD
    1482  09B5 A 2A3112                 LD      HL,(BTRS)
    1483  09B8 A 22D810                 LD      (DELD),HL
    1484  09BB A E1                     POP     HL              ;RESTORE ORIG HL TATUS
    1485  09BC A C9                     RET                     ;GOTO PROGRAM CALLING
    1486                        ;ENABLE XMITTER
    1487                        ;
    1488                        ;
    1489                        ;
    1490  09BD A 3E05           XMTTER  LD      A,05H
    1491  09BF A D3E1                   OUT     (SIOAC),A
    1492  09C1 A 3E6B                   LD      A,6BH
    1493  09C3 A D3E1                   OUT     (SIOAC),A
    1494  09C5 A DDCBF7FE               SET     7,(IX-09H)
    1495  09C9 A FDCB00F6               SET     6,(IY-00H)
    1496  09CD A C9                     RET
    1497                        ;TEST FOR IDLE LINK ROUTINE
    1498                        ;
    1499                        ;
    1500                        ;
    1501  09CE A DBE1           LINK    IN      A,(SIOAC)       ;TEST FOR FLAGS
    1502  09D0 A CB67                   BIT     4,A
```

| ERR | LINE | ADDR S | DATA | REL | | | | |
|---|---|---|---|---|---|---|---|---|
| | 1503 | 09D2 A | 2040 | | | JR | NZ,RRCVD-$ | ;IF NONE GOTO RRCVD |
| | 1504 | 09D4 A | DD46F2 | | | LD | B,(IX-0EH) | ;COUNTER FOR XMITTER STUCK |
| | 1505 | 09D7 A | 3E13 | | FLAGS | LD | A,13H | ;ENTER HUNT MODE |
| | 1506 | 09D9 A | D3E1 | | | OUT | (SIOAC),A | |
| | 1507 | 09DB A | 3ED9 | | | LD | A,0D9H | |
| | 1508 | 09DD A | D3E1 | | | OUT | (SIOAC),A | |
| | 1509 | 09DF A | 3E10 | | | LD | A,10H | ;RESET EXT STATUS BITS |
| | 1510 | 09E1 A | D3E1 | | | OUT | (SIOAC),A | |
| | 1511 | 09E3 A | D3E1 | | | OUT | (SIOAC),A | |
| | 1512 | 09E5 A | D3E1 | | | OUT | (SIOAC),A | |
| | 1513 | 09E7 A | 3AEB10 | | | LD | A,(FLAGD) | ;DELAY FOR 2 FLAG TIMES |
| | 1514 | 09EA A | 3D | | FLAGW | DEC | A | |
| | 1515 | 09EB A | 20FD | | | JR | NZ,FLAGW-$ | |
| | 1516 | 09ED A | 05 | | | DEC | B | ;TEST FOR XMITTER STUCK |
| | 1517 | 09EE A | 201E | | | JR | NZ,FLAGT-$ | ;IF TRUE GOTO CTOT |
| | 1518 | 09F0 A | DBE0 | | | IN | A,(SIOAD) | |
| | 1519 | 09F2 A | DBE0 | | | IN | A,(SIOAD) | ;FLUSH BUFFER |
| | 1520 | 09F4 A | DBE0 | | | IN | A,(SIOAD) | |
| | 1521 | 09F6 A | FDCBFF9E | | | RES | 3,(IY-01H) | ;RESET SYNC BIT |
| | 1522 | 09FA A | 3E01 | | | LD | A,01H | ;ENABLE EXT STATUS INT |
| | 1523 | 09FC A | D3E1 | | | OUT | (SIOAC),A | |
| | 1524 | 09FE A | 3E1B | | | LD | A,1BH | |
| | 1525 | 0A00 A | D3E1 | | | OUT | (SIOAC),A | |
| | 1526 | 0A02 A | 3E10 | | | LD | A,10H | |
| | 1527 | 0A04 A | D3E1 | | | OUT | (SIOAC),A | |
| | 1528 | 0A06 A | D3E1 | | | OUT | (SIOAC),A | |
| | 1529 | 0A08 A | D3E1 | | | OUT | (SIOAC),A | |
| | 1530 | 0A0A A | E1 | | | POP | HL | ;POSITION STACK POINTER |
| | 1531 | 0A0B A | C37406 | | | JP | RESE | |
| | 1532 | 0A0E A | DBE1 | | FLAGT | IN | A,(SIOAC) | ;TEST FOR FLAGS |
| | 1533 | 0A10 A | CB67 | | | BIT | 4,A | |
| | 1534 | 0A12 A | 28C3 | | | JR | Z,FLAGS-$ | ;IF TRUE GOTO FLAGS |
| | 1535 | 0A14 A | 3E33 | | RRCVD | LD | A,33H | ;DISABLE RCVR |
| | 1536 | 0A16 A | D3E1 | | | OUT | (SIOAC),A | |
| | 1537 | 0A18 A | 3E00 | | | LD | A,00H | |
| | 1538 | 0A1A A | D3E1 | | | OUT | (SIOAC),A | |
| | 1539 | 0A1C A | DBE0 | | | IN | A,(SIOAD) | ;FLUSH BUFFER |
| | 1540 | 0A1E A | DBE0 | | | IN | A,(SIOAD) | |
| | 1541 | 0A20 A | DBE0 | | | IN | A,(SIOAD) | |
| | 1542 | 0A22 A | DBE0 | | | IN | A,(SIOAD) | |
| | 1543 | 0A24 A | C9 | | | RET | | |
| | 1544 | | | | ;COMMAND 03 ROUTINE | | | |
| | 1545 | | | | ; | | | |
| | 1546 | 0A25 A | FDCB008E | | CMD3: | RES | 1,(IY-00H) | ;ALLOW WRITING TO BACKPLANE |
| | 1547 | 0A29 A | 3ADC10 | | | LD | A,(CRCS) | ;INSPECT CRC,OVERRUN,RESIDUE |
| | 1548 | 0A2C A | E6E7 | | | AND | 0E7H | |
| | 1549 | 0A2E A | FE87 | | | CP | 87H | |
| | 1550 | 0A30 A | C2EB0A | | | JP | NZ,CER | ;IF FALSE GOTO CER |
| | 1551 | 0A33 A | FDCB017E | | | BIT | 7,(IY+01H) | ;TEST IF PC DID VALID XFER |
| | 1552 | 0A37 A | CA5A0A | | | JP | Z,ERIN | ;IF TRUE GOTO ERIN |
| | 1553 | | | | ; | | | |
| | 1554 | | | | ;INVALID XFER AT PC END | | | |
| | 1555 | | | | ; | | | |
| | 1556 | 0A3A A | 3EFF | | | LD | A,0FFH | ;DO BYTE COUNT |
| | 1557 | 0A3C A | 90 | | | SUB | B | |
| | 1558 | 0A3D A | FE02 | | | CP | 02H | |
| | 1559 | 0A3F A | C26C06 | | | JP | NZ,YFLT | ;IF FALSE GOTO YFLT |
| | 1560 | 0A42 A | DDCBEB46 | | | BIT | 0,(IX-15H) | ;TEST FOR BT WRITE ERROR |
| | 1561 | 0A46 A | C2240B | | | JP | NZ,GLOAD | ;IF TRUE GOTO GLOAD |
| | 1562 | 0A49 A | DDCBEBC6 | | | SET | 0,(IX-15H) | ;INDICATE ERROR |
| | 1563 | 0A4D A | ED5B3112 | | | LD | DE,(BTRS) | ;PNT TO MODULE |
| | 1564 | 0A51 A | 3E00 | | | LD | A,00H | |
| | 1565 | 0A53 A | 12 | | | LD | (DE),A | ;FAULT OUT MODULE |
| | 1566 | 0A54 A | CD540B | | | CALL | RTBL | ;REINITIALIZE PARAMETERS |

| ERR | LINE | ADDR S DATA | REL | | | | |
|---|---|---|---|---|---|---|---|
| | 1567 | 0A57 A C3240B | | | JP | GLOAD | ;RETURN NO ERROR TO SCANNER |
| | 1568 | | | ; | | | |
| | 1569 | | | ;VALID CRC INSPECT FOR XFER TO MODULE | | | |
| | 1570 | | | ; | | | |
| | 1571 | 0A5A A DDCBEB46 | | ERIN | BIT | 0,(IX-15H) | ;TEST FOR BT WRITE ERROR |
| | 1572 | 0A5E A CA7B0A | | | JP | Z,VXFER | ;IF FALSE GOTO VXFER |
| | 1573 | 0A61 A CD540B | | | CALL | RTBL | ;REINITIALIZE PARAMETERS |
| | 1574 | 0A64 A 3A3512 | | | LD | A,(BTSW) | ;FIND NO. OF BYTES EXPECTED |
| | 1575 | 0A67 A E63F | | | AND | 3FH | |
| | 1576 | 0A69 A 07 | | | RLCA | | |
| | 1577 | 0A6A A C603 | | | ADD | A,03H | |
| | 1578 | 0A6C A FD77EB | | | LD | (IY-15H),A | ;STORE EXPECTED BYTES |
| | 1579 | 0A6F A 3EFF | | | LD | A,0FFH | ;FIND NO. OF BYTES RCVD |
| | 1580 | 0A71 A 90 | | | SUB | B | |
| | 1581 | 0A72 A FDBEEB | | | CP | (IY-15H) | ;TEST FOR PROPER NO OF BYTES |
| | 1582 | 0A75 A C26C06 | | | JP | NZ,YFLT | ;IF FALSE GOTO YFLT |
| | 1583 | 0A78 A C3180B | | | JP | BLOAD | ;REPLY INDICATING ERROR |
| | 1584 | | | ; | | | |
| | 1585 | | | ;DO BYTE COUNT | | | |
| | 1586 | | | ; | | | |
| | 1587 | 0A7B A DDCBFD46 | | VXFER | BIT | 0,(IX-03H) | ;TEST FOR BT DONE |
| | 1588 | 0A7F A C2A70A | | | JP | NZ,BTDON | ;IF TRUE GOTO BT DONE |
| | 1589 | 0A82 A 7D | | | LD | A,L | ;FIND NO OF BYTES DONE\ |
| | 1590 | 0A83 A D652 | | | SUB | 52H | |
| | 1591 | 0A85 A FD77EB | | | LD | (IY-15H),A | ;STORE NO OF BYTES |
| | 1592 | 0A88 A 3A3512 | | | LD | A,(BTSW) | ;FIND NO OF BYTES EXPECTED |
| | 1593 | 0A8B A E63F | | | AND | 3FH | |
| | 1594 | 0A8D A CB07 | | | RLC | A | |
| | 1595 | 0A8F A C603 | | | ADD | A,03H | |
| | 1596 | 0A91 A FDBEEB | | | CP | (IY-15H) | ;TEST FOR PROPER NO RCVD |
| | 1597 | 0A94 A CABF0A | | | JP | Z,CSUM | ;IF TRUE GOTO CSUM |
| | 1598 | 0A97 A 3E5C | | | LD | A,5CH | ;LOOP SO MODULE FAULTS |
| | 1599 | 0A99 A 3D | | DFLT | DEC | A | |
| | 1600 | 0A9A A C2990A | | | JP | NZ,DFLT | |
| | 1601 | 0A9D A DDCBEBC6 | | | SET | 0,(IX-15H) | ;INDICATE BT WRITE ERROR |
| | 1602 | 0AA1 A CD540B | | | CALL | RTBL | ;REINITIALIZE PARAMETERS |
| | 1603 | 0AA4 A C36C06 | | | JP | YFLT | |
| | 1604 | 0AA7 A 3EFF | | BTDON | LD | A,0FFH | ;FIND NO. OF BYTES RCVD |
| | 1605 | 0AA9 A 90 | | | SUB | B | |
| | 1606 | 0AAA A FD77EB | | | LD | (IY-15H),A | ;STORE NO. OF BYTES |
| | 1607 | 0AAD A 3A3512 | | | LD | A,(BTSW) | ;FIND NO BYTES EXPECTED |
| | 1608 | 0AB0 A E63F | | | AND | 3FH | |
| | 1609 | 0AB2 A CB07 | | | RLC | A | |
| | 1610 | 0AB4 A C603 | | | ADD | A,03H | |
| | 1611 | 0AB6 A FDBEEB | | | CP | (IY-15H) | ;TEST FOR PROPER NO BYTES |
| | 1612 | 0AB9 A C26C06 | | | JP | NZ,YFLT | ;IF FALSE GOTO YFLT |
| | 1613 | 0ABC A C3240B | | | JP | GLOAD | ;ELSE GOTO BLOAD |
| | 1614 | | | ; | | | |
| | 1615 | | | ;DO CHECKSUM EXCHANGE & VERIFY | | | |
| | 1616 | | | ; | | | |
| | 1617 | 0ABF A CD540B | | CSUM | CALL | RTBL | ;REINITIALIZE PARAMETERS |
| | 1618 | 0AC2 A FD7EF6 | | | LD | A,(IY-0AH) | ;OUTPUT CHECKSUM |
| | 1619 | 0AC5 A 12 | | | LD | (DE),A | |
| | 1620 | 0AC6 A 3E15 | | | LD | A,15H | ;DELAY TO INPUT CHECKSUM |
| | 1621 | 0AC8 A 3D | | TIME | DEC | A | |
| | 1622 | 0AC9 A C2C80A | | | JP | NZ,TIME | |
| | 1623 | 0ACC A 1A | | | LD | A,(DE) | ;INPUT CHECKSUM |
| | 1624 | 0ACD A FDBEF6 | | | CP | (IY-0AH) | ;COMPARE FOR PROPER XFER |
| | 1625 | 0AD0 A C2DF0A | | | JP | NZ,CERR | ;IF FALSE GOTO CERR |
| | 1626 | 0AD3 A DDCBFDC6 | | | SET | 0,(IX-03H) | ;ELSE SET BT DONE |
| | 1627 | 0AD7 A 3E00 | | | LD | A,00H | ;RESET CHECKSUM |
| | 1628 | 0AD9 A FD77F6 | | | LD | (IY-0AH),A | |
| | 1629 | 0ADC A C3240B | | | JP | GLOAD | ;RETURN WITH NO ERROR |
| | 1630 | 0ADF A DDCBEBC6 | | CERR | SET | 0,(IX-15H) | ;SET BT ERROR |
| | 1631 | 0AE3 A 3E00 | | | LD | A,00H | ;RESET CHECKSUM |

```
ERR LINE  ADDR S DATA     REL
1632 0AE5 A FD77F6             LD     (IY-0AH),A
1633 0AE8 A C3180B             JP     BLOAD           ;RETURN WITH ERROR
1634                       ;
1635                       ;COMMUNICATIONS ERROR IS FOUND
1636                       ;
1637 0AEB A DDCBFD46    CER    BIT    0,(IX-03H)      ;TEST FOR BT DONE
1638 0AEF A C26C06             JP     NZ,YFLT         ;IF TRUE GOTO YFLT
1639 0AF2 A FDCB017E           BIT    7,(IY+01H)      ;TEST FOR PC XFER FAULT
1640 0AF6 A C26C06             JP     NZ,YFLT         ;IF TRUE GOTO YFLT
1641 0AF9 A DDCBEB46           BIT    0,(IX-15H)      ;TEST FOR BT WRITE FAULT
1642 0AFD A C26C06             JP     NZ,YFLT         ;IF TRUE GOTO YFLT
1643 0B00 A FD7EF6             LD     A,(IY-0AH)      ;GET CHECKSUM
1644 0B03 A 2F                 CPL
1645 0B04 A 12                 LD     (DE),A          ;OUTPUT BAD CHECKSUM TO BACKPLA
1646 0B05 A 3E15               LD     A,15H           ;DELAY TO READ CHECKSUM
1647 0B07 A 3D          TIMO   DEC    A
1648 0B08 A C2070B             JP     NZ,TIMO
1649 0B0B A 1A                 LD     A,(DE)          ;INPUT CHECKSUM
1650 0B0C A DDCBEBC6           SET    0,(IX-15H)      ;SET BT WRITE ERROR BIT
1651 0B10 A 3E00               LD     A,00H           ;CLEAR CHECKSUM
1652 0B12 A FD77F6             LD     (IY-0AH),A
1653 0B15 A C36C06             JP     YFLT
1654                       ;
1655                       ;
1656                       ;LOAD XMIT BUFFER WITH COMMAND WITH ERROR BIT SET
1657                       ;
1658 0B18 A 21E812    BLOAD    LD     HL,XBUF
1659 0B1B A 3683               LD     (HL),83H
1660 0B1D A DDCBEBC6           SET    0,(IX-15H)
1661 0B21 A C3290B             JP     LXBF
1662                       ;
1663                       ;LOAD XMIT BUFFER WITH COMMAND WITH ERROR BIT RESET
1664                       ;
1665 0B24 A 21E812    GLOAD    LD     HL,XBUF
1666 0B27 A 3603               LD     (HL),03H
1667                       ;
1668                       ;DISABLE EXT/STATUS INT
1669                       ;
1670 0B29 A 3E01      LXBF     LD     A,01H
1671 0B2B A D3E1               OUT    (SIOAC),A
1672 0B2D A 3E1A               LD     A,1AH
1673 0B2F A D3E1               OUT    (SIOAC),A
1674                       ;
1675                       ;RETRIGGER WATCHDOG
1676                       ;
1677 0B31 A CD4F04             CALL   WATR
1678 0B34 A 3AE510             LD     A,(WATCH)
1679 0B37 A 32E410             LD     (WATCT),A
1680                       ;
1681                       ;TEST FOR XMITTER OFF LINK AND ENABLE XMITTER
1682                       ;
1683 0B3A A CDCE09             CALL   LINK
1684                       ;
1685                       ;DELAY BEFORE TURNING ON XMITTER
1686                       ;
1687 0B3D A 3E81               LD     A,81H
1688 0B3F A 3D          LDLY   DEC    A
1689 0B40 A C23F0B             JP     NZ,LDLY
1690                       ;
1691                       ;ENABLE XMITTER
1692                       ;
1693 0B43 A CDBD09             CALL   XMTTER
1694                       ;
1695                       ;FLAG DELAY
1696                       ;
```

```
ERR LINE  ADDR S DATA    REL
   1697  0B46 A 3E85               LD      A,85H
   1698  0B48 A 3D       FLAGE     DEC     A
   1699  0B49 A 20FD               JR      NZ,FLAGE-$
   1700                  ;
   1701                  ;INITIALIZE PARAMETERS
   1702                  ;
   1703  0B4B A FDCBFFA6           RES     4,(IY-01H)      ;RESET ADDR FOUNT BIT
   1704  0B4F A 0601               LD      B,01H
   1705  0B51 A C36D09             JP      RCRD
   1706                  ;SUBROUTINE TO RELOAD CONSTANTS FOR FUTURE BLOCK XFERS
   1707                  ;
   1708                  ;
   1709                  ;
   1710  0B54 A 214512   RTBL      LD      HL,XFERC
   1711  0B57 A 3602               LD      (HL),02H
   1712  0B59 A 23                 INC     HL
   1713  0B5A A 3600               LD      (HL),00H
   1714  0B5C A 23                 INC     HL
   1715  0B5D A 3600               LD      (HL),00H
   1716  0B5F A C9                 RET
   1717                  ;************************************************
   1718                  ;*COMMAND 4 ROUTINE                              *
   1719                  ;************************************************
   1720                  ;
   1721                  ;TEST FOR PROPER NO. OF BYTES RECEIVED
   1722                  ;
   1723  0B60 A 3EFF     CMD4:     LD      A,0FFH          ;FIND NO. OF BYTES RECEIVED
   1724  0B62 A 90                 SUB     B
   1725  0B63 A FE02               CP      02H             ;TEST FOR PROPER NO. OF BYTES
   1726  0B65 A C26C06             JP      NZ,YFLT         ;IF FALSE GOTO ECNT
   1727                  ;
   1728                  ;DISABLE EXT/STATUS INT
   1729                  ;
   1730  0B68 A 3E01               LD      A,01H
   1731  0B6A A D3E1               OUT     (SIOAC),A
   1732  0B6C A 3E1A               LD      A,1AH
   1733  0B6E A D3E1               OUT     (SIOAC),A
   1734                  ;
   1735                  ;RETRIGGER WATCHDOG
   1736                  ;
   1737  0B70 A CD4F04             CALL    WATR
   1738  0B73 A 3AE510             LD      A,(WATCH)
   1739  0B76 A 32E410             LD      (WATCT),A
   1740                  ;
   1741                  ;TEST FOR IDLE LINK AND ENABLE XMITTER
   1742                  ;
   1743  0B79 A CDCE09             CALL    LINK
   1744                  ;
   1745                  ;LINK DELAY
   1746                  ;
   1747  0B7C A 3E81               LD      A,81H
   1748  0B7E A 3D       DLYL      DEC     A
   1749  0B7F A C27E0B             JP      NZ,DLYL
   1750                  ;
   1751                  ;XMITTER ENABLE
   1752                  ;
   1753  0B82 A CDBD09             CALL    XMTTER
   1754                  ;
   1755                  ;XMITTER DELAY
   1756                  ;
   1757  0B85 A 3E9B               LD      A,9BH
   1758  0B87 A 3D       XMDL:     DEC     A
   1759  0B88 A C2870B             JP      NZ,XMDL
   1760                  ;
   1761                  ;TEST FOR 1ST OR 2ND TRY & INITIALIZE PARAMETERS ACCORDINGLY
```

```
ERR LINE  ADDR S DATA        REL
    1762                          ;
    1763  0B8B A FDCBFE56           BIT    2,(IY-02H)     ;TEST FOR 2ND TRY
    1764  0B8F A 2019               JR     NZ,STRY-$      ;IF TRUE GOTO STRY
    1765  0B91 A 3A3512             LD     A,(BTSW)       ;ELSE FIND NO. OF BT BYTES
    1766  0B94 A E63F               AND    3FH
    1767  0B96 A CB07               RLC    A
    1768  0B98 A C601               ADD    A,01H          ;INCLUDE CHECKSUM
    1769  0B9A A 47                 LD     B,A
    1770  0B9B A FDCBFED6           SET    2,(IY-02H)     ;INDICATE BLOCK XFER
    1771  0B9F A 0E00               LD     C,00H
    1772  0BA1 A 216705             LD     HL,BXMT
    1773  0BA4 A 229811             LD     (SIOTA),HL
    1774  0BA7 A C37309             JP     RCRC
    1775  0BAA A FDCBFE96   STRY:   RES    2,(IY-02H)     ;INDICATE NORMAL XFER
    1776  0BAE A 3A3512             LD     A,(BTSW)       ;FIND NO. OF BYTES IN XFER
    1777  0BB1 A E63F               AND    3FH
    1778  0BB3 A CB07               RLC    A
    1779  0BB5 A C602               ADD    A,02H          ;INCLUDE COMMAND
    1780  0BB7 A 47                 LD     B,A
    1781  0BB8 A 0EE0               LD     C,SIOAD
    1782  0BBA A C36D09             JP     RCRD
    1783  0BBD A 18        SCDA    DEFB    18H
    1784  0BBE A 04                DEFB    04H
    1785  0BBF A 20                DEFB    20H
    1786  0BC0 A 01                DEFB    01H
    1787  0BC1 A 1A                DEFB    1AH
    1788  0BC2 A 07                DEFB    07H
    1789  0BC3 A 7E                DEFB    7EH
    1790  0BC4 A 03                DEFB    03H
    1791  0BC5 A 00                DEFB    00H
    1792  0BC6 A 05                DEFB    05H
    1793  0BC7 A 00                DEFB    00H
    1794  0BC8 A 18                DEFB    18H
    1795  0BC9 A 04                DEFB    04H
    1796  0BCA A 04                DEFB    04H
    1797  0BCB A 01                DEFB    01H
    1798  0BCC A 04                DEFB    04H
    1799  0BCD A 02                DEFB    02H
    1800  0BCE A 90                DEFB    SIOV
    1801  0BCF A 03                DEFB    03H
    1802  0BD0 A 00                DEFB    00H
    1803  0BD1 A 05                DEFB    05H
    1804  0BD2 A 00                DEFB    00H
    1805  0BD3 A 05        SIOR    DEFB    05H
    1806  0BD4 A 00                DEFB    00H
    1807  0BD5 A 03                DEFB    03H
    1808  0BD6 A D9                DEFB    0D9H
    1809  0BD7                     END

ASSEMBLER ERRORS =    0
```

I claim:

1. A digital controller of a type having a main processor which executes a control program to examine and change I/O status data, and which senses and controls I/O devices on a controlled system through I/O modules which are located in an I/O interface rack and which communicate with the main processor via I/O status data, wherein the improvement comprises:

the I/O interface rack being located remotely from the main processor;

I/O memory means coupled to the main processor for storing I/O status data that has been examined and changed by the main processor during execution of the control program, wherein the I/O status data is stored in an I/O image table with memory locations corresponding to respective I/O modules in the I/O interface rack;

a serial data link extending from a near end proximate the main processor to a remote end at the I/O interface rack; and a scanner electrically coupled to the I/O memory means and to the near end of the serial data link and an adapter located with the I/O modules and electrically coupled to the remote end of the serial data link, the scanner and the adapter each having first means electrically coupled to a respective end of the serial data link for selectively transmitting I/O status data for one or more of the I/O modules together with an associated mask word over the serial data link;

second means electrically coupled to the first means for generating the associated mask work with a bit pattern that correlates the I/O status data to one or more respective I/O modules; and third means electrically coupled to a respective end of the serial data link for receiving and selectively coupling I/O status data from the serial data link i) to the I/O memory means at the near end of the serial data link and ii) to the I/O modules at the remote end of the serial data link, for the scanner and adapter respectively, according to the bit pattern of the associated mask word that is received with the I/O status data.

2. The digital controller of claim 1, wherein:

the first means in the scanner repeatedly and selectively couples output status data from the I/O memory means to the serial data link; and wherein the first means in the scanner has refresh means for selecting output status data for a number of transmissions to the I/O rack; and wherein the second means in the scanner has means for rotating a bit in bit patterns of successive output mask words associated with respective transmissions until output status data has been coupled for each of the I/O modules in the I/O interface rack, thereby providing refreshed output status data to the I/O interface rack over a number of transmissions defined by a number of bit positions in one output mask word.

3. The digital controller of claim 2, wherein:

the scanner has fourth means for storing a last state image table of output status data last coupled to the serial data link;

wherein the second means in the scanner has update means coupled to the fourth means for storing the last state image table and coupled to the I/O memory means, the update means being responsive to changed output status data at one of the memory locations in the I/O memory means to update the last state image table and to generate a bit in an update mask word that has a bit pattern which correlates the changed output status data in the I/O memory means to a respective one of the I/O modules; and wherein the second means in the scanner also has means coupled to the update means for combining the update mask word and the mask word with the rotating bit to provide an output mask word that is associated with both changed and refreshed output status data that is selected for transmission.

4. The digital controller of claim 1, wherein:

the first means in the adapter repeatedly and selectively couples input status data to the serial data link; and wherein the adapter has refresh means for selecting input status data for a number of transmissions to the scanner means and for rotating a bit in bit patterns of successive input mask words associated with respective transmissions until input status data has been coupled for each of the I/O modules in the I/O interface rack over a number of transmissions defined by a number of bit positions in one input mask word.

5. The digital controller of claim 4, wherein:

the adapter has fourth means for storing an adapter I/O image table of input status data last coupled from the I/O modules; and wherein the second means in the adapter has input change detection means, coupled to the I/O modules and responsive to input status data that has changed from the input status data last coupled from that I/O module to the adapter I/O image table, for generating a bit in an update mask word that has a bit pattern which correlates the input status data that has changed to a relative position within the rack of at least one of the I/O modules; and wherein the adapter also has means for combining the update mask word with a mask word having a rotating bit in its bit pattern to provide a resultant input mask word that correlates both changed and refreshed input status data to locations of the I/O modules providing such changed and refreshed input status data.

6. The digital controller of claim 1, wherein:

the scanner has fourth means for storing a last state image table of output status data last coupled to the serial data link; and wherein the second means in the scanner further includes update means coupled to the last state image table and to the I/O memory means, the update means being responsive to changed output status data at a location in the I/O memory means to update the last state image table and to generate a bit in an update mask word that has a bit pattern which correlates the location storing changed output status data in the I/O memory means to at least one of the I/O modules.

7. The digital controller of claim 1, wherein:

the adapter means includes fourth means for storing an adapter I/O image table of input status data last coupled from the I/O modules; and wherein the second means in the adapter further includes input change detection means coupled to the I/O modules and responsive to input status data that has changed from the input status data last coupled from that I/O module to the adapter I/O image table for generating a bit in an update mask word that has a bit pattern which correlates the input status data that has changed to a relative position within the rack of at least one of the I/O modules.

8. A digital controller of a type having a main processor that executes a control program to examine input status data and to determine resulting output status data, the controller also having an I/O interface rack with I/O modules that use input and output status data to sense and control I/O devices on a controlled system, wherein the improvement comprises:

the I/O interface rack being located remotely from the main processor;

memory means with an image table that is associated with the main processor for storing input status data examined during execution of a control program and output status data resulting from execution of the control program;

a serial data link connected to the I/O interface rack;

a scanner circuit coupled between the main processor and the serial data link, the scanner circuit including, first scanner means electrically connected to the serial data link for periodically and selectively coupling output status data and an associated output mask word to the I/O interface rack, wherein the first scanner means generates the output mask word with a bit pattern in which each bit corresponds to a position of at least one I/O module in the I/O interface rack that is selected to receive the output status data, and second scanner means electrically connected to the memory means with the image table associated with the main processor, and electrically connected to the serial data link, the second scanner means being responsive to the receipt of input status data and an input mask word through the serial data link to couple such input status data to a location in the image table associated with the main processor that corresponds to a position of an I/O module from which the input status data is coupled as indicated by the input mask word; and an adapter circuit disposed in the I/O interface rack and including, first adapter means electrically connected to the I/O modules for periodically coupling output status data to the I/O modules and input status data from the I/O modules, second adapter means electrically connected to the first adapter means and to the serial data link and responsive to the receipt of output status data and an output mask word through the serial data link for coupling such output status data through the first adapter means to at least one I/O module according to the bit pattern in the output mask word, and third adapter means electrically connected to the first adapter means and to the serial data link for selectively coupling input status data from the first adapter means to the serial data link, wherein the third adapter means generates an input mask word with a bit pattern in which each bit corresponds to the position of at least one I/O module in the I/O interface rack.

9. The digital controller of claim 8, wherein:

the third adapter means repeatedly and selectively couples input status data to the serial data link; and wherein the adapter circuit includes fourth adapter means coupled to the third adapter means for selecting refresh input status data for a number of transmissions to the scanner means and for rotating a bit in bit patterns of successive input mask words associated with respective transmissions until refresh input status data has been coupled for each of the I/O modules in the I/O interface rack over a number of transmissions defined by a number of bit positions in one input mask word;

wherein such refresh input status data is examined by the main processor during execution of the control program to generate refresh output status data; and wherein the first scanner means provides the refresh output status data to the I/O interface rack over a number of transmissions defined by a number of bit positions in one output mask word by rotating a bit in the bit patterns of successive output mask words until output status data has been coupled for each of the I/O modules in the I/O interface rack.

10. A digital controller of a type having a main processor that executes a control program to examine I/O status data and to determine resulting I/O status data, the controller also having an I/O interface rack with I/O modules that are responsive to I/O status data to sense and control the status of I/O devices on a controlled system, wherein the improvement comprises:

the I/O interface rack being located remotely from the main processor;

memory means with an image table that is associated with the main processor for storing I/O status data examined and determined during execution of the control program;

a serial data link extending from the main processor to the I/O interface rack;

a scanner circuit coupled between the main processor and the serial data link, the scanner circuit including first scanner means coupled to the serial data link for storing a last state image table of I/O status data last coupled to the I/O interface rack, second scanner means coupled to the first scanner means and to the memory means with the image table associated with the main processor and responsive to changed I/O status data in the image table associated with the main processor for coupling such changed I/O status data to the last state image table in the first scanner means, third scanner means coupled to the first scanner means and to the main processor and responsive to changed I/O status data coupled from the image table associated with the main processor for generating an associated output mask word with a bit pattern in which each bit corresponds to a position of one or more I/O modules in the I/O interface rack, fourth scanner means electrically connected to the second and third scanner means and to the serial data link for coupling changed I/O status data and its associated output mask word to the serial data link, and fifth scanner means electrically connected to the first scanner means, to the memory means with the image table associated with the main processor and to the serial data link, and responsive to receipt of changed I/O status data and an associated input mask word through the serial data link to couple such changed I/O status data to the image table associated with the main processor; and an adapter circuit disposed in the I/O interface rack and including first adapter means electrically connected to the I/O modules and to the serial data link for storing I/O status data that is coupled through the serial data link including an adapter image table of I/O status data last coupled to or from the I/O modules, second adapter means electrically connected to the first adapter means and to the serial data link for coupling changed I/O status data and its associated output mask word from the serial data link to the first adapter means and for coupling changed I/O status data and an associated input mask word from the first adapter means to the serial data link for transmission to the first scanner circuit, third adapter means coupled to the first and second adapter means and responsive to the receipt of changed I/O status data and its associated output mask word for coupling such changed I/O status data to the adapter image table, fourth adapter means coupled to the I/O modules and to the first adapter means for periodic I/O scanning of the I/O modules in which I/O status data in the adapter image table is coupled to the I/O modules and in which the I/O status data in the adapter image table is updated in response to changed I/O status data coupled from the I/O modules, and fifth adapter means coupled to the fourth adapter means and responsive to changed I/O status data from the I/O modules for generating an associated input mask word that has a bit pattern indicating a position of an I/O module providing such changed I/O status data, whereby the main processor is provided with continual scanning of the I/O modules and with selective transfer of I/O status data through the serial data link.

* * * * *

UNITED STATES PATENT AND TRADEMARK OFFICE
CERTIFICATE OF CORRECTION

PATENT NO. : 4,404,651

DATED : September 13, 1983

INVENTOR(S) : Raymond A. Grudowski

It is certified that error appears in the above—identified patent and that said Letters Patent is hereby corrected as shown below:

On the title page
In the Abstract, in line 11, "mask work" should be --mask word--.

In Column 1, lines 8-12 should be deleted and the following substituted --are provided as a microfiche appendix and which form a part of the specification herein.--.

In column 7, line 15, "FIGS. 4-6" should be --FIGS. 3-5-- and "FIG. 5" should be --FIG. 4--.

In column 7, line 22, "FIG. 4" should be --FIG. 3--.

In column 7, line 23, "FIG. 4" should be --FIG. 3--.

In column 7, line 24, "FIG. 4" should be --FIG. 3--.

In column 7, line 25, "FIG. 6" should be --FIG. 5-- and "Q" should be --$\bar{Q}$--.

In column 7, line 28, "Q" should be --$\bar{Q}$--.

In column 7, line 32, "FIG. 5" should be --FIG. 4--.

In column 7, line 44, "FIGS. 4,5 and 6" should be --FIGS. 3,4 and 5-- and "Q" should be --$\bar{Q}$--.

In column 7, line 49, "Q" should be --$\bar{Q}$--.

In column 7, line 52, "FIG. 4" should be --FIG. 3--.

UNITED STATES PATENT AND TRADEMARK OFFICE
CERTIFICATE OF CORRECTION

PATENT NO. : 4,404,651
DATED : September 13, 1983
INVENTOR(S) : Raymond A. Grudowski It is certified that error appears in the above—identified patent and that said Letters Patent is hereby corrected as shown below:

In column 7, line 54, "Q" should be --$\overline{Q}$--.

In column 7, line 62, "FIG. 4" should be --FIG. 3--.

In column 7, line 63, "FIG. 4" should be --FIG. 3-- and "FIG. 5" should be --FIG. 4--.

In column 7, line 65, "Q" should be --$\overline{Q}$--.

In column 8, line 5, "FIG. 4" should be --FIG. 3--.

In column 8, line 8, "FIG. 4" should be --FIG. 3--.

In column 8, line 19, "FIG. 5" should be --FIG. 4--.

In column 8, line 21, "FIG. 4" should be --FIG. 3--.

In column 8, line 23, "coupled" should be --couples--.

In column 8, line 31, "FIG. 6" should be --FIG. 5--.

In column 8, line 34, "FIG. 5" should be --FIG. 4--.

In column 8, line 35, "Q" should be --$\overline{Q}$--.

In column 8, line 51, "FIG. 5" should be --FIG. 4--.

In column 8, line 52, --the-- should appear before "trailing".

UNITED STATES PATENT AND TRADEMARK OFFICE
CERTIFICATE OF CORRECTION

PATENT NO. : 4,404,651

DATED : September 13, 1983

INVENTOR(S) : Raymond A. Grudowski

It is certified that error appears in the above—identified patent and that said Letters Patent is hereby corrected as shown below:

In column 11, line 23, "115" should be --B--.

In column 11, line 25, "FIG. 8" should be --FIG. 6--.

In column 11, line 48, "B" should be --115--.

In column 12, line 7, "back" should be --back- --.

In column 16, line 19, --of-- should appear after "all".

In column 16, line 24, "STAGE" should be --STATE--.

In column 16, line 50, "stack" should be --start--.

In column 16, line 66 "at" should be --an--.

In column 17, line 67, "wheter" should be --whether--.

In column 18, line 18, "charged" should be --charted--.

In column 18, line 52, "determined" should be --determine--.

In column 19, line 10, --of-- should appear after "storage".

In column 19, line 53, "block 394" should be --block 304--.

In column 21, line 11, "adaptor" should be --adapter--.

In column 22, line 55, "23bexe-" should be --23b exe- --.

UNITED STATES PATENT AND TRADEMARK OFFICE
CERTIFICATE OF CORRECTION

PATENT NO. : 4,404,651          PAGE 4 of 4

DATED : September 13, 1983

INVENTOR(S) : Raymond A. Grudowski

It is certified that error appears in the above—identified patent and that said Letters Patent is hereby corrected as shown below:

In column 23, line 19, "stage" should be --state--.

In column 151, line 32, "work" should be --word--.

Signed and Sealed this

Fourteenth Day of February 1984

[SEAL]

Attest:

GERALD J. MOSSINGHOFF

Attesting Officer      Commissioner of Patents and Trademarks